(12) United States Patent
Biasi et al.

(10) Patent No.: US 10,562,757 B2
(45) Date of Patent: Feb. 18, 2020

(54) PRODUCT DISPENSING SYSTEM

(71) Applicant: DEKA Products Limited Partnership, Manchester, NH (US)

(72) Inventors: John J. Biasi, Groton, MA (US); Russell H. Beavis, Merrimack, NH (US); Michael J. Goulet, Weare, NH (US); Eric L. Pribyl, Manchester, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 0 days.

(21) Appl. No.: 13/803,434

(22) Filed: Mar. 14, 2013

(65) Prior Publication Data

US 2014/0107835 A1 Apr. 17, 2014

Related U.S. Application Data

(63) Continuation-in-part of application No. 13/662,102, filed on Oct. 26, 2012, which is a continuation-in-part of application No. 13/339,962, filed on Dec. 29, 2011, now Pat. No. 8,516,902, which is a continuation of application No. 12/549,778, filed on Aug. 28, 2009, now Pat. No. 8,087,303, which is a continuation-in-part of application No. 12/437,356, filed on May 7, 2009, now Pat. No. 9,146,564, which is a continuation-in-part of application No. 12/205,762, filed on Sep. 5, 2008, now Pat. No. 8,322,570, which is a continuation-in-part of application No. 11/851,344, filed on Sep. 6, 2007, now Pat. No. 7,905,373.

(60) Provisional application No. 61/552,938, filed on Oct. 28, 2011, provisional application No. 61/560,007, filed on Nov. 15, 2011, provisional application No. 61/636,298, filed on Apr. 20, 2012, provisional application No. 61/092,404, filed on Aug. 28, 2008, provisional application No. 61/092,396, filed on Aug. 27, 2008, provisional application No. 61/092,394, filed on Aug. 27, 2008, provisional application No. 61/092,388, filed on Aug. 27, 2008, provisional application No. 60/970,501, filed on Sep. 6, 2007, provisional application No. 60/970,494, filed on Sep. 6, 2007, provisional application No. 60/970,493, filed (Continued)

(51) Int. Cl.
*B67D 7/22* (2010.01)

(52) U.S. Cl.
CPC .................................. *B67D 7/221* (2013.01)

(58) Field of Classification Search
CPC ................................. G06Q 20/18; G07F 7/00
USPC .................................................. 700/233–243
See application file for complete search history.

(56) References Cited

U.S. PATENT DOCUMENTS

| | | | | |
|---|---|---|---|---|
| 4,652,769 A | * | 3/1987 | Smith | H02M 3/3376 307/24 |
| 5,959,869 A | * | 9/1999 | Miller | G06Q 30/02 700/231 |

(Continued)

*Primary Examiner* — Timothy R Waggoner
(74) *Attorney, Agent, or Firm* — Michelle Saquet Temple

(57) ABSTRACT

A system for controlling selection and distribution of a product in a product dispensing system. The system includes a user interface for prompting a selection and selecting the product, a machine control processor in communication with the user interface, a power distribution module connected to the machine control processor, and a power supply unit for supplying power to the system through the power distribution module.

12 Claims, 114 Drawing Sheets

Related U.S. Application Data on Sep. 6, 2007, provisional application No. 60/970,495, filed on Sep. 6, 2007, provisional application No. 60/970,497, filed on Sep. 6, 2007, provisional application No. 61/054,757, filed on May 20, 2008, provisional application No. 61/054,629, filed on May 20, 2008, provisional application No. 61/054,745, filed on May 20, 2008, provisional application No. 61/054,776, filed on May 20, 2008.

(56) References Cited

U.S. PATENT DOCUMENTS

| | | | |
|---|---|---|---|
| 6,731,507 B2 * | 5/2004 | Varghese | G06F 1/18 312/223.2 |
| 7,154,381 B2 * | 12/2006 | Lang | H04L 12/10 340/12.32 |
| 7,236,946 B2 * | 6/2007 | Bates et al. | 705/26.81 |
| 7,458,510 B1 * | 12/2008 | Zhou | 713/168 |
| 7,627,496 B2 * | 12/2009 | Walker et al. | 705/16 |
| 8,245,739 B1 * | 8/2012 | Wade | B67D 1/0888 141/104 |
| 8,646,656 B2 * | 2/2014 | Johnson | A47K 5/1217 222/52 |
| 9,693,464 B2 * | 6/2017 | Bailey | H05K 7/20736 |
| 2005/0107076 A1 * | 5/2005 | Tsuda et al. | 455/419 |
| 2008/0028237 A1 * | 1/2008 | Knight | H04L 12/66 713/300 |
| 2008/0054837 A1 * | 3/2008 | Beavis | F04B 13/02 222/333 |
| 2009/0228722 A1 * | 9/2009 | Lin | H04L 12/10 713/300 |

* cited by examiner

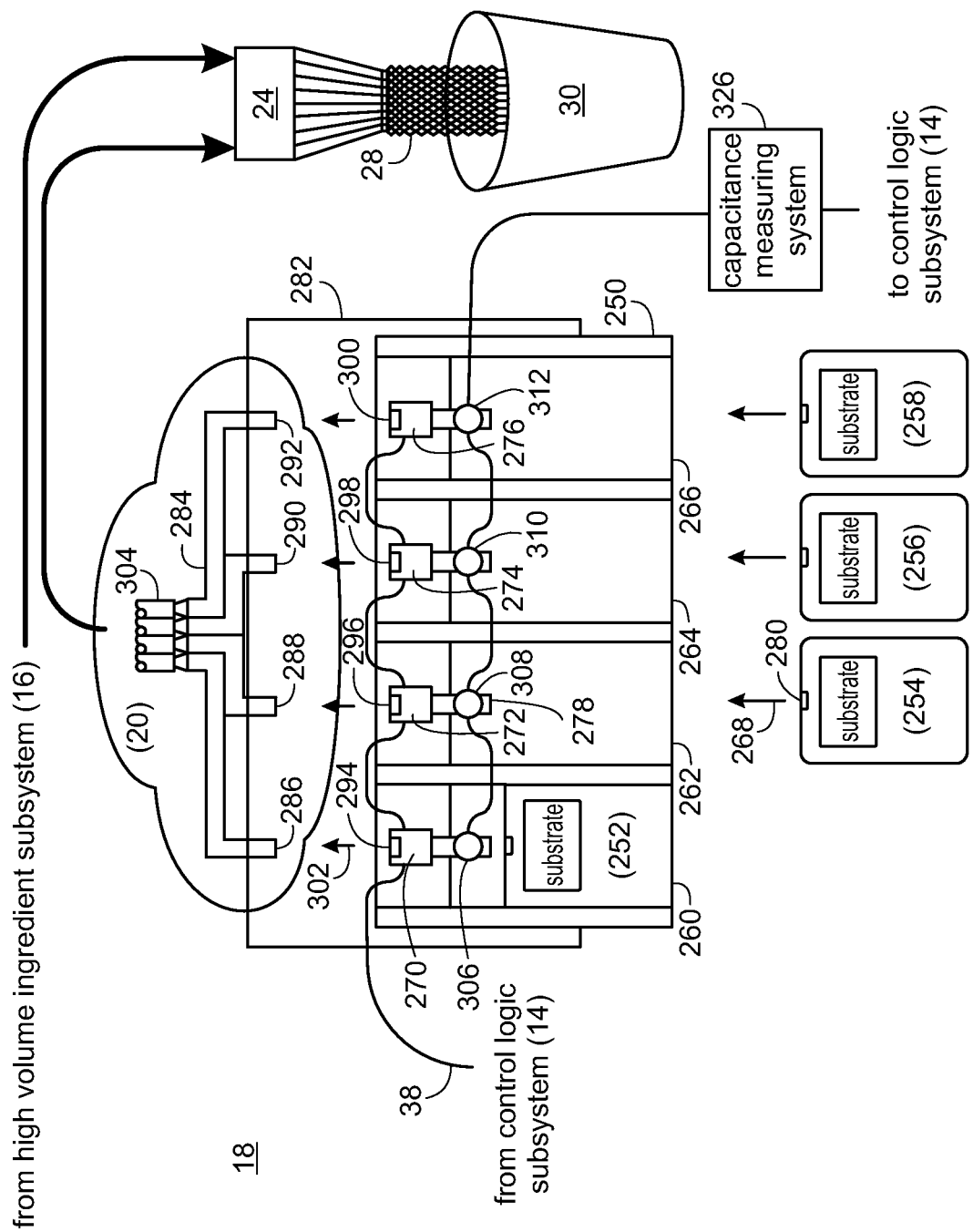

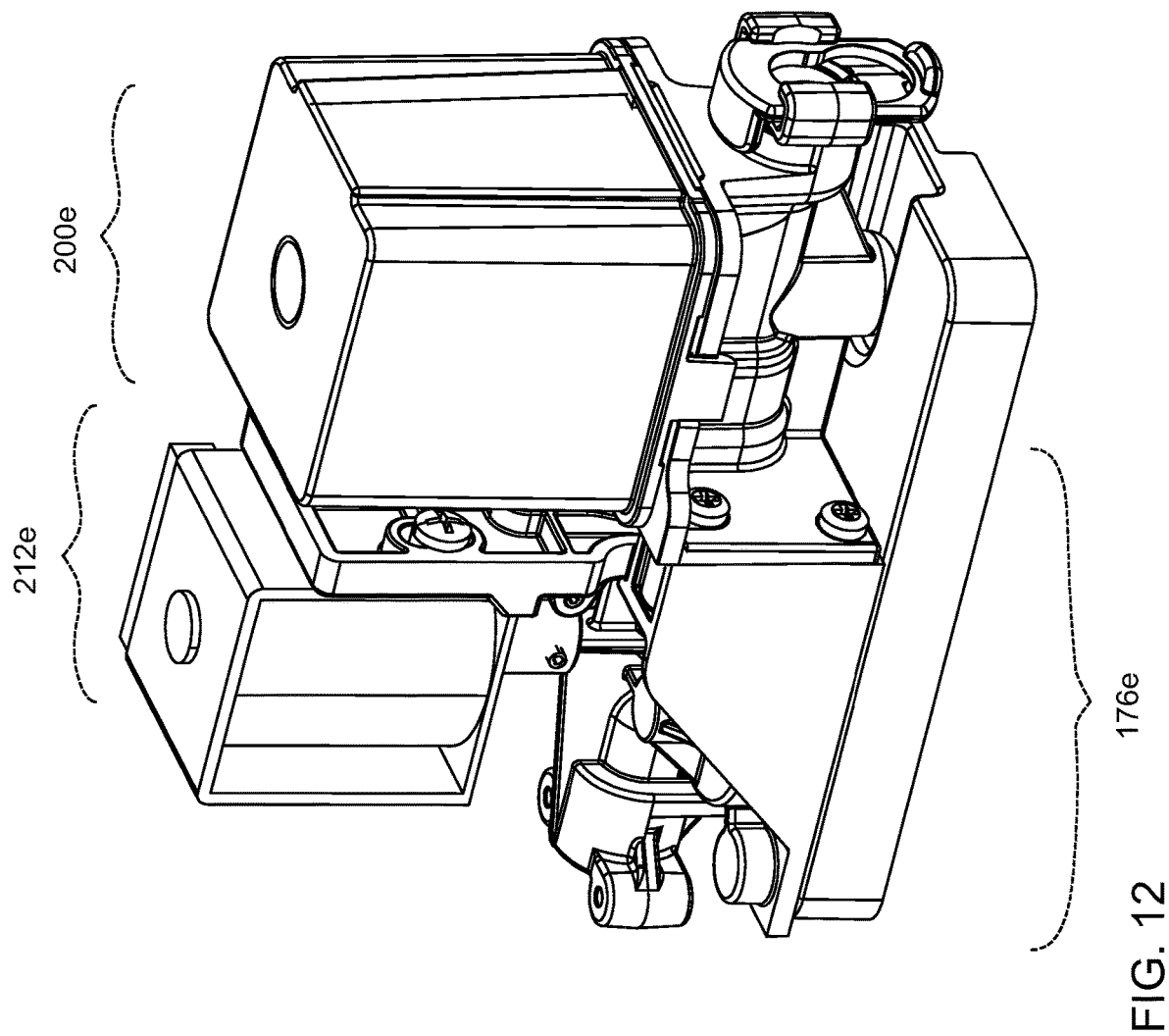
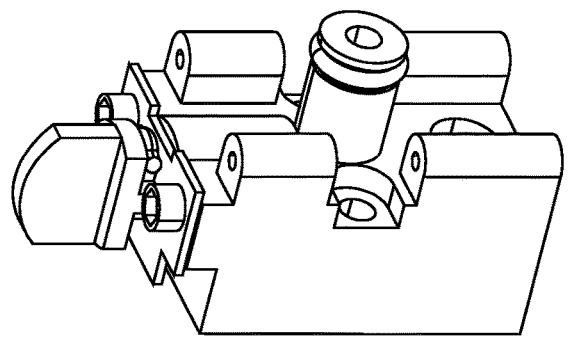
FIG. 12

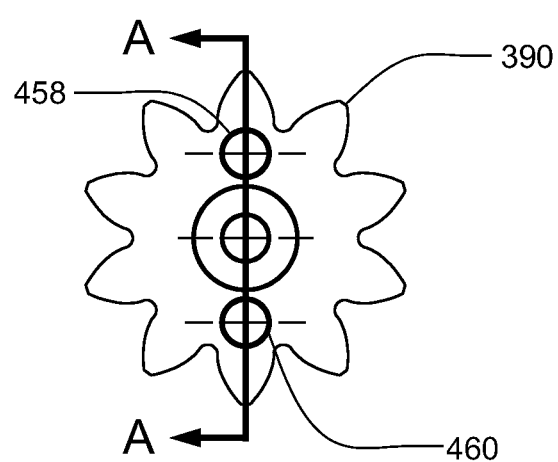
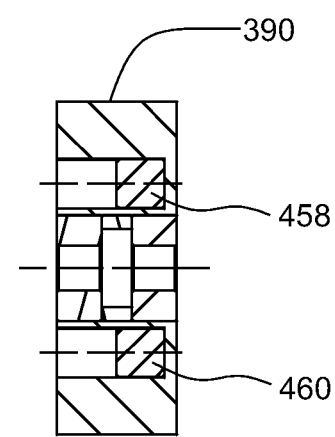
FIG. 16A                    FIG. 16B

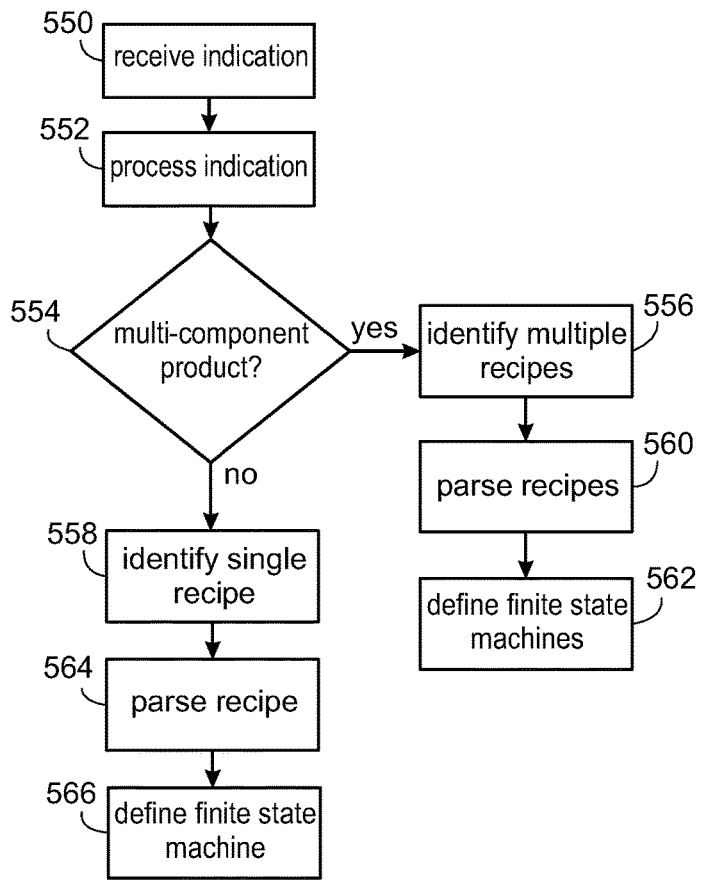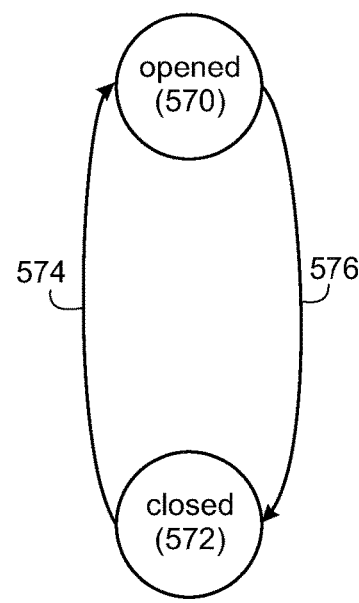
FIG. 18
FIG. 19

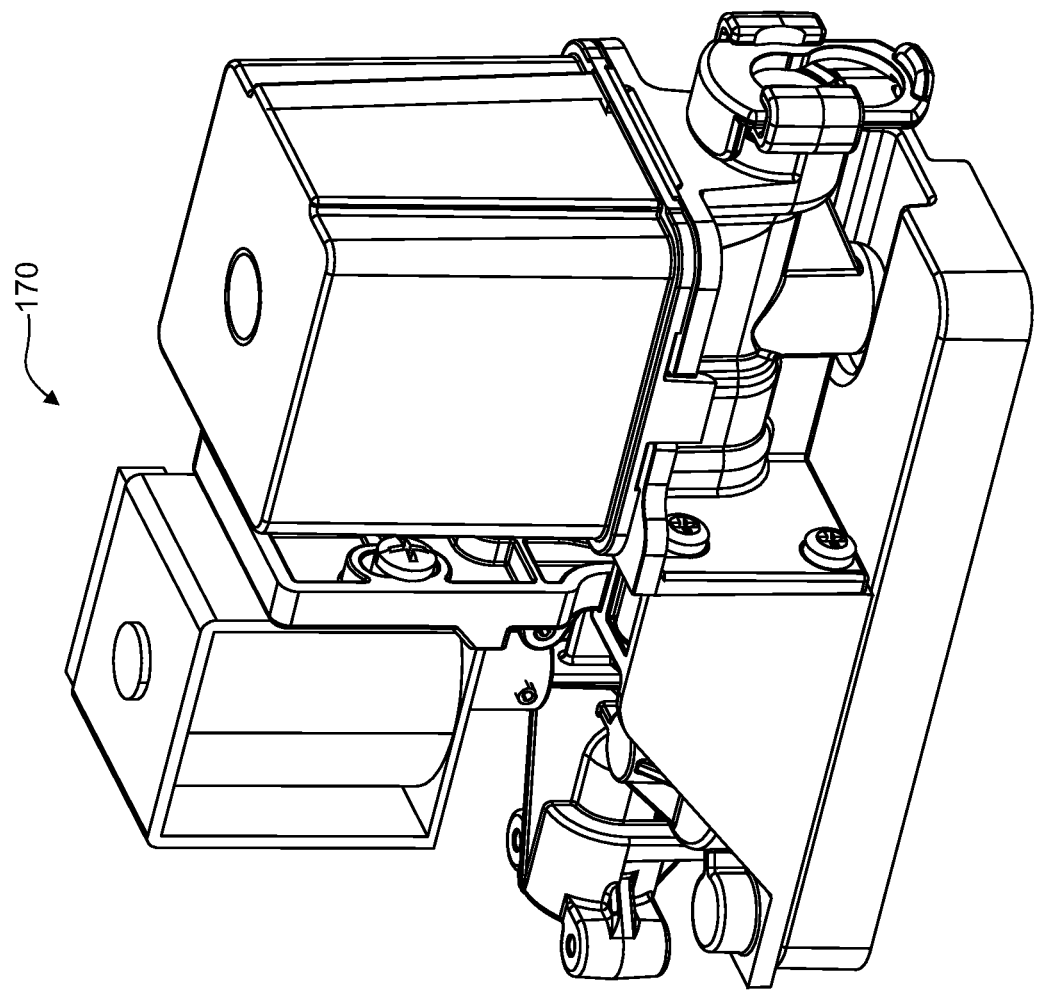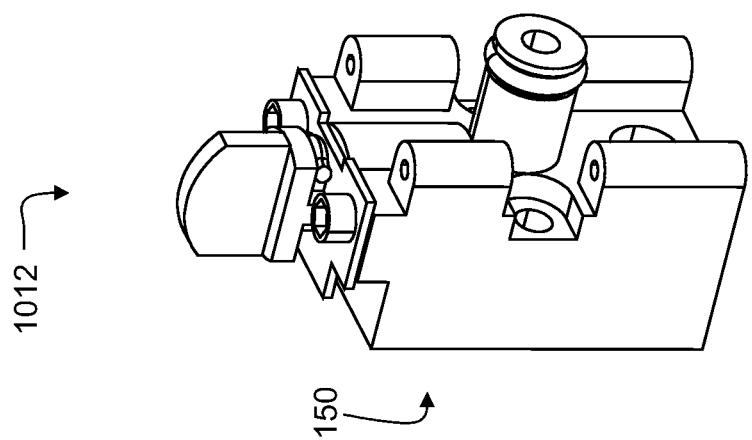
FIG. 34

PRODUCT DISPENSING SYSTEM

CROSS REFERENCE TO RELATED APPLICATIONS

The present application is a Continuation-In-Part of U.S. patent application Ser. No. 13/662,102, filed Oct. 26, 2012 and entitled Product Dispensing System, which claims priority to U.S. Provisional Patent Application Ser. No. 61/552,938 filed Oct. 28, 2011 and entitled Product Dispensing System; U.S. Provisional Patent Application Ser. No. 61/560,007 filed Nov. 15, 2011 and entitled Product Dispensing System; and U.S. Provisional Patent Application Ser. No. 61/636,298 filed Apr. 20, 2012 and entitled Product Dispensing System, each of which is hereby incorporated herein by reference in its entirety.

U.S. patent application Ser. No. 13/662,102, filed Oct. 26, 2012 and entitled Product Dispensing System, is also a Continuation-In-Part of U.S. patent application Ser. No. 13/339,962, filed Dec. 29, 2011, now U.S. Publication No. US-2012-0192969, published Aug. 2, 2012 and entitled Product Dispensing System, which is a Continuation of U.S. patent application Ser. No. 12/549,778, filed Aug. 28, 2009, and entitled Product Dispensing System, now U.S. Pat. No. 8,087,303, issued Jan. 3, 2012, which claims priority from U.S. Provisional Patent Application Ser. No. 61/092,404, filed Aug. 28, 2008 and entitled Product Dispensing System each of which are hereby incorporated herein by reference in its entirety.

U.S. Pat. No. 8,087,303, issued Jan. 3, 2012 and entitled Product Dispensing System, is a Continuation-In-Part of U.S. patent application Ser. No. 12/437,356, filed May 7, 2009, now U.S. Publication No. US-2010-0206400, published Aug. 19, 2010 and entitled Product Dispensing System which itself is a Continuation-In-Part of U.S. patent application Ser. No. 12/205,762, filed Sep. 5, 2008, and entitled Product Dispensing System, now U.S. Pat. No. 8,322,570, issued Dec. 4, 2012, each of which is hereby incorporated herein by reference in its entirety. U.S. Pat. No. 8,322,570, issued Dec. 4, 2012 and entitled Product Dispensing System, claims priority to: U.S. Provisional Patent Application Ser. No. 61/092,396, filed Aug. 27, 2008 and entitled RFID System and Method; U.S. Provisional Patent Application Ser. No. 61/092,394, filed Aug. 27, 2008 and entitled Processing System and Method; U.S. Provisional Patent Application Ser. No. 61/092,388, filed Aug. 27, 2008 and entitled Beverage Dispensing System; U.S. Provisional Patent Application Ser. No. 60/970,501, filed Sep. 6, 2007 and entitled Content Dispensing System; U.S. Provisional Patent Application Ser. No. 60/970,494, filed Sep. 6, 2007 and entitled Virtual Manifold System and Method; U.S. Provisional Patent Application Ser. No. 60/970,493, filed Sep. 6, 2007 and entitled FSM System and Method; U.S. Provisional Patent Application Ser. No. 60/970,495, filed Sep. 6, 2007 and entitled Virtual Machine System and Method; U.S. Provisional Patent Application Ser. No. 60/970,497, filed Sep. 6, 2007 and entitled RFID System and Method; U.S. Provisional Patent Application Ser. No. 61/054,757, filed May 20, 2008 and entitled RFID System and Method; U.S. Provisional Patent Application Ser. No. 61/054,629, filed May 20, 2008 and entitled Flow Control Module; U.S. Provisional Patent Application Ser. No. 61/054,745, filed May 20, 2008 and entitled Capacitance-Based Flow Sensor; and U.S. Provisional Patent Application Ser. No. 61/054,776, filed May 20, 2008 and entitled Beverage Dispensing System, each of which is hereby incorporated herein by reference in its entirety.

U.S. Pat. No. 8,322,570, issued Dec. 4, 2012 and entitled Product Dispensing System is a Continuation-In-Part of U.S. patent application Ser. No. 11/851,344, filed Sep. 6, 2007, now U.S. Pat. No. 7,905,373, issued Mar. 15, 2011 and entitled System and Method for Generating a Drive Signal, both of which is also hereby incorporated herein by reference in their entireties.

U.S. Pat. No. 7,905,373, issued Mar. 15, 2011, and System and Method for Generating a Drive Signal, is related to U.S. patent application Ser. No. 11/276,548, filed on Mar. 6, 2007, now U.S. Pat. No. 7,740,152, issued Jun. 22, 2010 and entitled Pump System with Calibration Curve, of which is also hereby incorporated herein by reference in entirety.

FIELD OF THE INVENTION

The present invention relates generally to processing systems and, more particularly, to processing systems that are used to generate products from a plurality of separate ingredients.

BACKGROUND

Processing systems may combine one or more ingredients to form a product. Unfortunately, such systems are often static in configuration and are only capable of generating a comparatively limited number of products. While such systems may be capable of being reconfigured to generate other products, such reconfiguration may require extensive changes to mechanical/electrical/software systems.

For example, in order to make a different product, new components may need to be added, such as e.g., new valves, lines, manifolds, and software subroutines. Such extensive modifications may be required due to existing devices/processes within the processing system being non-reconfigurable and having a single dedicated use, thus requiring that additional components be added to accomplish new tasks.

SUMMARY OF THE INVENTION

In accordance with one aspect of the present invention, a system for controlling selection and distribution of a product in a product dispensing system is disclosed. The system includes a user interface for prompting a selection and selecting the product, a machine control processor in communication with the user interface, a power distribution module connected to the machine control processor, and a power supply unit for supplying power to the system through the power distribution module.

Some embodiments of this aspect of the present invention may include one or more of the following features. Wherein the machine control processor further includes a microprocessor, and a communication interface. Wherein the machine control processor controls the distribution of the product through control of the power distribution module and a control logic subsystem. Wherein the power distribution module supplies power to the machine control processor through the power supply unit. Wherein the communication between the machine control processor and the user interface is a wireless communication. Wherein the communication between the machine control processor and the user interface is a wired communication.

In accordance with one aspect of the present invention, a method for controlling selection and distribution of a product from a product dispensing system. The method includes prompting a selection of the product on a user interface, communicating the selection from the user interface to a machine control processor, and dispensing the product under the control of the machine control processor and a product distribution module.

Some embodiments of this aspect of the present invention may include one or more of the following features. Wherein the machine control processor further includes a microprocessor, and a communication interface. Wherein the selection is communicated to the user interface from a wireless device. Wherein the wireless device selects the product from the user interface using a downloaded application. Wherein the wireless device is a device from the group comprising a smartphone, a desktop computer, a laptop computer, an MP3 player, and a tablet computer. Wherein the selection communication from the user interface to the machine control processor is a wireless communication.

In accordance with one aspect of the present invention, a system for monitoring flow conditions of fluid flowing from a product container through a solenoid pump is disclosed. The system includes at least one solenoid pump comprising a solenoid coil, which, when energized, produces a stroke of the solenoid pump, at least one product container connected to the at least one solenoid pump wherein the at least one solenoid pump pumps fluid from the at least one product container during each stroke, at least one PWM controller configured to energize the at least one solenoid pump, at least one current sensor for sensing the current flow through the solenoid coil and producing an output of the sensed current flow, and a control logic subsystem for controlling the flow of fluids through the solenoid pump by commanding the PWM controller and for monitoring the current through the solenoid pump by receiving the output from the current sensor, wherein the control logic subsystem uses the measured current flow through the solenoid coil to determine whether the stroke of the solenoid pump is functional.

Some embodiments of this aspect of the present invention may include one or more of the following features: wherein the control logic subsystem uses at least the measured current flow through the solenoid coil to determine a Sold-Out condition of the at least one product container. Wherein the control logic subsystem uses the measured current flow through the solenoid coil to determine whether the stroke of the solenoid pump is non-functional. Wherein the control logic subsystem uses the measured current flow through the solenoid coil to determine whether the stroke of the solenoid pump is a Sold-Out Stroke.
Wherein the control logic subsystem determines a Sold-Out condition of the at least one product container if a threshold number of consecutive Sold-Out Strokes is reached. Wherein the at least one product container further comprising an RFID tag that stores a fuel gauge value representing the amount of fluid remaining in the at least one product container.
Wherein the control logic subsystem determines a Sold-Out condition of the at least one product container if a given number of consecutive Sold-Out Strokes are determined and the fuel gauge is above a threshold volume.

In accordance with one aspect of the present invention, a method for monitoring flow of fluid from a product container through a solenoid pump is disclosed. The method includes energizing a solenoid coil of the solenoid pump to produce a stroke of the solenoid pump, pumping fluid from a product container through the solenoid pump during each stroke, sensing the current flow through the solenoid using a current sensor and producing an output of sensed current flow, monitoring the current through the solenoid pump using a control logic subsystem, the control logic subsystem receiving the sensed current flow from the current sensor, and determining whether the stroke of the solenoid pump is functional.

Some embodiments of this aspect of the present invention may include one or more of the following features: wherein the control logic subsystem determining a Sold-Out condition of the at least one product container using at least the measured current flow through the solenoid coil. Wherein the control logic subsystem determining whether the stroke of the solenoid pump is non-functional using the measured current flow through the solenoid coil. Wherein the control logic subsystem determining whether the stroke of the solenoid pump a Sold-Out Stroke using the measured current flow through the solenoid coil.
Wherein the control logic subsystem determining a Sold-Out condition of the at least one product container if a threshold number of consecutive Sold-Out Strokes is reached. Determining the amount of fluid remaining in the product container using an RFID tag that stores a fuel gauge value representing the amount of fluid remaining in the at least one product container. Wherein the control logic subsystem determining a Sold-Out condition of the product container if a given number of consecutive Sold-Out Strokes are determined and the fuel gauge is above a threshold volume.

In accordance with one aspect of the present invention, a system for determining a Sold-Out condition of a product container is disclosed. The system includes at least one solenoid pump comprising a solenoid coil, which, when energized, produces a stroke of the pump, at least one product container connected to the at least one solenoid pump wherein the at least one solenoid pump pumps fluid from the at least one product container during each stroke, at least one PWM controller configured to energize the at least one solenoid pump and control the voltage applied to the at least one solenoid pump, at least one current sensor for sensing the current flow through the solenoid coil and producing an output of the sensed current flow, and a control logic subsystem for controlling the flow of fluids through the solenoid pump by commanding the PWM controller and for monitoring the current through the pump by receiving the output from the current sensor, wherein the control logic subsystem uses at least the measured current flow through the solenoid coil to determine a Sold-Out condition of the at least one product container.

Some embodiments of this aspect of the present invention may include one or more of the following features: Wherein the control logic subsystem determines if the at least one solenoid pump stroke was a functional stroke based on the output of the current sensor.
Wherein the control logic subsystem determines if the at least one solenoid pump stroke was a Sold-Out Stroke based on the output of the current sensor. Wherein the control logic subsystem determines a Sold-Out condition of the at least one product container if a threshold number of consecutive Sold-Out Strokes is reached. Wherein the control logic subsystem determines if the at least one solenoid pump stroke was a non-functional stroke based on the output of the current sensor. Wherein the at least one product container further comprising an RFID tag that stores a fuel gauge value representing the amount of fluid remaining in the at least one product container. Wherein the control logic subsystem determines a Sold-Out condition of the system if a given number of consecutive Sold-Out strokes are determined and the fuel gauge is above a threshold volume. Wherein the control logic subsystem varies a high frequency duty cycle of the PWM controller to control the current measured by the current sensor. At least one power supply connected to the at least one solenoid pump via the at least one PWM controller and the at least one current sensor.

In accordance with one aspect of the present invention, a method for cross reading mitigation in a product dispensing system is disclosed. The method includes scanning a plurality of RFID tag assemblies in the product dispensing system, evaluating the RFID tag assemblies for position within the product dispensing system, if one or more RFID tag assemblies are read in more than one slot, determining the time in slot, comparing the fitment maps, and comparing received signal strength indication values.

In accordance with one aspect of the present invention, in a first implementation, a flow sensor includes a fluid chamber configured to receive a fluid. A diaphragm assembly is configured to be displaced whenever the fluid within the fluid chamber is displaced. A transducer assembly is configured to monitor the displacement of the diaphragm assembly and generate a signal based, at least in part, upon the quantity of fluid displaced within the fluid chamber.

Some embodiments of this aspect of the present invention may include one or more of the following features: wherein the transducer assembly comprising a linear variable differential transformer coupled to the diaphragm assembly by a linkage assembly; wherein the transducer assembly comprising a needle/magnet cartridge assembly; wherein the transducer assembly comprising a magnetic coil assembly; wherein the transducer assembly comprising a Hall Effect sensor assembly; wherein the transducer assembly comprising a piezoelectric buzzer element; wherein the transducer assembly comprising a piezoelectric sheet element; wherein the transducer assembly comprising an audio speaker assembly; wherein the transducer assembly comprising an accelerometer assembly; wherein the transducer assembly comprising a microphone assembly; and/or wherein the transducer assembly comprising an optical displacement assembly.

In accordance with another aspect of the present invention, a method for determining a product container is empty is disclosed. The method includes energizing a pump assembly, pumping a micro-ingredient from a product container, displacing a capacitive plate a displacement distance, measuring the capacitance of a capacitor, calculating the displacement distance from the measured capacitance, and determining whether the product container is empty.

In accordance with another aspect of the present invention a method for determining a product container is empty is disclosed. The method includes energizing a pump assembly, displacing a diaphragm assembly a displacement distance by pumping a micro-ingredient from a product container, measuring the displacement distance using a transducer assembly, using the transducer assembly generating a signal based, at least in part, upon the quantity of micro-ingredient pumped from the product container, and determining, using the signal, whether the product container is empty.

In accordance with another aspect of the present invention, a bracket for a product dispensing system is disclosed. The bracket includes a plurality of tabs and configured to align at least one bar code reader onto the door of the product dispensing system.

These aspects of the invention are not meant to be exclusive and other features, aspects, and advantages of the present invention will be readily apparent to those of ordinary skill in the art when read in conjunction with the appended claims and accompanying drawings.

BRIEF DESCRIPTION OF THE DRAWINGS

These and other features and advantages of the present invention will be better understood by reading the following detailed description, taken together with the drawings wherein:

FIG. 4 is a diagrammatic view of one embodiment of a microingredient subsystem included within the processing system of FIG. 1;

FIGS. 8-14C diagrammatically depict various alternative embodiments of a flow control module of FIG. 3;

FIGS. 16A and 16B diagrammatically depict a gear of a gear-based positive displacement flow measuring device according to one embodiment.

FIG. 18 is a flowchart of an FSM process executed by the control logic subsystem of FIG. 1;

FIG. 19 is a diagrammatic view of a first state diagram;

FIG. 34 is a diagrammatic view of a flow control module of the flow control subsystem of FIG. 33;

Like reference symbols in the various drawings indicate like elements.

DETAILED DESCRIPTION OF SPECIFIC EMBODIMENTS

Figure 1:
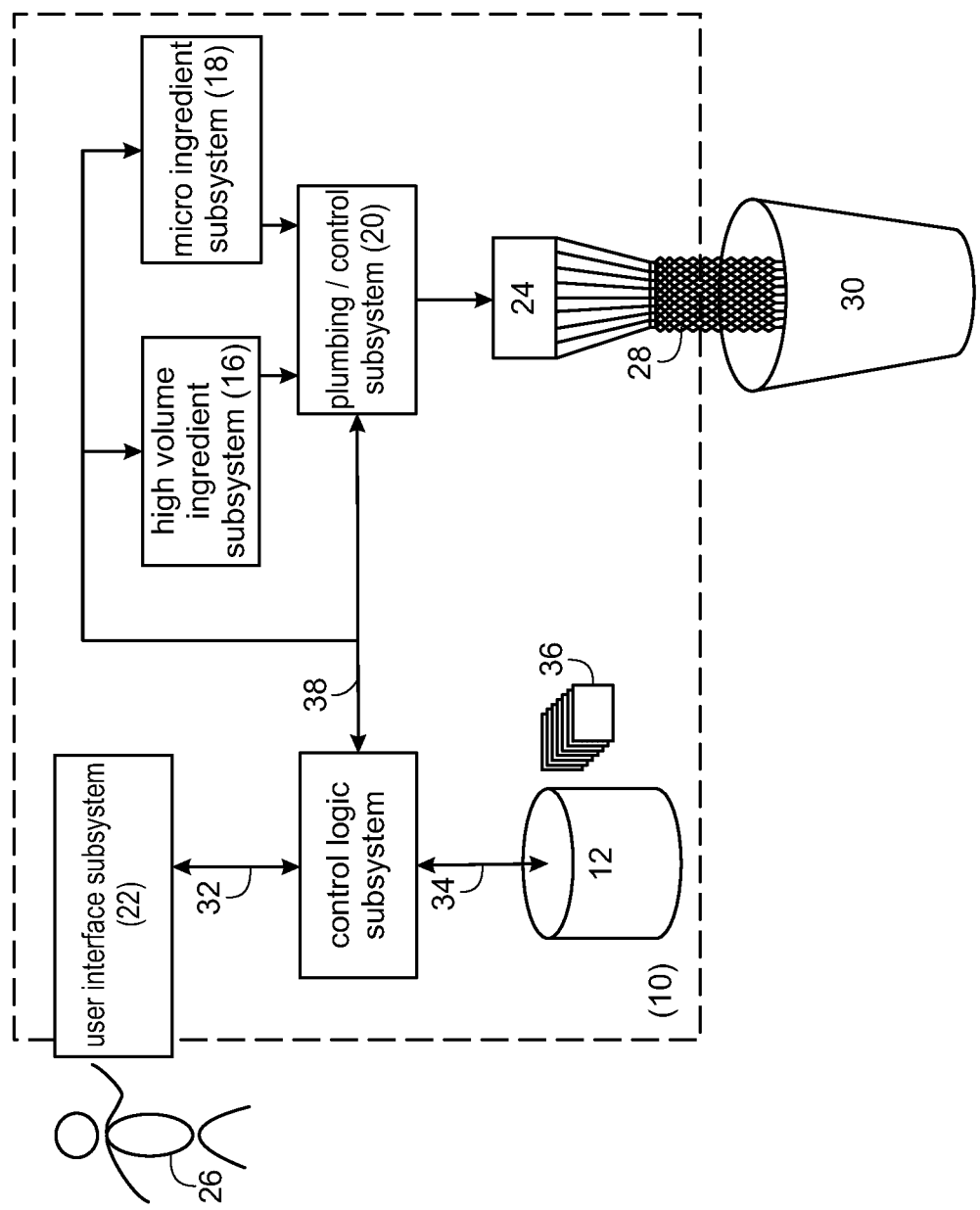
FIG. 1 is a diagrammatic view of one embodiment of a processing system.

Described herein is a product dispensing system. The system includes one or more modular components, also termed "subsystems". Although exemplary systems are described herein, in various embodiments, the product dispensing system may include one or more of the subsystems described, but the product dispensing system is not limited to only one or more of the subsystems described herein. Thus, in some embodiments, additional subsystems may be used in the product dispensing system.

The following disclosure will discuss the interaction and cooperation of various electrical components, mechanical components, electro-mechanical components, and software processes (i.e., "subsystems") that allow for the mixing and processing of various ingredients to form a product. Examples of such products may include but are not limited to: dairy-based products (e.g., milkshakes, floats, malts, frappes); coffee-based products (e.g., coffee, cappuccino, espresso); soda-based products (e.g., floats, soda w/ fruit juice); tea-based products (e.g., iced tea, sweet tea, hot tea); water-based products (e.g., spring water, flavored spring water, spring water w/ vitamins, high-electrolyte drinks, high-carbohydrate drinks); solid-based products (e.g., trail mix, granola-based products, mixed nuts, cereal products, mixed grain products); medicinal products (e.g., infusible medicants, injectable medicants, ingestible medicants, dialysates); alcohol-based products (e.g., mixed drinks, wine spritzers, soda-based alcoholic drinks, water-based alcoholic drinks, beer with flavor "shots"); industrial products (e.g., solvents, paints, lubricants, stains); and health/beauty aid products (e.g., shampoos, cosmetics, soaps, hair conditioners, skin treatments, topical ointments).

The products may be produced using one or more "ingredients". Ingredients may include one or more fluids, powders, solids or gases. The fluids, powders, solids, and/or gases may be reconstituted or diluted within the context of processing and dispensing. The products may be a fluid, solid, powder or gas.

The various ingredients may be referred to as "macroingredients", "microingredients", or "large volume microingredients". One or more of the ingredients used may be contained within a housing, i.e., part of a product dispensing machine. However, one or more of the ingredients may be stored or produced outside the machine. For example, in some embodiments, water (in various qualities) or other ingredients used in high volume may be stored outside of the machine (for example, in some embodiments, high fructose corn syrup may be stored outside the machine), while other ingredients, for example, ingredients in powder form, concentrated ingredients, nutraceuticals, pharmaceuticals and/or gas cylinders may be stored within the machine itself.

Various combinations of the above-referenced electrical components, mechanical components, electro-mechanical components, and software processes are discussed below. While combinations are described below that disclose e.g., the production of beverages and medicinal products (e.g., dialysates) using various subsystems, this is not intended to be a limitation of this disclosure, rather, exemplary embodiments of ways in which the subsystems may work together to create/dispense a product. Specifically, the electrical components, mechanical components, electro-mechanical components, and software processes (each of which will be discussed below in greater detail) may be used to produce any of the above-referenced products or any other products similar thereto.

Referring to FIG. 1, there is shown a generalized view of processing system 10 that is shown to include a plurality of subsystems namely: storage subsystem 12, control logic subsystem 14, high volume ingredient subsystem 16, microingredient subsystem 18, plumbing/control subsystem 20, user interface subsystem 22, and nozzle 24. Each of the above described subsystems 12, 14, 16, 18, 20, 22 will be described below in greater detail.

During use of processing system 10, user 26 may select a particular product 28 for dispensing (into container 30) using user interface subsystem 22. Via user interface subsystem 22, user 26 may select one or more options for inclusion within such product. For example, options may include but are not limited to the addition of one or more ingredients. In one exemplary embodiment, the system is a system for dispensing a beverage. In this embodiment, the user may select various flavorings (e.g. including but not limited to lemon flavoring, lime flavoring, chocolate flavoring, and vanilla flavoring) to be added into a beverage; the addition of one or more nutraceuticals (e.g. including but not limited to Vitamin A, Vitamin C, Vitamin D, Vitamin E, Vitamin $B_6$, Vitamin $B_{12}$, and Zinc) into a beverage; the addition of one or more other beverages (e.g. including but not limited to coffee, milk, lemonade, and iced tea) into a beverage; and the addition of one or more food products (e.g. ice cream, yogurt) into a beverage.

Once user 26 makes the appropriate selections, via user interface subsystem 22, user interface subsystem 22 may send the appropriate data signals (via data bus 32) to control logic subsystem 14. Control logic subsystem 14 may process these data signals and may retrieve (via data bus 34) one or more recipes chosen from a plurality of recipes 36 maintained on storage subsystem 12. The term "recipe" referring to instructions for processing/creating the requested product. Upon retrieving the recipe(s) from storage subsystem 12, control logic subsystem 14 may process the recipe(s) and provide the appropriate control signals (via data bus 38) to e.g. high volume ingredient subsystem 16, microingredient subsystem 18 (and, in some embodiments, large volume microingredients, not shown, which may be included in the description with respect to microingredients with respect to processing. With respect to the subsystems for dispensing these large volume microingredients, in some embodiments, an alternate assembly from the microingredient assembly, may be used to dispense these large volume microingredients), and plumbing/control subsystem 20, resulting in the production of product 28 (which is dispensed into container 30).

Figure 2:
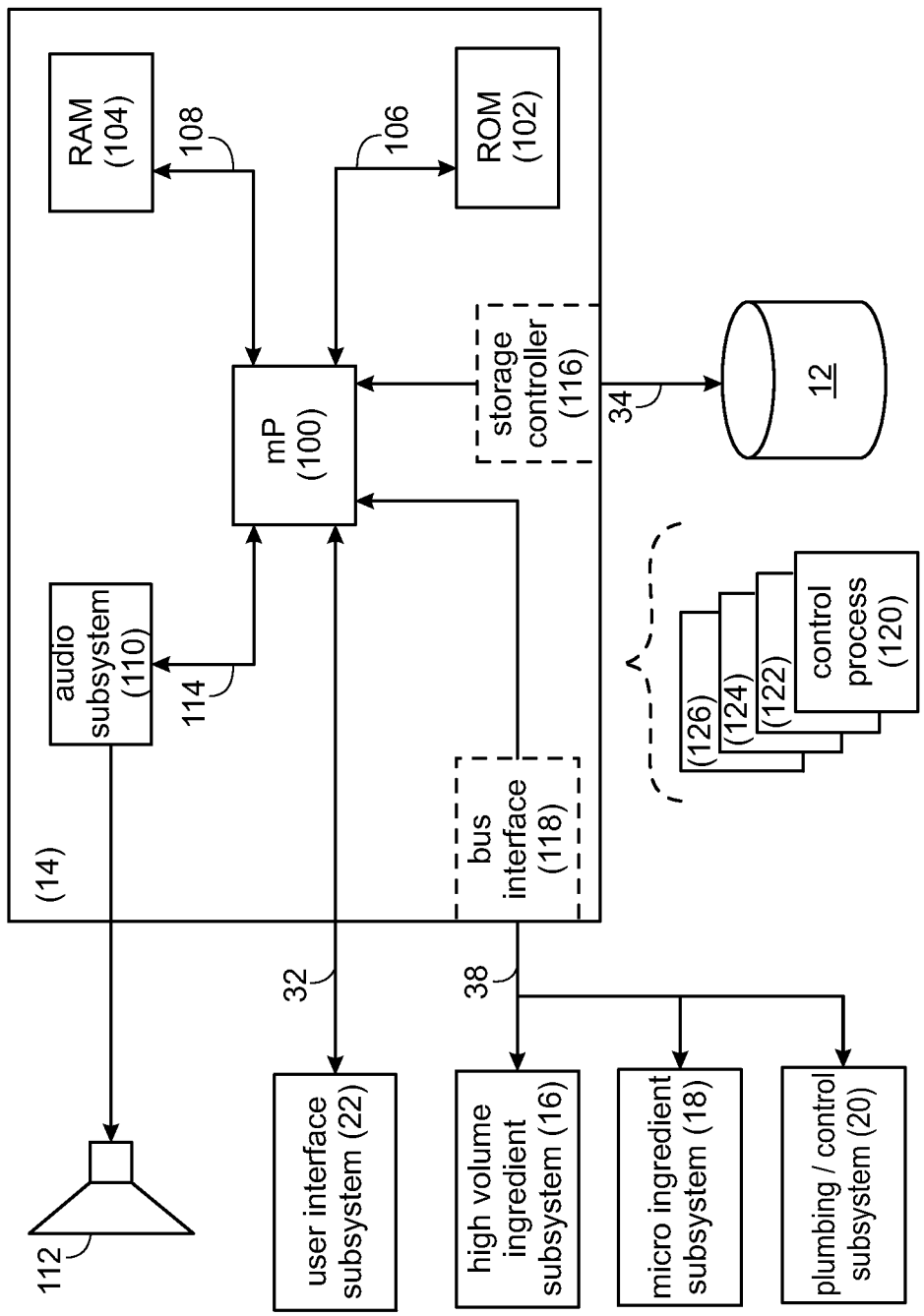
FIG. 2 is a diagrammatic view of one embodiment of a control logic subsystem included within the processing system of FIG. 1.

Referring also to FIG. 2, a diagrammatic view of control logic subsystem 14 is shown. Control logic subsystem 14 may include microprocessor 100 (e.g., an ARM™ microprocessor produced by Intel Corporation of Santa Clara, Calif.), nonvolatile memory (e.g. read only memory 102), and volatile memory (e.g. random access memory 104); each of which may be interconnected via one or more data/system buses 106, 108. As discussed above, user interface subsystem 22 may be coupled to control logic subsystem 14 via data bus 32.

Control logic subsystem 14 may also include an audio subsystem 110 for providing e.g. an analog audio signal to speaker 112, which may be incorporated into processing system 10. Audio subsystem 110 may be coupled to microprocessor 100 via data/system bus 114.

Control logic subsystem 14 may execute an operating system, examples of which may include but are not limited to Microsoft Windows CE™, Redhat Linux™, Palm OS™, or a device-specific (i.e., custom) operating system.

The instruction sets and subroutines of the above-described operating system, which may be stored on storage subsystem 12, may be executed by one or more processors (e.g. microprocessor 100) and one or more memory architectures (e.g. read-only memory 102 and/or random access memory 104) incorporated into control logic subsystem 14.

Storage subsystem 12 may include, for example, a hard disk drive, a solid state drive, an optical drive, a random access memory (RAM), a read-only memory (ROM), a CF (i.e., compact flash) card, an SD (i.e., secure digital) card, a SmartMedia card, a Memory Stick, and a MultiMedia card, for example.

As discussed above, storage subsystem 12 may be coupled to control logic subsystem 14 via data bus 34. Control logic subsystem 14 may also include storage controller 116 (shown in phantom) for converting signals provided by microprocessor 100 into a format usable by storage system 12. Further, storage controller 116 may convert signals provided by storage subsystem 12 into a format usable by microprocessor 100.

In some embodiments, an Ethernet connection is also included.

As discussed above, high-volume ingredient subsystem (also referred to herein as "macroingredients") 16, microingredient subsystem 18, and/or plumbing/control subsystem 20 may be coupled to control logic subsystem 14 via data bus 38. Control logic subsystem 14 may include bus interface 118 (shown in phantom) for converting signals provided by microprocessor 100 into a format usable by high-volume ingredient subsystem 16, microingredient subsystem 18, and/or plumbing/control subsystem 20. Further, bus interface 118 may convert signals provided by high-volume ingredient subsystem 16, microingredient subsystem 18 and/or plumbing/control subsystem 20 into a format usable by microprocessor 100.

As will be discussed below in greater detail, control logic subsystem 14 may execute one or more control processes 120 (e.g., finite state machine process (FSM process 122), virtual machine process 124, and virtual manifold process 126, for example) that may control the operation of processing system 10. The instruction sets and subroutines of control processes 120, which may be stored on storage subsystem 12, may be executed by one or more processors (e.g. microprocessor 100) and one or more memory architectures (e.g. read-only memory 102 and/or random access memory 104) incorporated into control logic subsystem 14.

Figure 3:
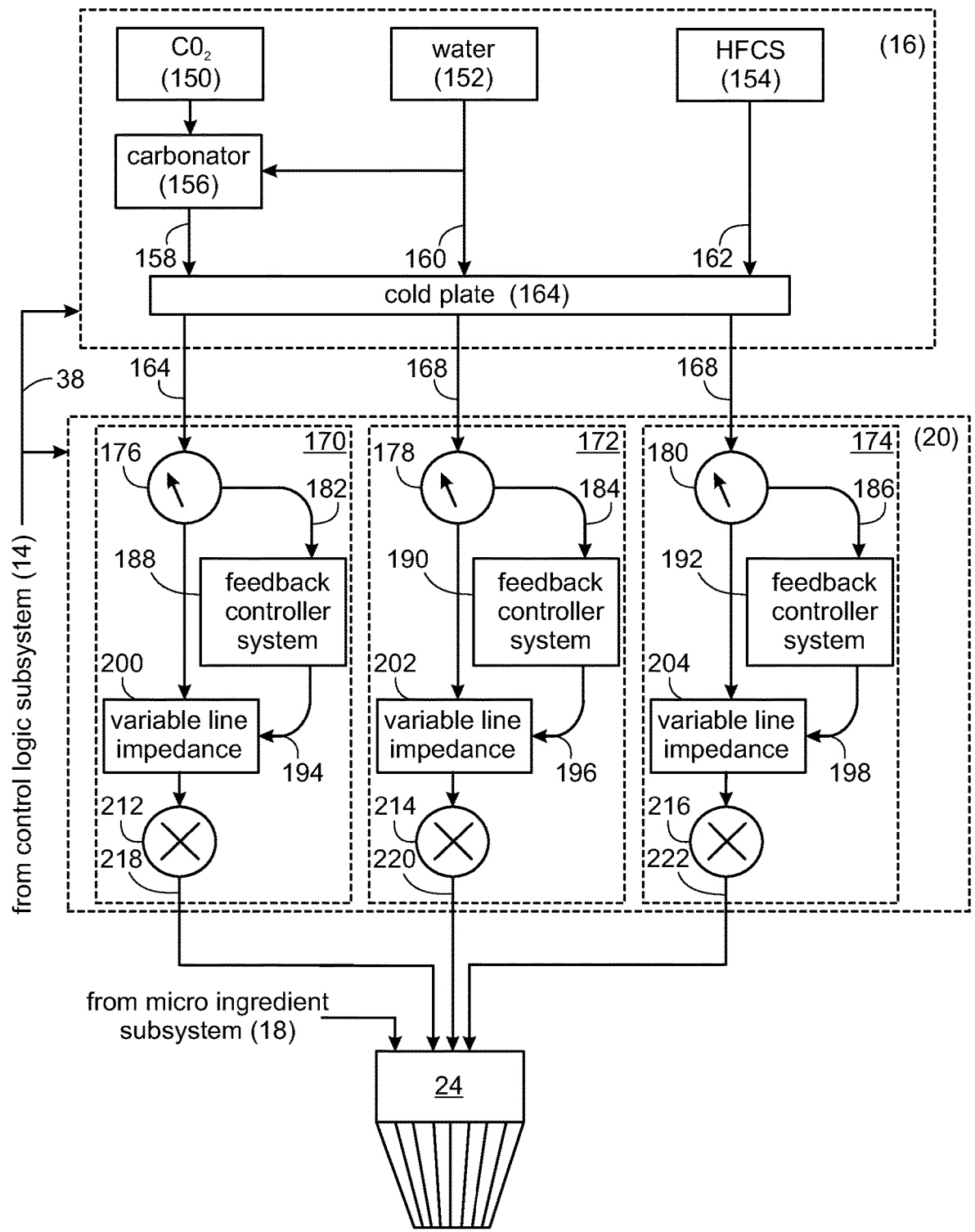
FIG. 3 is a diagrammatic view of one embodiment of a high volume ingredient subsystem included within the processing system of FIG. 1.

Referring also to FIG. 3, a diagrammatic view of high-volume ingredient subsystem 16 and plumbing/control subsystem 20 are shown. High-volume ingredient subsystem 16 may include containers for housing consumables that are used at a rapid rate when making beverage 28. For example, high-volume ingredient subsystem 16 may include carbon dioxide supply 150, water supply 152, and high fructose corn syrup supply 154. The high-volume ingredients, in some embodiments, are located within close proximity to the other subsystems. An example of carbon dioxide supply 150 may include, but is not limited to, a tank (not shown) of compressed, gaseous carbon dioxide. An example of water supply 152 may include but is not limited to a municipal water supply (not shown), a distilled water supply, a filtered water supply, a reverse-osmosis ("RO") water supply or other desired water supply. An example of high fructose corn syrup supply 154 may include, but is not limited to, one or more tank(s) (not shown) of highly-concentrated, high fructose corn syrup, or one or more bag-in-box packages of high-fructose corn syrup.

High-volume ingredient subsystem 16 may include a carbonator 156 for generating carbonated water from carbon dioxide gas (provided by carbon dioxide supply 150) and water (provided by water supply 152). Carbonated water 158, water 160 and high fructose corn syrup 162 may be provided to cold plate assembly 163 (for example, in embodiments where a product is being dispensed in which it may be desired to be cooled. In some embodiments, the cold plate assembly is not included as part of the dispensing systems or may be by-passed). Cold plate assembly 163 may be designed to chill carbonated water 158, water 160, and high fructose corn syrup 162 down to a desired serving temperature (e.g. 40° F.).

While a single cold plate 163 is shown to chill carbonated water 158, water 160, and high fructose corn syrup 162, this is for illustrative purposes only and is not intended to be a limitation of disclosure, as other configurations are possible. For example, an individual cold plate may be used to chill each of carbonated water 158, water 160 and high fructose corn syrup 162. Once chilled, chilled carbonated water 164, chilled water 166, and chilled high fructose corn syrup 168 may be provided to plumbing/control subsystem 20. And in still other embodiments, a cold plate may not be included. In some embodiments, at least one hot plate may be included.

Although the plumbing is depicted as having the order shown, in some embodiments, this order is not used. For example, the flow control modules described herein may be configured in a different order, i.e., flow measuring device, binary valve and then variable line impedance.

For descriptive purposes, the system will be described below with reference to using the system to dispense soft drinks as a product, i.e., the macroingredients/high-volume ingredients described will include high-fructose corn syrup, carbonated water and water. However, in other embodiments of the dispensing system, the macroingredients themselves, and the number of macroingredients, may vary.

For illustrative purposes, plumbing/control subsystem 20 is shown to include three flow control modules 170, 172, 174. Flow control modules 170, 172, 174 may generally control the volume and/or flow rate of high-volume ingredients. Flow control modules 170, 172, 174 may each include a flow measuring device (e.g., flow measuring devices 176, 178, 180), which measure the volume of chilled carbonated water 164, chilled water 166 and chilled high fructose corn syrup 168 (respectively). Flow measuring devices 176, 178, 180 may provide feedback signals 182, 184, 186 (respectively) to feedback controller systems 188, 190, 192 (respectively).

Feedback controller systems 188, 190, 192 (which will be discussed below in greater detail) may compare flow feedback signals 182, 184, 186 to the desired flow volume (as defined for each of chilled carbonated water 164, chilled water 166, and chilled high fructose corn syrup 168; respectively). Upon processing flow feedback signals 182, 184, 186, feedback controller systems 188, 190, 192 (respectively) may generate flow control signals 194, 196, 198 (respectively) that may be provided to variable line impedances 200, 202, 204 (respectively). Examples of variable line impedances 200, 202, 204 are disclosed and claimed in U.S. Pat. No. 5,755,683 and U.S. Patent Publication No.: 2007/0085049. Variable line impedances 200, 202, 204 may regulate the flow of chilled carbonated water 164, chilled water 166 and chilled high fructose corn syrup 168 passing through lines 218, 220, 222 (respectively), which are provided to nozzle 24 and (subsequently) container 30. However, additional embodiments of the variable line impedances are described herein.

Lines 218, 220, 222 may additionally include binary valves 212, 214, 216 (respectively) for preventing the flow of fluid through lines 218, 220, 222 during times when fluid flow is not desired/required (e.g. during shipping, maintenance procedures, and downtime).

In one embodiment, binary valves 212, 214, 216 may include solenoid operated binary valves. However, in other embodiments, the binary valves may be any binary valve known in the art, including, but not limited to a binary valve actuated by any means. Additionally, binary valves 212, 214, 216 may be configured to prevent the flow of fluid through lines 218, 220, 222 whenever processing system 10 is not dispensing a product. Further, the functionality of binary valves 212, 214, 216 may be accomplished via variable line impedances 200, 202, 204 by fully closing variable line impedances 200, 202, 204, thus preventing the flow of fluid through lines 218, 220, 222.

As discussed above, FIG. 3 merely provides an illustrative view of plumbing/control subsystem 20. Accordingly, the manner in which plumbing/control subsystem 20 is illustrated is not intended to be a limitation of this disclosure, as other configurations are possible. For example, some or all of the functionality of feedback controller systems 182, 184, 186 may be incorporated into control logic subsystem 14. Also, with respect to the flow control modules 170, 172, 174, the sequential configuration of the components are shown in FIG. 3 for illustration purposes only. Thus, the sequential configuration shown serves merely as an exemplary embodiment. However, in other embodiments, the components may be arranged in a different sequence.

Referring also to FIG. 4, a diagrammatic top-view of microingredient subsystem 18 and plumbing/control subsystem 20 is shown. Microingredient subsystem 18 may include product module assembly 250, which may be configured to releasably engage one or more product containers 252, 254, 256, 258, which may be configured to hold microingredients for use when making product 28. The microingredients are substrates that are used in making the product. Examples of such micro ingredients/substrates may include but are not limited to a first portion of a soft drink flavoring, a second portion of a soft drink flavoring, coffee flavoring, nutraceuticals, pharmaceuticals, and may be fluids, powders or solids. However for illustrative purposes, the description below refers to microingredients that are fluids. In some embodiments, the microingredients are powders or solids. Where a microingredient is a powder, the system may include an additional subsystem for metering the powder and/or reconstituting the powder (although, as described in examples below, where the microingredient is a powder, the powder may be reconstituted as part of the methods of mixing the product, i.e., the software manifold).

Product module assembly 250 may include a plurality of slot assemblies 260, 262, 264, 266 configured to releasably engage plurality of product containers 252, 254, 256, 258. In this particular example, product module assembly 250 is shown to include four slot assemblies (namely slots 260, 262, 264, 266) and, therefore, may be referred to as a quad product module assembly. When positioning one or more of product containers 252, 254, 256, 258 within product module assembly 250, a product container (e.g. product container 254) may be slid into a slot assembly (e.g. slot assembly 262) in the direction of arrow 268. Although as shown herein, in the exemplary embodiment, a "quad product module" assembly is described, in other embodiments, more or less product may be contained within a module assembly. Depending on the product being dispensed by the dispensing system, the numbers of product containers may vary. Thus, the numbers of product contained within any module assembly may be application specific, and may be selected to satisfy any desired characteristic of the system, including, but not limited to, efficiency, necessity and/or function of the system.

For illustrative purposes, each slot assembly of product module assembly 250 is shown to include a pump assembly. For example, slot assembly 252 is shown to include pump assembly 270; slot assembly 262 is shown to include pump assembly 272; slot assembly 264 is shown to include pump assembly 274; and slot assembly 266 is shown to include pump assembly 276.

An inlet port, coupled to each of pump assemblies 270, 272, 274, 276, may releasably engage a product orifice included within the product container. For example, pump assembly 272 is shown to include inlet port 278 that is configured to releasably engage container orifice 280 included within product container 254. Inlet port 278 and/or product orifice 280 may include one or more sealing assemblies (not shown), for example, one or more o-rings or a luer fitting, to facilitate a leak-proof seal. The inlet port (e.g., inlet port 278) coupled to each pump assembly may be constructed of a rigid "pipe-like" material or may be constructed from a flexible "tubing-like" material.

An example of one or more of pump assemblies 270, 272, 274, 276 may include, but is not limited to, a solenoid piston pump assembly that provides a calibratedly expected volume of fluid each time that one or more of pump assemblies 270, 272, 274, 276 are energized. In one embodiment, such pumps are available from ULKA Costruzioni Elettromeccaniche S.p.A. of Pavia, Italy. For example, each time a pump assembly (e.g. pump assembly 274) is energized by control logic subsystem 14 via data bus 38, the pump assembly may provide approximately 30 μL of the fluid microingredient included within product container 256 (however, the volume of flavoring provided may vary calibratedly). Again, for illustrative purposes only, the microingredients are fluids in this section of the description. The term "calibratedly" refers to volumetric, or other information and/or characteristics, that may be ascertained via calibration of the pump assembly and/or individual pumps thereof.

Figure 54:
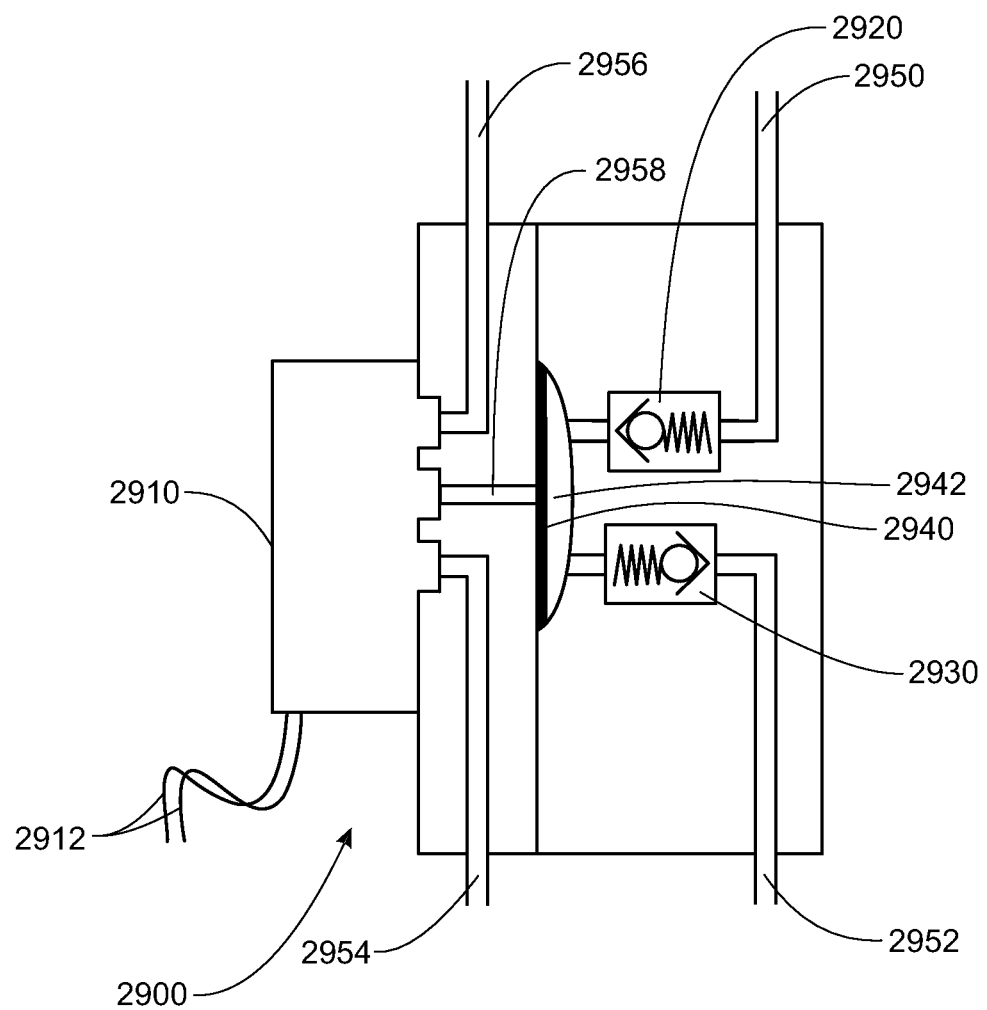
FIGS. 54 and 55 diagrammatically depict a membrane pump.
Figure 55:
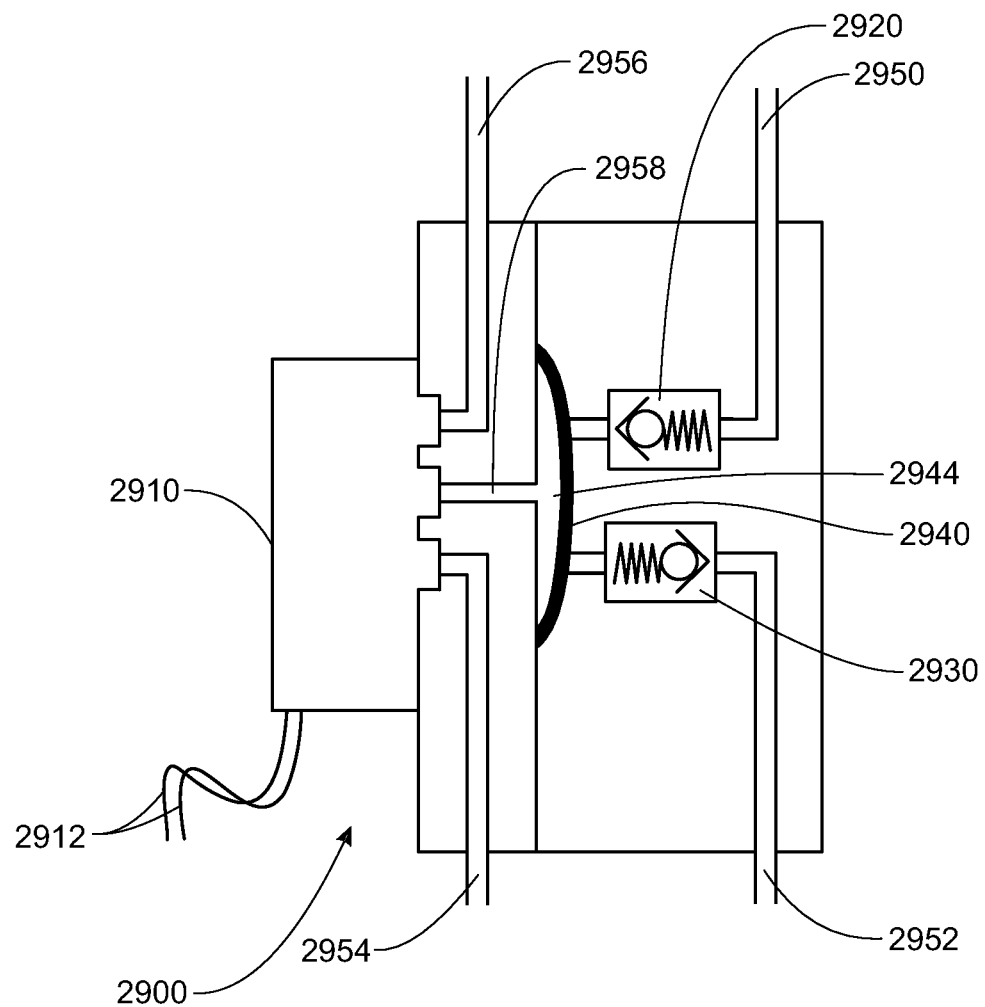

Other examples of pump assemblies 270, 272, 274, 276 and various pumping techniques are described in U.S. Pat. Nos. 4,808,161; 4,826,482; 4,976,162; 5,088,515; and 5,350,357, all of which are incorporated herein by reference in their entireties. In some embodiments, the pump assembly may be a membrane pump as shown in FIGS. 54-55. In some embodiments, the pump assembly may be any of the pump assemblies and may use any of the pump techniques described in U.S. Pat. No. 5,421,823 which is herein incorporated by reference in its entirety.

The above-cited references describe non-limiting examples of pneumatically actuated membrane-based pumps that may be used to pump fluids. A pump assembly based on a pneumatically actuated membrane may be advantageous, for one or more reasons, including but not limited to, ability to deliver quantities, for example, microliter quantities of fluids of various compositions reliably and precisely over a large number of duty cycles; and/or because the pneumatically actuated pump may require less electrical power because it may use pneumatic power, for example, from a carbon dioxide source. Additionally, a membrane-based pump may not require a dynamic seal, in which the surface moves with respect to the seal. Vibratory pumps such as those manufactured by ULKA generally require the use of dynamic elastomeric seals, which may fail over time for example, after exposure to certain types of fluids and/or wear. In some embodiments, pneumatically-actuated membrane-based pumps may be more reliable, cost effective and easier to calibrate than other pumps. They may also produce less noise, generate less heat and consume less power than other pumps. A non-limiting example of a membrane-based pump is shown in FIG. 54.

The various embodiments of the membrane-based pump assembly 2900, shown in FIGS. 54-55, include a cavity, which in FIG. 54 is 2942, which may also be referred to as a pumping chamber, and in FIG. 55 is 2944, which may also be referred to as a control fluid chamber. The cavity includes a diaphragm 2940 which separates the cavity into the two chambers, the pumping chamber 2942 and the volume chamber 2944.

Referring now to FIG. 54, a diagrammatic depiction of an exemplary membrane-based pump assembly 2900 is shown. In this embodiment, the membrane-based pump assembly 2900 includes membrane or diaphragm 2940, pumping chamber 2942, control fluid chamber 2944 (best seen in FIG. 55), a three-port switching valve 2910 and check valves 2920 and 2930. In some embodiments, the volume of pumping chamber 2942 may be in the range of approximately 20 microliters to approximately 500 microliters. In an exemplary embodiment, the volume of pumping chamber 2942 may be in the range of approximately 30 microliters to approximately 250 microliters. In other exemplary embodiments, the volume of pumping chamber 2942 may be in the range of approximately 40 microliters to approximately 100 microliters.

Switching valve 2910 may be operated to place pump control channel 2958 either in fluid communication with switching valve fluid channel 2954, or switching valve fluid channel 2956. In a non-limiting embodiment, switching valve 2910 may be an electromagnetically operated solenoid valve, operating on electrical signal inputs via control lines 2912. In other non-limiting embodiments, switching valve 2910 may be a pneumatic or hydraulic membrane-based valve, operating on pneumatic or hydraulic signal inputs. In yet other embodiments, switching valve 2910 may be a fluidically, pneumatically, mechanically or electromagnetically actuated piston within a cylinder. More generally, any other type of valve may be contemplated for use in pump assembly 2900, with preference that the valve is capable of switching fluid communication with pump control channel 2958 between switching valve fluid channel 2954 and switching valve fluid channel 2956.

In some embodiments, switching valve fluid channel 2954 is ported to a source of positive fluid pressure (which may be pneumatic or hydraulic). The amount of fluid pressure required may depend on one or more factors, including, but not limited to, the tensile strength and elasticity of diaphragm 2940, the density and/or viscosity of the fluid being pumped, the degree of solubility of dissolved solids in the fluid, and/or the length and size of the fluid channels and ports within pump assembly 2900. In various embodiments, the fluid pressure source may be in the range of approximately 15 psi to approximately 250 psi. In an exemplary embodiment, the fluid pressure source may be in the range of approximately 60 psi to approximately 100 psi. In another exemplary embodiment, the fluid pressure source may be in the range of approximately 70 psi to approximately 80 psi. As discussed above, some embodiments of the dispensing system may produce carbonated beverages and thus, may use, as an ingredient, carbonated water. In these embodiments, the gas pressure of CO2 used to generate carbonated beverages is often approximately 75 psi, the same source of gas pressure may also be regulated lower and used in some embodiments to drive a membrane-based pump for pumping small quantities of fluids in a beverage dispenser.

In response to the appropriate signal provided via control lines 2912, valve 2910 may place switching valve fluid channel 2954 into fluid communication with pump control channel 2958. Positive fluid pressure may thus be transmitted to diaphragm 2940, which in turn may force fluid in pumping chamber 2942 out through pump outlet channel 2950. Check valve 2930 ensures that the pumped fluid is prevented from flowing out of pumping chamber 2942 through inlet channel 2952.

Switching valve 2910 via control lines 2912 may place the pump control channel 2958 into fluid communication with switching valve fluid channel 2956, which may cause the diaphragm 2940 to reach the wall of the pumping chamber 2942 (as shown in FIG. 54). In an embodiment, switching valve fluid channel 2956 may be ported to a vacuum source, which when placed in fluid communication with pump control channel 2958, may cause diaphragm 2940 to retract, reducing the volume of pump control chamber 2944, and increasing the volume of pumping chamber 2942. Retraction of diaphragm 2940 causes fluid to be pulled into pumping chamber 2942 via pump inlet channel 2952. Check valve 2920 prevents reverse flow of pumped fluid back into pumping chamber 2942 via outlet channel 2950.

In an embodiment, diaphragm 2940 may be constructed of semi-rigid spring-like material, imparting on the diaphragm a tendency to maintain a curved or spheroidal shape, and acting as a cup-shaped diaphragm type spring. For example, diaphragm 2940 may be constructed or stamped at least partially from a thin sheet of metal, the metal that may be used includes but is not limited to high carbon spring steel, nickel-silver, high-nickel alloys, stainless steel, titanium alloys, beryllium copper, and the like. Pump assembly 2900 may be constructed so that the convex surface of diaphragm 2940 faces the pump control chamber 2944 and/or the pump control channel 2958. Thus, diaphragm 2940 may have a natural tendency to retract after it is pressed against the surface of pumping chamber 2942. In this circumstance, switching valve fluid channel 2956 may be ported to ambient (atmospheric) pressure, allowing diaphragm 2940 to automatically retract and draw fluid into pumping chamber 2942 via pump inlet channel 2952. In some embodiments the concave portion of the spring-like diaphragm defines a volume equal to, or substantially/approximately equal to the volume of fluid to be delivered with each pump stroke. This has the advantage of eliminating the need for constructing a pumping chamber having a defined volume, the exact dimensions of which may be difficult and/or expensive to manufacture within acceptable tolerances. In this embodiment, the pump control chamber is shaped to accommodate the convex side of the diaphragm at rest, and the geometry of the opposing surface may be any geometry, i.e., may not be relevant to performance.

In an embodiment, the volume delivered by a membrane pump may be performed in an 'open-loop' manner, without the provision of a mechanism to sense and verify the delivery of an expected volume of fluid with each stroke of the pump. In another embodiment, the volume of fluid pumped through the pump chamber during a stroke of the membrane may be measured using a Fluid Management System ("FMS") technique, described in greater detail in U.S. Pat. Nos. 4,808,161; 4,826,482; 4,976,162; 5,088,515; and 5,350,357, all of which are hereby incorporated herein by reference in their entireties. Briefly, FMS measurement is used to detect the volume of fluid delivered with each stroke of the membrane-based pump. A small fixed reference air chamber is located outside of the pump assembly, or example in a pneumatic manifold (not shown). A valve isolates the reference chamber and a second pressure sensor. The stroke volume of the pump may be precisely computed by charging the reference chamber with air, measuring the pressure, and then opening the valve to the pumping chamber. The volume of air on the chamber side may be computed based on the fixed volume of the reference chamber and the change in pressure when the reference chamber was connected to the pump chamber. In some embodiments, the volume of fluid pumped through the pump chamber during a stroke of the membrane may be measured using an Acoustic Volume Sensing ("AVS") technique. Acoustic volume measurement technology is the subject of U.S. Pat. Nos. 5,575,310 and 5,755,683 assigned to DEKA Products Limited Partnership, as well as U.S. Patent Application Publication Nos. US 2007/0228071 A1, US 2007/0219496 A1, US 2007/0219480 A1, US 2007/0219597 A1 and WO 2009/088956, all of which are hereby incorporated herein by reference. Fluid volume sensing in the nanoliter range is possible with this embodiment, thus contributing to highly accurate and precise monitoring of the volume pumped. Other alternate techniques for measuring fluid flow may also be used; for example, Doppler-based methods; the use of Hall-effect sensors in combination with a vane or flapper valve; the use of a strain beam (for example, related to a flexible member over a fluid chamber to sense deflection of the flexible member); the use of capacitive sensing with plates; or thermal time of flight methods.

Product module assembly 250 may be configured to releasably engage bracket assembly 282. Bracket assembly 282 may be a portion of (and rigidly fixed within) processing system 10. Although referred to herein as a "bracket assembly", the assembly may vary in other embodiments. The bracket assembly serves to secure the product module assembly 282 in a desired location. An example of bracket assembly 282 may include but is not limited to a shelf within processing system 10 that is configured to releasably engage product module 250. For example, product module 250 may include an engagement device (e.g. a clip assembly, a slot assembly, a latch assembly, a pin assembly; not shown) that is configured to releasably engage a complementary device that is incorporated into bracket assembly 282.

Plumbing/control subsystem 20 may include manifold assembly 284 that may be rigidly affixed to bracket assembly 282. Manifold assembly 284 may be configured to include a plurality of inlet ports 286, 288, 290, 292 that are configured to releasably engage a pump orifice (e.g. pump orifices 294, 296, 298, 300) incorporated into each of pump assemblies 270, 272, 274, 276. When positioning product module 250 on bracket assembly 282, product module 250 may be moved in the direction of the arrow 302, thus allowing for inlet ports 286, 288, 290, 292 to releasably engage pump orifices 294, 296, 298, 300 (respectively). Inlet ports 286, 288, 290, 292 and/or pump orifices 294, 296, 298, 300 may include one or more o-ring or other sealing assemblies as described above (not shown) to facilitate a leak-proof seal. The inlet ports (e.g., inlet ports 286, 288, 290, 292) included within manifold assembly 284 may be constructed of a rigid "pipe-like" material or may be constructed from a flexible "tubing-like" material.

Manifold assembly 284 may be configured to engage tubing bundle 304, which may be plumbed (either directly or indirectly) to nozzle 24. As discussed above, high-volume ingredient subsystem 16 also provides fluids in the form of, in at least one embodiment, chilled carbonated water 164, chilled water 166 and/or chilled high fructose corn syrup 168 (either directly or indirectly) to nozzle 24. Accordingly, as control logic subsystem 14 may regulate (in this particular example) the specific quantities of the various high-volume ingredients e.g. chilled carbonated water 164, chilled water 166, chilled high fructose corn syrup 168 and the quantities of the various micro ingredients (e.g. a first substrate (i.e., flavoring, a second substrate (i.e., a nutraceutical, and a third substrate (i.e., a pharmaceutical), control logic subsystem 14 may accurately control the makeup of product 28.

As discussed above, one or more of pump assemblies 270, 272, 274, 276 may be a solenoid piston pump assembly that provides a defined and consistent amount of fluid each time that one or more of pump assemblies 270, 272, 274, 276 are energized by control logic subsystem 14 (via data bus 38). Further and as discussed above, control logic subsystem 14 may execute one or more control processes 120 that may control the operation of processing system 10. An example of such a control process may include a drive signal generation process (not shown) for generating a drive signal that may be provided from control logic subsystem 14 to pump assemblies 270, 272, 274, 276 via data bus 38. One exemplary methodology for generating the above-described drive signal is disclosed in U.S. patent application Ser. No. 11/851,344, entitled SYSTEM AND METHOD FOR GENERATING A DRIVE SIGNAL, which was filed on 6 Sep. 2007, now U.S. Pat. No. 7,905,373 the entire disclosure of which is incorporated herein by reference.

Although FIG. 4 depicts one nozzle 24, in various other embodiments, more than one nozzle 24 may be included. In some embodiments, more than one container 30 may receive product dispensed from the system, for example, via more than one set of tubing bundles. Thus, in some embodiments, the dispensing system may be configured such that one or more users may request one or more products to be dispensed concurrently.

Capacitance-based flow sensors 306, 308, 310, 312 may be utilized to sense flow of the above-described microingredients through each of pump assemblies 270, 272, 274, 276.

Figure 5A:
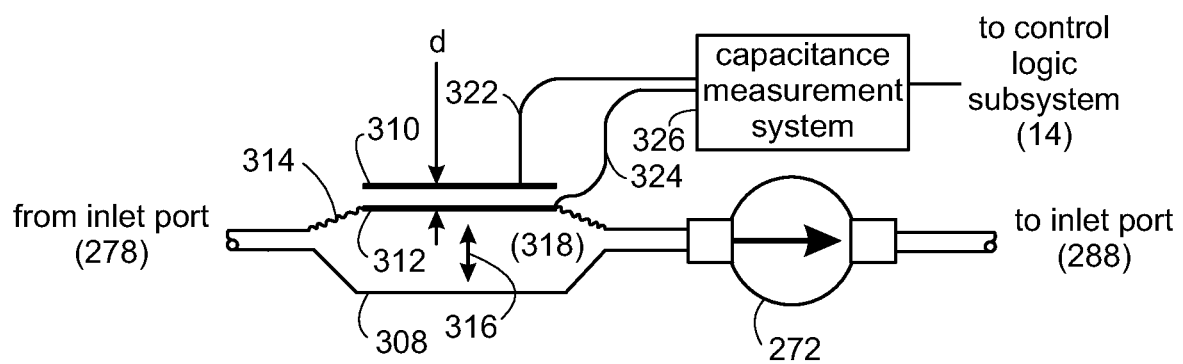
FIG. 5A is a diagrammatic side view of one embodiment of a capacitance-based flow sensor included within the processing system of FIG. 1 (during a non-pumping condition)
Figure 5B:
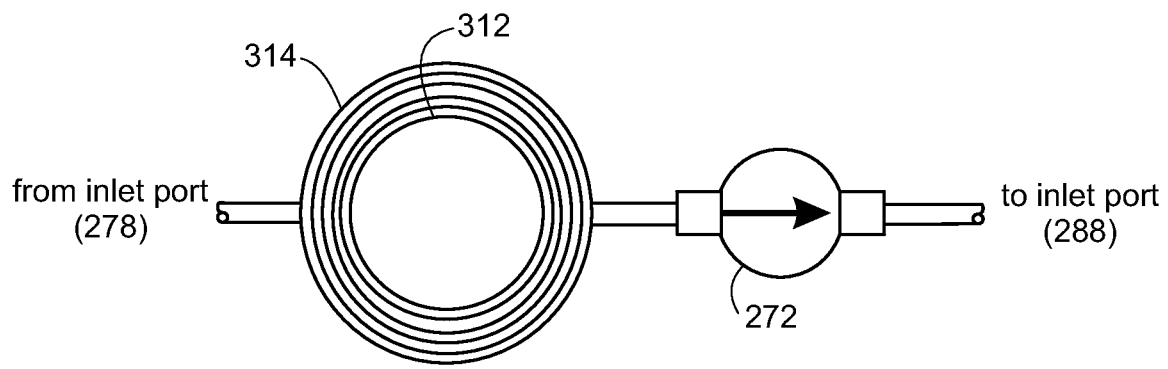
FIG. 5B is a diagrammatic top view of the capacitance-based flow sensor of FIG. 5A.

Referring also to FIG. 5A (side view) and FIG. 5B (top view), a detailed view of exemplary capacitance-based flow sensor 308 is shown. Capacitance-based flow sensor 308 may include first capacitive plate 310 and second capacitive plate 312. Second capacitive plate 312 may be configured to be movable with respect to first capacitive plate 310. For example, first capacitive plate 310 may be rigidly affixed to a structure within processing system 10. Further, capacitance-based flow sensor 308 may also be rigidly affixed to a structure within processing system 10. However, second capacitive plate 312 may be configured to be movable with respect to first capacitive plate 310 (and capacitance-based flow sensor 308) through the use of diaphragm assembly 314. Diaphragm assembly 314 may be configured to allow for the displacement of second capacitive plate 312 in the direction of arrow 316. Diaphragm assembly 314 may be constructed of various materials that allow for displacement in the direction of arrow 316. For example, diaphragm assembly 314 may be constructed out of a stainless steel foil with a PET (i.e., Polyethylene Terephthalate) coating to prevent corrosion of the stainless steel foil. Alternatively, diaphragm assembly 314 may be constructed of a titanium foil. Further still, diaphragm assembly 314 may be constructed of a plastic in which one surface of the plastic diaphragm assembly is metalized to form second capacitive plate 312. In some embodiments, the plastic may be, but is not limited to, an injection molded plastic or a PET rolled sheet.

As discussed above, each time a pump assembly (e.g. pump assembly 272) is energized by control logic subsystem 14 via data bus 38, the pump assembly may provide a calibrated volume of fluid, for example 30-33 µL, of the appropriate microingredient included within e.g., product container 254. Accordingly, control logic subsystem 14 may control the flow rate of the microingredients by controlling the rate at which the appropriate pump assembly is energized. An exemplary rate of energizing a pump assembly is between 3 Hz (i.e. three times per second) to 30 Hz (i.e. 30 times per second).

Accordingly, when pump assembly 272 is energized, a suction is created (within chamber 318 of capacitance-based flow sensor 308) that effectuates drawing of the appropriate microingredient (e.g. a substrate) from e.g. product container 254. Therefore, upon pump assembly 272 being energized and creating a suction within chamber 318, second capacitive plate 312 may be displaced downward (with respect to FIG. 5A), thus increasing distance "d" (i.e. the distance between first capacitive plate 310 and second capacitive plate 312).

Figure 5C:
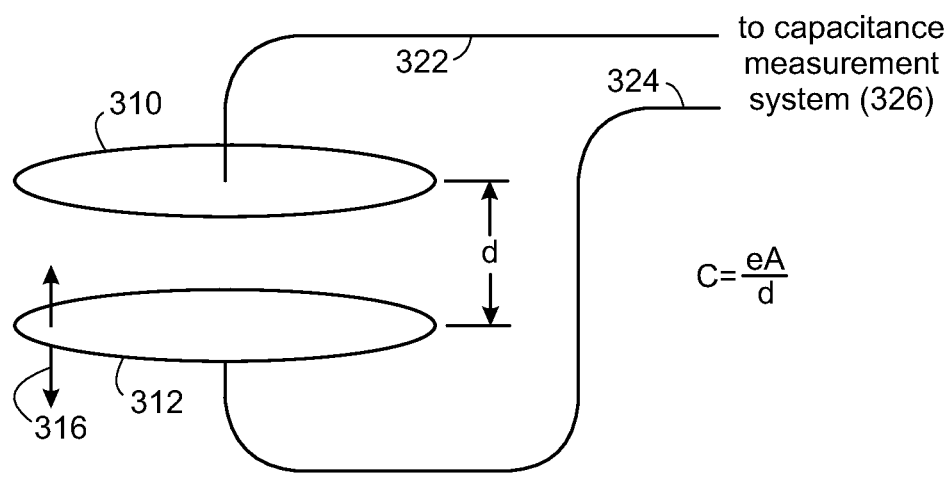
FIG. 5C is a diagrammatic view of two capacitive plates included within the capacitance-based flow sensor of FIG. 5A.

Referring also to FIG. 5C and as is known in the art, the capacitance (C) of a capacitor is determined according to the following equation:

$$C = \frac{\varepsilon A}{d}$$

wherein "ε" is the permittivity of the dielectric material positioned between first capacitive plate 310 and second capacitive plate 312; "A" is the area of the capacitive plates; and "d" is the distance between first capacitive plate 310 and second capacitive plate 312. As "d" is positioned in the denominator of the above-described equation, any increase in "d" results in a corresponding decrease in "C" (i.e. the capacitance of the capacitor).

Figure 5D:
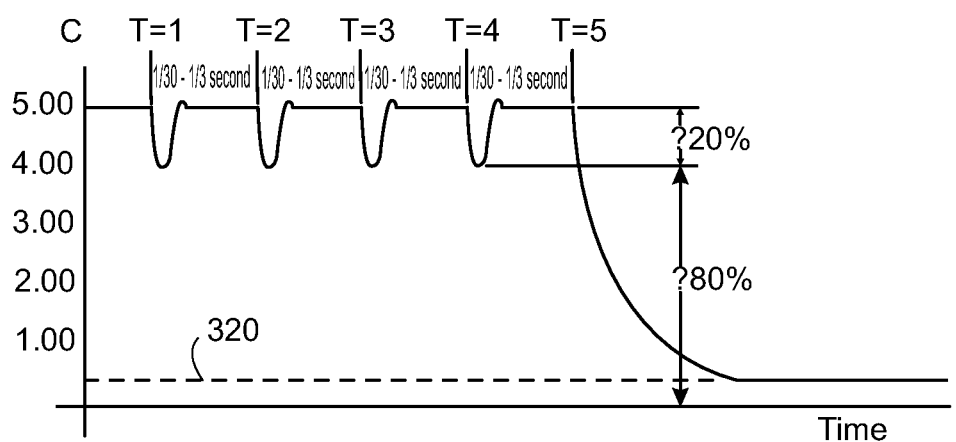
FIG. 5D is a time-dependent graph of the capacitance value of the capacitance based flow sensor of FIG. 5A (during a non-pumping condition, a pumping condition, and an empty condition)
Figure 5E:
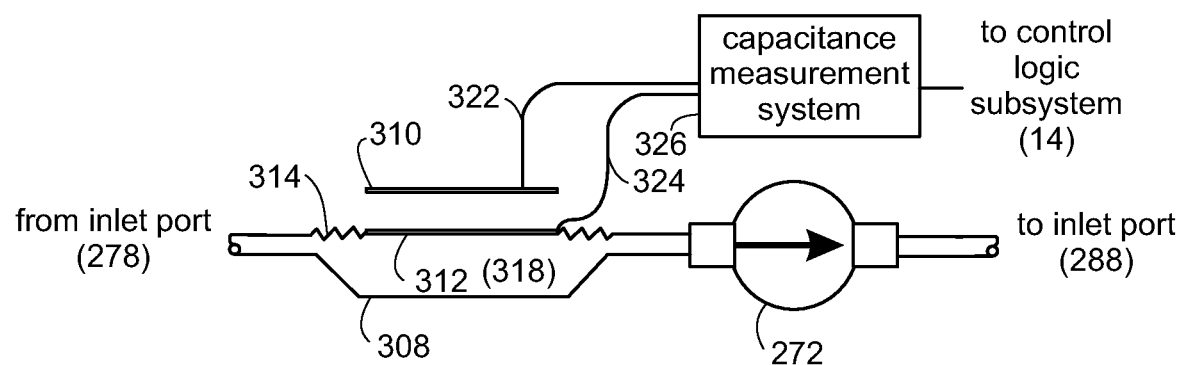
FIG. 5E is a diagrammatic side view of the capacitance-based flow sensor of FIG. 5A (during a pumping condition)

Continuing with the above-stated example and referring also to FIG. 5D, assume that when pump assembly 272 is not energized, the capacitor formed by first capacitive plate 310 and second capacitive plate 312 has a value of 5.00 pF. Further assume that when pump assembly 272 is energized at time T=1, a suction is created within chamber 316 that is sufficient to displace second capacitive plate 312 downward a distance sufficient to result in a 20% reduction in the capacitance of the capacitor formed by first capacitive plate 310 and second capacitive plate 312. Accordingly, the new value of the capacitor formed by first capacitive plate 310 and second capacitive plate 312 may be 4.00 pF. An illustrative example of a second capacitive plate 312 being displaced downward during the above-described pumping sequence is shown in FIG. 5E.

As the appropriate microingredient is drawn from product container 254, the suction within chamber 318 may be reduced and second capacitive plate 312 may be displaced upward to its original position (as shown in FIG. 5A). As second capacitive plate 312 is displaced upward, the distance between second capacitive plate 312 and first capacitive plate 310 may be reduced back to its initial value. Accordingly, the capacitance of the capacitor formed by first capacitive plate 310 and second capacitive plate 312 may once again be 5.00 pF. When second capacitive plate 312 is moving upward and returning to its initial position, the momentum of second capacitive plate 312 may result in second capacitive plate 312 overshooting its initial position and momentarily being positioned closer to first capacitive plate 310 then during the initial position of the second capacitive plate 312 (as shown in FIG. 5A). Accordingly, the capacitance of the capacitor formed by first capacitive plate 310 and second capacitive plate 312 may momentarily increase above its initial value of 5.00 pF and shortly thereafter stabilize at 5.00 pF.

Figure 5F:
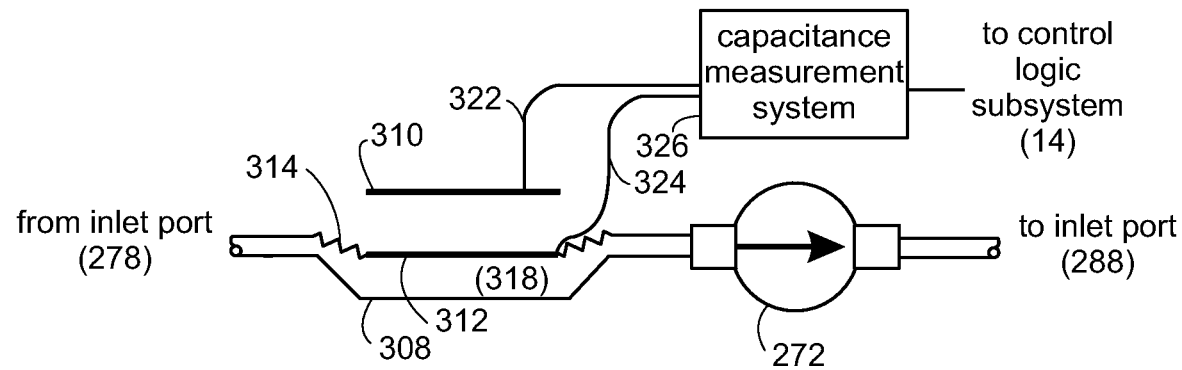
FIG. 5F is a diagrammatic side view of the capacitance-based flow sensor of FIG. 5A (during an empty condition)

The above-described varying of the capacitance value of between (in this example) 5.00 pF and 4.00 pF while pump assembly 272 is repeatedly cycled on and off may continue until e.g. product container 254 is empty. Assume for illustrative purposes that product container 254 is emptied at time T=5. At this point in time, second capacitive plate 312 may not return to its original position (as shown in FIG. 5A). Further, as pump assembly 272 continues to be cycled, second capacitive plate 312 may continue to be drawn downward until second capacitive plate 312 can no longer be displaced (as shown in FIG. 5F). At this point in time, due to the increase in distance "d" over and above that illustrated in FIG. 5A and FIG. 5E, the capacitance value of the capacitor formed by first capacitive plate 310 and second capacitive plate 312 may be minimized to minimum capacitance value 320. The actual value of minimum capacitance value 320 may vary depending upon the flexibility of diaphragm assembly 314.

Accordingly, by monitoring the variations in the capacitance value (e.g., absolute variations or peak-to-peak variations) of the capacitor formed by first capacitive plate 310 and second capacitive plate 312, the proper operation of e.g. pump assembly 272 may be verified. For example, if the above-described capacitance value cyclically varies between 5.00 pF and 4.00 pF, this variation in capacitance may be indicative of the proper operation of pump assembly 272 and a nonempty product container 254. However, in the event that the above-described capacitance value does not vary (e.g. remains at 5.00 pF), this may be indicative of a failed pump assembly 272 (e.g., a pump assembly that includes failed mechanical components and/or failed electrical components) or a blocked nozzle 24.

Further, in the event that the above-described capacitance value decreases to a point below 4.00 pF (e.g. to minimum capacitance value 320), this may be indicative of product container 254 being empty. Additionally still, in the event that the peak-to-peak variation is less than expected (e.g., less than the above-described 1.00 pF variation), this may be indicative of a leak between product container 254 and capacitance-based flow sensor 308.

To determine the capacitance value of the capacitor formed by first capacitive plate 310 and second capacitive plate 312, a signal may be provided (via conductors 322, 324) to capacitance measurement system 326. The output of capacitance measurement system 326 may be provided to control logic subsystem 14. An example of capacitance measurement system 326 may include the CY8C21434-24LFXI PSOC offered by Cypress Semiconductor of San Jose, Calif., the design and operation of which are described within the "CSD User Module" published by Cypress Semiconductor, which is incorporated herein by reference. Capacitance measurement circuit 326 may be configured to provide compensation for environmental factors (e.g., temperature, humidity, and power supply voltage change).

Capacitance measurement system 326 may be configured to take capacitance measurements (with respect to the capacitor formed with first capacitive plate 310 and second capacitive plate 312) over a defined period of time to determine if the above-described variations in capacitance are occurring. For example, capacitance measurement system 326 may be configured to monitor changes in the above-described capacitance value that occur over the time frame of 0.50 seconds. Accordingly and in this particular example, as long as pump assembly 272 is being energized at a minimum rate of 2.00 Hz (i.e., at least once every 0.50 seconds), at least one of the above-described capacitance variations should be sensed by capacitance measurement system 326 during each 0.50 second measurement cycle.

While flow sensor 308 is described above as being capacitance-based, this is for illustrative purposes only and is not intended to be a limitation of this disclosure, as other configurations are possible and are considered to be within the scope of this disclosure.

Figure 5G:
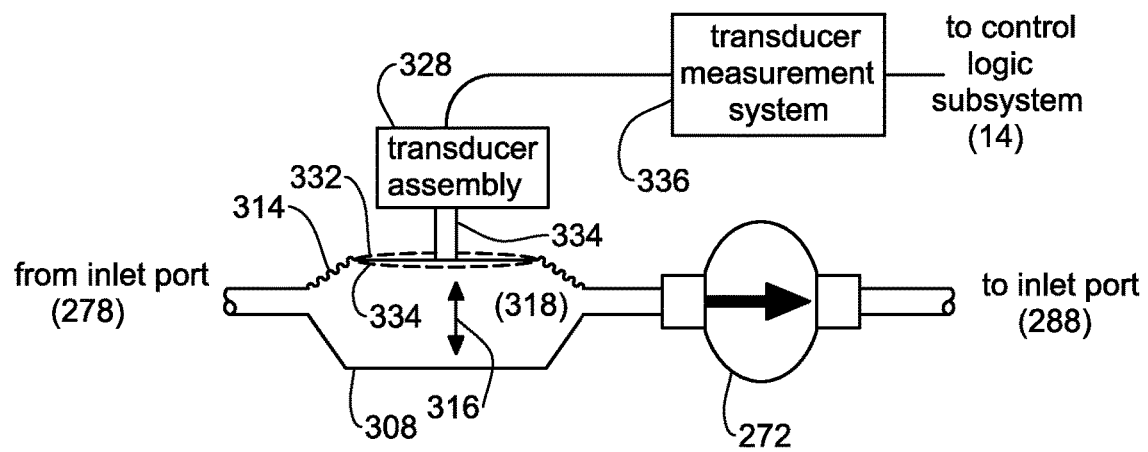
FIG. 5G is a diagrammatic side view of an alternative embodiment of the flow sensor of FIG. 5A.

For example and referring also to FIG. 5G, assume for illustrative purposes that flow sensor 308 does not include first capacitive plate 310 and second capacitive plate 312. Alternatively, flow sensor 308 may include transducer assembly 328 that may be (directly or indirectly) coupled to diaphragm assembly 314. If directly coupled, transducer assembly 328 may be mounted on/attached to diaphragm assembly 314. Alternatively, if indirectly coupled, transducer assembly 328 may be coupled to diaphragm assembly 314 with e.g., linkage assembly 330.

As discussed above, as fluid is displaced through chamber 318, diaphragm assembly 314 may be displaced. For example, diaphragm assembly 314 may move in the direction of arrow 316. Additionally/alternatively, diaphragm assembly 314 may distort (e.g., become slightly concave/convex (as illustrated via phantom diaphragm assemblies 332, 334). As is known in the art, whether: (a) diaphragm assembly 314 remains essentially planar while being displaced in the direction of arrow 316; (b) flexes to become convex diaphragm assembly 332/concave diaphragm assembly 334 while remaining stationary with respect to arrow 316; or (c) exhibits a combination of both forms of displacement, may depend upon a plurality of factors (e.g., the rigidity of various portions of diaphragm assembly 314). Accordingly, by utilizing transducer assembly 328 (in combination with linkage assembly 330 and/or transducer measurement system 336) to monitor the displacement of all or a portion of diaphragm assembly 314, the quantity of fluid displaced through chamber 318 may be determined.

Through the use of various types of transducer assemblies (to be discussed below in greater detail), the quantity of fluid passing through chamber 318 may be determined.

For example, transducer assembly 328 may include a linear variable differential transformer (LVDT) and may be rigidly affixed to a structure within processing system 10, which may be coupled to diaphragm assembly 314 via linkage assembly 330. An illustrative and non-limiting example of such an LVDT is an SE 750 100 produced by Macro Sensors of Pennsauken, N.J. Flow sensor 308 may also be rigidly affixed to a structure within processing system 10. Accordingly, if diaphragm assembly 314 is displaced (e.g., along arrow 316 or flexed to become convex/concave), the movement of diaphragm assembly 314 may be monitored. Therefore, the quantity of fluid passing through chamber 318 may also be monitored. Transducer assembly 328 (i.e., which includes LVDT) may generate a signal that may be processed (e.g., amplified/converted/filtered) by transducer measurement system 336. This processed signal may then be provided to control logic subsystem 14 and used to ascertain the quantity of fluid passing through chamber 318.

Alternatively, transducer assembly 328 may include a needle/magnetic cartridge assembly (e.g., such as a phonograph needle/magnetic cartridge assembly) and may be rigidly affixed to a structure within processing system 10. An illustrative and non-limiting example of such a needle/magnetic cartridge assembly is a N 16 D produced by Toshiba Corporation of Japan Transducer assembly 328 may be coupled to diaphragm assembly 314 via linkage assembly 330 (e.g., a rigid rod assembly). The needle of transducer assembly 328 may be configured to contact the surface of linkage assembly 330 (i.e., the rigid rod assembly). Accordingly, as diaphragm assembly 314 is displaced/flexes (as discussed above), linkage assembly 330 (i.e., rigid rod assembly) is also displaced (in the direction of arrow 316) and may rub against the needle of transducer assembly 328. Therefore, the combination of transducer assembly 328 (i.e., the needle/magnetic cartridge) and linkage assembly 330 (i.e., the rigid rod assembly) may generate a signal that may be processed (e.g., amplified/converted/filtered) by transducer measurement system 336. This processed signal may then be provided to control logic subsystem 14 and used to ascertain the quantity of fluid passing through chamber 318.

Alternatively, transducer assembly 328 may include a magnetic coil assembly (e.g., similar to a voice coil of a speaker assembly) and may be rigidly affixed to a structure within processing system 10. An illustrative and non-limiting example of such a magnetic coil assembly is a 5526-1 produced by API Delevan Inc. of East Aurora, N.Y. Transducer assembly 328 may be coupled to diaphragm assembly 314 via linkage assembly 330, which may include an axial magnet assembly. An illustrative and non-limiting example of such an axial magnet assembly is a D16 produced by K & J Magnetics, Inc. of Jamison, Pa. The axial magnet assembly included within linkage assembly 330 may be configured to slide coaxially within the magnetic coil assembly of transducer assembly 328. Accordingly, as diaphragm assembly 314 is displaced/flexes (as discussed above), linkage assembly 330 (i.e., the axial magnet assembly) is also displaced (in the direction of arrow 316). As is known in the art, the movement of an axial magnet assembly within a magnetic coil assembly induces a current within the windings of the magnetic coil assembly. Accordingly, the combination of the magnetic coil assembly (not shown) of transducer assembly 328 and the axial magnet assembly (not shown) of linkage assembly 330 may generate a signal that may be processed (e.g., amplified/converted/filtered) and then provided to control logic subsystem 14 and used to ascertain the quantity of fluid passing through chamber 318.

Alternatively, transducer assembly 328 may include a Hall Effect sensor assembly and may be rigidly affixed to a structure within processing system 10. An illustrative and non-limiting example of such a Hall Effect sensor assembly is a AB0iKUA-T produced by Allegro Microsystems Inc. of Worcester, Mass. Transducer assembly 328 may be coupled to diaphragm assembly 314 via linkage assembly 330, which may include an axial magnet assembly. An illustrative and non-limiting example of such an axial magnet assembly is a D16 produced by K & J Magnetics, Inc. of Jamison, Pa. The axial magnet assembly included within linkage assembly 330 may be configured to be positioned proximate the Hall Effect sensor assembly of transducer assembly 328. Accordingly, as diaphragm assembly 314 is displaced/flexes (as discussed above), linkage assembly 330 (i.e., the axial magnet assembly) is also displaced (in the direction of arrow 316). As is known in the art, a Hall Effect sensor assembly is an assembly that generates an output voltage signal that varies in response to changes in a magnetic field. Accordingly, the combination of the Hall Effect sensor assembly (not shown) of transducer assembly 328 and the axial magnet assembly (not shown) of linkage assembly 330 may generate a signal that may be processed (e.g., amplified/converted/filtered) and then provided to control logic subsystem 14 and used to ascertain the quantity of fluid passing through chamber 318.

Piezoelectric, as used herein, refers to any material which exhibits a piezoelectric effect. The materials may include, but are not limited to, the following: ceramic, films, metals, crystals.

Alternatively, transducer assembly 328 may include a piezoelectric buzzer element that may be directly coupled to diaphragm assembly 314. Accordingly, linkage assembly 330 may not be utilized. An illustrative and non-limiting example of such a piezoelectric buzzer element is a KBS-13DA-12A produced by AVX Corporation of Myrtle Beach, S.C. As is known in the art, a piezoelectric buzzer element may generate an electrical output signal that varies depending on the amount of mechanical stress that the piezoelectric buzzer element is exposed to. Accordingly, as diaphragm assembly 314 is displaced/flexes (as discussed above), the piezoelectric buzzer element (included within transducer assembly 328) may be exposed to mechanical stress and, therefore, may generate a signal that may be processed (e.g., amplified/converted/filtered) by transducer measurement system 336. This processed signal may then be provided to control logic subsystem 14 and used to ascertain the quantity of fluid passing through chamber 318.

Alternatively, transducer assembly 328 may include a piezoelectric sheet element that may be directly coupled to diaphragm assembly 314. Accordingly, linkage assembly 330 may not be utilized. An illustrative and non-limiting example of such a piezoelectric sheet element is a 0-1002794-0 produced by MSI/Schaevitz of Hampton, Va. As is known in the art, a piezoelectric sheet element may generate an electrical output signal that varies depending on the amount of mechanical stress that the piezoelectric sheet element is exposed to. Accordingly, as diaphragm assembly 314 is displaced/flexes (as discussed above), the piezoelectric sheet element (included within transducer assembly 328) may be exposed to mechanical stress and, therefore, may generate a signal that may be processed (e.g., amplified/converted/filtered) by transducer measurement system 336. This processed signal may then be provided to control logic subsystem 14 and used to ascertain the quantity of fluid passing through chamber 318.

Alternatively, the above-described piezoelectric sheet element (included within transducer assembly 328) may be positioned proximate and acoustically coupled with diaphragm assembly 314. The piezoelectric sheet element (included within transducer assembly 328) may or may not include a weight assembly to enhance the ability of the piezoelectric sheet element to resonate. Accordingly, as diaphragm assembly 314 is displaced/flexes (as discussed above), the piezoelectric sheet element (included within transducer assembly 328) may be exposed to mechanical stress (due to the acoustic coupling) and, therefore, may generate a signal that may be processed (e.g., amplified/converted/filtered) by transducer measurement system 336. This processed signal may then be provided to control logic subsystem 14 and used to ascertain the quantity of fluid passing through chamber 318.

Alternatively, transducer assembly 328 may include an audio speaker assembly in which the cone of the audio speaker assembly may be directly coupled to diaphragm assembly 314. Accordingly, linkage assembly 330 may not be utilized. An illustrative and non-limiting example of such an audio speaker assembly is a AS01308MR-2X produced by Projects Unlimited of Dayton, Ohio. As is known in the art, the audio speaker assembly may include a voice coil assembly and a permanent magnet assembly within which the voice coil assembly slides. While a signal is typically applied to the voice coil assembly to generate movement of the speaker cone, if the speaker is manually moved, a current will be induced in the voice coil assembly. Accordingly, as diaphragm assembly 314 is displaced/flexes (as discussed above), the voice coil of the audio speaker assembly (included within transducer assembly 328) may be displaced with respect to the above-described permanent magnet assembly and, therefore, a signal may be generated that may be processed (e.g., amplified/converted/filtered) by transducer measurement system 336. This processed signal may then be provided to control logic subsystem 14 and used to ascertain the quantity of fluid passing through chamber 318.

Alternatively, transducer assembly 328 may include an accelerometer assembly that may be directly coupled to diaphragm assembly 314. Accordingly, linkage assembly 330 may not be utilized. An illustrative and non-limiting example of such an accelerometer assembly is a AD22286-R2 produced by Analog Devices, Inc. of Norwood, Mass. As is known in the art, an accelerometer assembly may generate an electrical output signal that varies depending on the acceleration that the accelerometer assembly is exposed to. Accordingly, as diaphragm assembly 314 is displaced/flexes (as discussed above), the accelerometer assembly (included within transducer assembly 328) may be exposed to varying levels of acceleration and, therefore, may generate a signal that may be processed (e.g., amplified/converted/filtered) by transducer measurement system 336. This processed signal may then be provided to control logic subsystem 14 and used to ascertain the quantity of fluid passing through chamber 318.

Alternatively, transducer assembly 328 may include a microphone assembly that may be positioned proximate and acoustically coupled with diaphragm assembly 314. Accordingly, linkage assembly 330 may not be utilized. An illustrative and non-limiting example of such a microphone assembly is a EA-21842 produced by Knowles Acoustics of Itasca, Ill. Accordingly, as diaphragm assembly 314 is displaced/flexes (as discussed above), the microphone assembly (included within transducer assembly 328) may be exposed to mechanical stress (due to the acoustic coupling) and, therefore, may generate a signal that may be processed (e.g., amplified/converted/filtered) by transducer measurement system 336. This processed signal may then be provided to control logic subsystem 14 and used to ascertain the quantity of fluid passing through chamber 318.

Alternatively, transducer assembly 328 may include an optical displacement assembly configured to monitor the movement of diaphragm assembly 314. Accordingly, linkage assembly 330 may not be utilized. An illustrative and non-limiting example of such an optical displacement assembly is a Z4W-V produced by Advanced Motion Systems, Inc. of Pittsford, N.Y. Assume for illustrative purposes that the above-described optical displacement assembly includes a optical signal generator that directs an optical signal toward diaphragm assembly 314, which is reflected off of diaphragm assembly 314 and is sensed by an optical sensor (also included within optical displacement assembly). Accordingly, as diaphragm assembly 314 is displaced/flexes (as discussed above), the optical signal sensed by the above-described optical sensor (included within transducer assembly 328) may vary. Therefore, a signal may be generated by the optical displacement assembly (included within transducer assembly 328) that may be processed (e.g., amplified/converted/filtered) by transducer measurement system 336. This processed signal may then be provided to control logic subsystem 14 and used to ascertain the quantity of fluid passing through chamber 318.

While the above-described examples of flow sensor 308 are meant to be illustrative, they are not intended to be exhaustive, as other configurations are possible and are considered to be within the scope of this disclosure. For example, while transducer assembly 328 is shown to be positioned outside of diaphragm assembly 314, transducer assembly 328 may be positioned within chamber 318.

Figure 5H:
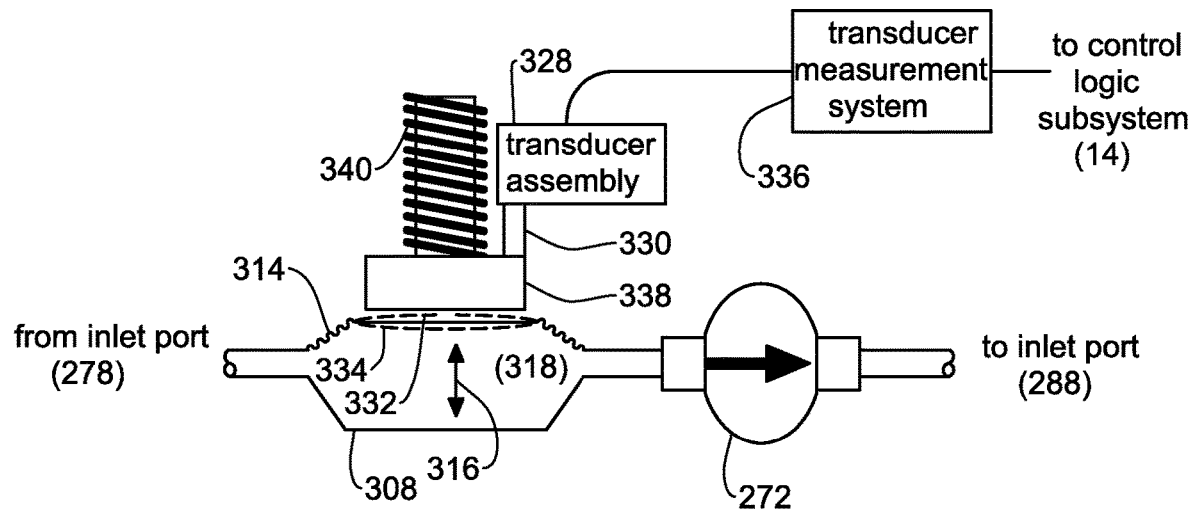
FIG. 5H is a diagrammatic side view of an alternative embodiment of the flow sensor of FIG. 5A.

While several of the above-described examples of flow sensor 308 are described as being coupled to diaphragm assembly 314, this is for illustrative purposes only and is not intended to be a limitation of this disclosure, as other configurations are possible and are considered to be within the scope of this disclosure. For example and referring also to FIG. 5H, flow sensor 308 may include piston assembly 338 that may be biased by spring assembly 340. Piston assembly 338 may be positioned proximate and configured to bias diaphragm assembly 314. Accordingly, piston assembly 338 may emulate the movement of diaphragm assembly 314. Therefore, transducer assembly 328 may be coupled to piston assembly 338 and achieve the results discussed above.

Further, when flow sensor 308 is configured to include piston assembly 338 and spring assembly 340, transducer assembly 328 may include an inductance monitoring assembly configured to monitor the inductance of spring assembly 340. Accordingly, linkage assembly 330 may not be utilized. An illustrative and non-limiting example of such an inductance monitoring assembly is a L/C Meter II B produced by Almost All Digital Electronics of Auburn, Wash. Accordingly, as diaphragm assembly 314 is displaced/flexes (as discussed above), the inductance of spring assembly 340 sensed by the above-described inductance monitoring assembly (included within transducer assembly 328) may vary i.e., due to the changes in resistance as spring assembly 340 flexes. Therefore, a signal may be generated by the inductance monitoring assembly (included within transducer assembly 328) that may be processed (e.g., amplified/converted/filtered) by transducer measurement system 336. This processed signal may then be provided to control logic subsystem 14 and used to ascertain the quantity of fluid passing through chamber 318.

Figure 6A:
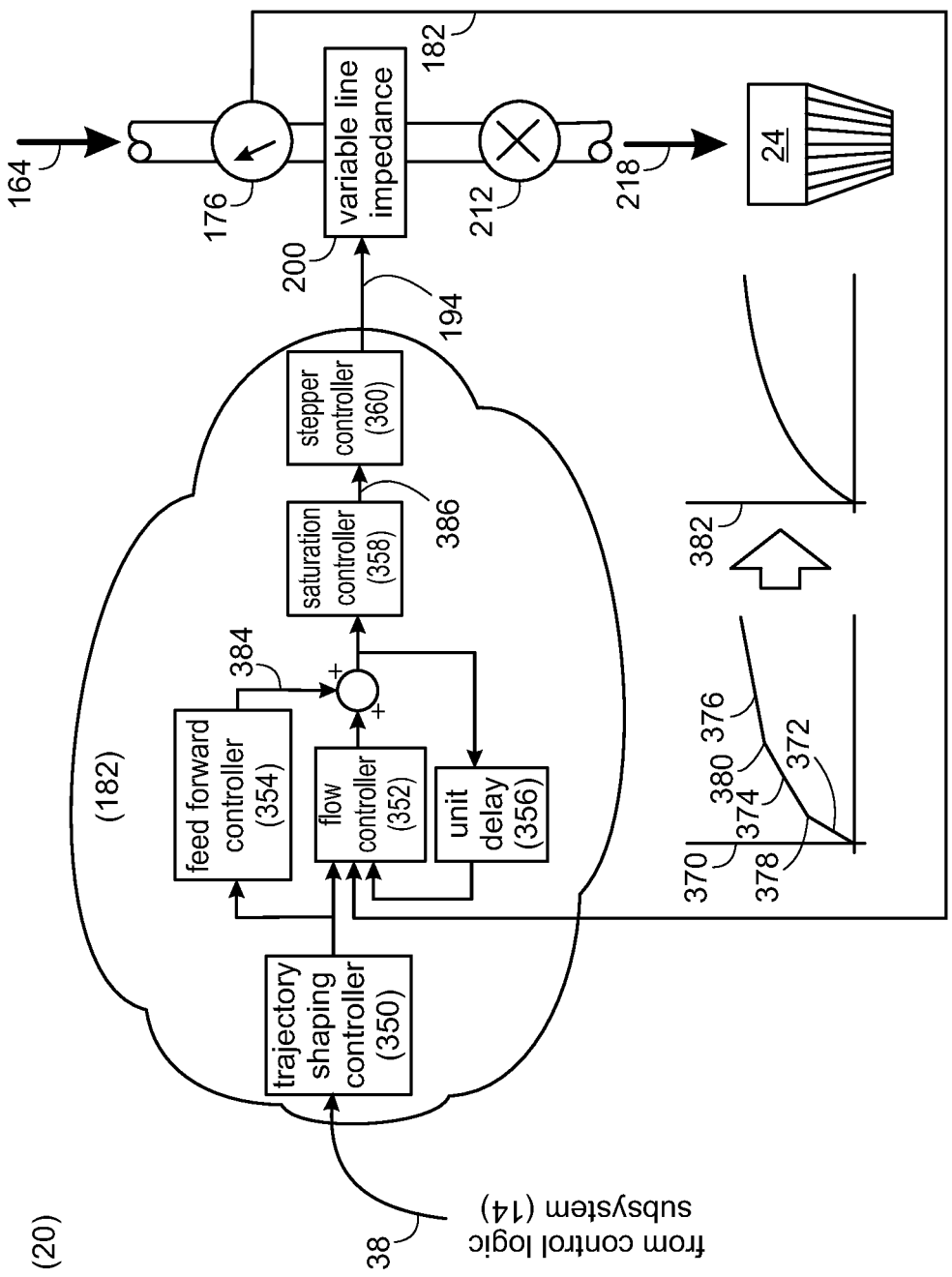
FIG. 6A is a diagrammatic view of a plumbing/control subsystem included within the processing system of FIG. 1.

Referring also to FIG. 6A, a diagrammatic view of plumbing/control subsystem 20 is shown. While the plumbing/control subsystem described below concerns the plumbing/control system used to control the quantity of chilled carbonated water 164 being added to product 28, via flow control module 170, this is for illustrative purposes only and is not intended to be a limitation of this disclosure, as other configurations are also possible. For example, the plumbing/control subsystem described below may also be used to control e.g., the quantity of chilled water 166 (e.g., via flow control module 172) and/or chilled high fructose corn syrup 168 (e.g., via flow control module 174) being added to product 28.

As discussed above, plumbing/control subsystem 20 may include feedback controller system 188 that receives flow feedback signal 182 from flow measuring device 176. Feedback controller system 188 may compare flow feedback signal 182 to the desired flow volume (as defined by control logic subsystem 14 via data bus 38). Upon processing flow feedback signal 182, feedback controller system 188 may generate flow control signal 194 that may be provided to variable line impedance 200.

Feedback controller system 188 may include trajectory shaping controller 350, flow regulator 352, feed forward controller 354, unit delay 356, saturation controller 358, and stepper controller 360, each of which will be discussed below in greater detail.

Trajectory shaping controller 350 may be configured to receive a control signal from control logic subsystem 14 via data bus 38. This control signal may define a trajectory for the manner in which plumbing/control subsystem 20 is supposed to deliver fluid (in the case, chilled carbonated water 164 via flow control module 170) for use in product 28. However, the trajectory provided by control logic subsystem 14 may need to be modified prior to being processed by e.g., flow controller 352. For example, control systems tend to have a difficult time processing control curves that are made up of a plurality of line segments (i.e., that include step changes). For example, flow regulator 352 may have difficulty processing control curve 370, as it consists of three distinct linear segments, namely segments 372, 374, 376. Accordingly, at the transition points (e.g., transition points 378, 380), flow controller 352 specifically (and plumbing/control subsystem 20 generally) would be required to instantaneously change from a first flow rate to a second flow rate. Therefore, trajectory shaping controller 350 may filter control curve 30 to form smoothed control curve 382 that is more easily processed by flow controller 352 specifically (and plumbing/control subsystem 20 generally), as an instantaneous transition from a first flow rate to a second flow rate is no longer required.

Additionally, trajectory shaping controller 350 may allow for the pre-fill wetting and post-fill rinsing of nozzle 24. In some embodiments, and/or for some recipes, one or more ingredients may present problems to the nozzle 24 if the ingredient (referred to herein as "dirty ingredient") contacts the nozzle 24 directly, i.e., in the form in which it is stored. In some embodiments, the nozzle 24 may be pre-fill wetted with a "pre-fill" ingredient, for example, water, so as to prevent the direct contact of these "dirty ingredients" with the nozzle 24. The nozzle 24 may following, be post-fill rinsed with a "post-wash ingredient", for example, water.

Specifically, in the event that nozzle 24 is pre-fill wetted with, for example, 10 mL of water, and/or post-fill rinsed with, for example, 10 mL of water or any "post-wash" ingredient, once the adding of the dirty ingredient has stopped, trajectory shaping controller 350 may offset the pre-wash ingredient added during the pre-fill wetting and/or post-fill rinsing by providing an additional quantity of dirty ingredient during the fill process. Specifically, as container 30 is being filled with product 28, the pre-fill rinse water or "pre-wash" may result in product 28 being initially under-concentrated with the dirty ingredient, Trajectory shaping controller 350 may then add dirty ingredient at a higher-than-needed flow rate, resulting in product 28 transitioning from "under-concentrated" to "appropriately concentrated" to "over-concentrated", or present in a concentration higher than that which is called for by the particular recipe. However, once the appropriate amount of dirty ingredient has been added, the post-fill rinse process may add additional water, or another appropriate "post-wash ingredient", resulting in product 28 once again becoming "appropriately-concentrated" with the dirty ingredient.

Flow controller 352 may be configured as a proportional-integral (PI) loop controller. Flow controller 352 may perform the comparison and processing that was generally described above as being performed by feedback controller system 188. For example, flow controller 352 may be configured to receive feedback signal 182 from flow measuring device 176. Flow controller 352 may compare flow feedback signal 182 to the desired flow volume (as defined by control logic subsystem 14 and modified by trajectory shaping controller 350). Upon processing flow feedback signal 182, flow controller 352 may generate flow control signal 194 that may be provided to variable line impedance 200.

Feed forward controller 354 may provide a "best guess" estimate concerning what the initial position of variable line impedance 200 should be. Specifically, assume that at a defined constant pressure, variable line impedance has a flow rate (for chilled carbonated water 164) of between 0.00 mL/second and 120.00 mL/second. Further, assume that a flow rate of 40 mL/second is desired when filling container 30 with a beverage product 28. Accordingly, feed forward controller 354 may provide a feed forward signal (on feed forward line 384) that initially opens variable line impedance 200 to 33.33% of its maximum opening (assuming that variable line impedance 200 operates in a linear fashion).

When determining the value of the feed forward signal, feed forward controller 354 may utilize a lookup table (not shown) that may be developed empirically and may define the signal to be provided for various initial flow rates. An example of such a lookup table may include, but is not limited to, the following table:

| Flowrate mL/second | Signal to stepper controller |
|---|---|
| 0 | pulse to 0 degrees |
| 20 | pulse to 30 degrees |
| 40 | pulse to 60 degrees |
| 60 | pulse to 150 degrees |
| 80 | pulse to 240 degrees |
| 100 | pulse to 270 degrees |
| 120 | pulse to 300 degrees |

Again, assuming that a flow rate of 40 mL/second is desired when filling container 30 with beverage product 28, for example, feed forward controller 354 may utilize the above-described lookup table and may pulse the stepper motor to 60.0 degrees (using feed forward line 384). Although in the exemplary embodiment a stepper motor is used, in various other embodiments, any other type of motor may be used including but not limited to a servo motor.

Unit delay 356 may form a feedback path through which a previous version of the control signal (provided to variable line impedance 200) is provided to flow controller 352.

Saturation controller 358 may be configured to disable the integral control of feedback controller system 188 (which, as discussed above, may be configured as a PI loop controller) whenever variable line impedance 200 is set to a maximum flow rate (by stepper controller 360), thus increasing the stability of the system by reducing flow rate overshoots and system oscillations.

Stepper controller 360 may be configured to convert the signal provided by saturation controller 358 (on line 386) into a signal usable by variable line impedance 200. Variable line impedance 200 may include a stepper motor for adjusting the orifice size (and, therefore, the flow rate) of variable line impedance 200. Accordingly, control signal 194 may be configured to control the stepper motor included within variable line impedance.

Figure 6B:
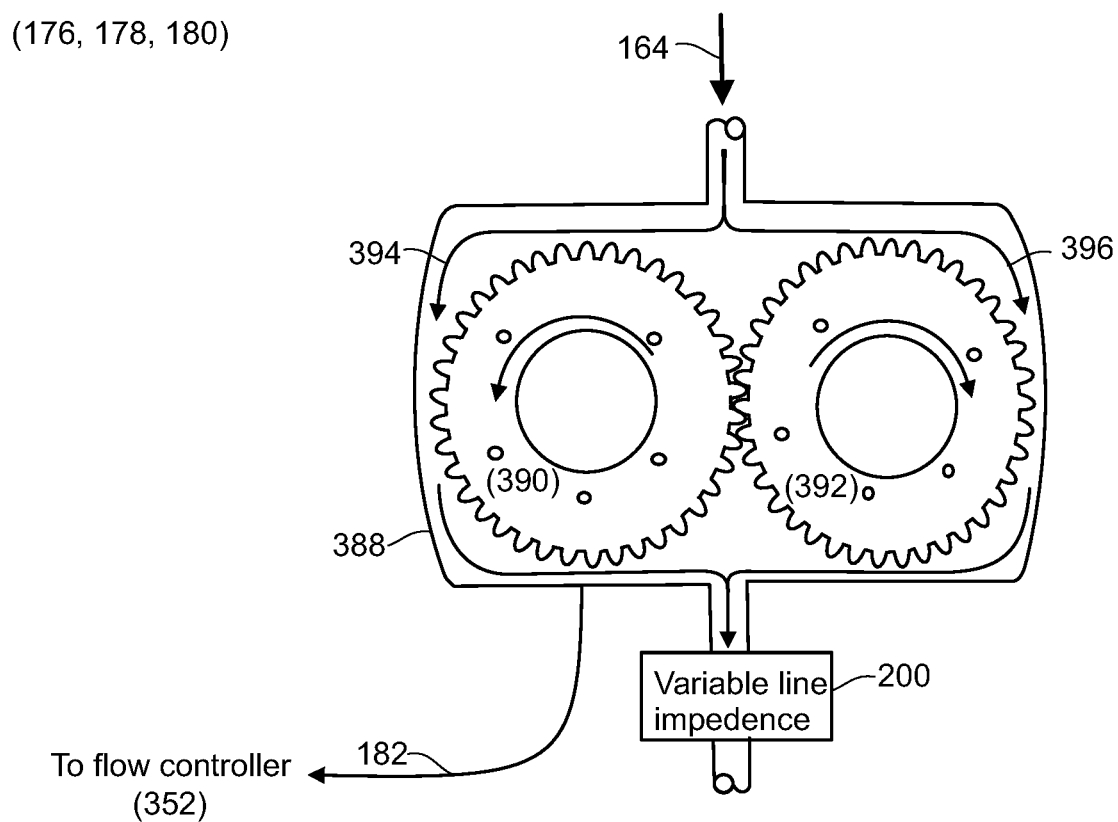
FIG. 6B is a diagrammatic view of one embodiment of a gear-based, positive displacement flow measuring device.

Referring also to FIG. 6B, an example of flow measuring devices 176, 178, 180 of flow control modules 170, 172, 174, respectively, may include but is not limited to a paddle wheel flow measuring device, a turbine-type flow measuring device, or a positive displacement flow measuring device (e.g., gear-based, positive displacement flow measuring device 388). Thus, in various embodiments, the flow measuring device may be any device capable of measuring flow, either directly or indirectly. In the exemplary embodiment, a gear-based, positive displacement, flow measuring device 388 is used. In this embodiment, the flow measuring device 388 may include a plurality of meshing gears (e.g., gears 390, 392) that e.g., may require that any content passing through gear-based, positive displacement flow measuring device 388 follow one or more defined pathways (e.g., pathways 394, 396), resulting in e.g., the counterclockwise rotation of gear 390 and the clockwise rotation of gear 392. By monitoring the rotation of gears 390, 392, a feedback signal (e.g., feedback signal 182) may be generated and provided to the appropriate flow controller (e.g., flow controller 352).

Referring also to FIGS. 7-14, various illustrative embodiments of a flow control module (e.g., flow control module 170) are shown. However, as discussed above, the order of the various assemblies may vary in various embodiments, i.e., the assemblies may be arranged in any order desired. For example, in some embodiments the assemblies are arranged in the following order: flow measuring device, binary valve, variable impedance; while in other embodiments, the assemblies are arranged in the following order: flow measuring device, variable impedance, binary valve. In some embodiments, it may be desired to vary the order of the assemblies to either maintain pressure and fluid on the variable impedance or vary the pressure on the variable impedance. In some embodiments, the variable impedance valve may include a lip seal. In these embodiments, it may be desirable to maintain pressure and fluid on the lip seal. This may be accomplished by ordering the assemblies as follows: flow measuring device, variable impedance, and binary valve. The binary valve being downstream from the variable line impedance maintains pressure and liquid on the variable impedance such that the lip seal maintains a desirable seal.

Figure 7A:
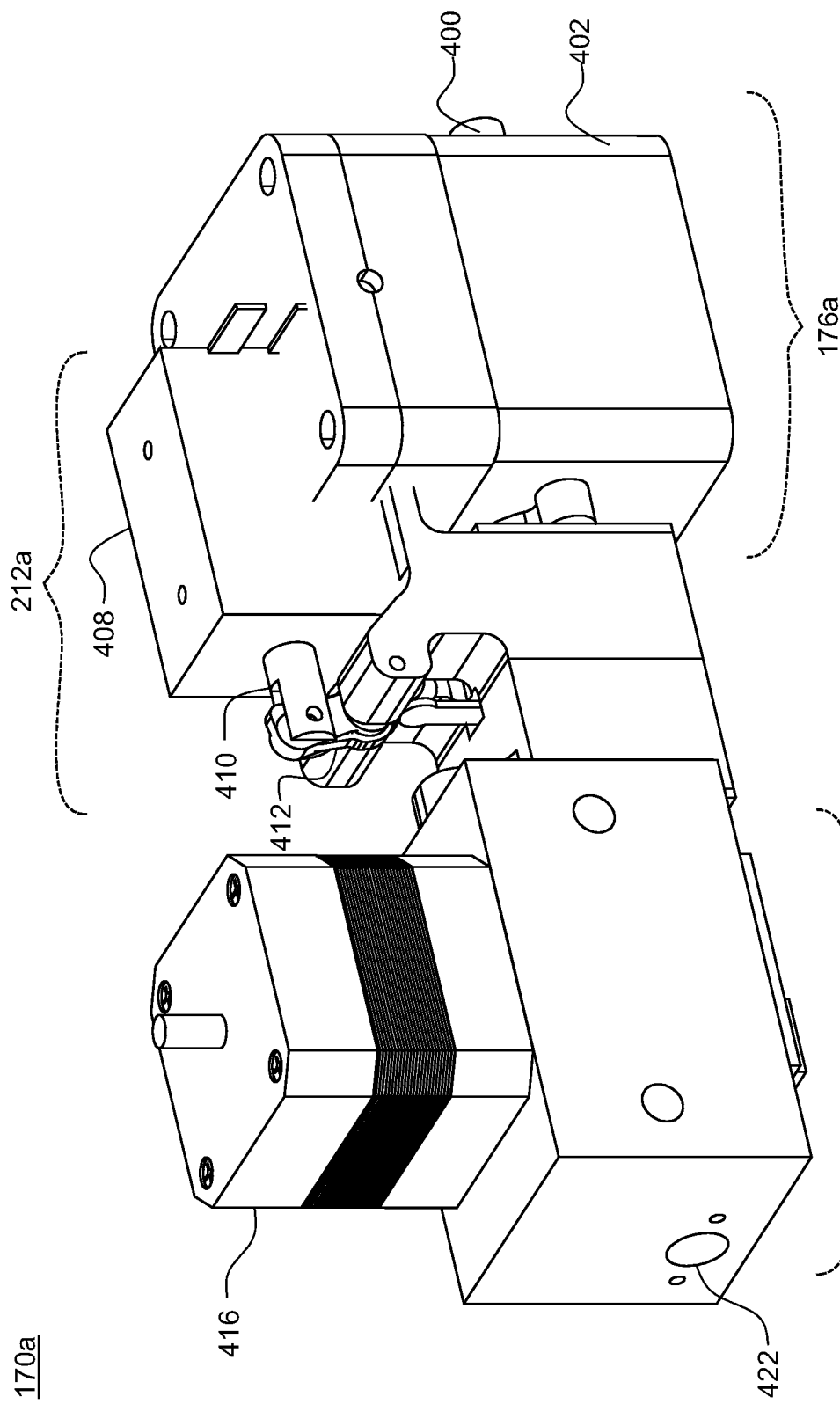
FIGS. 7A and 7B diagrammatically depict an embodiment of a flow control module of FIG. 3.
Figure 7B:
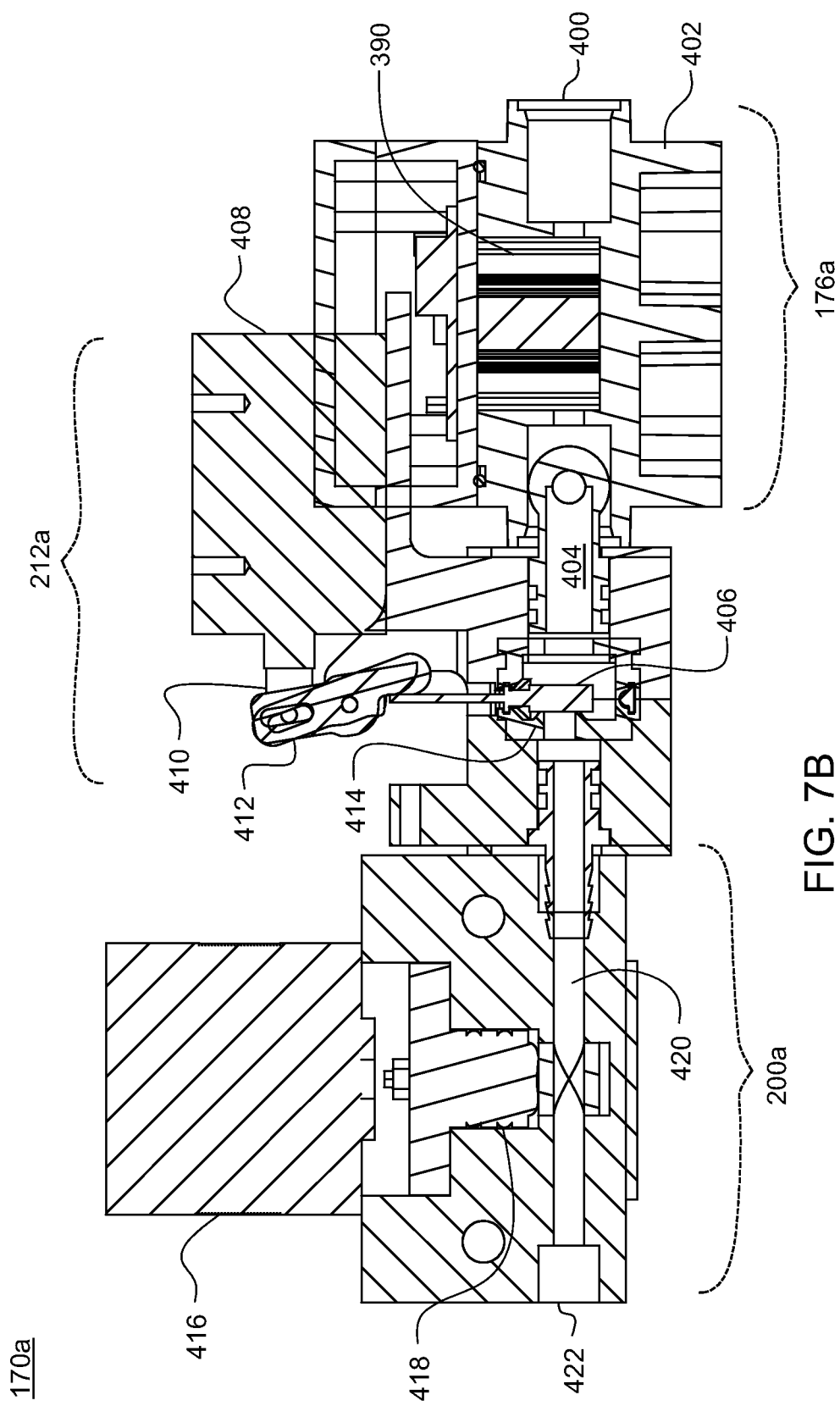

Referring first to FIGS. 7A and 7B, one embodiment of the flow control module 170a is shown. In some embodiments, the flow control module 170a may generally include flow meter 176a, variable line impedance 200a and binary valve 212a, and may have a generally linear fluid flow path there-through. Flow meter 176a may include fluid inlet 400 for receiving a high-volume ingredient from high-volume ingredient subsystem 16. Fluid inlet 400 may communicate the high-volume ingredient to a gear-based, positive displacement, flow measuring device (e.g., gear-based, positive displacement device 388 generally described above), including a plurality of intermeshing gears (e.g., including gear 390) disposed within housing 402. The high-volume ingredient may pass from flow meter 176a to a binary valve 212a via fluid passage 404.

Binary valve 212a may include banjo valve 406 actuated by solenoid 408. Banjo valve 406 may be biased (e.g., by a spring, not shown) to position banjo valve 406 toward a closed position, thereby preventing the flow of the high-volume ingredient through flow control module 170a. Solenoid coil 408 may be energized (e.g., in response to a control signal from control logic subsystem 14), to linearly drive plunger 410, via linkage 412, to move banjo valve 406 out of sealing engagement with valve seat 414, thereby opening binary valve 212a to permitting flow of the high-volume ingredient to variable line impedance 200a.

As mentioned above, variable line impedance 200a may regulate the flow of the high-volume ingredients. Variable line impedance 200a may include drive motor 416, which may include, but is not limited to a stepper motor, or a servo motor. Drive motor 416 may be coupled to variable impedance valve 418, generally. As mentioned above, variable impedance valve 418 may control the flow of the high-volume ingredients, e.g., passing from binary valve 212a via fluid passage 420, and exiting from fluid discharge 422. Examples of variable impedance valve 418 are disclosed and claimed in U.S. Pat. No. 5,755,683 and U.S. Patent Publication No.: 2007/0085049, both are which are incorporated by reference in their entireties. While not shown, a gearbox may be coupled between drive motor 416 and variable impedance valve 418.

Figure 8:
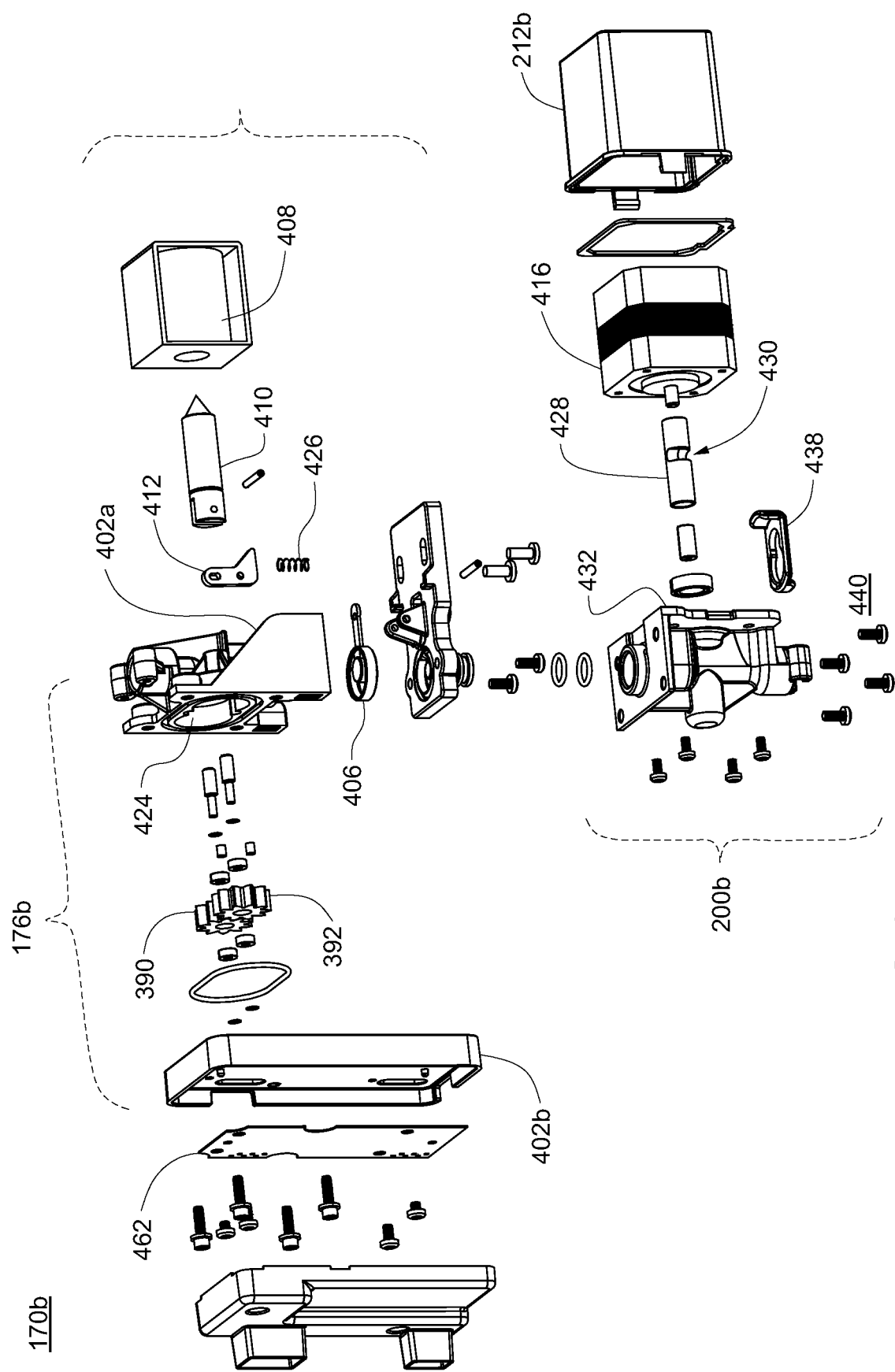
Figure 9:
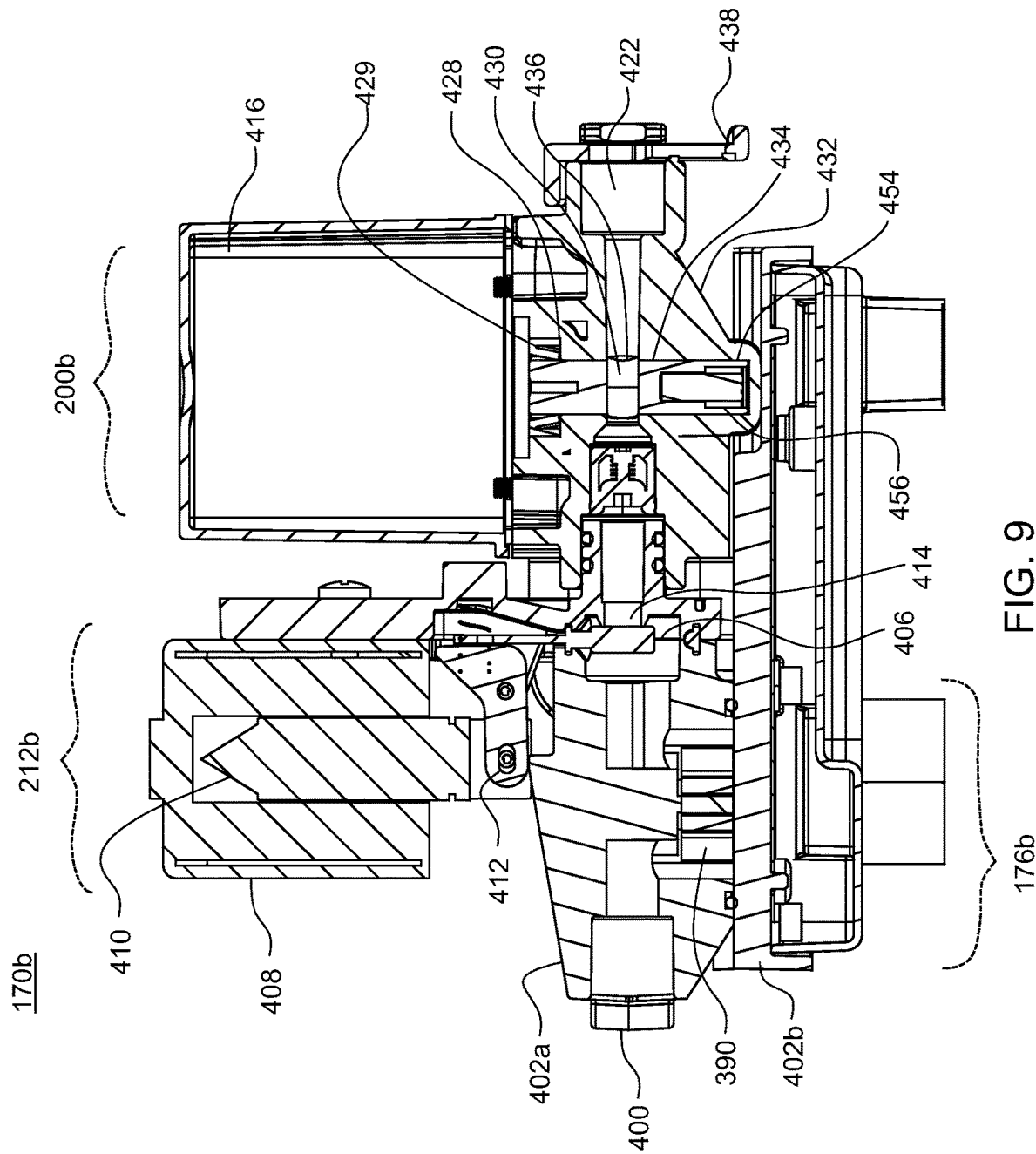
Figure 10:
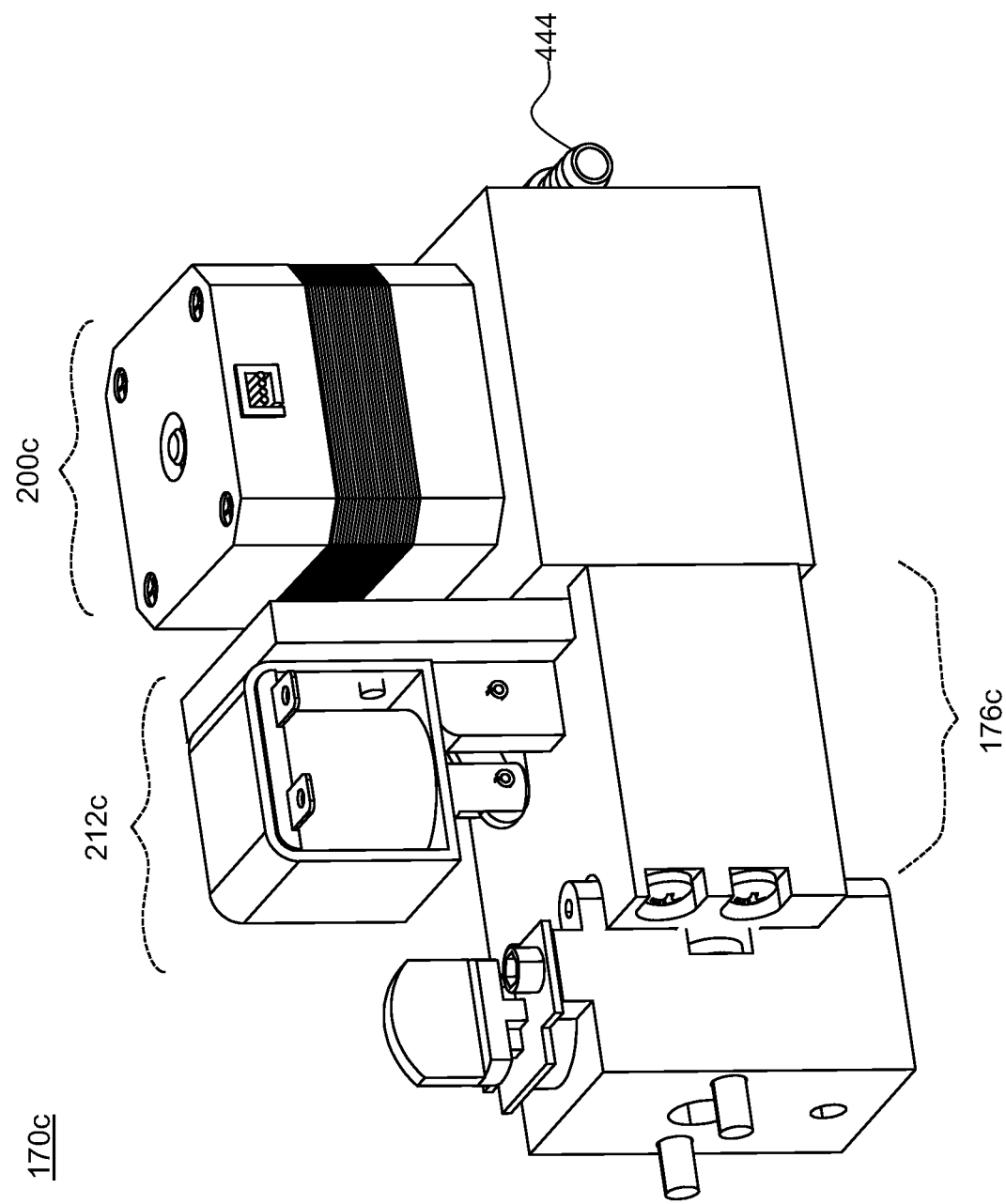
Figure 11:
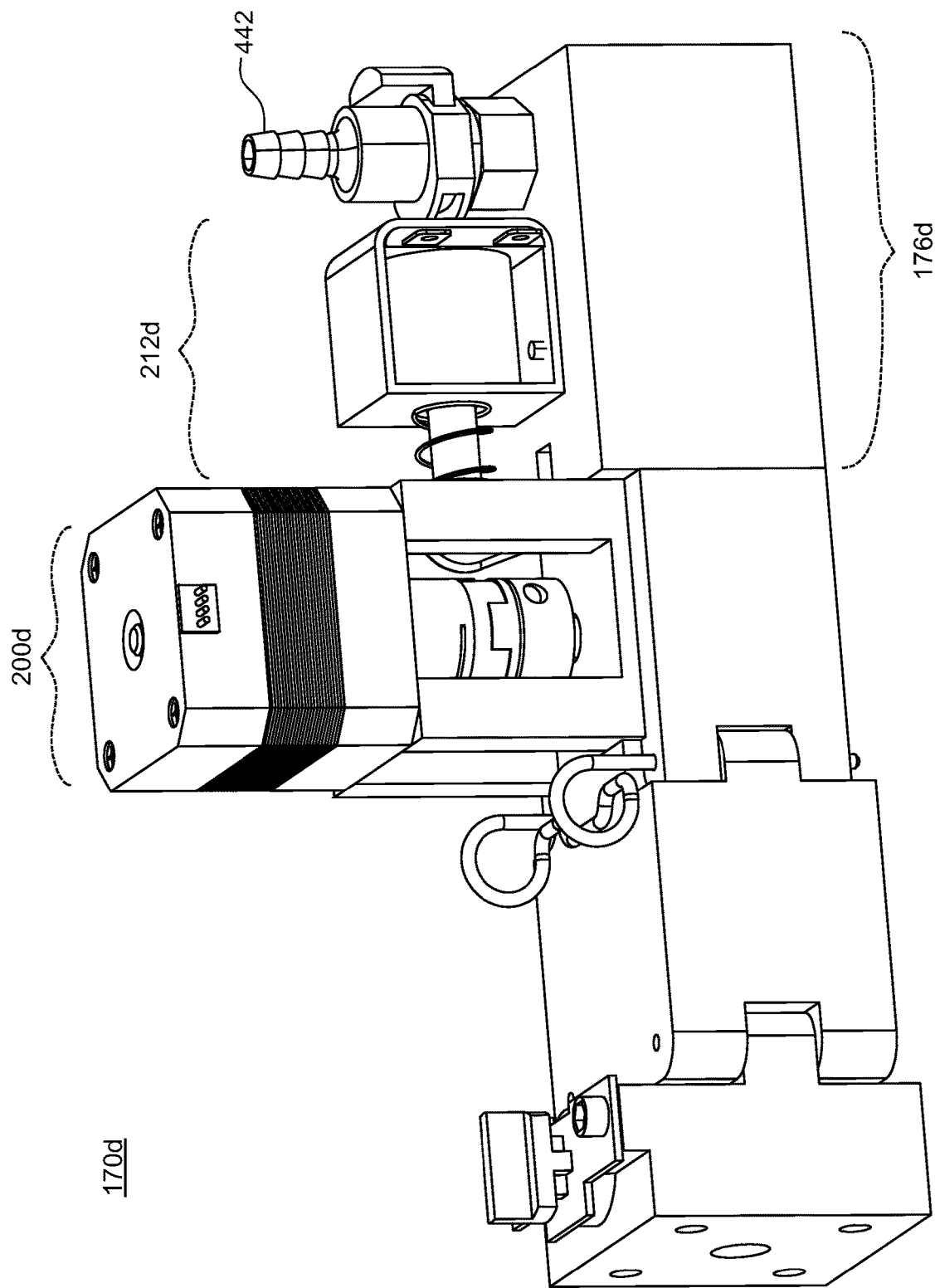
Figure 13:
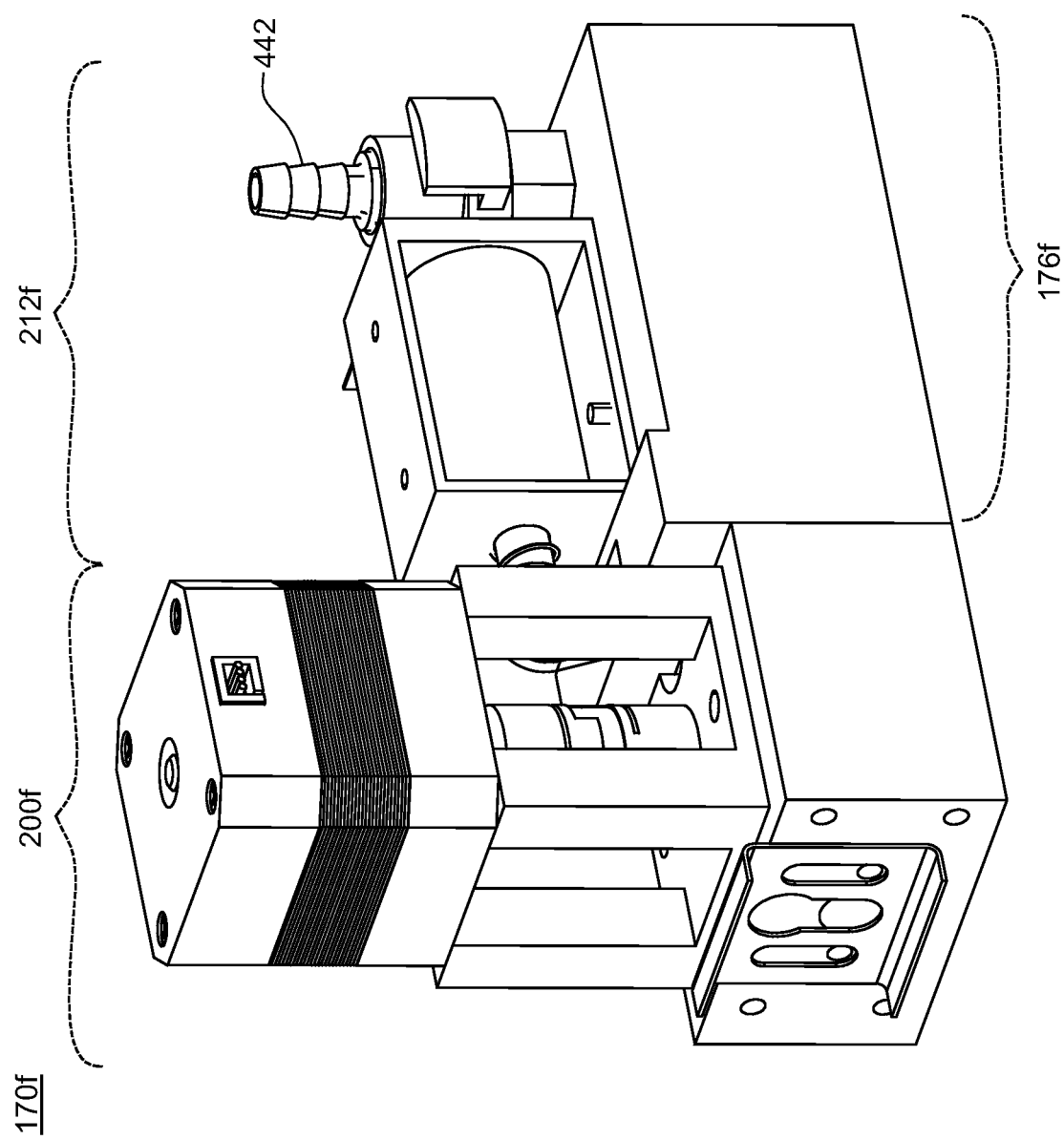

Referring also to FIGS. 8 and 9, another embodiment of a flow control module (e.g., flow control module 170b) is shown, generally including flow meter 176b, binary valve 212b, and variable line impedance 200b. Similar to flow control module 170a, flow control module 170b may include fluid inlet 400, which may communicate the high-volume ingredient to flow meter 176b. Flow meter 176b may include meshing gears 390, 392 disposed with in cavity 424, e.g., which may be formed within housing member 402. Meshing gears 390, 392 and cavity 424 may define flow pathways about the perimeter of cavity 424. The high-volume ingredient may pass from flow meter 176b to binary valve 212b via fluid passage 404. As shown, fluid inlet 400 and fluid passage 404 may provide for a 90 degree flow path in to, and out of, flow meter 176b (i.e., into and out of cavity 424).

Binary valve 212b may include banjo valve 406, urged into engagement with valve seat 414 (e.g., in response to a biasing force applied by spring 426 via linkage 412). When solenoid coil 408 is energized, plunger 410 may be retracted toward solenoid coil 408, thereby moving banjo valve 406 out of sealing engagement with valve seat 414, thereby allowing the high-volume ingredient to flow to variable line impedance 200b. In other embodiments, the banjo valve 406 may be downstream from the variable line impedance 200b.

Variable line impedance 200b may generally include a first rigid member (e.g., shaft 428) having a first surface. Shaft 428 may define a first fluid-path portion with a first terminus at the first surface. The first terminus may include a groove (e.g., groove 430) defined on the first surface (e.g., of shaft 428). Groove 430 may taper from a large cross-sectional area to a small cross-sectional area normal to the tangent of the curve of the first surface. However, in other embodiments, the shaft 428 may include a bore (i.e., a straight ball-style hole, see FIG. 15C) rather than a groove 430. A second rigid member (e.g., housing 432) may have a second surface (e.g., inner bore 434). The second rigid member (e.g., housing 432) may define a second fluid-path portion with a second terminus at the second surface. The first and second rigid members are capable of being rotated with respect to each other from a fully open position continuously through partially open positions to a closed position. For example, shaft 428 may be rotatably driven relative to housing 432 by drive motor 416 (e.g., which may include, a stepper motor or a servo motor). The first and second surfaces define a space therebetween. An aperture (e.g., opening 436) in the second rigid member (i.e., housing 432) may provide fluid communication between the first and second fluid-path portions when the first and second rigid members are in the fully open position or in one of the partially open positions with respect to each other. Fluid flowing between the first and second fluid-path portions flows through the groove (i.e., groove 430) as well as the aperture (i.e., opening 436). At least one sealing means (e.g., a gasket, o-ring, or the like, not shown) in some embodiments, may be disposed between the first and second surfaces providing a seal between the first and second rigid members for preventing fluid from leaking out of the space which also prevents fluid leaking from the desired flow path. However, in the exemplary embodiment as shown, this type of sealing means is not used. Rather, in the exemplary embodiments, a lip seal 429 or other sealing means, is used to seal the space.

Various connection arrangements may be included for fluidly coupling flow control modules 170, 172, 174 to high-volume ingredient subsystem 16 and/or downstream components, e.g., nozzle 24. For example, as shown in FIGS. 8 and 9 with respect to flow control module 170b, locking plate 438 may be slidingly disposed relative to guide feature 440. A fluid line (not shown) may be at least partially inserted into fluid discharge 422 and locking plate 438 may be slidingly translated to lock the fluid line in engagement with fluid discharge. Various gaskets, o-rings, or the like may be employed to provide a fluid-tight connection between the fluid line and fluid discharge 422.

FIGS. 10 through 13 depict various additional embodiments of flow control modules (e.g., flow control modules 170c, 170d, 170e, and 170f, respectively). Flow control modules 170c, 170d, 170e, 170f generally differ from previously described flow control modules 170a, 170b in terms of fluid connections and relative variable line impedance 200 and binary valve 212 orientations. For example, flow control modules 170d and 170f, shown in FIGS. 11 and 13 respectively, may include barbed fluid connections 442 for communicating fluid to/from flow meters 176d and 176f. Similarly, flow control module 170c may include barbed fluid connection 444 for communicating fluid to/from variable line impedance 200c. Various additional/alternative fluid connection arrangements may be equally utilized. Similarly, various relative orientations of solenoid 408 and configurations of spring bias for banjo valve 406 may be employed to suit various packaging arrangements and design criteria.

Figure 14A:
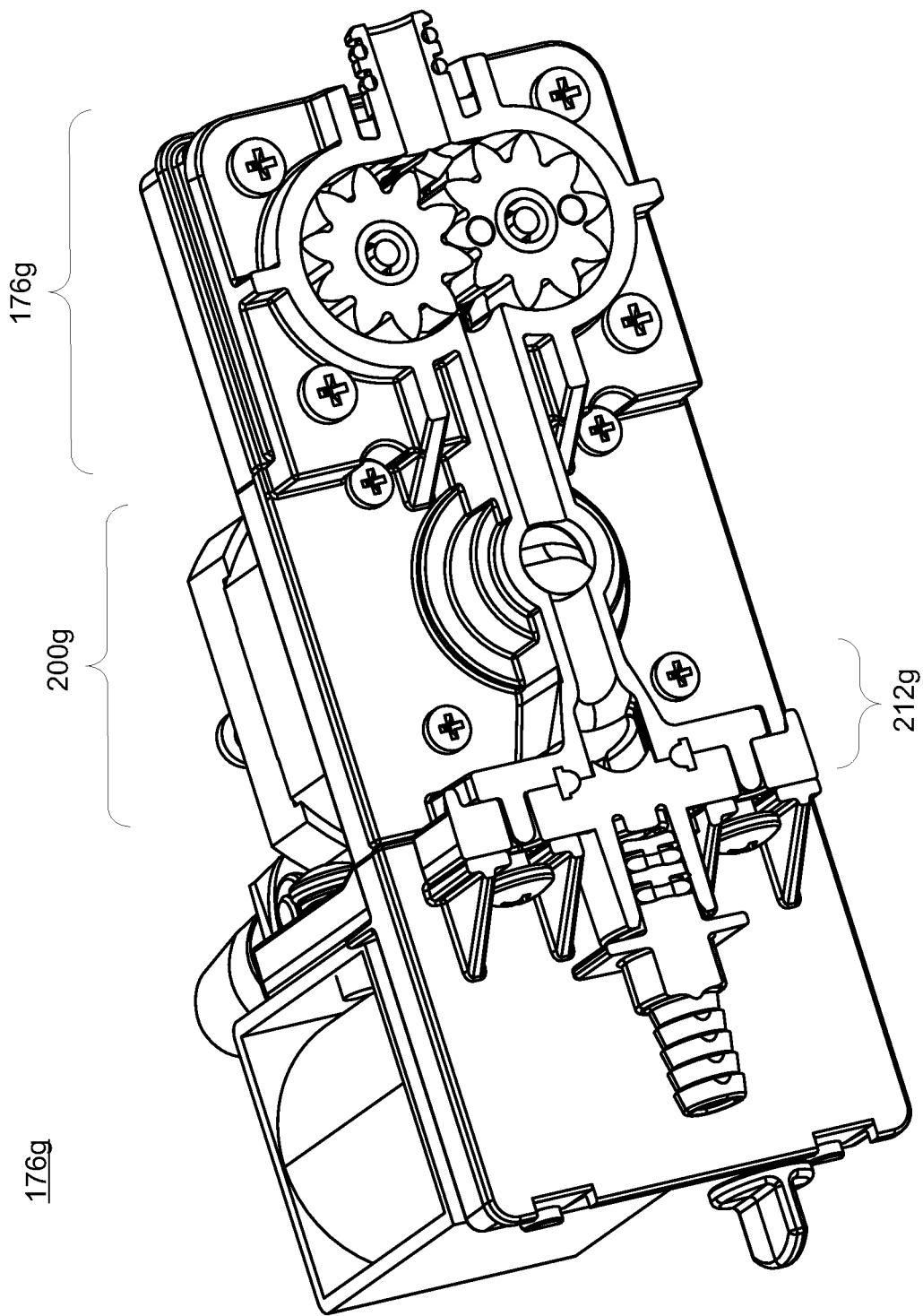
Figure 14B:
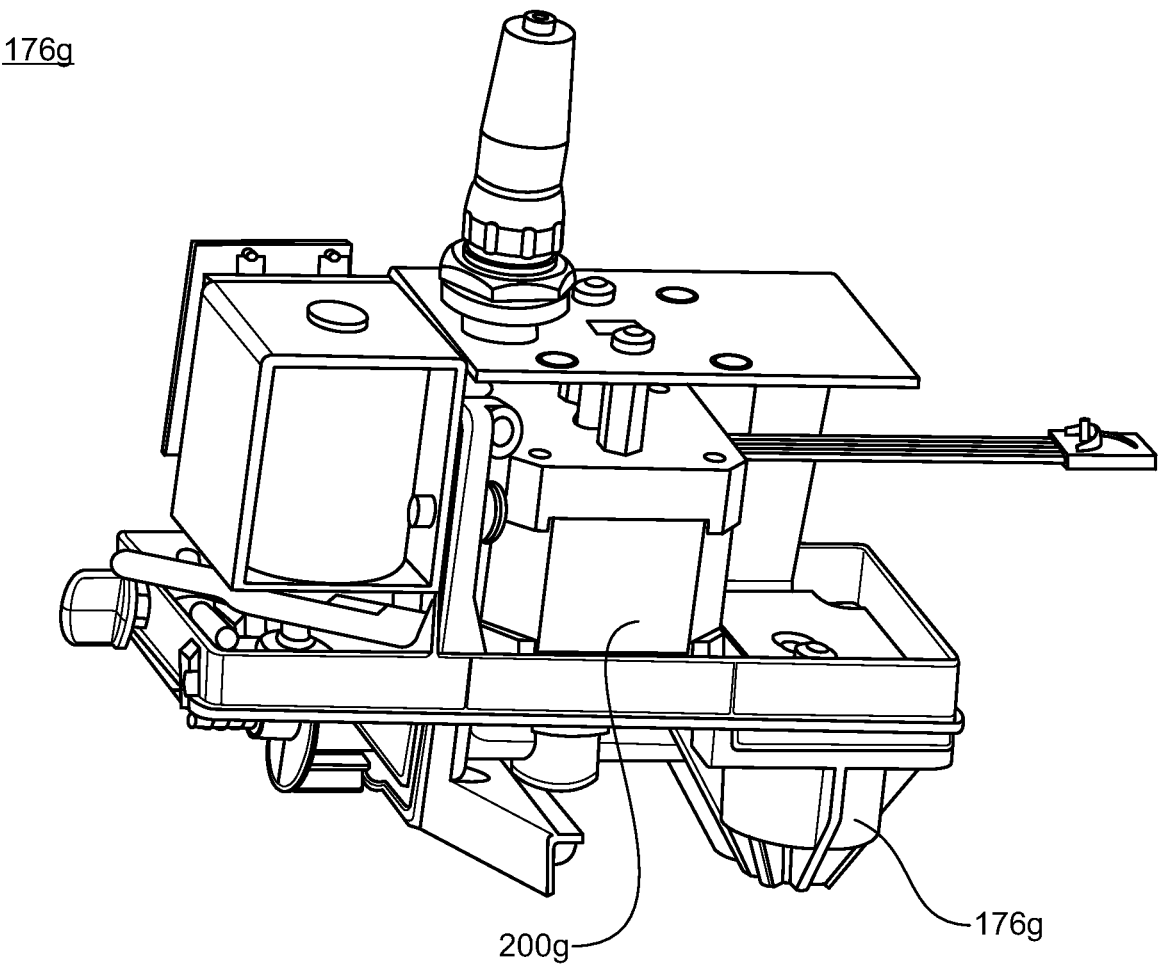
Figure 14C:
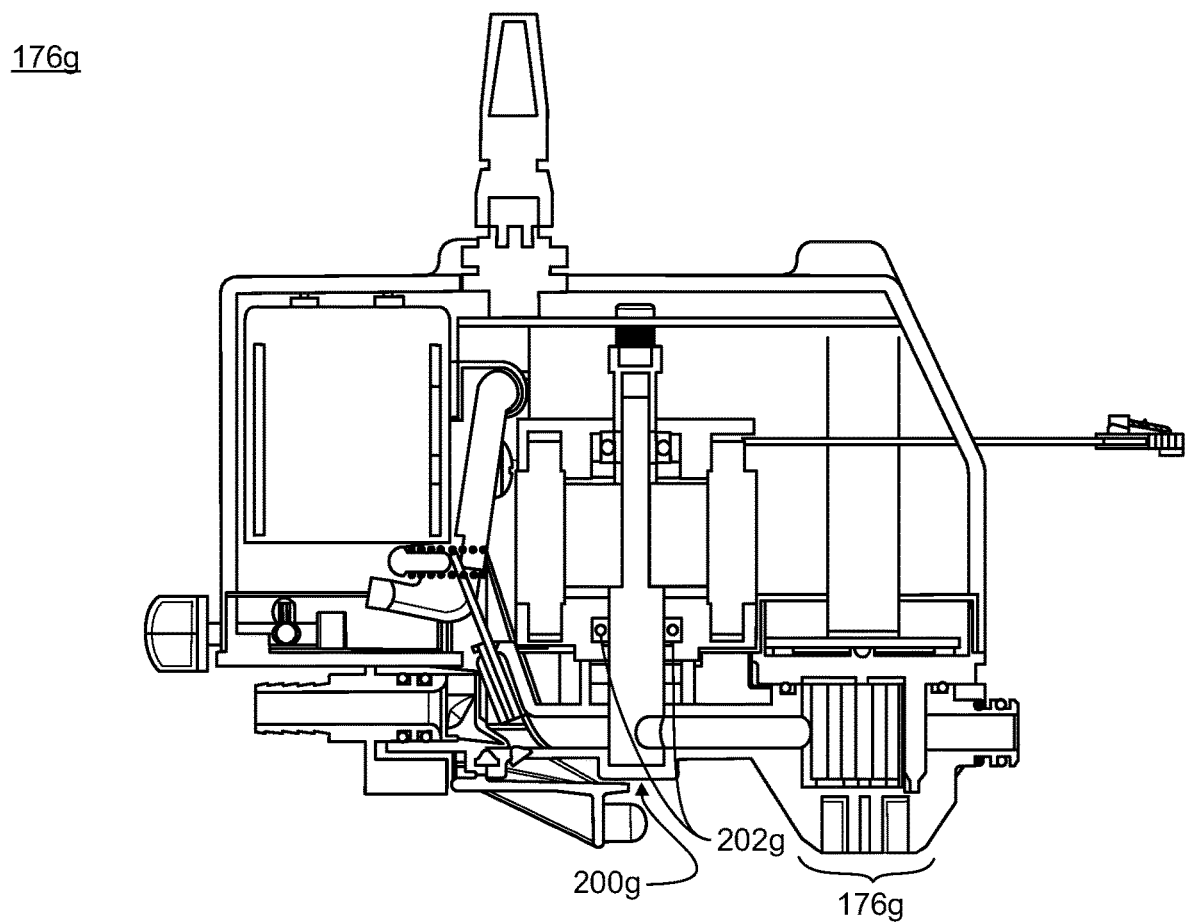

Referring also to FIGS. 14A-14C, yet another embodiment of a flow control module is depicted (i.e., flow control module 170g). Flow control module 170g may generally include flow meter 176g, variable line impedance 200g, and binary valve 212g (e.g., which may be a solenoid actuated banjo valve, as generally described herein above). Referring to FIG. 14C, the lip seals 202g may be seen. Also, FIG. 14C shows one exemplary embodiment where the flow control module includes a cover which may provide protection to the various flow control module assemblies. Although not depicted in all embodiments shown, each of the embodiments of the flow control module may also include a cover It should be noted that while the flow control module (e.g., flow control modules 170, 172, 174) have been described as being configured such that high-volume ingredients flow from high-volume ingredient subsystem 16 to the flow meter (e.g., flow meters 176, 178, 180), then to the variable line impedance (e.g., variable line impedance 200, 202, 204), and finally through the binary valve (e.g., binary valves 212, 214, 216), this should not be construed as a limitation on the present disclosure. For example, as shown and discussed with respect to FIGS. 7 through 14C, the flow control modules may be configured having a flow path from high-volume ingredient subsystem 16, to the flow meter (e.g., flow meters 176, 178, 180), then to the binary valve (e.g., binary valve 212, 214, 216), and finally through the variable line impedance (e.g., variable line impedance 200, 202, 204). Various additional/alternative configurations may be equally utilized. Additionally, one or more additional components may be interconnected between one or more of the flow meter, the binary valve, and the variable line impedance.

Figure 15A:
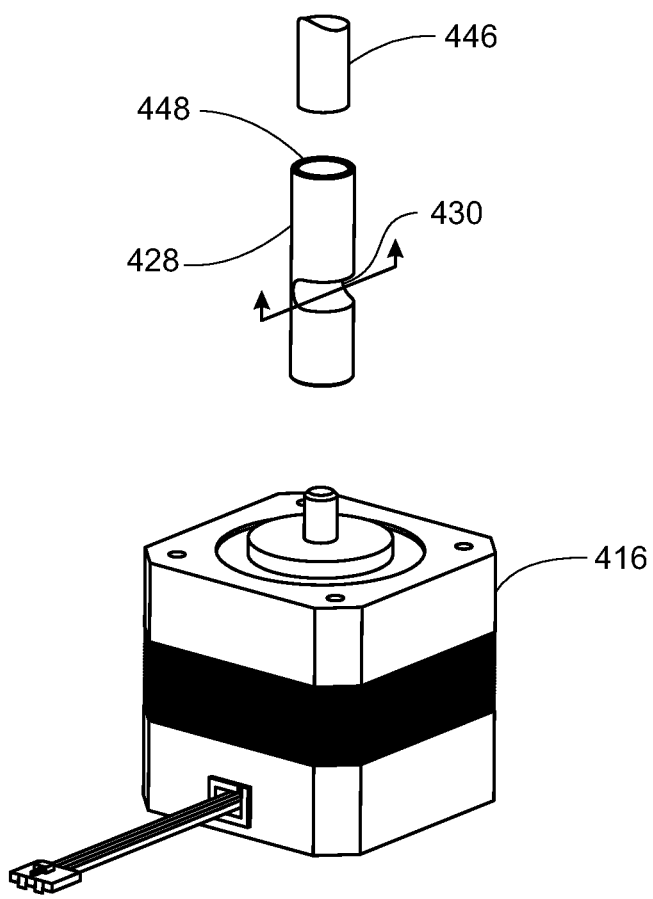
FIGS. 15A and 15B diagrammatically depict a portion of a variable line impedance.
Figure 15B:
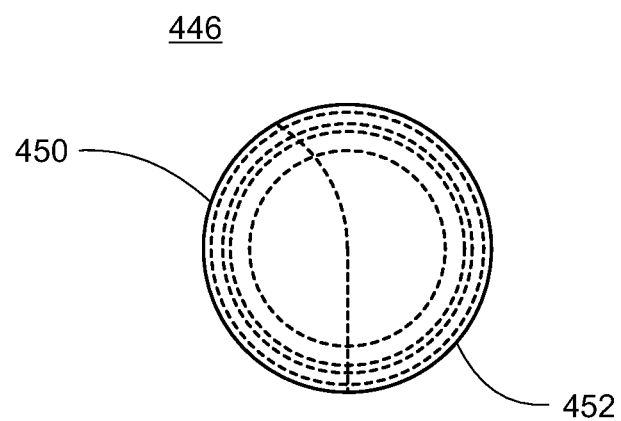
Figure 15C:
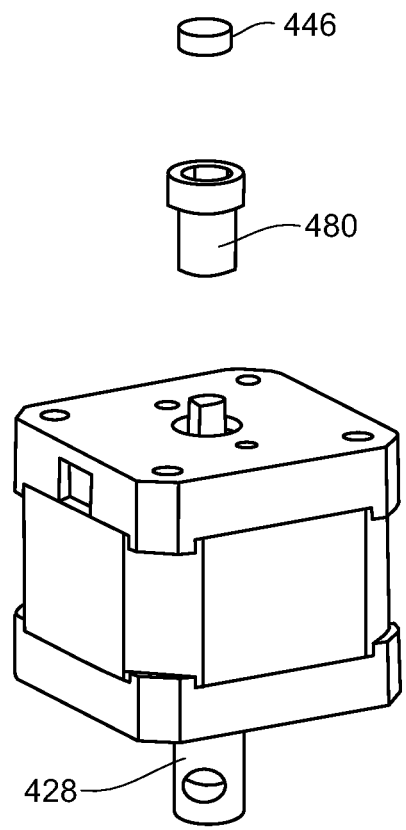
FIG. 15C diagrammatically depicts one embodiment of a variable line impedance.

Referring to FIGS. 15A and 15B, a portion of a variable line impedance (e.g., variable line impedance 200) is shown including drive motor 416 (e.g., which may be a stepper motor, a servo motor, or the like). Drive motor 416 may coupled to shaft 428, having groove 430 therein. Referring now to FIG. 15C, in some embodiments, the shaft 428 includes a bore, and in the exemplary embodiment, as shown in FIG. 15C, the bore is a ball-shaped bore. As discussed, e.g., with reference to FIGS. 8 and 9, drive motor 416 may rotate shaft 428 relative to a housing (e.g., housing 432) to regulate flow through the variable line impedance. Magnet 446 may be coupled to shaft 428 (e.g., maybe at least partially disposed within axial opening in shaft 428. Magnet 446 may be generally diametrically magnetized, providing south pole 450 and north pole 452. The rotational position of shaft 428 may be determined, e.g., based upon the magnetic flux imparted by magnet 446 on one or more magnetic flux sensing devices, e.g., sensors 454, 456 shown in FIG. 9. Magnetic flux sensing devices may include, but are not limited to, for example, a Hall-Effect sensor, or the like. The magnetic flux sensing device may provide a position feedback signal, e.g., to control logic subsystem 14.

Referring again to FIG. 15C, in some embodiments, the magnet 446 is located on the opposite side as the embodiment shown and described above with respect to FIGS. 8 and 9. Additionally, in this embodiment, the magnet 446 is held by magnet holder 480.

In addition/as an alternative to utilizing magnetic position sensors (e.g., for determining the rotational position of the shaft), the variable line impedance may be determined based upon, at least in part, a motor position, or an optical sensor to detect shaft position.

Referring next to FIGS. 16A and 16B, a gear (e.g., gear 390) of a gear-based, positive displacement, flow measuring device (e.g., gear-based, positive displacement, flow measuring device 388) may include one or more magnets (e.g., magnets 458, 460) coupled thereto. As discussed above, as a fluid (e.g., a high-volume ingredient) flows through gear-based, positive displacement, flow measuring device 388, gear 390 (and gear 392) may rotate. The rate of rotation of gear 390 may be generally proportional to the flow rate of the fluid passing through gear-based, positive displacement, flow measuring device 388. The rotation (and/or rate of rotation) of gear 390 may be measured using a magnetic flux sensor (e.g., a Hall-Effect sensor, or the like), which may measure the rotational movement of axial magnets 458, 460 coupled to gear 390. The magnetic flux sensor, e.g., which may be disposed on printed circuit board 462, depicted in FIG. 8, may provide a flow feedback signal (e.g., flow feedback signal 182) to a flow feedback controller system (e.g., feedback controller system 188).

Flow Control Module Leak Detect

In various embodiments, a flow control module may be in an operational state but fluid should not be flowing, i.e., the flow control module is not acting on any pump command. In some embodiments, a system including a method for leak detection may be used to detect fluid flow from the flow control module when fluid should not be flowing.

In various embodiments of the flow control module leak detect, the leak detect may be activated when the flow control module is not acting on any pump commands, and the banjo valve or other valve controller is idle and the gear meter monitor is idle any post-pour gear meter spin-down time has elapsed. When these conditions are met, the leak detection is activated. In some embodiments, a predetermined lapsed time may be given to the flow control module before the leak detection is activated.

Figure 76:
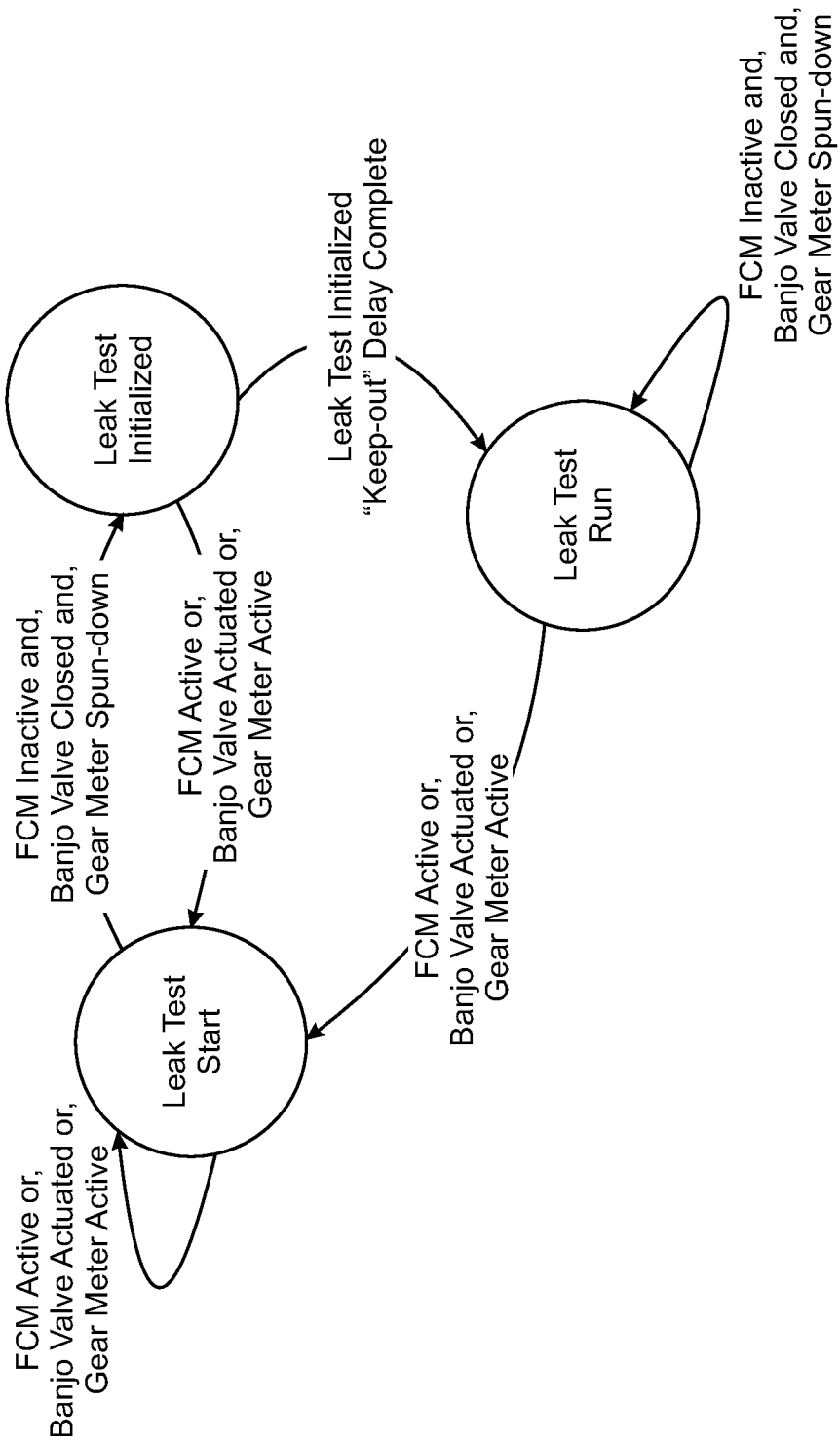
FIG. 76 is a diagrammatic representation of the leak detection for the flow control module according to one embodiment.

Referring now also to FIG. 76, in various embodiments, the leak detection method includes three states: leak test start; leak test initialize and leak test run. In the leak test start the leak detection is idle because one or more of the activation criteria have not been met. In various embodiments, the activation criteria may include one or more of the above-described criteria. In the leak test initialize state the timing guard band, which occurs when the flow control module transitions from an active state to an idle state (i.e. once the activation criteria have been met) is controlled. In the leak test run state, once the timing guard band has elapsed, the leak test method remains in this state until the flow control module is activated.

Figure 77:
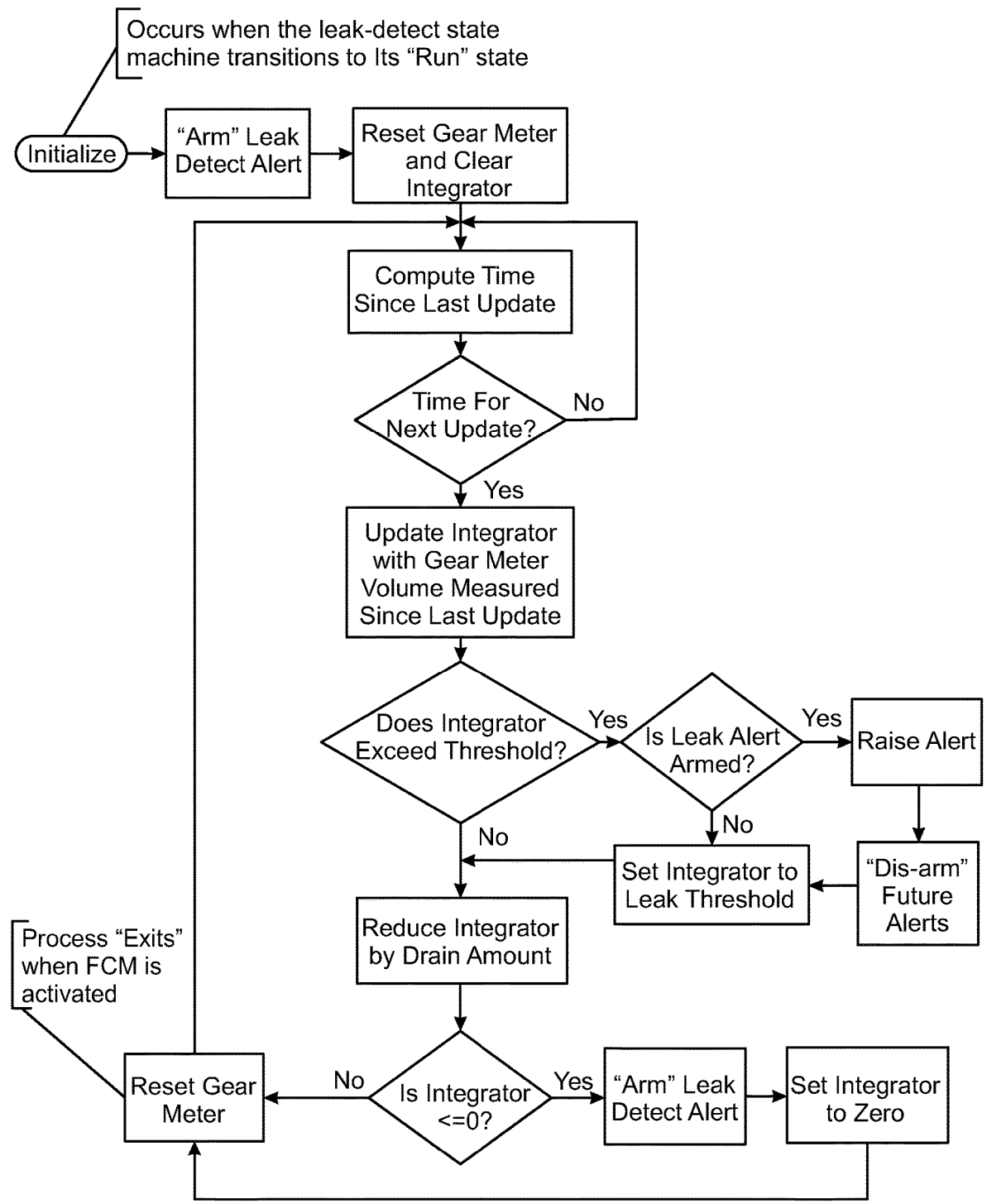
FIG. 77 is a diagrammatic representation of the leak detection for the flow control module according to one embodiment.
Figure 78:
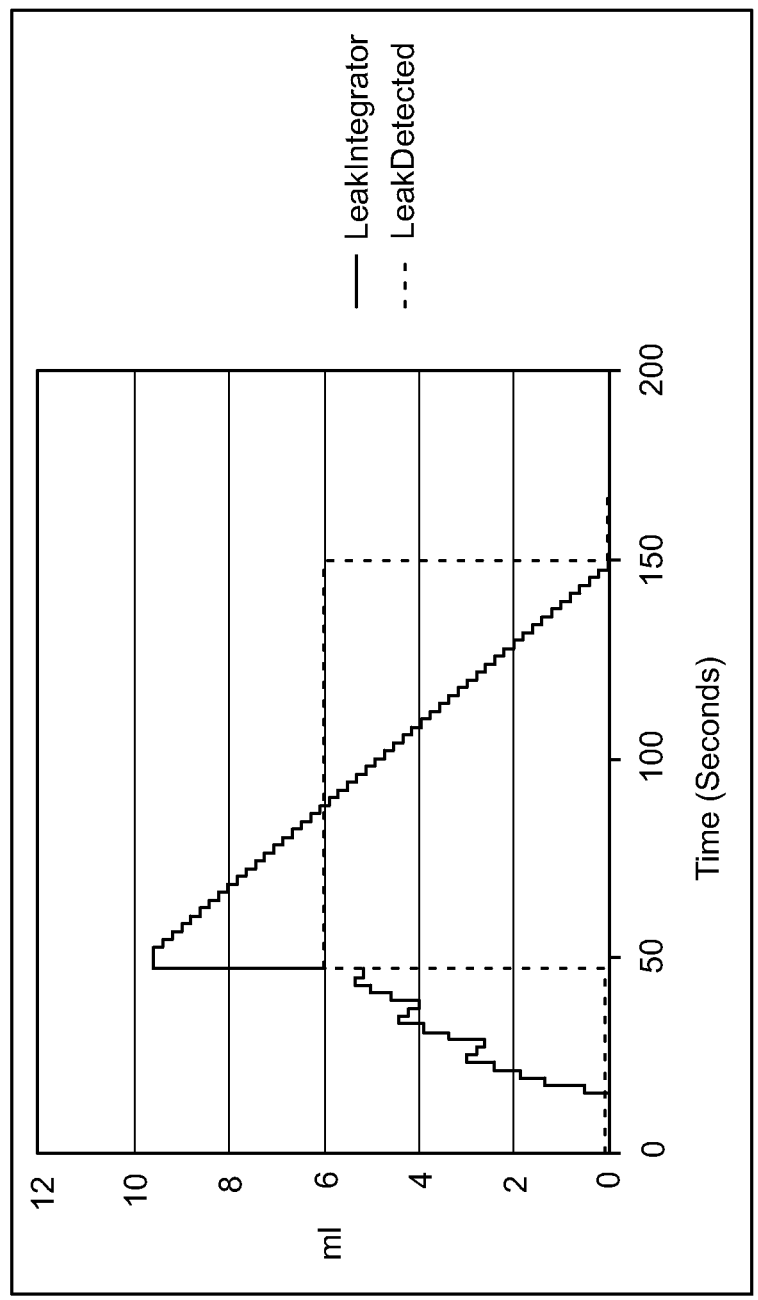
FIG. 78 is a plot of time and volume showing the leak integrator and leak detected.

Referring now also to FIG. 77, at a high level, the FCM leak detection method receives and monitors the fluid volume communicated and determined by the gear meter. If that reported volume exceeds a pre-determined, preset threshold, an alert is raised. To accomplish this, a "leaky integrator" algorithm is used which, in some embodiments, includes for each update, the fluid volume measured by the gear meter is added to a running sum—the integrator; and if the integrator exceeds a threshold, a leak is determined. For each update, the integrator is then reduced by a fixed "drain amount". The running sum does not have a value below zero.

In various embodiments, three coefficients may be used; these include the Update Period, the Leak Detection Threshold and the Integrator Drain Rate. In various other embodiments, different coefficients may be used or additional or less coefficients may be used.

In some embodiments, the Update Period defines how often the leak detect is executed. In some embodiments, the leak detect may be executed regularly, for example, executes once every 2 seconds (0.5 Hz). In some embodiments, the Leak Detection Threshold is set and if the integrator exceeds this value, a leak is declared. The Leak Detection Threshold may, in some embodiments, be defined in terms of the maximum flow rate defined in the flow control module calibration data as follows:

$$\text{Leak\_Detection\_Threshold} = (0.25 * \text{FCM\_Maximum\_Flow\_Rate}) * \text{Update\_Period}$$

In some embodiments, the Integrator Drain Rate is a value in which the integrated gear meter flow is reduced by for each update. This may be beneficial for example because draining the integrator improves the method's noise immunity and allows the algorithm to reset should a leak condition clear. The Integrator Drain Rate is defined in terms of the maximum flow rate defined in the flow control module's calibration data as follows:

$$\text{Integrator\_Drain\_Rate} = (0.001 * \text{FCM\_Maximum\_Flow\_Rate}) * \text{Update\_Period}$$

In various embodiments, a leak is determined and, in some embodiments, an alert or alarm is generated when the following conditions are met: the Integrator exceeds the Leak Detection Threshold and the alert generation is "armed". In various embodiments, the alert generation is "armed" when the algorithm is initialized and whenever the integrator is zero. In various embodiments, the alert generation is "disarmed" when an alert is generated. This arming/disarming process keeps the method and system from generating a large number of alerts for a single leak event. The following are examples of when alerts may be generated. These are given only by illustration and example and are not intended to be an exhaustive list. In various embodiments, the method may vary and different conditions may generate alerts/alarms. In various embodiments, additional conditions may generate alerts/alarms.

As an example, a flow control module leaks steadily until the integrator exceeds the threshold. The flow control module continues to leak. In this example, a single alert may be generated when the integrator first crosses the threshold.

As another example, a flow control module leaks intermittently until the integrator eventually exceeds the threshold. The integrator then oscillates around the threshold. In this example, a single alert may be generated when the integrator first crosses the threshold. The disarming logic present in some embodiments may prevent subsequent nuisance alerts should the integrator re-cross the threshold.

As another example, a flow control module leaks steadily until the integrator exceeds the threshold. The flow control module then stops leaking. In this example, an alert may be generated when the integrator first crosses the threshold. When the flow control module stops leaking, the integrator may slowly drain all the way back to zero. Once the integrator drains back to zero, alert generation may be re-armed so that additional alerts may be generated should the flow control module begin to leak again.

Referring now also to FIG. 77, this graph presents data collected during an example of the leak detection method. In this example, a high fructose corn syrup leak was simulated using a flow control module manual override. The manual override was toggled open-and-closed for a period of time, and then held in its full-open position. Once a leak was declared, the manual override was closed. As shown in FIG. 77, the integrator can be seen to grow until the leak is declared. At that point the integrator is not allowed to grow any more. Once the manual override is closed, the integrator can be seen to drain back to zero at which time the leak state is cleared and the alert is re-armed.

Figure 17:
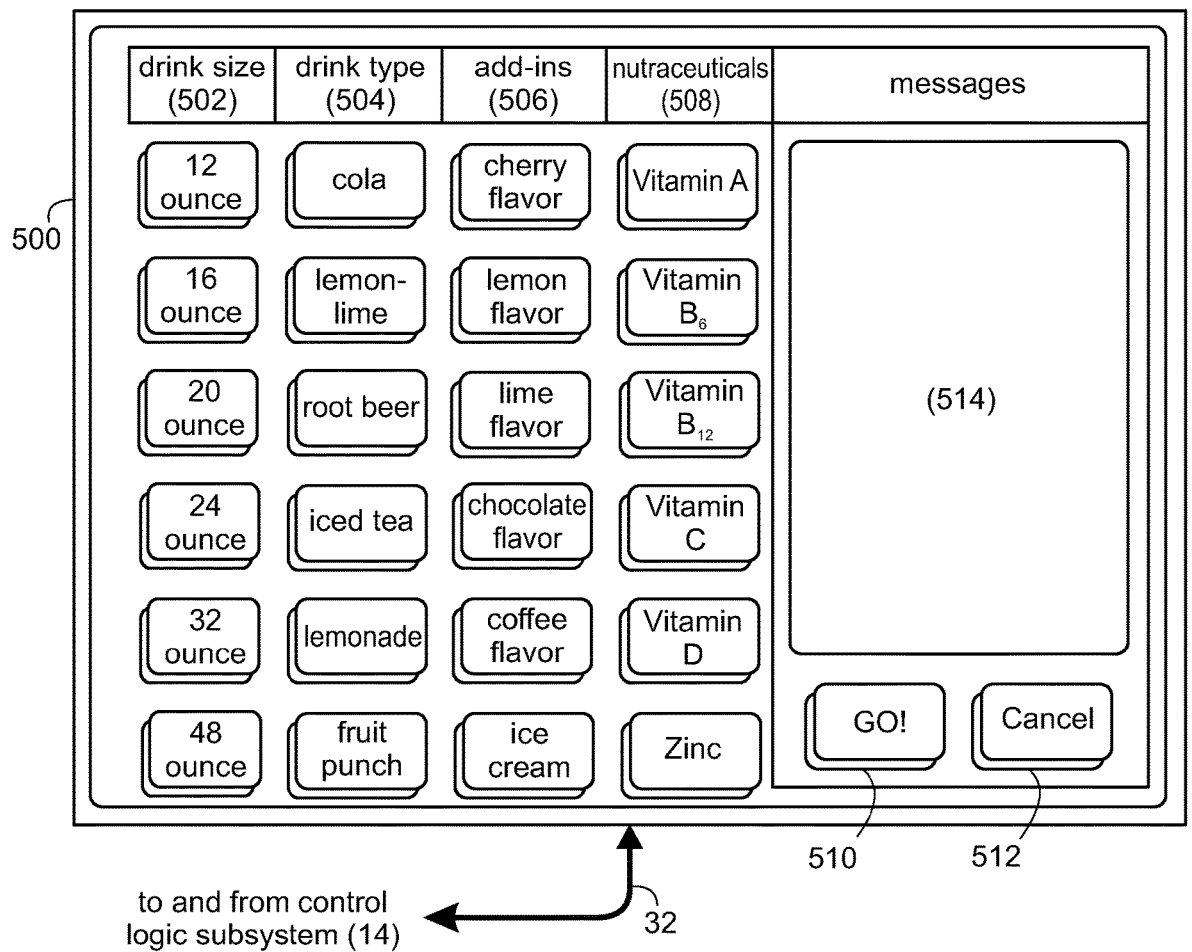
FIG. 17 is a diagrammatic view of a user interface subsystem included within the processing system of FIG. 1.

Referring also to FIG. 17, a diagrammatic view of user interface subsystem 22 is shown. User interface subsystem 22 may include touch screen interface 500 (exemplary embodiments described below with respect to FIGS. 51-53) that allows user 26 to select various options concerning beverage 28. For example, user 26 (via "drink size" column 502) may be able to select the size of beverage 28. Examples of the selectable sizes may include but are not limited to: "12 ounce"; "16 ounce"; "20 ounce"; "24 ounce"; "32 ounce"; and "48 ounce".

User 26 may be able to select (via "drink type" column 504) the type of beverage 28. Examples of the selectable types may include but are not limited to: "cola"; "lemon-lime"; "root beer"; "iced tea"; "lemonade"; and "fruit punch".

User 26 may also be able to select (via "add-ins" column 506) one or more flavorings/products for inclusion within beverage 28. Examples of the selectable add-ins may include but are not limited to: "cherry flavor"; "lemon flavor"; "lime flavor"; "chocolate flavor"; "coffee flavor"; and "ice cream".

Further, user 26 may be able to select (via "nutraceuticals" column 508) one or more nutraceuticals for inclusion within beverage 28. Examples of such nutraceuticals may include but are not limited to: "Vitamin A"; "Vitamin B6"; "Vitamin B12"; "Vitamin C"; "Vitamin D"; and "Zinc".

In some embodiments, an additional screen at a level lower than the touch screen may include a "remote control" (not shown) for the screen. The remote control may include buttons indicating up, down, left and right and select, for example. However, in other embodiments, additional buttons may be included.

Once user 26 has made the appropriate selections, user 26 may select "GO!" button 510 and user interface subsystem 22 may provide the appropriate data signals (via data bus 32) to control logic subsystem 14. Once received, control logic subsystem 14 may retrieve the appropriate data from storage subsystem 12 and may provide the appropriate control signals to e.g., high volume ingredient subsystem 16, micro-ingredient subsystem 18, and plumbing/control subsystem 20, which may be processed (in the manner discussed above) to prepare beverage 28. Alternatively, user 26 may select "Cancel" button 512 and touch screen interface 500 may be reset to a default state (e.g., no buttons selected).

User interface subsystem 22 may be configured to allow for bidirectional communication with user 26. For example, user interface subsystem 22 may include informational screen 514 that allows processing system 10 to provide information to user 26. Examples of the types of information that may be provided to user 26 may include but is not limited to advertisements, information concerning system malfunctions/warnings, and information concerning the cost of various products.

As discussed above, control logic subsystem 14 may execute one or more control processes 120 that may control the operation of processing system 10. Accordingly, control logic subsystem 14 may execute a finite state machine process (e.g., FSM process 122).

As also discussed above, during use of processing system 10, user 26 may select a particular beverage 28 for dispensing (into container 30) using user interface subsystem 22. Via user interface subsystem 22, user 26 may select one or more options for inclusion within such beverage. Once user 26 makes the appropriate selections, via user interface subsystem 22, user interface subsystem 22 may send the appropriate indication to control logic subsystem 14, indicating the selections and preferences of user 26 (with respect to beverage 28).

When making a selection, user 26 may select a multi-portion recipe that is essentially the combination of two separate and distinct recipes that produces a multi-component product. For example, user 26 may select a root beer float, which is a multi-portion recipe that is essentially the combination of two separate and distinct components (i.e. vanilla ice cream and root beer soda). As a further example, user 26 may select a drink that is a combination of cola and coffee. This cola/coffee combination is essentially a combination of two separate and distinct components (i.e. cola soda and coffee).

Referring also to FIG. 18, upon receiving 550 the above-described indication, FSM process 122 may process 552 the indication to determine if the product to be produced (e.g., beverage 28) is a multi-component product.

If the product to be produced is a multi-component product 554, FSM process 122 may identify 556 the recipe(s) required to produce each of the components of the multi-component product. The recipe(s) identified may be chosen from plurality of recipes 36 maintained on storage subsystem 12, shown in FIG. 1.

If the product to be produced is not a multi-component product 554, FSM process 122 may identify 558 a single recipe for producing the product. The single recipe may be chosen from plurality of recipes 36 maintained on storage subsystem 12. Accordingly, if the indication received 550 and processed 552 was an indication that defined a lemon-lime soda, as this is not a multi-component product, FSM process 122 may identify 558 the single recipe required to produce the lemon-lime soda.

If the indication concerns a multi-component product 554, upon identifying 556 the appropriate recipes chosen from plurality of recipes 36 maintained on storage subsystem 12, FSM process 122 may parse 560 each of the recipes into a plurality of discrete states and define one or more state transitions. FSM process 122 may then define 562 at least one finite state machine (for each recipe) using at least a portion of the plurality of discrete states.

If the indication does not concern a multi-component product 554, upon identifying 558 the appropriate recipe chosen from plurality of recipes 36 maintained on storage subsystem 12, FSM process 122 may parse 564 the recipe into a plurality of discrete states and define one or more state transitions. FSM process 122 may then define 566 at least one finite state machine for the recipe using at least a portion of the plurality of discrete states.

As is known in the art, a finite state machine (FSM) is a model of behavior composed of a finite number of states, transitions between those states and/or actions. For example and referring also to FIG. 19, if defining a finite state machine for a physical doorway that can either be fully opened or fully closed, the finite state machine may include two states, namely "opened" state 570 and "closed" state 572. Additionally, two transitions may be defined that allow for the transition from one state to another state. For example, transition state 574 "opens" the door (thus transitioning from "closed" state 572 to "open" state 570) and transition state 576 "closes" the door (thus transitioning from "opened" state 570 to "closed" state 572).

Figure 20:
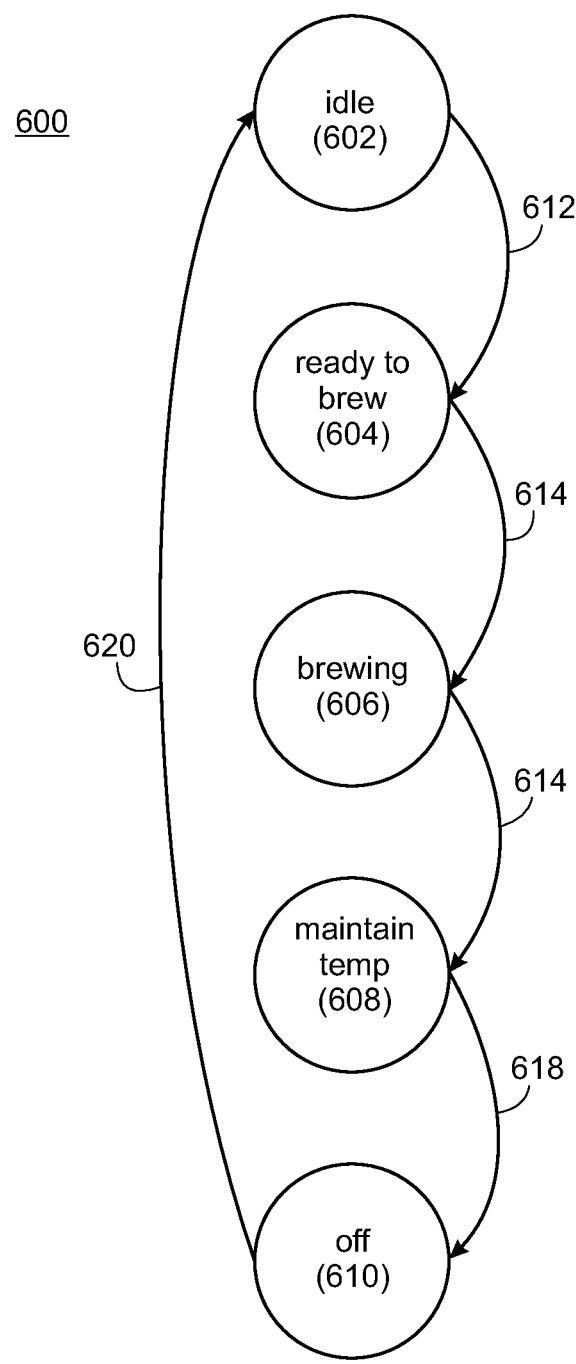
FIG. 20 is a diagrammatic view of a second state diagram.

Referring also to FIG. 20, a state diagram 600 concerning the manner in which coffee may be brewed is shown. State diagram 600 is shown to include five states, namely: idle state 602; ready to brew state 604; brewing state 605; maintain temperature state 608; and off state 610. Additionally, five transition states are shown. For example, transition state 612 (e.g., installing coffee filter, installing coffee grounds, filling coffee machine with water) may transition from idle state 602 to ready to brew state 604. Transition state 614 (e.g., pressing the brew button) may transition from ready to brew state 604 to brewing state 606. Transition state 616 (e.g., exhausting the water supply) may transition from brewing state 606 to maintain temperature 608. Transition state 618 (e.g., turning the power switch off or exceeding a maximum "maintain temperature" time) may transition from maintain temperature state 608 to off state 610. Transition state 620 (e.g., turning the power switch on) may transition from off state 610 to idle state 602.

Accordingly, FSM process 122 may generate one or more finite state machines that correspond to the recipes (or portions thereof) utilized to produce a product. Once the appropriate finite state machines are produced, control logic subsystem 14 may execute the finite state machine(s) and generate the product (e.g., multi-component or single component) requested by e.g., user 26.

Accordingly, assume that processing system 10 receives 550 an indication (via user interface subsystem 22) that user 26 has selected a root beer float. FSM process 122 may process 552 the indication to determine if the root beer float is a multi-component product 554. As the root beer float is a multi-component product, FSM process 122 may identify 556 the recipes required to produce the root beer float (namely the recipe for root beer soda and the recipe for vanilla ice cream) and parse 560 the recipe for root beer soda and the recipe for vanilla ice cream into a plurality of discrete states and define one or more state transitions. FSM process 122 may then define 562 at least one finite state machine (for each recipe) using at least a portion of the plurality of discrete states. These finite state machines may subsequently be executed by control logic subsystem 14 to produce the root beer float selected by user 26.

When executing the state machines corresponding to the recipes, processing system 10 may utilize one or more manifolds (not shown) included within processing system 10. As used in this disclosure, a manifold is a temporary storage area designed to allow for the execution of one or more processes. In order to facilitate the movement of ingredients into and out of the manifolds, processing system 10 may include a plurality of valves (controllable by e.g., control logic subsystem 14) for facilitating the transfer of ingredients between manifolds. Examples of various types of manifolds may include but are not limited to: a mixing manifold, a blending manifold, a grinding manifold, a heating manifold, a cooling manifold, a freezing manifold, a steeping manifold, a nozzle, a pressure manifold, a vacuum manifold, and an agitation manifold.

For example, when making coffee, a grinding manifold may grind coffee beans. Once the beans are ground, water may be provided to a heating manifold in which water 160 is heated to a predefined temperature (e.g. 212° F.). Once the water is heated, the heated water (as produced by the heating manifold) may be filtered through the ground coffee beans (as produced by the grinding manifold). Additionally and depending on how processing system 10 is configured, processing system 10 may add cream and/or sugar to the coffee produced in another manifold or at nozzle 24.

Accordingly, each portion of a multi-portion recipe may be executed in a different manifold included within processing system 10. Therefore, each component of a multi-component recipe may be produced in a different manifold included within processing system 10. Continuing with the above-stated example, the first component of the multi-component product (i.e., the root beer soda) may be produced within a mixing manifold included within processing system 10. Further, the second component of the multi-component product (i.e., the vanilla ice cream) may be produced within a freezing manifold included within processing system 10.

As discussed above, control logic subsystem 14 may execute one or more control processes 120 that may control the operation of processing system 10. Accordingly, control logic subsystem 14 may execute virtual machine process 124.

As also discussed above, during use of processing system 10, user 26 may select a particular beverage 28 for dispensing (into container 30) using user interface subsystem 22. Via user interface subsystem 22, user 26 may select one or more options for inclusion within such beverage. Once user 26 makes the appropriate selections, via user interface subsystem 22, user interface subsystem 22 may send the appropriate instructions to control logic subsystem 14.

When making a selection, user 26 may select a multi-portion recipe that is essentially the combination of two separate and distinct recipes that produces a multi-component product. For example, user 26 may select a root beer float, which is a multi-portion recipe that is essentially the combination of two separate and distinct components (i.e. vanilla ice cream and root beer soda). As a further example, user 26 may select a drink that is a combination of cola and coffee. This cola/coffee combination is essentially a combination of two separate and distinct components (i.e. cola soda and coffee).

Figure 21:
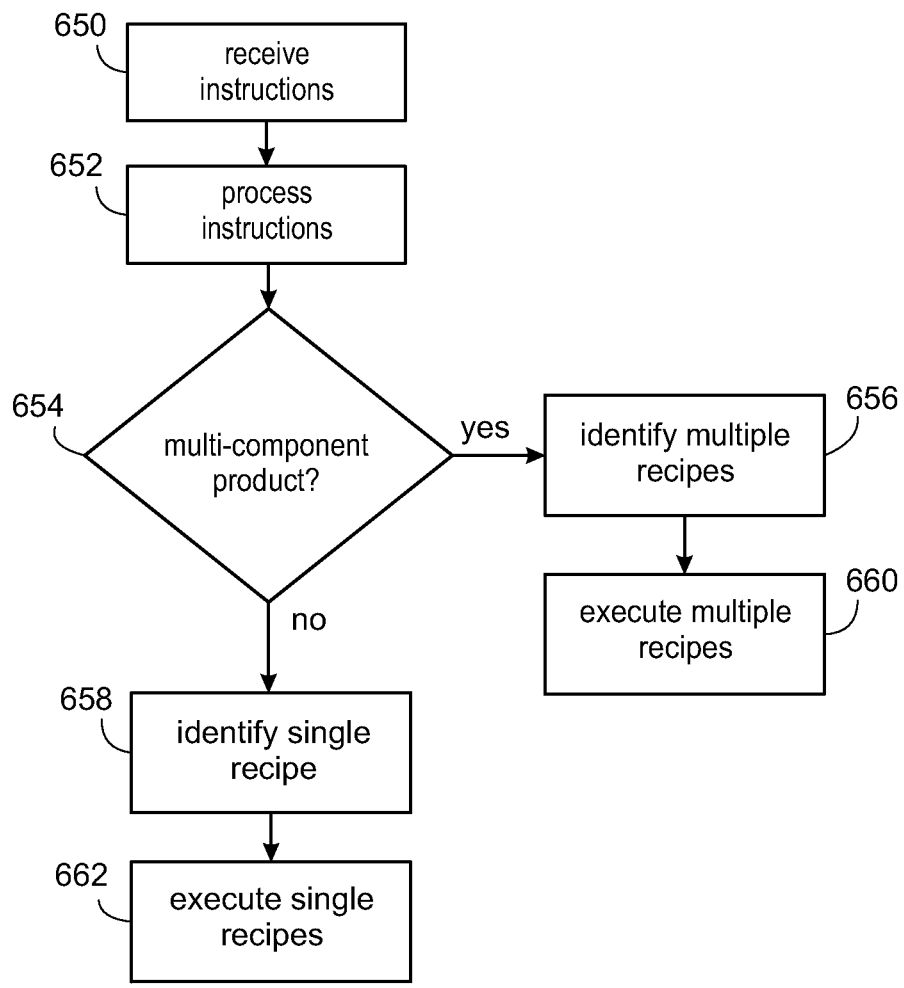
FIG. 21 is a flowchart of a virtual machine process executed by the control logic subsystem of FIG. 1.

Referring also to FIG. 21, upon receiving 650 the above-described instructions, virtual machine process 124 may process 652 these instructions to determine if the product to be produced (e.g., beverage 28) is a multi-component product.

If 654 the product to be produced is a multi-component product, virtual machine process 124 may identify 656 a first recipe for producing a first component of the multi-component product and at least a second recipe for producing at least a second component of the multi-component product. The first and second recipes may be chosen from plurality of recipes 36 maintained on storage subsystem 12.

If 654 the product to be produced is not a multi-component product, virtual machine process 124 may identify 658 a single recipe for producing the product. The single recipe may be chosen from plurality of recipes 36 maintained on storage subsystem 12. Accordingly, if the instructions received 650 were instructions concerning a lemon-lime soda, as this is not a multi-component product, virtual machine process 124 may identify 658 the single recipe required to produce the lemon-lime soda.

Upon identifying 656, 658 the recipe(s) from plurality of recipes 36 maintained on storage subsystem 12, control logic subsystem 14 may execute 660, 662 the recipe(s) and provide the appropriate control signals (via data bus 38) to e.g. high volume ingredient subsystem 16 microingredient subsystem 18 and plumbing/control subsystem 20, resulting in the production of beverage 28 (which is dispensed into container 30).

Accordingly, assume that processing system 10 receives instructions (via user interface subsystem 22) to create a root beer float. Virtual machine process 124 may process 652 these instructions to determine if 654 the root beer float is a multi-component product. As the root beer float is a multi-component product, virtual machine process 124 may identify 656 the recipes required to produce the root beer float (namely the recipe for root beer soda and the recipe for vanilla ice cream) and execute 660 both recipes to produce root beer soda and vanilla ice cream (respectively). Once these products are produced, processing system 10 may combine the individual products (namely root beer soda and vanilla ice cream) to produce the root beer float requested by user 26.

When executing a recipe, processing system 10 may utilize one or more manifolds (not shown) included within processing system 10. As used in this disclosure, a manifold is a temporary storage area designed to allow for the execution of one or more processes. In order to facilitate the movement of ingredients into and out of the manifolds, processing system 10 may include a plurality of valves (controllable by e.g., control logic subsystem 14) for facilitating the transfer of ingredients between manifolds. Examples of various types of manifolds may include but are not limited to: a mixing manifold, a blending manifold, a grinding manifold, a heating manifold, a cooling manifold, a freezing manifold, a steeping manifold, a nozzle, a pressure manifold, a vacuum manifold, and an agitation manifold.

For example, when making coffee, a grinding manifold may grind coffee beans. Once the beans are ground, water may be provided to a heating manifold in which water 160 is heated to a predefined temperature (e.g. 212° F.). Once the water is heated, the heated water (as produced by the heating manifold) may be filtered through the ground coffee beans (as produced by the grinding manifold). Additionally and depending on how processing system 10 is configured, processing system 10 may add cream and/or sugar to the coffee produced in another manifold or at nozzle 24.

Accordingly, each portion of a multi-portion recipe may be executed in a different manifold included within processing system 10. Therefore, each component of a multi-component recipe may be produced in a different manifold included within processing system 10. Continuing with the above-stated example, the first portion of the multi-portion recipe (i.e., the one or more processes utilized by processing system 10 to make root beer soda) may be executed within a mixing manifold included within processing system 10. Further, the second portion of the multi-portion recipe (i.e., the one or more processes utilized by processing system 10 to make vanilla ice cream) may be executed within a freezing manifold included within processing system 10.

As discussed above, during use of processing system 10, user 26 may select a particular beverage 28 for dispensing (into container 30) using user interface subsystem 22. Via user interface subsystem 22, user 26 may select one or more options for inclusion within such beverage. Once user 26 makes the appropriate selections, via user interface subsystem 22, user interface subsystem 22 may send the appropriate data signals (via data bus 32) to control logic subsystem 14. Control logic subsystem 14 may process these data signals and may retrieve (via data bus 34) one or more recipes chosen from plurality of recipes 36 maintained on storage subsystem 12. Upon retrieving the recipe(s) from storage subsystem 12, control logic subsystem 14 may process the recipe(s) and provide the appropriate control signals (via data bus 38) to e.g. high volume ingredient subsystem 16 microingredient subsystem 18 and plumbing/control subsystem 20, resulting in the production of beverage 28 (which is dispensed into container 30).

When user 26 makes their selection, user 26 may select a multi-portion recipe that is essentially the combination of two separate and distinct recipes. For example, user 26 may select a root beer float, which is a multi-portion recipe that is essentially the combination of two separate and distinct recipes (i.e. vanilla ice cream and root beer soda). As a further example, user 26 may select a drink that is a combination of cola and coffee. This cola/coffee combination is essentially a combination of two separate and distinct recipes (i.e. cola soda and coffee).

Accordingly, assume that processing system 10 receives instructions (via user interface subsystem 22) to create a root beer float, knowing that a recipe for a root beer float is a multi-portion recipe, processing system 10 may simply obtain the standalone recipe for root beer soda, obtain the standalone recipe for vanilla ice cream, and execute both recipes to produce root beer soda and vanilla ice cream (respectively). Once these products are produced, processing system 10 may combine the individual products (namely root beer soda and vanilla ice cream) to produce the root beer float requested by user 26.

When executing a recipe, processing system 10 may utilize one or more manifolds (not shown) included within processing system 10. As used in this disclosure, a manifold is a temporary storage area designed to allow for the execution of one or more processes. In order to facilitate the movement of ingredients into and out of the manifolds, processing system 10 may include a plurality of valves (controllable by e.g., control logic subsystem 14) for facilitating the transfer of ingredients between manifolds. Examples of various types of manifolds may include but are not limited to: a mixing manifold, a blending manifold, a grinding manifold, a heating manifold, a cooling manifold, a freezing manifold, a steeping manifold, a nozzle, a pressure manifold, a vacuum manifold, and an agitation manifold.

For example, when making coffee, a grinding manifold may grind coffee beans. Once the beans are ground, water may be provided to a heating manifold in which water 160 is heated to a predefined temperature (e.g. 212° F.). Once the water is heated, the heated water (as produced by the heating manifold) may be filtered through the ground coffee beans (as produced by the grinding manifold). Additionally and depending on how processing system 10 is configured, processing system 10 may add cream and/or sugar to the coffee produced in another manifold or at nozzle 24.

As discussed above, control logic subsystem 14 may execute one or more control processes 120 that may control the operation of processing system 10. Accordingly, control logic subsystem 14 may execute virtual manifold process 126.

Figure 22:
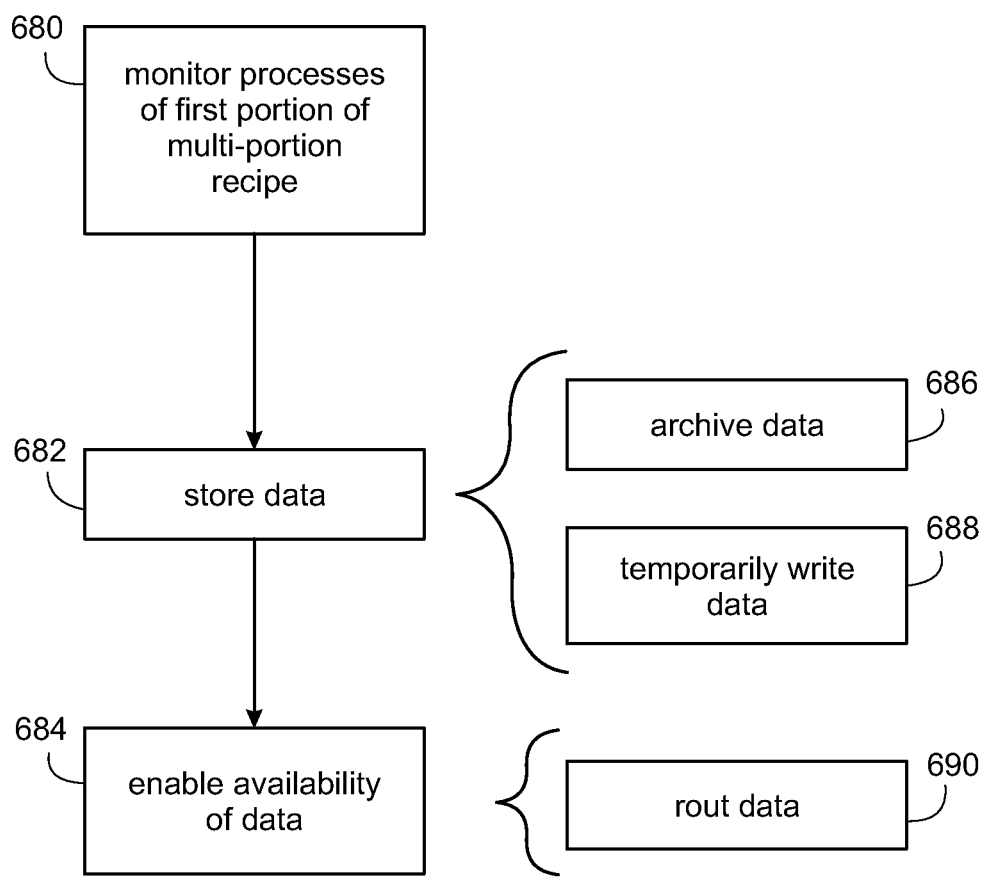
FIG. 22 is a flowchart of a virtual manifold process executed by the control logic subsystem of FIG. 1.

Referring also to FIG. 22, virtual manifold process 126 may monitor 680 one or more processes occurring during a first portion of a multi-portion recipe being executed on e.g., processing system 10 to obtain data concerning at least of portion of the one or more processes. For example, assume that the multi-portion recipe concerns the making of a root beer float, which (as discussed above) is essentially the combination of two separate and distinct recipes (i.e. root beer soda and vanilla ice cream) that may be chosen from plurality of recipes 36 maintained on storage subsystem 12. Accordingly, the first portion of the multi-portion recipe may be considered the one or more processes utilized by processing system 10 to make root beer soda. Further, the second portion of the multi-portion recipe may be considered the one or more processes utilized by processing system 10 to make vanilla ice cream.

Each portion of these multi-portion recipes may be executed in a different manifold included within processing system 10. For example, the first portion of the multi-portion recipe (i.e., the one or more processes utilized by processing system 10 to make root beer soda) may be executed within a mixing manifold included within processing system 10. Further, the second portion of the multi-portion recipe (i.e., the one or more processes utilized by processing system 10 to make vanilla ice cream) may be executed within a freezing manifold included within processing system 10. As discussed above, processing system 10 may include a plurality of manifolds, examples of which may include but are not limited to: mixing manifolds, blending manifolds, grinding manifolds, heating manifolds, cooling manifolds, freezing manifolds, steeping manifolds, nozzles, pressure manifolds, vacuum manifolds, and agitation manifolds.

Accordingly, virtual manifold process 126 may monitor 680 the processes utilized by processing system 10 to make root beer soda (or may monitor the processes utilized by processing system 10 to make vanilla ice cream) to obtain data concerning these processes.

Examples of the type of data obtained may include but is not limited to ingredient data and processing data.

Ingredient data may include but is not limited to a list of ingredients used during the first portion of a multi-portion recipe. For example, if the first portion of a multi-portion recipe concerns making root beer soda, the list of ingredients may include: a defined quantity of root beer flavoring, a defined quantity of carbonated water, a defined quantity of non-carbonated water, and a defined quantity of high fructose corn syrup.

Processing data may include but is not limited to a sequential list of processes performed on the ingredients. For example, a defined quantity of carbonated water may begin to be introduced into a manifold within processing system 10. While filling the manifold with carbonated water, the defined quantity of root beer flavoring, the defined quantity of high fructose corn syrup, and the defined quantity of non-carbonated water may also be introduced into the manifold.

At least a portion of the data obtain may be stored 682 (e.g., either temporarily or permanently). Further, virtual manifold process 126 may enable 684 the availability of this stored data for subsequent use by e.g., one or more processes occurring during a second portion of the multi-portion recipe. When storing 682 the data obtained, virtual manifold process 126 may archive 686 the data obtained in a non-volatile memory system (e.g., storage subsystem 12) for subsequent diagnostic purposes. Examples of such diagnostic purposes may include enabling a service technician to review ingredient consumption characteristics to establish a purchasing plan for purchasing consumables for processing system 10. Alternatively/additionally, when storing 682 the data obtained, virtual manifold process 126 may temporarily write 688 the data obtained to a volatile memory system (e.g., random access memory 104).

When enabling 684 the availability of the data obtained, virtual manifold process 126 may route 690 the obtained data (or a portion thereof) to one or more processes that are occurring (or will occur) during the second portion of the multi-portion recipe. Continuing with the above-stated example, in which the second portion of the multi-portion recipe concerns the one or more processes utilized by processing system 10 to make vanilla ice cream, virtual manifold process 126 may enable 684 the data obtained (or a portion thereof) to be available to the one or more processes utilized to make vanilla ice cream.

Assume that the root beer flavoring utilized to make the above-described root beer float is flavored with a considerable quantity of vanilla flavoring. Further, assume that when making the vanilla ice cream, a considerable quantity of vanilla flavoring is also used. As virtual manifold process 126 may enable 684 the availability of the obtained data (e.g., ingredient and/or process data) to control logic subsystem (i.e., the subsystem orchestrating the one or more processes utilized to make the vanilla ice cream), upon reviewing this data, control logic subsystem 14 may alter the ingredients utilized to make the vanilla ice cream. Specifically, control logic subsystem 14 may reduce the quantity of vanilla flavoring utilized to make the vanilla ice cream to avoid an overabundance of vanilla flavoring within the root beer float.

Additionally, by enabling 684 the availability of the obtained data to subsequently-executed processes, procedures may be performed that would prove impossible had that data not been made available to the subsequently-executed processes. Continuing with the above-stated example, assume that it is determined empirically that consumers tend to not like any single-serving of a product that includes more than 10.0 mL of vanilla flavoring. Further, assume that 8.0 mL of vanilla flavoring is included within the root beer flavoring utilized to make the root beer soda for the root beer float, and another 8.0 mL of vanilla flavoring is utilized to make the vanilla ice cream utilized to make the root beer float. Therefore, if these two products (the root beer soda and the vanilla ice cream) are combined, the final product would be flavored with 16.0 mL of vanilla flavoring (which exceeds the empirically-defined not-to-exceed 10.0 mL rule).

Accordingly, if the ingredient data for the root beer soda was not stored 682 and the availability of such stored data was not enabled 684 by virtual manifold process 126, the fact that the root beer soda contains 8.0 mL of vanilla flavoring would be lost and a final product containing 16.0 mL of vanilla flavoring would be produced. Accordingly, this obtained and stored 682 data may be utilized to avoid (or reduce) the occurrence of any undesirable effect (e.g., an undesired flavor characteristic, an undesired appearance characteristic, an undesired odor characteristic, an undesired texture characteristic, and exceeding a maximum recommended dosage of a nutraceutical).

The availability of this obtained data may allow for subsequent processes to also be adjusted. For example, assume that the quantity of salt utilized to make the vanilla ice cream varies depending on the quantity of carbonated water utilized to make the root beer soda. Again, if the ingredient data for the root beer soda was not stored 682 and the availability of such stored data was not enabled 684 by virtual manifold process 126, the quantity of carbonated water used to make the root beer soda would be lost and the ability to adjust the quantity of salt utilized to make the ice cream may be compromised.

As discussed above, virtual manifold process 126 may monitor 680 one or more processes occurring during a first portion of a multi-portion recipe being executed on e.g., processing system 10 to obtain data concerning at least of portion of the one or more processes. The one or more processes monitored 680 may be executed within a single manifold of the processing system 10 or may be representative of a single portion of a multi-portion procedure executed within a single manifold of processing system 10.

For example, when making the root beer soda, a single manifold may be used that has four inlets (e.g., one for the root beer flavoring, one for the carbonated water, one for the non-carbonated water, and one for the high fructose corn syrup) and one outlet (as all of the root beer soda is being provided to a single secondary manifold).

However, if instead of having one outlet, the manifold has two outlets (one having a flow rate of four times the other), virtual manifold process 126 may consider this process to include two separate and distinct portions being executed simultaneously within the same manifold. For example, 80% of all of the ingredients may be mixed together to produce 80% of the total quantity of root beer soda; while the remaining 20% of all of the ingredients may be simultaneously mixed together (in the same manifold) to produce 20% of the root beer soda. Accordingly, virtual manifold process 126 may enable 684 the data obtained concerning the first portion (i.e., the 80% portion) to be made available to the downstream process that utilizes the 80% of the root beer soda and enable 684 the data obtained concerning the second portion (i.e., the 20% portion) to be made available to the downstream process that utilizes the 20% of the root beer soda.

Additionally/alternatively, the single portion of a multi-portion procedure executed within a single manifold of processing system 10 may be indicative of one process that occurs within a single manifold that executes a plurality of discrete processes. For example, when making vanilla ice cream within the freezing manifold, the individual ingredients may be introduced, mixed, and reduced in temperature until frozen. Accordingly, the process of making vanilla ice cream may include an ingredient introduction process, an ingredient mixing process, and an ingredient freezing process, each of which may be individually monitored 680 by virtual manifold process 126.

As discussed above, product module assembly 250 (of microingredient subsystem 18 and plumbing/control subsystem 20) may include a plurality of slot assemblies 260, 262, 264, 266 configured to releasably engage a plurality of product containers 252, 254, 256, 258. Unfortunately, when servicing processing system 10 to refill product containers 252, 254, 256, 258, it may be possible to install a product container within the wrong slot assembly of product module assembly 250. A mistake such as this may result in one or more pump assemblies (e.g., pump assemblies 270, 272, 274, 276) and/or one or more tubing assemblies (e.g., tubing bundle 304) being contaminated with one or more microingredients. For example, as root beer flavoring (i.e., the microingredient contained within product container 256) has a very strong taste, once a particular pump assembly/tubing assembly is used to distribute e.g., root beer flavoring, it can no longer be used to distribute a microingredient having a less-strong taste (e.g., lemon-lime flavoring, iced tea flavoring, and lemonade flavoring).

Additionally and as discussed above, product module assembly 250 may be configured to releasably engage bracket assembly 282. Accordingly, in the event that processing system 10 includes multiple product module assemblies and multiple bracket assemblies, when servicing processing system 10, it may be possible to install a product module assembly onto the wrong bracket assembly. Unfortunately, such a mistake may also result in one or more pump assemblies (e.g., pump assemblies 270, 272, 274, 276) and/or one or more tubing assemblies (e.g., tubing bundle 304) being contaminated with one or more microingredients.

Figure 23:
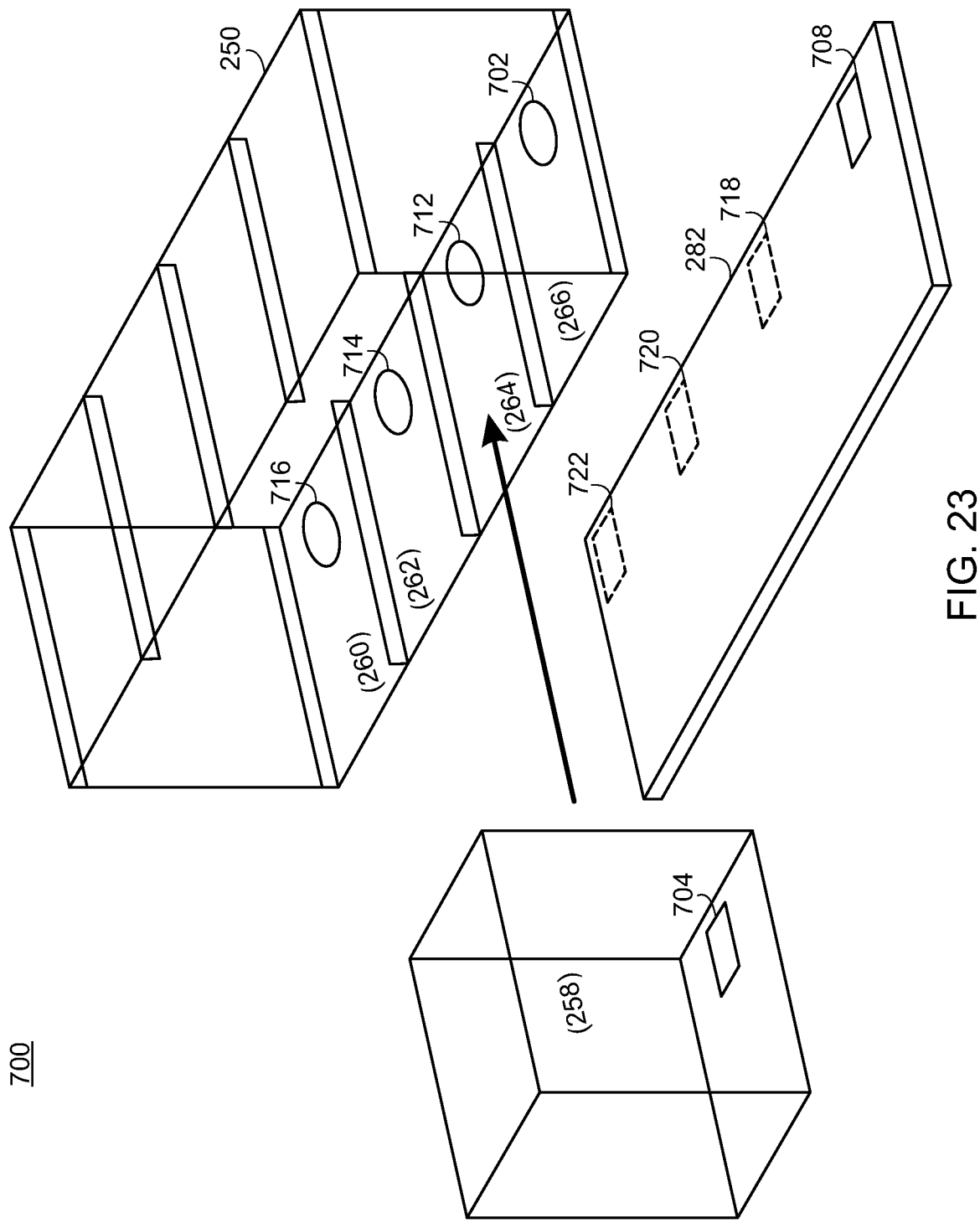
FIG. 23 is an isometric view of an RFID system included within the processing system of FIG. 1.
Figure 24:
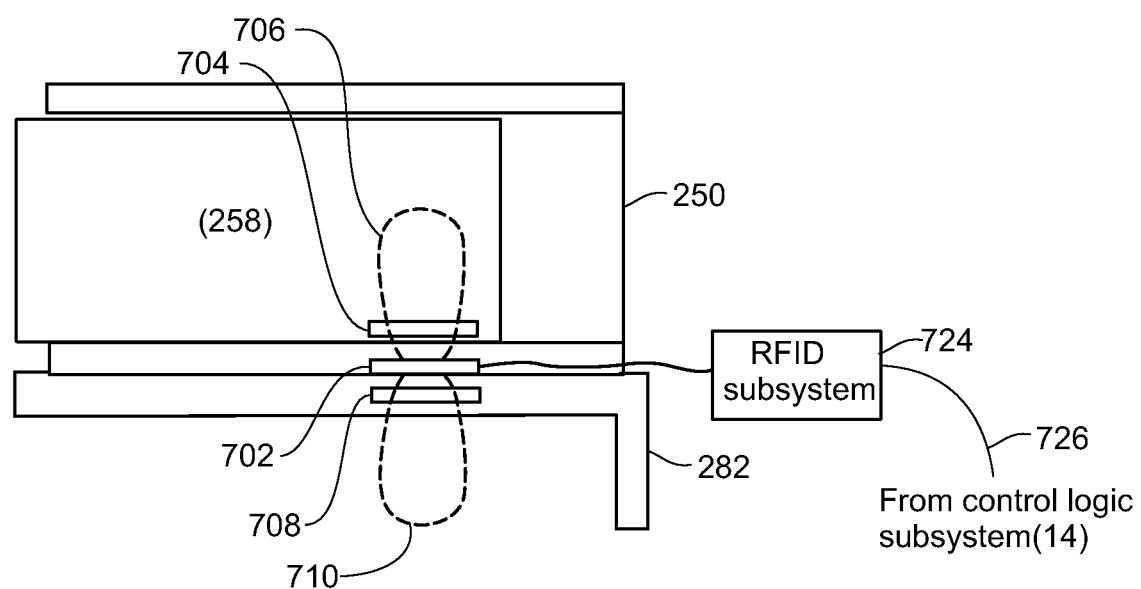
FIG. 24 is a diagrammatic view of the RFID system of FIG. 23.

Accordingly, processing system 10 may include an RFID-based system to ensure the proper placement of product containers and product modules within processing system 10. Referring also to FIGS. 23 & 24, processing system 10 may include RFID system 700 that may include RFID antenna assembly 702 positioned on product module assembly 250 of processing system 10.

As discussed above, product module assembly 250 may be configured to releasably engage at least one product container (e.g., product container 258). RFID system 700 may include RFID tag assembly 704 positioned on (e.g., affixed to) product container 258. Whenever product module assembly 250 releasably engages the product container (e.g., product container 258), RFID tag assembly 704 may be positioned within e.g., upper detection zone 706 of RFID antenna assembly 702. Accordingly and in this example, whenever product container 258 is positioned within (i.e. releasably engages) product module assembly 250, RFID tag assembly 704 should be detected by RFID antenna assembly 702.

As discussed above, product module assembly 250 may be configured to releasably engage bracket assembly 282. RFID system 700 may further include RFID tag assembly 708 position on (e.g. affixed to) bracket assembly 282. Whenever bracket assembly 282 releasably engages product module assembly 250, RFID tag assembly 708 may be positioned within e.g., lower detection zone 710 of RFID antenna assembly 702.

Accordingly, through use of RFID antenna assembly 702 and RFID tag assemblies 704, 708, RFID system 700 may be able to determine whether or not the various product containers (e.g., product containers 252, 254, 256, 258) are properly positioned within product module assembly 250. Further, RFID system 700 may be able to determine whether or not product module assembly 250 is properly positioned within processing system 10.

While RFID system 700 shown to include one RFID antenna assembly and two RFID tag assemblies, this is for illustrative purposes only and is not intended to be a limitation of this disclosure, as other configurations are possible. Specifically, a typical configuration of RFID system 700 may include one RFID antenna assembly positioned within each slot assembly of product module assembly 250. For example, RFID system 700 may additionally include RFID antenna assemblies 712, 714, 716 positioned within product module assembly 250. Accordingly, RFID antenna assembly 702 may determine whether a product container is inserted into slot assembly 266 (of product module assembly 250); RFID antenna assembly 712 may determine whether a product container is inserted into slot assembly 264 (of product module assembly 250); RFID antenna assembly 714 may determine whether a product container is inserted into slot assembly 262 (of product module assembly 250); and RFID antenna assembly 716 may determine whether a product container is inserted into slot assembly 260 (of product module assembly 250). Further, since processing system 10 may include multiple product module assemblies, each of these product module assemblies may include one or more RFID antenna assemblies to determine which product containers are inserted into the particular product module assembly.

As discussed above, by monitoring for the presence of an RFID tag assembly within lower detection zone 710 of RFID antenna assembly 702, RFID system 700 may be able to determine whether product module assembly 250 is properly positioned within processing system 10. Accordingly, any of RFID antenna assemblies 702, 712, 714, 716 may be utilized to read one or more RFID tag assemblies affixed to bracket assembly 282. For illustrative purposes, product module assembly 282 is shown to include only a single RFID tag assembly 708. However, this is for illustrative purposes only and is not intended to be a limitation of this disclosure, as other configurations are possible. For example, bracket assembly 282 may include multiple RFID tag assemblies, namely RFID tag assembly 718 (shown in phantom) for being read by RFID antenna assembly 712; RFID tag assembly 720 (shown in phantom) for being read by RFID antenna assembly 714; and RFID tag assembly 722 (shown in phantom) for being read by RFID antenna assembly 716.

One or more of the RFID tag assemblies (e.g., RFID tag assemblies 704, 708, 718, 720, 722) may be passive RFID tag assemblies (e.g., RFID tag assemblies that do not require a power source). Additionally, one or more of the RFID tag assemblies (e.g., RFID tag assemblies 704, 708, 718, 720, 722) may be a writeable RFID tag assembly, in that RFID system 700 may write data to the RFID tag assembly. Examples of the type of data storable within the RFID tag assemblies may include, but is not limited to: a quantity identifier for the product container, a production date identifier for the product container, a discard date identifier for the product container, an ingredient identifier for the product container, a product module identifier, and a bracket identifier.

With respect to the quantity identifier, in some embodiments, each volume of ingredient pumped from a container including an RFID tag, the tag is written to include the updated volume in the container, and/or, the amount pumped. Where the container is subsequently removed from the assembly, and replaced into a different assembly, the system will read the RFID tag and will know the volume in the container and/or the amount that has been pumped from the container. Additionally, the dates of pumping may also be written on the RFID tag.

Accordingly, when each of the bracket assemblies (e.g. bracket assembly 282) is installed within processing system 10, an RFID tag assembly (e.g. RFID tag assembly 708) may be attached, wherein the attached RFID tag assembly may define a bracket identifier (for uniquely identifying the bracket assembly). Accordingly, if processing system 10 includes ten bracket assemblies, ten RFID tag assemblies (i.e., one attached to each bracket assembly) may define ten unique bracket identifiers (i.e. one for each bracket assembly).

Further, when a product container (e.g. product container 252, 254, 256, 258) is manufactured and filled with a microingredient, an RFID tag assembly may include: an ingredient identifier (for identifying the microingredient within the product container); a quantity identifier (for identifying the quantity of microingredient within the product container); a production date identifier (for identifying the date of manufacture of the microingredient); and a discard date identifier (for identifying the date on which the product container should be discarded/recycled).

Accordingly, when product module assembly 250 is installed within processing system 10, RFID antenna assemblies 702, 712, 714, 716 may be energized by RFID subsystem 724. RFID subsystem 724 may be coupled to control logic subsystem 14 via databus 726. Once energized, RFID antenna assemblies 702, 712, 714, 716 may begin scanning their respective upper and lower detection zones (e.g. upper detection zone 706 and lower detection zone 710) for the presence of RFID tag assemblies.

As discussed above, one or more RFID tag assemblies may be attached to the bracket assembly with which product module assembly 250 releasably engages. Accordingly, when product module assembly 250 is slid onto (i.e. releasably engages) bracket assembly 282, one or more of RFID tag assemblies 708, 718, 720, 722 may be positioned within the lower detection zones of RFID antenna assemblies 702, 712, 714, 716 (respectively). Assume, for illustrative purposes, that bracket assembly 282 includes only one RFID tag assembly, namely RFID tag assembly 708. Further, assume for illustrative purposes that product containers 252, 254, 256, 258 are being installed within slot assemblies 260, 262, 264, 266 (respectively). Accordingly, RFID subsystem 714 should detect bracket assembly 282 (by detecting RFID tag assembly 708) and should detect product containers 252, 254, 256, 258 by detecting the RFID tag assemblies (e.g., RFID tag assembly 704) installed on each product container.

The location information concerning the various product modules, bracket assemblies, and product containers, may be stored within e.g. storage subsystem 12 that is coupled to control logic subsystem 14. Specifically, if nothing has changed, RFID subsystem 724 should expect to have RFID antenna assembly 702 detect RFID tag assembly 704 (i.e. which is attached to product container 258) and should expect to have RFID antenna assembly 702 detect RFID tag assembly 708 (i.e. which is attached to bracket assembly 282). Additionally, if nothing has changed: RFID antenna assembly 712 should detect the RFID tag assembly (not shown) attached to product container 256; RFID antenna assembly 714 should detect the RFID tag assembly (not shown) attached to product container 254; and RFID antenna assembly 716 should detect the RFID tag assembly (not shown) attached to product container 252.

Assume for illustrative purposes that, during a routine service call, product container 258 is incorrectly positioned within slot assembly 264 and product container 256 is incorrectly positioned within slot assembly 266. Upon acquiring the information included within the RFID tag assemblies (using the RFID antenna assemblies), RFID subsystem 724 may detect the RFID tag assembly associated with product container 258 using RFID antenna assembly 262; and may detect the RFID tag assembly associated with product container 256 using RFID antenna assembly 702. Upon comparing the new locations of product containers 256, 258 with the previously stored locations of product containers 256, 258 (as stored on storage subsystem 12), RFID subsystem 724 may determine that the location of each of these product containers is incorrect.

Accordingly, RFID subsystem 724, via control logic subsystem 14, may render a warning message on e.g. informational screen 514 of user-interface subsystem 22, explaining to e.g. the service technician that the product containers were incorrectly reinstalled. Depending on the types of microingredients within the product containers, the service technician may be e.g. given the option to continue or told that they cannot continue. As discussed above, certain microingredients (e.g. root beer flavoring) have such a strong taste that once they have been distributed through a particular pump assembly and/or tubing assembly, the pump assembly/tubing assembly can no longer be used for any other microingredient. Additionally and as discussed above, the various RFID tag assemblies attached to the product containers may define the microingredient within the product container.

Accordingly, if a pump assembly/tubing assembly that was used for lemon-lime flavoring is now going to be used for root beer flavoring, the service technician may be given a warning asking them to confirm that this is what they want to do. However, if a pump assembly/tubing assembly that was used for root beer flavoring is now going to be used for lemon-lime flavoring, the service technician may be provided with a warning explaining that they cannot proceed and must switch the product containers back to their original configurations or e.g., have the compromised pump assembly/tubing assembly removed and replaced with a virgin pump assembly/tubing assembly. Similar warnings may be provided in the event that RFID subsystem 724 detects that a bracket assembly has been moved within processing system 10.

RFID subsystem 724 may be configured to monitor the consumption of the various microingredients. For example and as discussed above, an RFID tag assembly may be initially encoded to define the quantity of microingredient within a particular product container. As control logic subsystem 14 knows the amount of microingredient pumped from each of the various product containers, at predefined intervals (e.g. hourly), the various RFID tag assemblies included within the various product containers may be rewritten by RFID subsystem 724 (via an RFID antenna assembly) to define an up-to-date quantity for the microingredient included within the product container.

Upon detecting that a product container has reached a predetermined minimum quantity, RFID subsystem 724, via control logic subsystem 14, may render a warning message on informational screen 514 of user-interface subsystem 22. Additionally, RFID subsystem 724 may provide a warning (via informational screen 414 of user-interface subsystem 22) in the event that one or more product containers has reached or exceeded an expiration date (as defined within an RFID tag assembly attached to the product container).

While RFID system 700 is described above as having an RFID antenna assembly affixed to a product module and RFID tag assemblies affixed to bracket assemblies and product containers, this is for illustrative purposes only and is not intended to be a limitation of this disclosure. Specifically, the RFID antenna assembly may be positioned on any product container, a bracket assembly, or product module. Additionally, the RFID tag assemblies may be positioned on any product container, bracket assembly, or product module. Accordingly, in the event that an RFID tag assembly is affixed to a product module assembly, the RFID tag assembly may define a project module identifier that e.g. defines a serial number for the product module.

Due to the close proximity of the slot assemblies (e.g., slot assemblies 260, 262, 264, 266) included within product module assembly 250, it may be desirable to configure RFID antenna assembly 702 in a manner that allows it to avoid reading e.g., product containers positioned within adjacent slot assemblies. For example, RFID antenna assembly 702 should be configured so that RFID antenna assembly 702 can only read RFID tag assemblies 704, 708; RFID antenna assembly 712 should be configured so that RFID antenna assembly 712 can only read RFID tag assembly 718 and the RFID tag assembly (not shown) affixed to product container 256; RFID antenna assembly 714 should be configured so that RFID antenna assembly 714 can only read RFID tag assembly 720 and the RFID tag assembly (not shown) affixed to product container 254; and RFID antenna assembly 716 should be configured so that RFID antenna assembly 716 can only read RFID tag assembly 722 and the RFID tag assembly (not shown) affixed to product container 252.

RFID Cross Read Mitigation

In some embodiments, upon machine start up, for example, and in some embodiments, when the machine door is open, a scan of the RFID tag assemblies is performed to map the location of the various elements within machine, including, but not limited to, the location of each product container. As described herein, an accurate mapping is critical for many reasons, including, but not limited to, maintaining recipes and dispensing products as well as for maintaining the quality of the products dispensed. In some embodiments, to mitigate unintentional reading by RFID antenna assemblies of, e.g., product containers positioned within adjacent slot assemblies, various embodiments of the method for scanning tags, described below, may be used.

Figure 73:
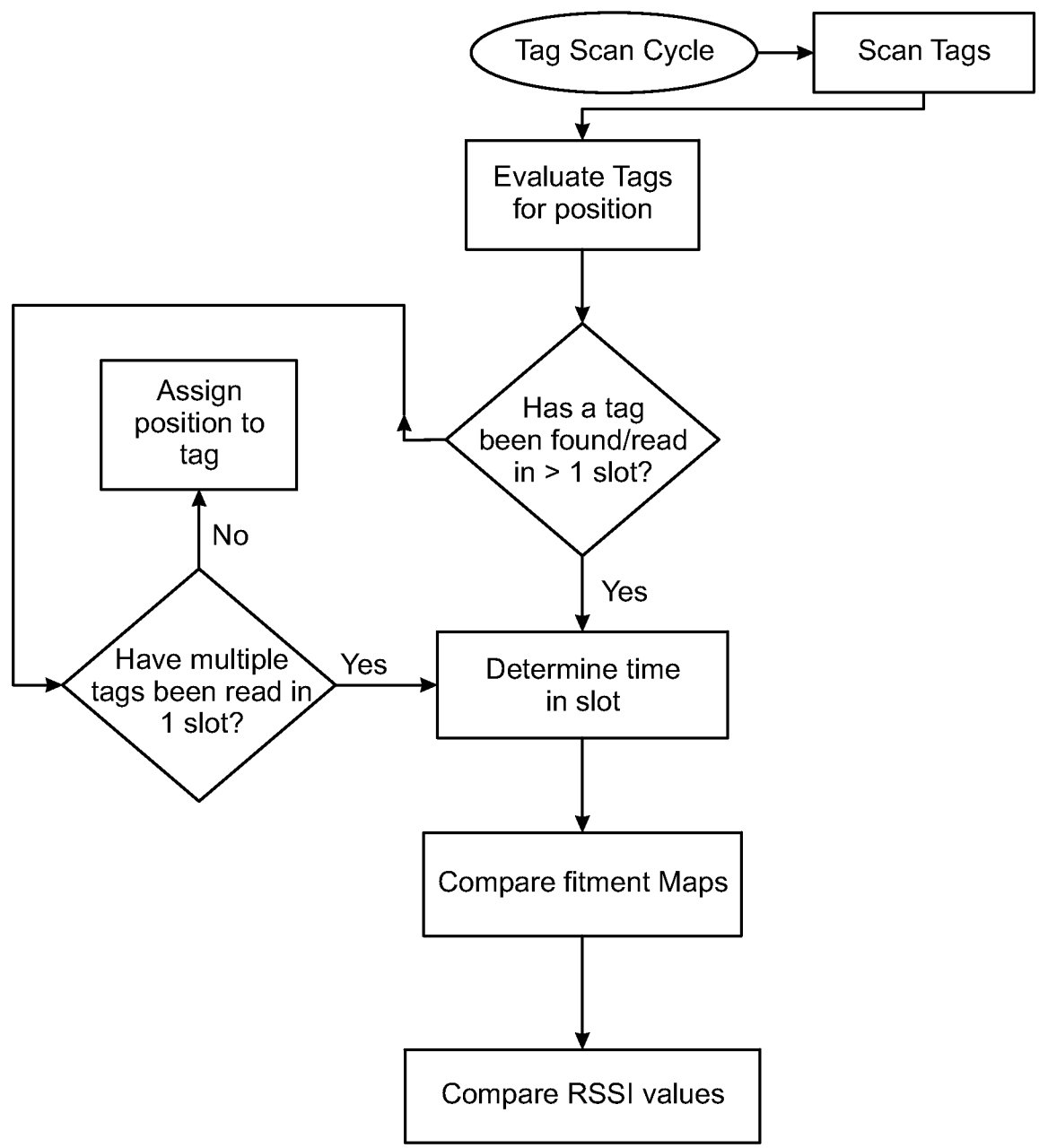
FIG. 73 is a flow diagram of a method for cross talk mitigation according to one embodiment.

Referring now also to FIG. 73, the RFID tag assemblies are all scanned and then the scanning data is evaluated to determine the position of each RFID tag assembly. If an RFID tag assembly is attributed to more than one slot after the scan, then the scanning data is further evaluated to determine the correct slot in which to assign the RFID tag assembly. In some embodiments, time in slot, fitment maps and RSSI values are used to determine the correct location of the RFID tag assembly.

With respect to time in slot, in some embodiments, this may be a count of the number of scan cycles an RFID tag assembly has been identified in each slot to which it was assigned prior to the scan in which the RFID tag assembly was attributed to more than one slot. If an RFID tag assembly has been in the slot in which it was assigned prior to the scan ("current slot") for its life and the scan attributed it to a different slot as well as the current slot, the time in the current slot will be significantly greater than the different slot. In some embodiments, the system will then assign the RFID tag assembly to the slot in which it has been assigned to for the highest number of scans, which, in this example, is the current slot.

In some embodiments, the product container may be a "double wide" product container and, for these embodiments, the product container will require two slots adjacent and within the same product module. In some embodiments, the product module is a quad product module and therefore is configured to receive four product containers, however, with respect to double wide product container, the quad product module is configured to receive two double wide product containers and/or two single product container and one double wide product container. With respect to the double wide product containers, because these cannot span over two product modules (i.e., cannot cross product module boundaries), where an RFID tag assembly attached to a double wide product container has been read in more than one slot, and one of the slots is, for example, an odd number slot (i.e., slot 1 or 3 in a quad product module), then the system may use this information to eliminate that slot as a candidate for the position of the RFID tag assembly.
Thus, in some embodiments,
The system may use fitment map information to establish the true/correct position of the double wide product container.

In some embodiments, where an RFID tag assembly has been read in multiple slots and all of the slots over one have not been eliminated using the time in slot and/or fitment map methods, then the system compares the received signal strength indicator ("RSSI") values. In some embodiments, the slot with the higher RSSI value will be assigned as the position of the RFID tag assembly.

If after scanning all of the RFID tag assemblies multiple RFID tag assemblies are attributed to one slot ("the slot"), then after the scan, the system may complete the following method to determine the correct RFID tag assembly to assign to the slot. In some embodiments, time in slot, fitment maps and RSSI values are used to determine the correct location of the RFID tag assembly.

With respect to time in slot, in some embodiments, this may be a count of the number of scan cycles an RFID tag assembly has been identified in the slot. If a RFID tag assembly has been in another slot in which it was assigned prior to the scan ("current slot") for its life and the scan attributed it to a different slot, i.e., the slot, the time in the current slot will be significantly greater than the different slot, i.e., the slot. In some embodiments, the system will then assign the RFID tag assembly to the slot in which it has been assigned to for the highest number of scans, which, in this example, is the current slot. However, if a RFID tag assembly has been in the slot for a predetermined period of time that is longer than any of the other candidate RFID tag assembly for the slot, then the RFID tag assembly that has been in the slot the longest will be assigned to the slot.

In some embodiments, the product container may be a "double wide" product container and, for these embodiments, the product container will require two slots adjacent and within the same product module. In some embodiments, the product module is a quad product module and therefore is configured to receive four product containers, however, with respect to double wide product containers, the quad product module is configured to receive two double wide product containers and/or two single product container and one double wide product container. With respect to the double wide product containers, because these cannot span over two product modules (i.e., cannot cross product module boundaries), where one of the RFID tag assembly read for the slot is attached to a double wide product container and the slot is, for example, an odd number slot (i.e., slot 1 or 3 in a quad product module), or otherwise could not accommodate the double wide product container, then the system may use this information to eliminate that product module/RFID tag assembly from being a candidate for the slot. Thus, in some embodiments, the system may use fitment map information to establish the true/correct position of the double wide product container.

In some embodiments, where multiple RFID tag assemblies have been read in the slot and all of the RFID tag assemblies over one have not been eliminated using the time in slot and/or fitment map methods, then the system compares the receive signal strength indicator ("RSSI") values. In some embodiments, the RFID tag assembly with the higher RSSI value for the antenna associated with the slot will be assigned as the position of the slot.

Figure 25:
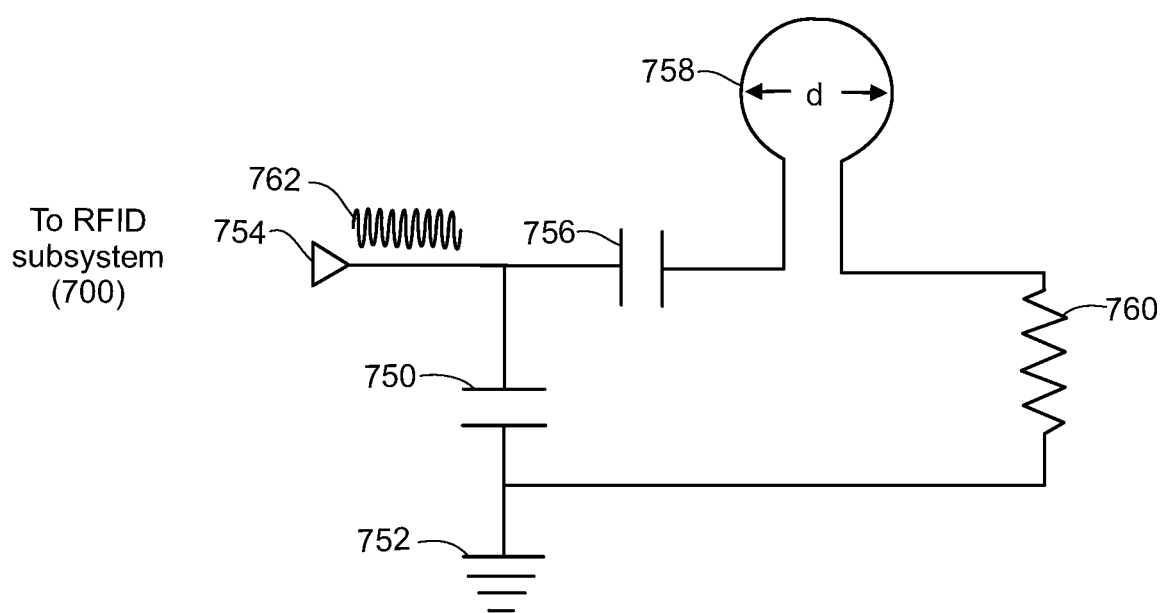
FIG. 25 is a diagrammatic view of an RFID antenna assembly included within the RFID system of FIG. 23.

Accordingly and referring also to FIG. 25, one or more of RFID antenna assemblies 702, 712, 714, 716 may be configured as a loop antenna. While the following discussion is directed towards RFID antenna assembly 702, this is for illustrative purposes only and is not intended to be a limitation of this disclosure, as the following discussion may be equally applied to RFID antenna assemblies 712, 714, 716.

RFID antenna assembly 702 may include first capacitor assembly 750 (e.g., a 2.90 pF capacitor) that is coupled between ground 752 and port 754 that may energize RFID antenna assembly 702. A second capacitor assembly 756 (e.g., a 2.55 pF capacitor) maybe positioned between port 754 and inductive loop assembly 758. Resistor assembly 760 (e.g., a 2.00 Ohm resistor) may couple inductive loop assembly 758 with ground 752 while providing a reduction in the Q factor to increase the bandwidth and provide a wider range of operation.

As is known in the art, the characteristics of RFID antenna assembly 702 may be adjusted by altering the physical characteristics of inductive loop assembly 758. For example, as the diameter "d" of inductive loop assembly 758 increases, the far field performance of RFID antenna assembly 702 may increase. Further, as the diameter "d" of inductive loop assembly 758 decreases; the far field performance of RFID antenna assembly 702 may decrease.

Specifically, the far field performance of RFID antenna assembly 702 may vary depending upon the ability of RFID antenna assembly 702 to radiate energy. As is known in the art, the ability of RFID antenna assembly 702 to radiate energy may be dependent upon the circumference of inductive loop assembly 708 (with respect to the wavelength of carrier signal 762 used to energize RFID antenna assembly 702 via port 754.

Figure 26:
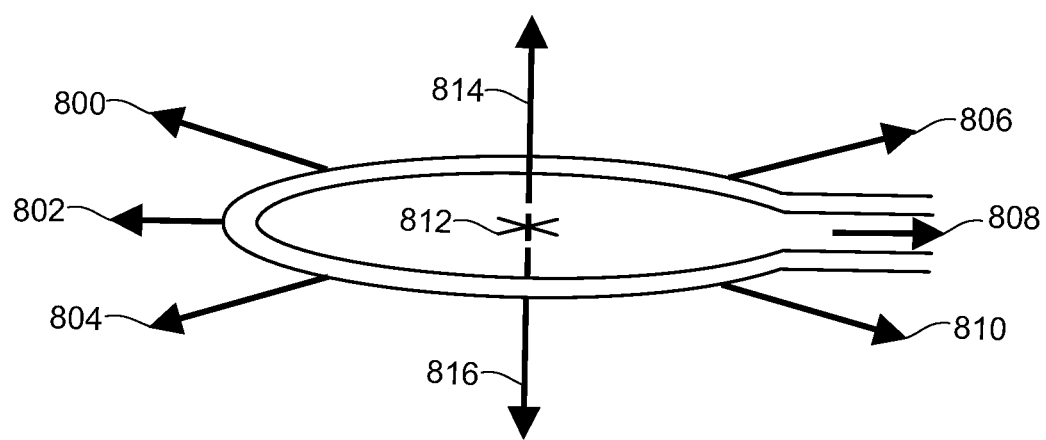
FIG. 26 is an isometric view of an antenna loop assembly of the RFID antenna assembly of FIG. 25.

Referring also to FIG. 26 and in a preferred embodiment, carrier signal 762 may be a 915 MHz carrier signal having a wavelength of 12.89 inches. With respect to loop antenna design, once the circumference of inductive loop assembly 758 approaches or exceeds 50% of the wavelength of carrier signal 762, the inductive loop assembly 758 may radiate energy outward in a radial direction (e.g., as represented by arrows 800, 802, 804, 806, 808, 810) from axis 812 of inductive loop assembly 758, resulting in strong far field performance. Conversely, by maintaining the circumference of inductive loop assembly 758 below 25% of the wavelength of carrier signal 762, the amount of energy radiated outward by inductive loop assembly 758 will be reduced and far field performance will be compromised. Further, magnetic coupling may occur in a direction perpendicular to the plane of inductive loop assembly 758 (as represented by arrows 814, 816), resulting in strong near field performance.

As discussed above, due to the close proximity of slot assemblies (e.g., slot assemblies 260, 262, 264, 266) included within product module assembly 250, it may be desirable to configure RFID antenna assembly 702 in a manner that allows it to avoid reading e.g., product containers positioned within adjacent slot assemblies. Accordingly, by configuring inductive loop assembly 758 so that the circumference of inductive loop assembly 758 is below 25% of the wavelength of carrier signal 762 (e.g., 3.22 inches for a 915 MHz carrier signal), far field performance may be reduced and near field performance may be enhanced. Further, by positioning inductive loop assembly 758 so that the RFID tag assembly to be read is either above or below RFID antenna assembly 702, the RFID tag assembly may be inductively coupled to RFID antenna assembly 702. For example, when configured so that the circumference of inductive loop assembly 758 is 10% of the wavelength of carrier signal 762 (e.g., 1.29 inches for a 915 MHz carrier signal), the diameter of inductive loop assembly 758 would be 0.40 inches, resulting in a comparatively high level of near field performance and a comparatively low level of far field performance.

Figure 27:
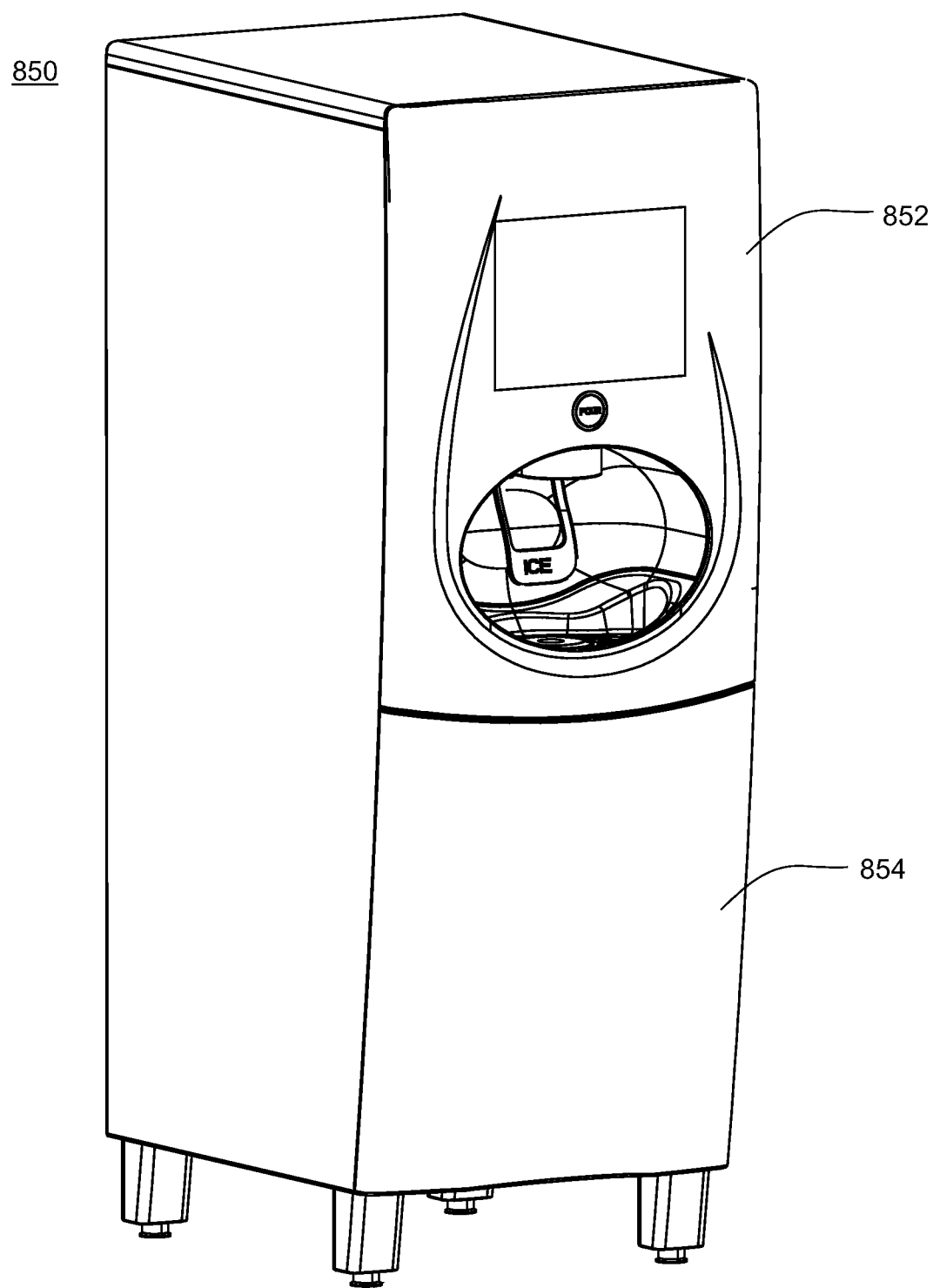
FIG. 27 is an isometric view of a housing assembly for housing the processing system of FIG. 1.
Figure 28:
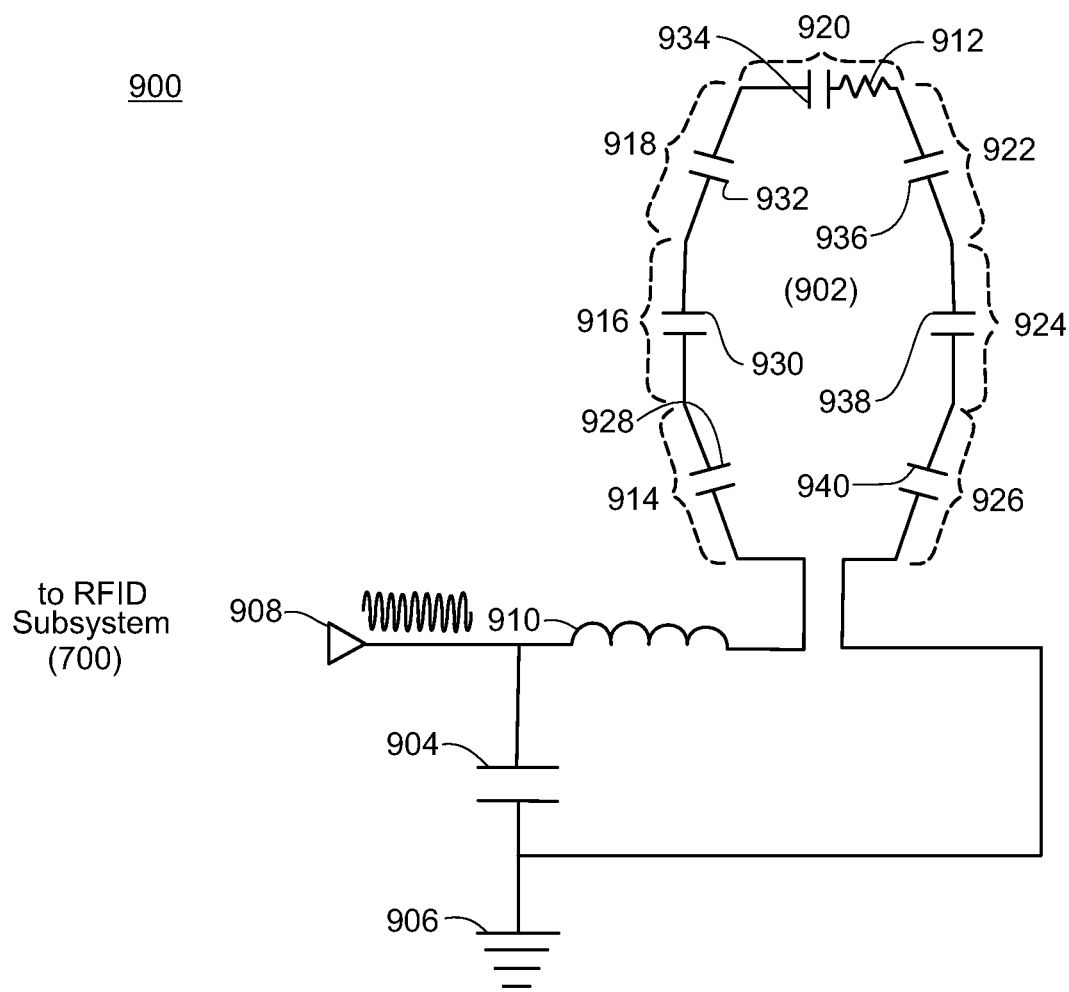
FIG. 28 is a diagrammatic view of an RFID access antenna assembly included within the processing system of FIG. 1.

Referring also to FIGS. 27 & 28, processing system 10 may be incorporated into housing assembly 850. Housing assembly 850 may include one or more access doors/panels 852, 854 that e.g., allow for the servicing of processing system 10 and allow for the replacement of empty product containers (e.g., product container 258). For various reasons (e.g., security, safety, etc), it may be desirable to secure access doors/panels 852, 854 so that the internal components of beverage dispensing machine 10 can only be accessed by authorized personnel. Accordingly, the previously-described RFID subsystem (i.e., RFID subsystem 700) may be configured so that access doors/panels 852, 854 may only be opened if the appropriate RFID tag assembly is positioned proximate RFID access antenna assembly 900. An example of such an appropriate RFID tag assembly may include an RFID tag assembly that is affixed to a product container (e.g., RFID tag assembly 704 that is affixed to product container 258).

RFID access antenna assembly 900 may include multi-segment inductive loop assembly 902. A first matching component 904 (e.g., a 5.00 pF capacitor) may be coupled between ground 906 and port 908 that may energize RFID access antenna assembly 900. A second matching component 910 (e.g., a 16.56 nanoHenries inductor) may be positioned between port 908 and multi-segment inductive loop assembly 902. Matching components 904, 910 may adjust the impedance of multi-segment inductive loop assembly 902 to a desired impedance (e.g., 50.00 Ohms). Generally, matching components 904, 910 may improve the efficiency of RFID access antenna assembly 900.

RFID access antenna assembly 900 may include a reduction in the Q factor of element 912 (e.g., a 50 Ohm resistor) that may be configured to allow RFID access antenna assembly 900 to be utilized over a broader range of frequencies. This may also allow RFID access antenna assembly 900 to be used over an entire band and may also allow for tolerances within the matching network. For example, if the band of interest of RFID access antenna assembly 900 is 50 MHz and reduction of Q factor element (also referred to herein as a "de-Qing element") 912 is configured to make the antenna 100 MHz wide, the center frequency of RFID access antenna assembly 900 may move by 25 MHz without affecting the performance of RFID access antenna assembly 900. De-Qing element 912 may be positioned within multi-segment inductive loop assembly 902 or positioned somewhere else within RFID access antenna assembly 900.

As discussed above, by utilizing a comparatively small inductive loop assembly (e.g., inductive loop assembly 758 of FIGS. 25 & 26), far field performance of an antenna assembly may be reduced and near field performance may be enhanced. Unfortunately, when utilizing such a small inductive loop assembly, the depth of the detection range of the RFID antenna assembly is also comparatively small (e.g., typically proportional to the diameter of the loop). Therefore, to obtain a larger detection range depth, a larger loop diameter may be utilized. Unfortunately and as discussed above, the use of a larger loop diameter may result in increased far field performance.

Accordingly, multi-segment inductive loop assembly 902 may include a plurality of discrete antenna segments (e.g., antenna segments 914, 916, 918, 920, 922, 924, 926), with a phase shift element (e.g., capacitor assemblies 928, 930, 932, 934, 936, 938, 940). Examples of capacitor assemblies 928, 930, 932, 934, 936, 938, 940 may include 1.0 pF capacitors or varactors (e.g., voltage variable capacitors) for example, 0.1-250 pF varactors. The above-described phase shift element may be configured to allow for the adaptive controlling of the phase shift of multi-segment inductive loop assembly 902 to compensate for varying conditions; or for the purpose of modulating the characteristics of multi-segment inductive loop assembly 902 to provide for various inductive coupling features and/or magnetic properties. An alternative example of the above-described phase shift element is a coupled line (not shown).

As discussed above, by maintaining the length of an antenna segment below 25% of the wavelength of the carrier signal energizing RFID access antenna assembly 900, the amount of energy radiated outward by the antenna segment will be reduced, far field performance will be compromised, and near field performance will be enhanced. Accordingly each of antenna segments 914, 916, 918, 920, 922, 924, 926 may be sized so that they are no longer than 25% of the wavelength of the carrier signal energizing RFID access antenna assembly 900. Further, by properly sizing each of capacitor assemblies 928, 930, 932, 934, 936, 938, 940, any phase shift that occurs as the carrier signal propagates around multi-segment inductive loop assembly 902 may be offset by the various capacitor assemblies incorporated into multi-segment inductive loop assembly 902. Accordingly, assume for illustrative purposes that for each of antenna segments 914, 916, 918, 920, 922, 924, 926, a 90° phase shift occurs. Accordingly, by utilizing properly sized capacitor assemblies 928, 930, 932, 934, 936, 938, 940, the 90° phase shift that occurs during each segment may be reduced/eliminated. For example, for a carrier signal frequency of 915 MHz and an antenna segment length that is less than 25% (and typically 10%) of the wavelength of the carrier signal, a 1.2 pF capacitor assembly may be utilized to achieve the desired phase shift cancellation, as well as tune segment resonance.

While multi-segment inductive loop assembly 902 is shown as being constructed of a plurality of linear antenna segments coupled via miter joints, this is for illustrative purposes only and is not intended to be a limitation of this disclosure. For example, a plurality of curved antenna segments may be utilized to construct multi-segment inductive loop assembly 902. Additionally, multi-segment inductive loop assembly 902 may be configured to be any loop-type shape. For example, multi-segment inductive loop assembly 902 may be configured as an oval (as shown in FIG. 28), a circle, a square, a rectangle, or an octagon.

While the system is described above as being utilized within a processing system, this is for illustrative purposes only and is not intended to be a limitation of this disclosure, as other configurations are possible. For example, the above-described system may be utilized for processing/dispensing other consumable products (e.g., ice cream and alcoholic drinks). Additionally, the above-described system may be utilized in areas outside of the food industry. For example, the above-described system may be utilized for processing/dispensing: vitamins; pharmaceuticals; medical products; cleaning products; lubricants; painting/staining products; and other non-consumable liquids/semi-liquids/granular solids and/or fluids.

While the system is described above as having the RFID tag assembly (e.g., RFID tag assembly 704) that is affixed to the product container (e.g., product container 258) positioned above the RFID antenna assembly (e.g., RFID antenna assembly 702), which is positioned above the RFID tag (e.g., RFID tag assembly 708) that is affixed to bracket assembly 282, this for illustrative purposes only and is not intended to be a limitation of this disclosure, as other configurations are possible. For example, the RFID tag assembly (e.g., RFID tag assembly 704) that is affixed to the product container (e.g., product container 258) may be positioned below the RFID antenna assembly (e.g., RFID antenna assembly 702), which may be positioned below the RFID tag (e.g., RFID tag assembly 708) that is affixed to bracket assembly 282.

As discussed above, by utilizing comparatively short antenna segments (e.g., antenna segments 914, 916, 918, 920, 922, 924, 926) that are no longer than 25% of the wavelength of the carrier signal energizing RFID antenna assembly 900, far field performance of antenna assembly 900 may be reduced and near field performance may be enhanced.

Figure 29:
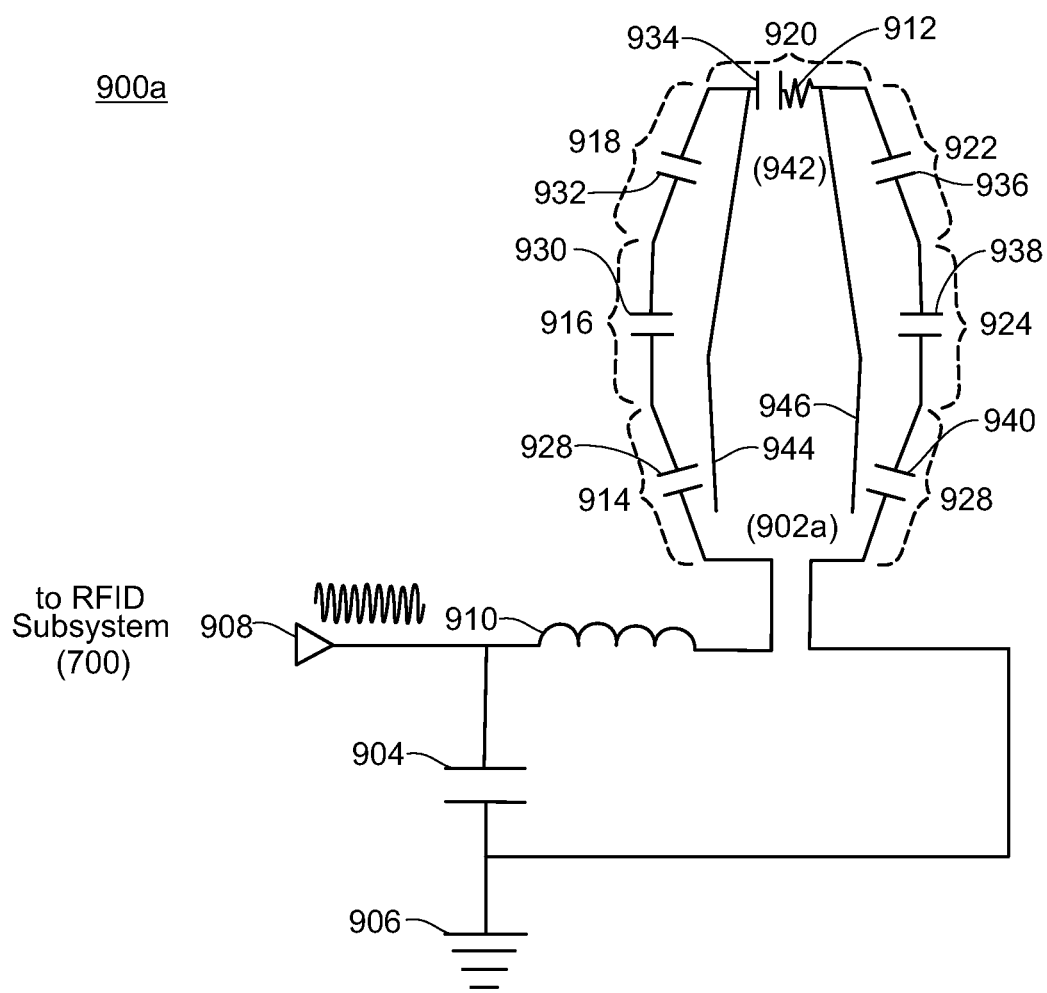
FIG. 29 is a diagrammatic view of an alternative RFID access antenna assembly included within the processing system of FIG. 1.

Referring also to FIG. 29, if a higher level of far field performance is desired from the RFID antenna assembly, RFID antenna assembly 900a may be configured to include far field antenna assembly 942 (e.g., a dipole antenna assembly) electrically coupled to a portion of multi-segment inductive loop assembly 902a. Far field antenna assembly 942 may include first antenna portion 944 (i.e., forming the first portion of the dipole) and second antenna portion 946 (i.e., forming the second portion of the dipole). As discussed above, by maintaining the length of antenna segments 914, 916, 918, 920, 922, 924, 926 below 25% of the wavelength of the carrier signal, far field performance of antenna assembly 900a may be reduced and near field performance may be enhanced. Accordingly, the sum length of first antenna portion 944 and second antenna portion 946 may be greater than 25% of the wavelength of the carrier signal, thus allowing for an enhanced level of far field performance.

Figure 30:
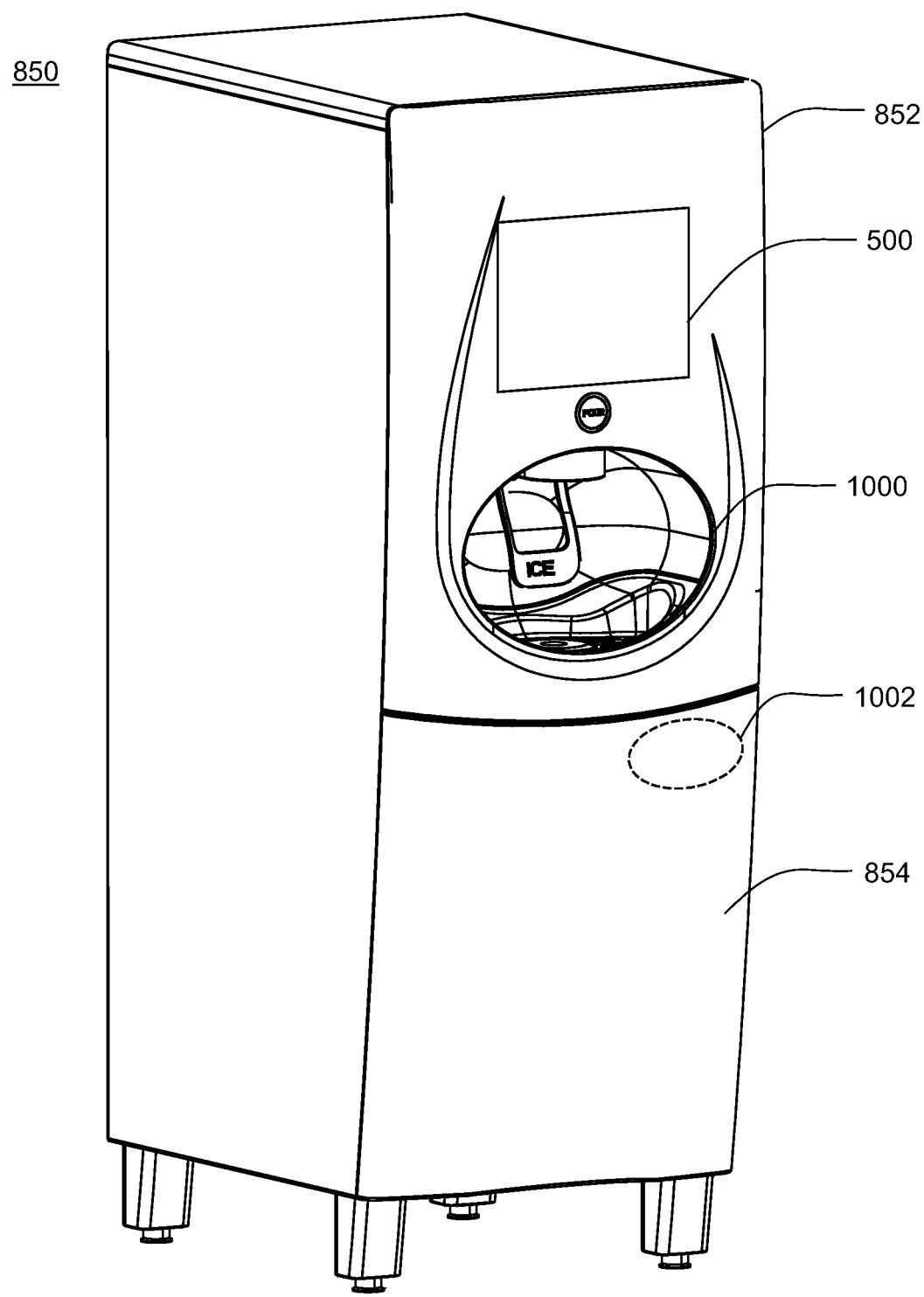
FIG. 30 is a diagrammatic view of an embodiment of the processing system of FIG. 1.

Referring also to FIG. 30, as discussed above (e.g., with reference to FIG. 27) processing system 10 may be incorporated into housing assembly 850. Housing assembly 850 may include one or more access doors/panels (e.g., upper door 852, and lower door 854) that e.g., allow for the servicing of processing system 10 and allow for the replacement of empty product containers (e.g., product container 258). Touch screen interface 500 may be disposed on upper door 852, allowing facile user access. Upper door 852 may also provide access to dispenser assembly 1000, which may allow a beverage container (e.g., container 30) to be filled with a beverage (e.g., via nozzle 24; not shown), ice, or the like. Additionally, lower door 854 may include RFID interrogation region 1002, e.g., which may be associated with RFID access antenna assembly 900, e.g., to permit one or more of access doors/panels 852, 854 to be opened. Interrogation region 1002 is depicted for illustrative purposes only, as RFID access antenna assembly 900 may be equally located in various alternative locations, including locations other than access doors/panels 852, 854.

Figure 51:
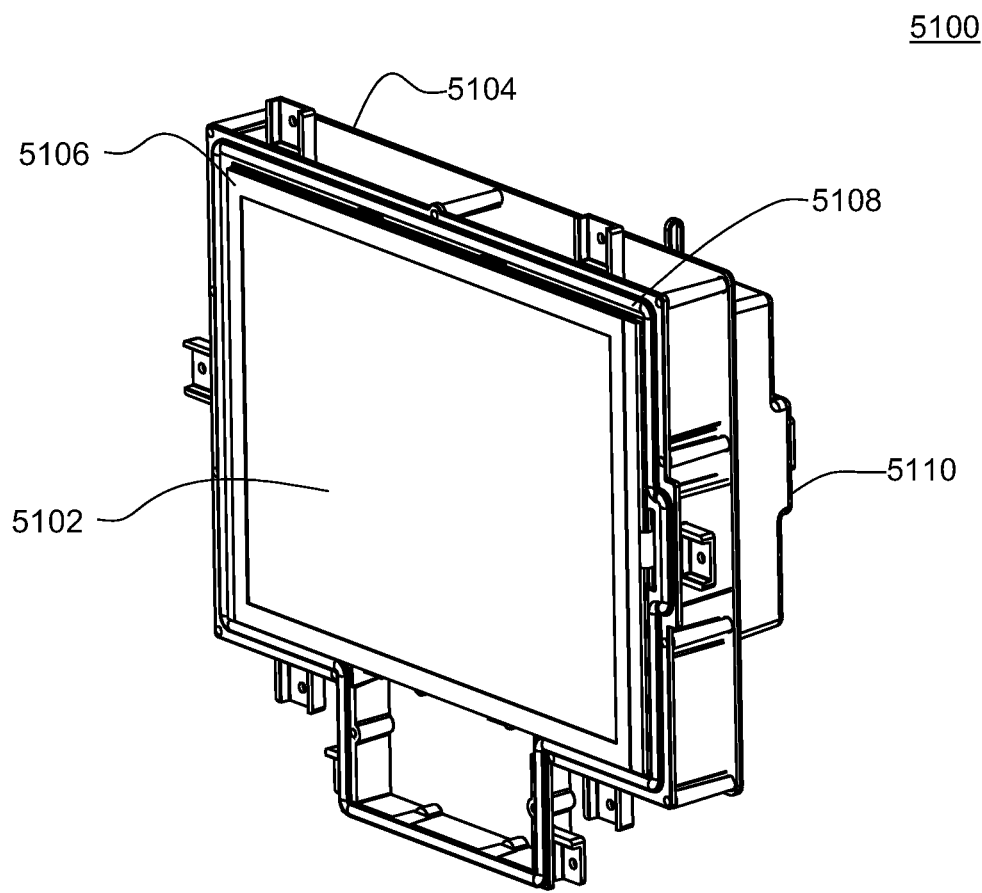
FIG. 51 diagrammatically depicts one embodiment of a user interface screen in a user interface bracket.
Figure 52:
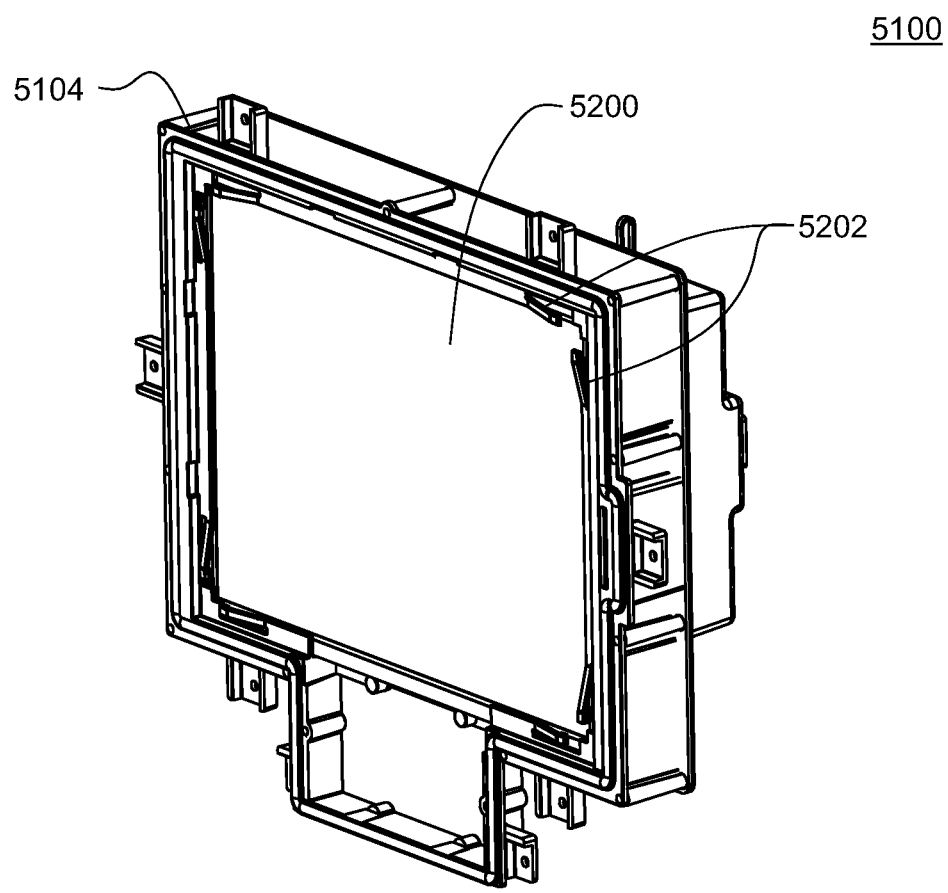
FIG. 52 diagrammatically depicts one embodiment of a user interface bracket without a screen.
Figure 53:
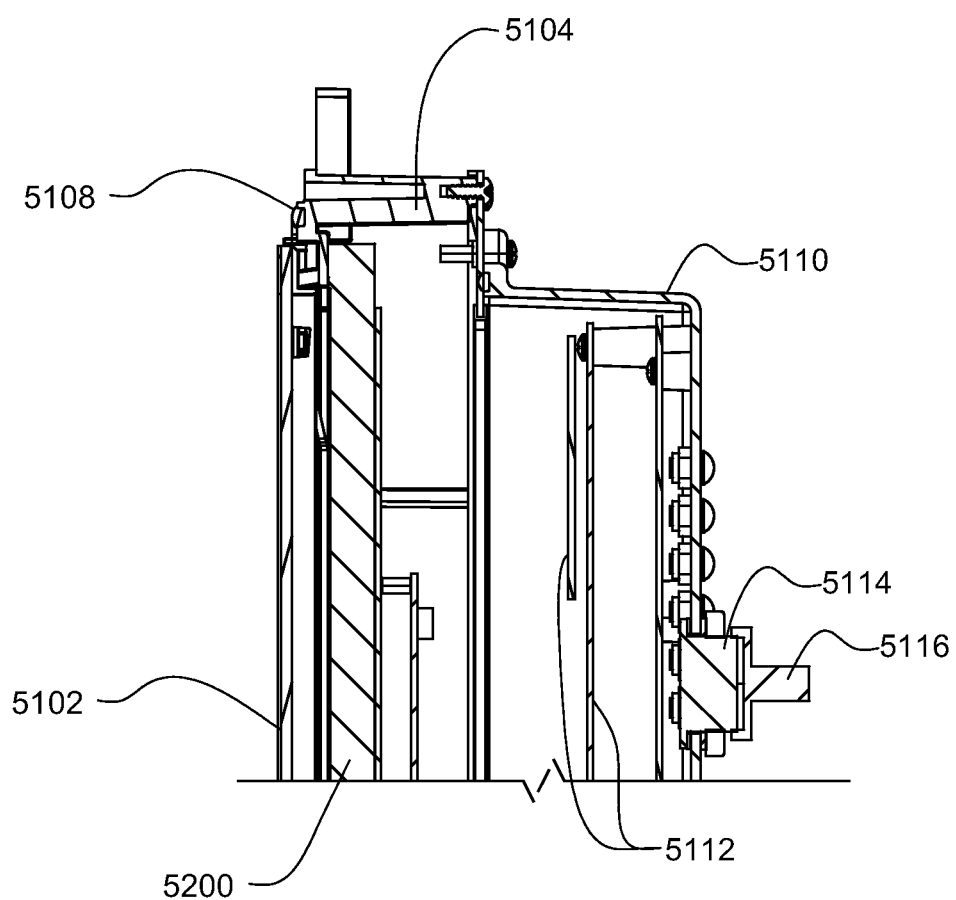
FIG. 53 is a detailed side view of the bracket of FIG. 52.

Referring also to FIGS. 51-53, an exemplary embodiment of the user interface assembly 5100 is depicted, which may be incorporated into the housing assembly 850 shown in FIG. 30. The user interface assembly may include the touch screen interface 500. User interface assembly 5100 may include a touch screen 5102, a frame 5104, a border 5106, a seal 5108, and a system controller enclosure 5110. The border 5106 may space the touch screen 5102, and may also serve as a clean visual border. The touch screen 5102, in the exemplary embodiment, is a capacitive touch screen, however, on other embodiments, other types of touch screens may be used. However, in the exemplary embodiment, due to the capacitive nature of the touch screen 5102 it may be desirable to maintain a predetermined distance between the touch screen 5102 and the door 852 via the border 5106.

The seal 5108 may protect the display shown in FIG. 52 as 5200) and may serve to prevent moisture and/or particulates from reaching the display 5200. In the exemplary embodiment, the seal 5108 contacts the door of the housing assembly 852 to better maintain a seal. In the exemplary embodiment, the display 5200 is an LCD display and is held by the frame by at least one set of spring fingers 5202, which may engage the display 5200 and retain the display 5200. In the exemplary embodiment, the display 5200 is a 15" LCD display such as model LQ150X1LGB1 from Sony Corporation, Tokyo, Japan. However, in other embodiments, the display may be any type of display. The spring fingers 5202 may additionally serve as springs, to allow for tolerances within the user interface assembly 5100, thus, in the exemplary embodiment, the touch screen 5102 is allowed to float relative to the display 5200. In the exemplary embodiment, the touch screen 5102 is a projected capacitive touch screen such as model ZYP15-10001D by Zytronics of Blaydon on Tyne, UK, but in other embodiments, the touch screen may be another type of touch screen and/or another capacitive touch screen. In the exemplary embodiment, the seal is a foam in place gasket, which in the exemplary embodiment, is made from polyurethane foam die-cut, but in other embodiments, may be made from silicone foam or other similar materials. In some embodiments, the seal may be an over molded seal or any other type of sealing body.

In the exemplary embodiment, the user interface assembly 5100 includes four sets of spring fingers 5202. However, other embodiments may include a greater or fewer number of spring fingers 5202. In the exemplary embodiment, the spring fingers 5202 and the frame 5104 are made from ABS, but in other embodiments, may be made from any material.

Referring also to FIG. 53, the user interface assembly 5100, in the exemplary embodiment, also includes as least one PCB as well as at least one connector 5114, which, in some embodiments, may be covered by a connector cap 5116.

Figure 31:
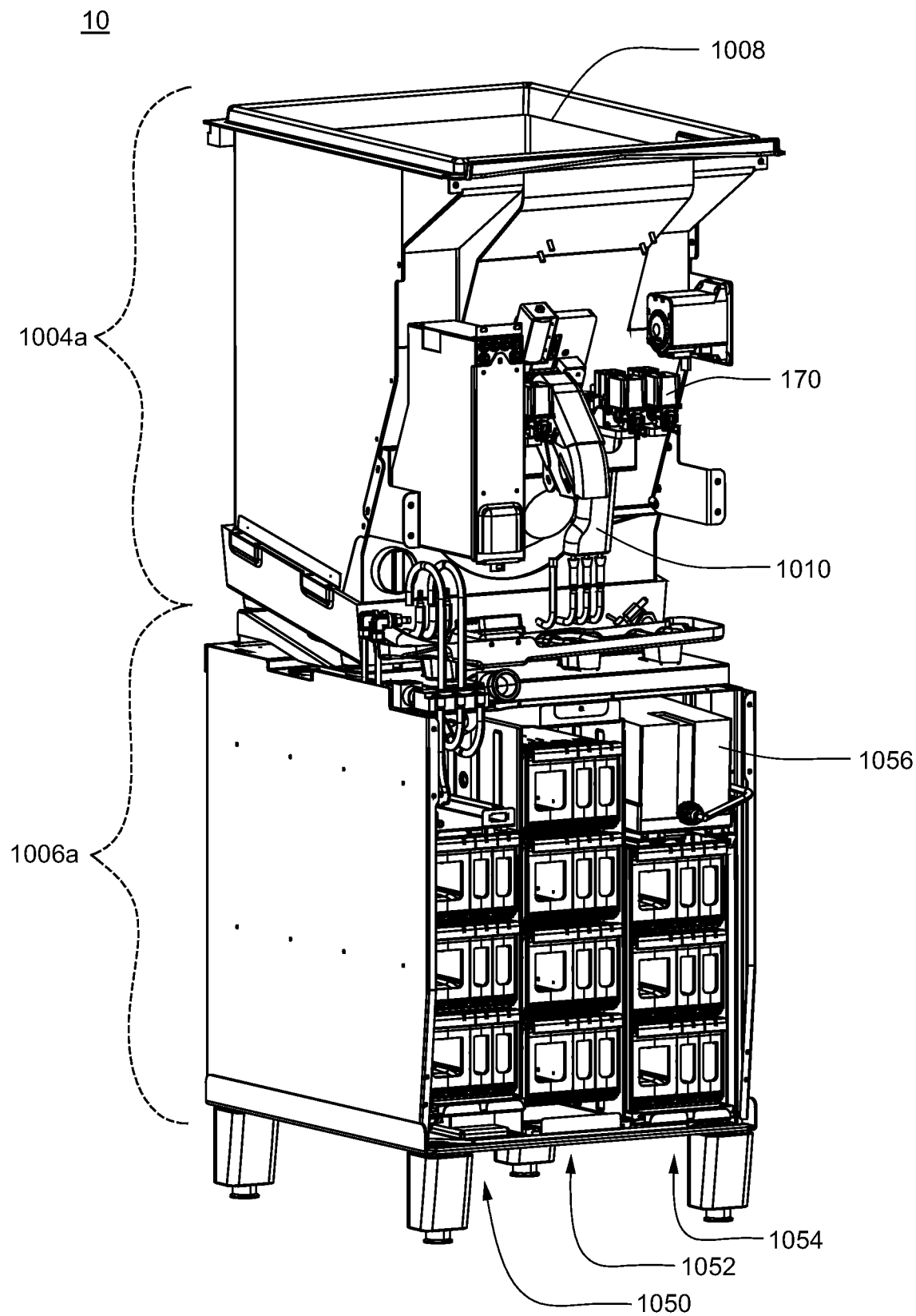
FIG. 31 is a diagrammatic view of the internal assembly of the processing system of FIG. 30.
Figure 32:
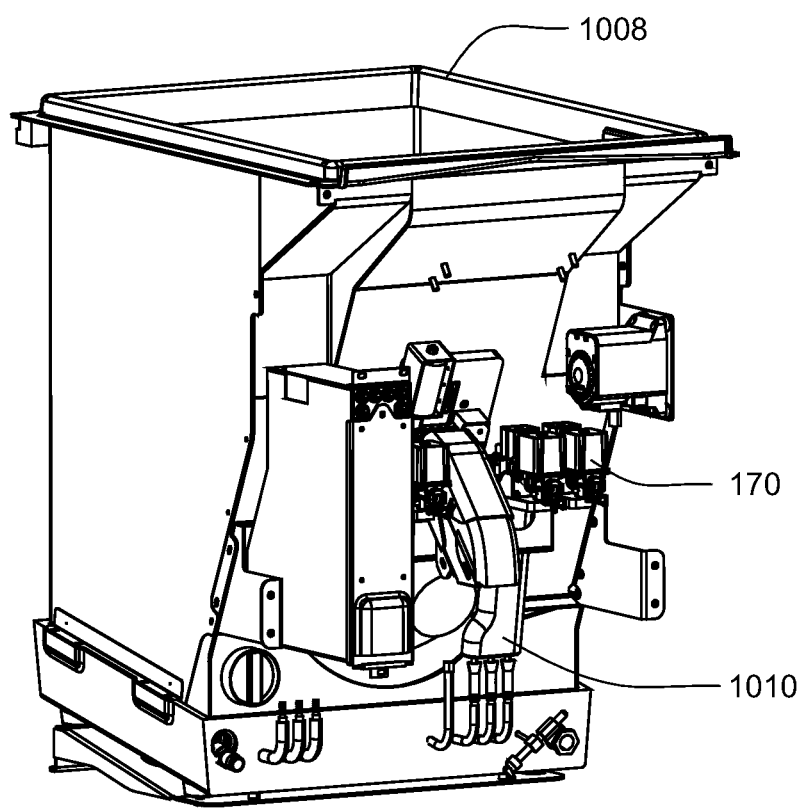
FIG. 32 is a diagrammatic view of the upper cabinet of the processing system of FIG. 30.
Figure 33:
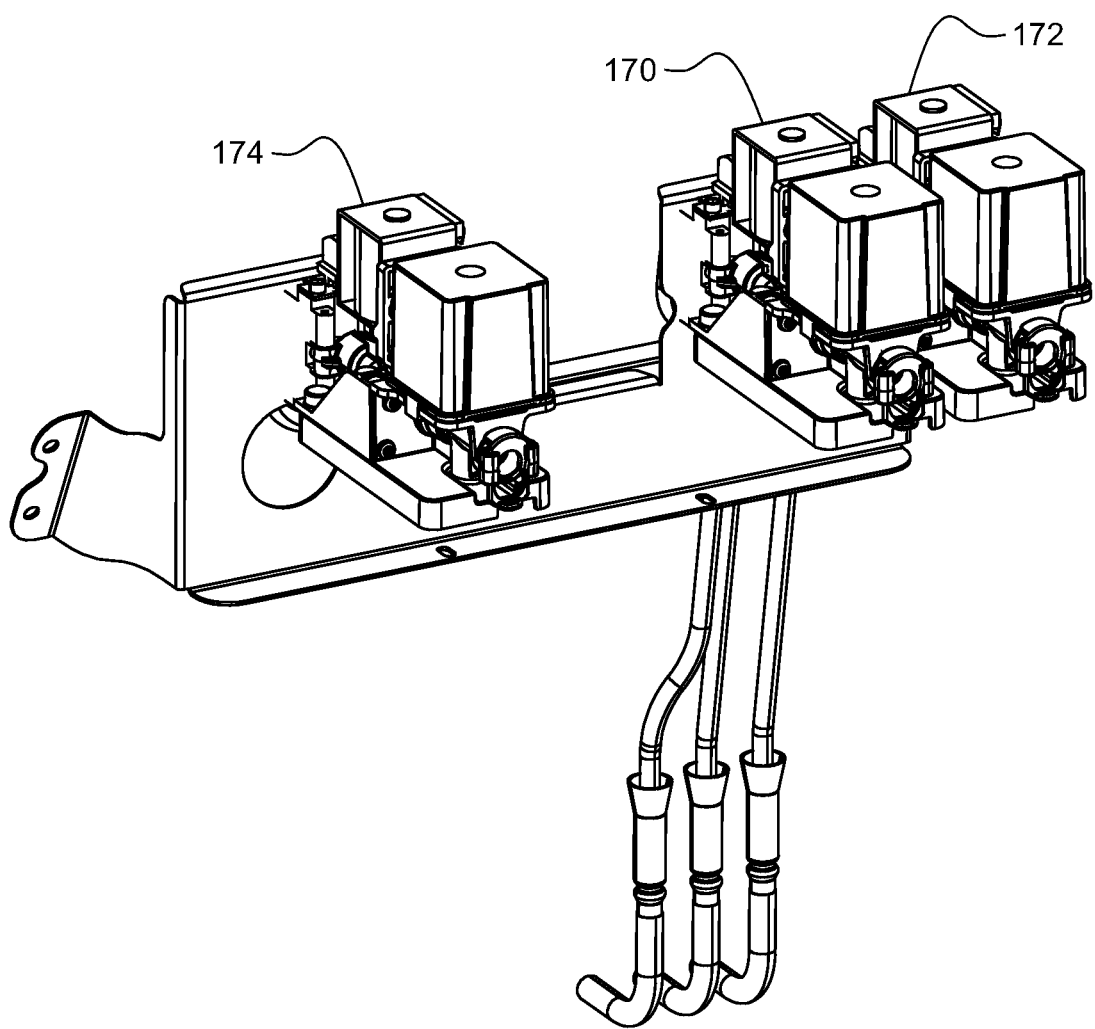
FIG. 33 is a diagrammatic view of a flow control subsystem of the processing system of FIG. 30.
Figure 35:
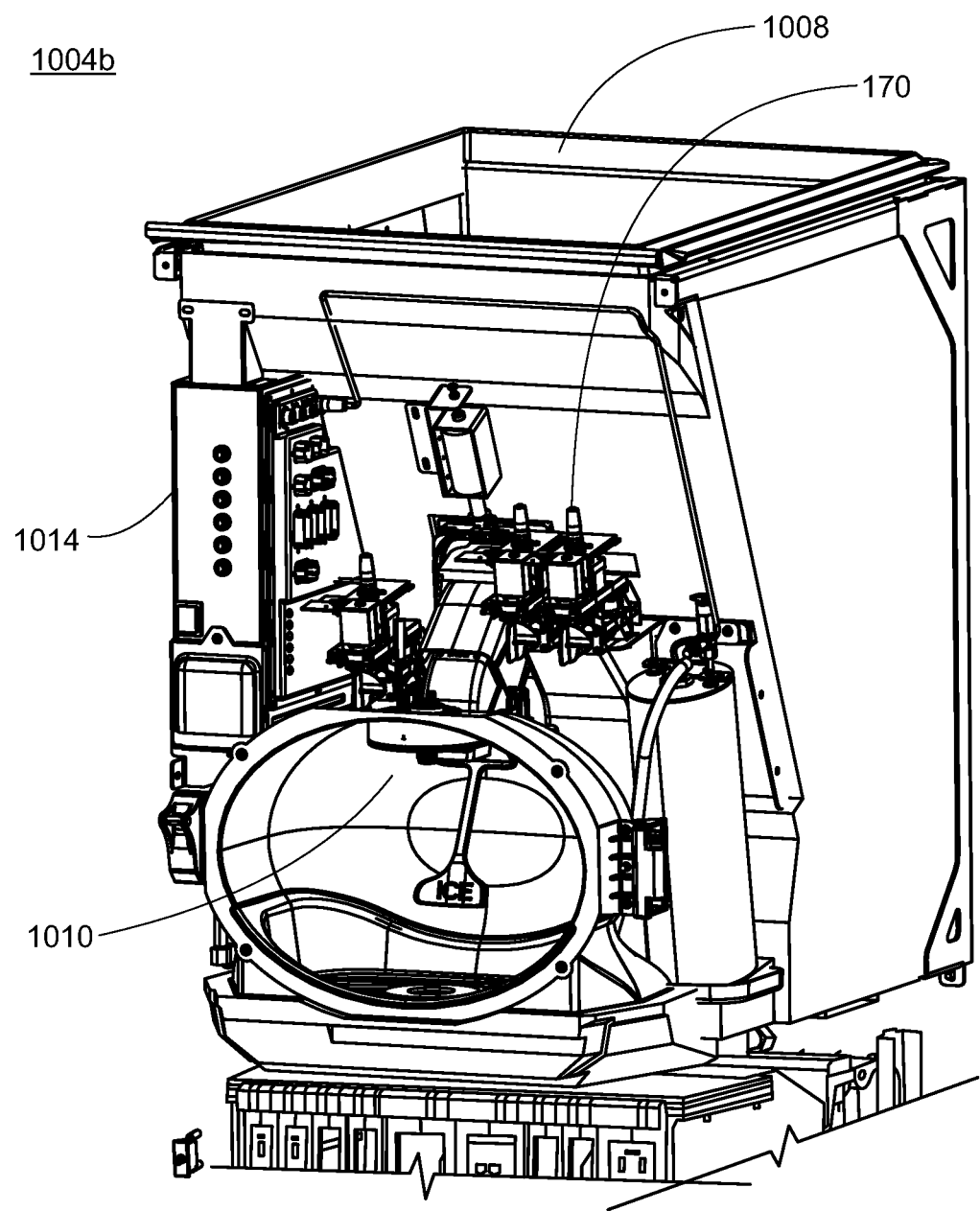
FIG. 35 is a diagrammatic view of the upper cabinet of the processing system of FIG. 30.

Referring also to FIG. 31, consistent with an exemplary embodiment, processing system 10 may include upper cabinet portion 1004a and lower cabinet portion 1006a. However, this should not be construed as a limitation on this disclosure, as other configurations may be equally utilized. With additional reference also to FIGS. 32 and 33, upper cabinet portion 1004a (e.g., which may be covered, at least in part, by upper door 852) may include one or more features of plumbing subsystem 20, described above. For example, upper cabinet portion 1004a may include one or more flow control modules (e.g., flow control module 170), a fluid chilling system (e.g., cold plate 163, not shown), a dispensing nozzle (e.g., nozzle 24, not shown), plumbing for connection to high-volume ingredient supplies (e.g., carbon dioxide supply 150, water supply 152, and HFCS supply 154, not shown), and the like. Additionally, upper cabinet portion 1004a may include ice hopper 1008 for storing ice, and ice dispensing chute 1010, for dispensing ice from ice hopper 1008 (e.g., into beverage containers).

Carbon dioxide supply 150 may be provided by one or more carbon dioxide cylinders, e.g., which may be remotely located and plumbed to processing system 10. Similarly, water supply 152 may be provided as municipal water, e.g., which may also be plumbed to processing system 10. High fructose corn syrup supply 154 may include, for example, one or more reservoirs (e.g., in the form of five gallon bag-in-box containers), which may be remotely stored (e.g., in a back room, etc.). High fructose corn syrup supply 154 may also by plumbed to processing system 10. Plumbing for the various high-volume ingredients may be achieved via conventional hard or soft line plumbing arrangements.

As discussed above, carbonated water supply 158, water supply 152, and high fructose corn syrup supply 154 may be remotely located and plumbed to processing system 10 (e.g., to flow control modules 170, 172, 174). Referring to FIG. 34, a flow control module (e.g., flow control module 172) may be coupled to a high-volume ingredient supply (e.g., water 152) via quick plumbing connection 1012. For example, water supply 152 may be coupled to plumbing connection 1012, which may be releasably coupled to flow control module 172, thereby completing plumbing of water supply 152 to flow control module 170.

Referring to FIGS. 35, 36A, 36B, 37A, 37B, and 37, another embodiment of the upper cabinet portion (e.g., upper cabinet portion 1004b) is shown. Similar to the above-described exemplary embodiment, upper cabinet portion 1004b may include one or more features of plumbing subsystem 20, described above. For example, upper cabinet portion 1004b may include one or more flow control modules (e.g., flow control module 170), a fluid chilling system (e.g., cold plate 163, not shown), a dispensing nozzle (e.g., nozzle 24, not shown), plumbing for connection to high-volume ingredient supplies (e.g., carbon dioxide supply 150, water supply 152, and HFCS supply 154, not shown), and the like. Additionally, upper cabinet portion 1004b may include ice hopper 1008 for storing ice, and ice dispensing chute 1010, for dispensing ice from ice hopper 1008 (e.g., into beverage containers).

Figure 36B:
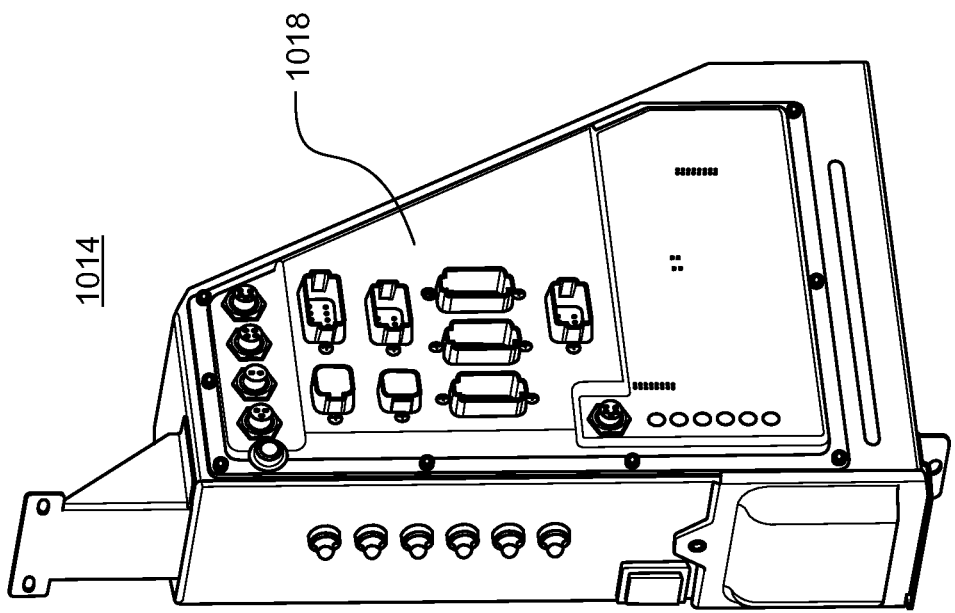
FIGS. 36A and 36B are diagrammatic views of a power module of the processing system of FIG. 35.
Figure 36A:
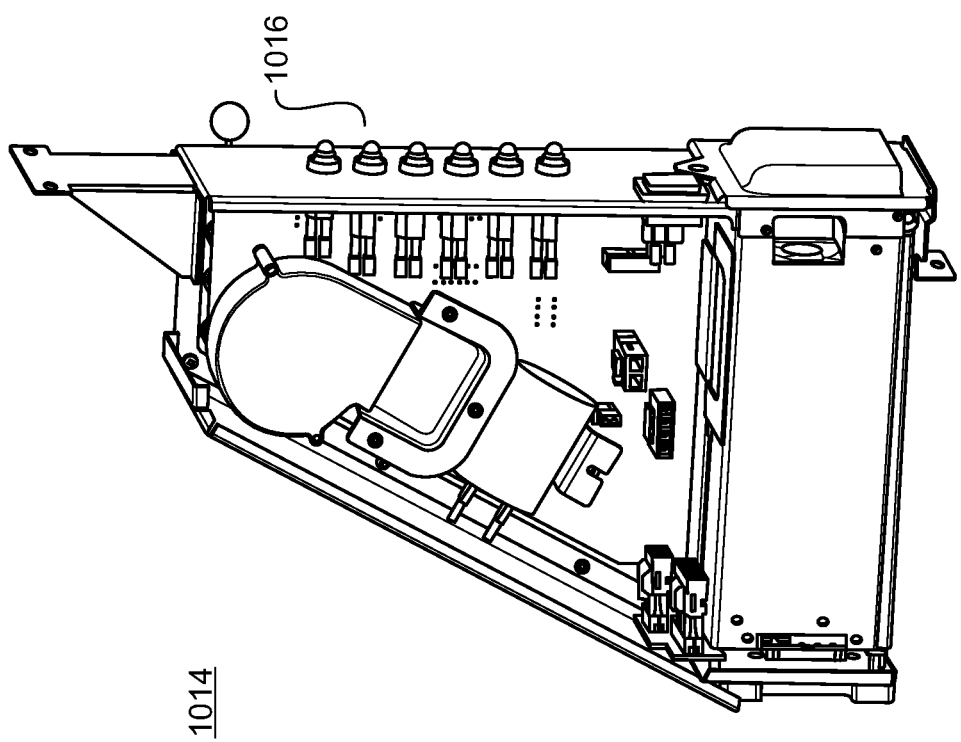

Referring also to FIGS. 36A-36b, upper cabinet portion 1004b may include power module 1014. Power module 1014 may house, e.g., a power supply, one or more power distribution busses, controllers (e.g., control logic subsystem 14) user interface controllers, storage device 12, etc. Power module 1014 may include one or more status indicators (indicator lights 1016, generally), and power/data connections (e.g., connections 1018 generally).

Figure 37A:
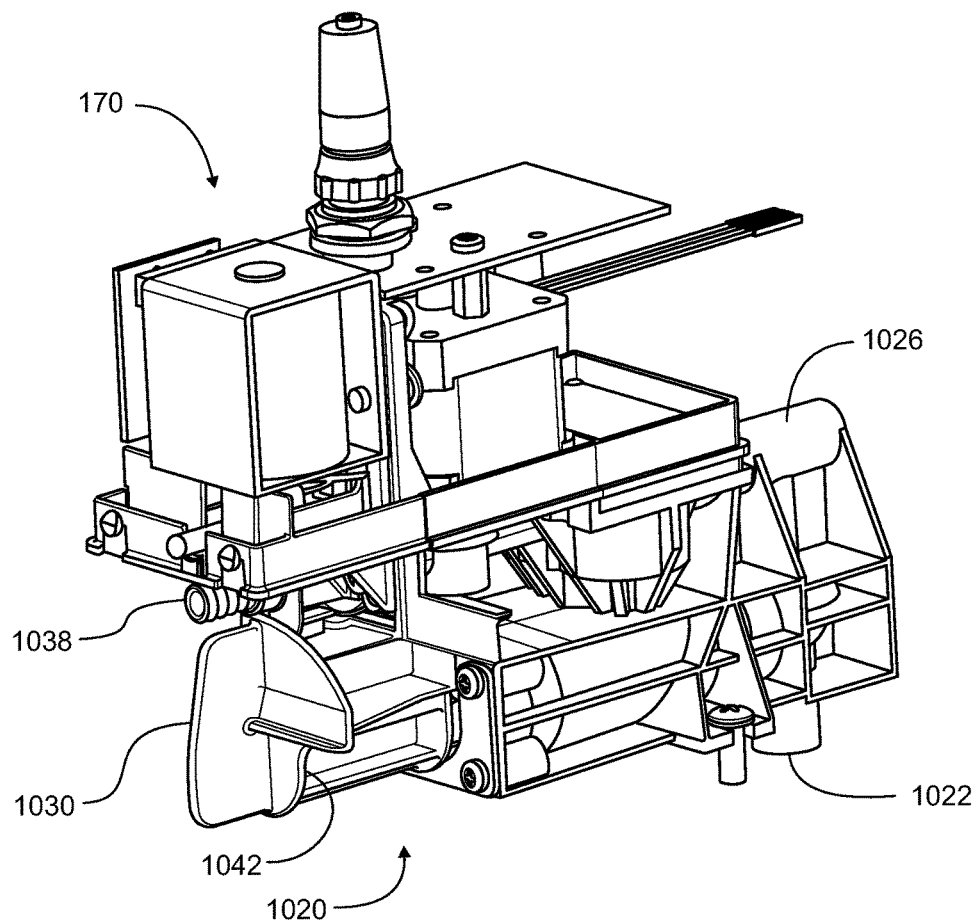
FIGS. 37A, 37B, and 37C diagrammatically depict a flow control module of the flow control subsystem of FIG. 35.
Figure 37B:
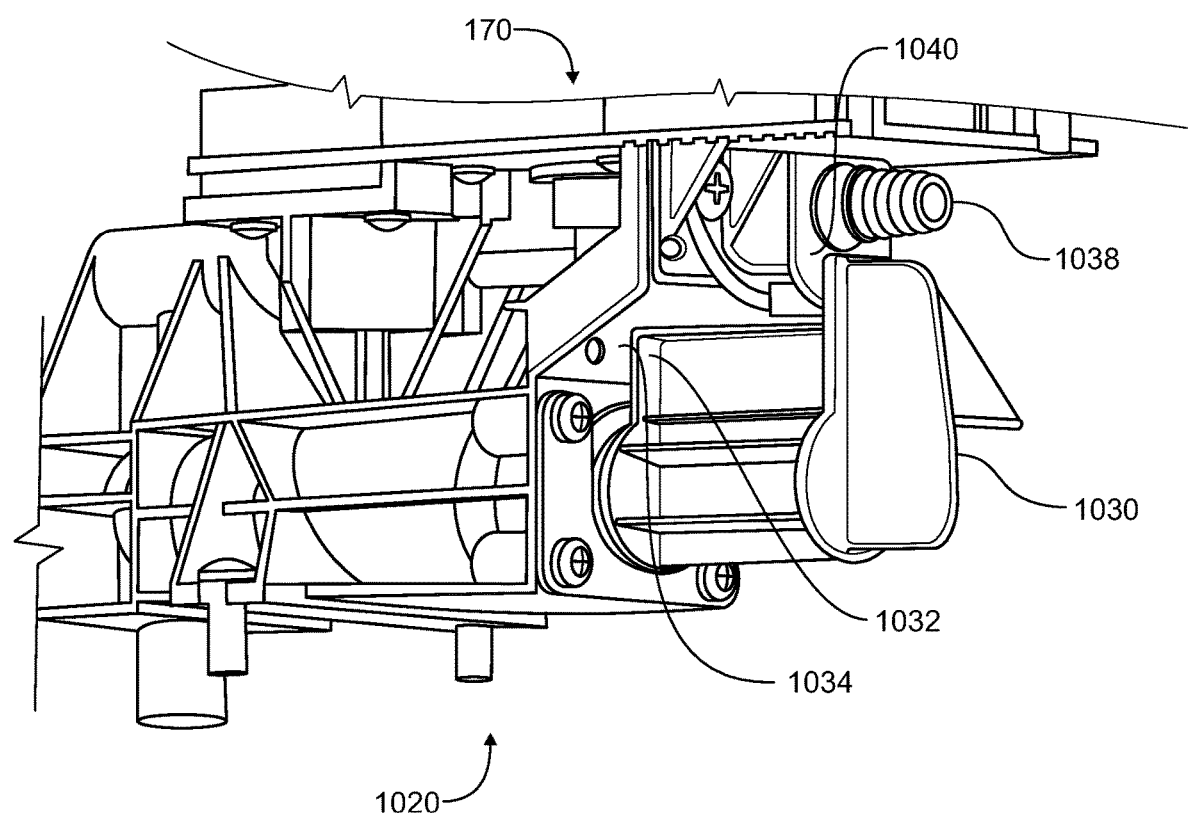
Figure 37C:
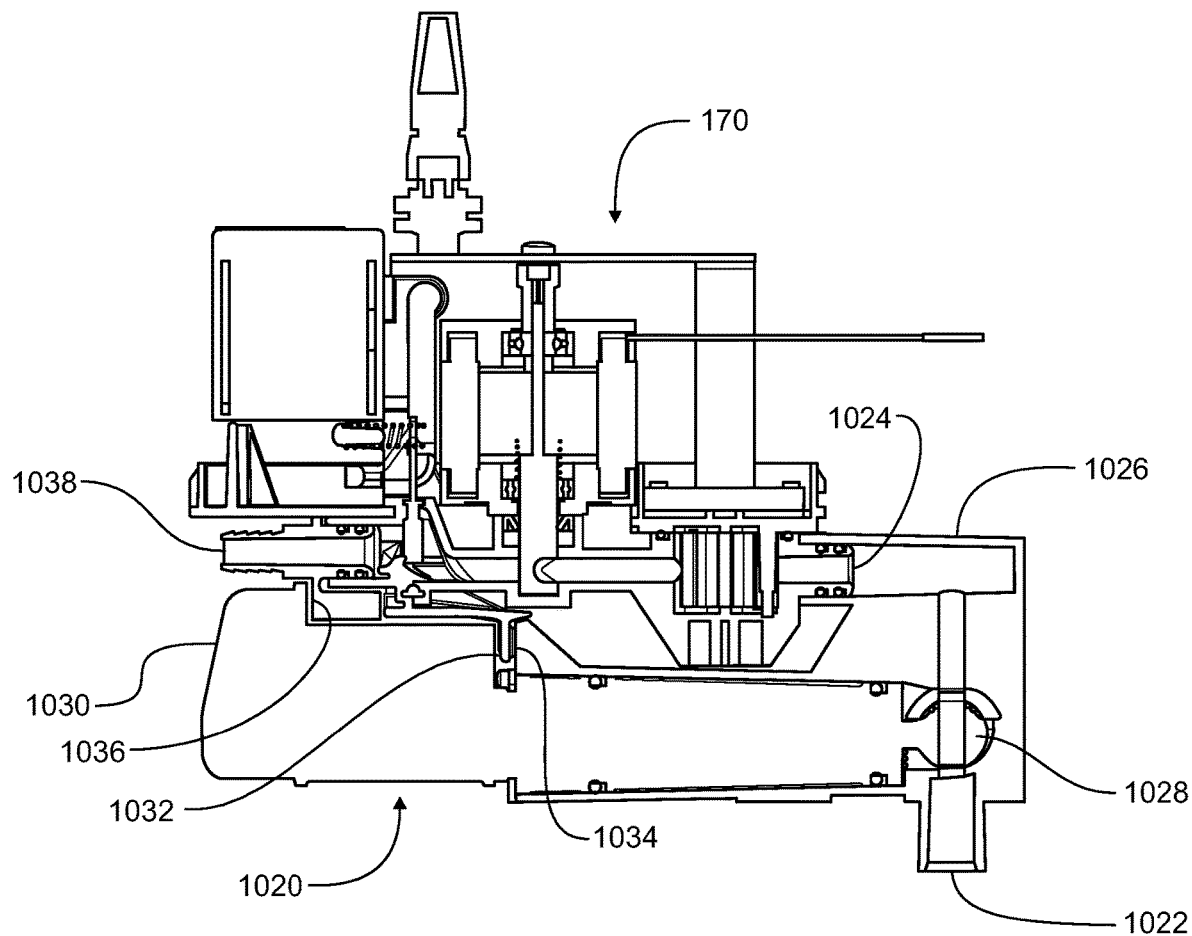

Referring also to FIGS. 37A, 37B, and 37C, flow control module 170 may be mechanically and fluidly coupled to upper cabinet portion 1004b via connection assembly 1020, generally. Connection assembly 1020 may include a supply fluid passage, e.g., which may be coupled to a high-volume ingredient supply (e.g., carbonated water 158, water 160, high-fructose corn syrup 162, etc) via inlet 1022. Inlet 1024 of flow control module 170 may be configured to be at least partially received in outlet passage 1026 of connection assembly 1020. Accordingly, flow control module 170 may receive high-volume ingredients via connection assembly 1020. Connection assembly 1020 may further include a valve (e.g., ball valve 1028) movable between an opened and closed position. When ball valve 1028 is in the opened position, flow control module 170 may be fluidly coupled to a high-volume ingredient supply. Similarly, when ball valve 1028 is in the closed position, flow control module 170 may be fluidly isolated from the high-volume ingredient supply.

Ball valve 1028 may be moved between the opened and closed position by rotatably actuating locking tab 1030. In addition to opening and closing ball valve 1028, locking tab 1030 may engage flow control module 170, e.g., thereby retaining flow control module relative to connection assembly 1020. For example, shoulder 1032 may engage tab 1034 of flow control module 170. Engagement between shoulder 1032 and tab 1034 may retain inlet 1024 of flow control module 170 in outlet passage 1026 of connection assembly 1020. Retaining inlet 1024 of flow control module 170 in outlet passage 1026 of connection assembly 1020 may additionally facilitate maintaining a fluid-tight connection between flow control module 170 and connection assembly 1020 (e.g., by maintaining satisfactory engagement between inlet 1024 and outlet 1026).

Locking tab face 1036 of locking tab 1030 may engage outlet connector 1038 (e.g., which may be fluidly coupled to an outlet of flow control module 170). For example, as shown, locking tab face 1036 may engage face 1040 of outlet connector 1038, retaining outlet connector 1038 in fluid tight engagement with flow control module 170.

Connection assembly 1020 may facilitate the installation/removal of flow control module 170 from processing system 10 (e.g., to allow replacement of a damaged/malfunctioning flow control module). Consistent with the depicted orientation, locking tab 1030 may be rotated counterclockwise (e.g., approximately one quarter of a turn in the illustrated embodiment). Counterclockwise rotation of locking tab 130 may disengage outlet connector 1038 and tab 1034 of flow control module 170. Outlet connector 1038 may be disengaged from flow control module 170. Similarly, inlet 1024 of flow control module 170 may be disengaged from outlet passage 1026 of connection assembly 1020. Additionally, counterclockwise rotation of locking tab 1030 may rotate ball valve 1028 to the closed position, thereby closing the fluid supply passage connected to the high-volume ingredient. As such, once locking tab 1030 is rotated to allow flow control module 170 to be removed from connection assembly 1020, the fluid connection to the high-volume ingredient is closed, e.g., which may reduce/prevent contamination of processing system by the high-volume ingredients. Tab extension 1042 of locking tab 1030 may inhibit the removal of flow control module 170 from connection assembly 1020 until ball valve 1028 is in a fully closed position (e.g., by preventing the fluid disengagement and removal of flow control module 170 until ball valve 1028 has been rotated 90 degrees to a fully closed position).

In a related manner, flow control module 170 may be coupled to connection assembly 1020. For example, with locking tab 1030 rotated counterclockwise, inlet 1024 of flow control module 170 may be inserted into outlet passage 1026 of connection assembly 1020. Outlet connector 1038 may be engaged with the outlet (not shown) of flow control module 170. Locking tab 1030 may be rotated clockwise, thereby engaging flow control module 170 and outlet connector 1038. In the clockwise rotated position, connection assembly 1020 may retain inlet 1024 of flow control module 170 in fluid tight connection with outlet passage 1026 of connection assembly. Similarly, outlet connector 1038 may be retained in fluid tight connection with the outlet of flow control module 170. Further, clockwise rotation of locking tab 1030 may move ball valve 1028 to the opened position, thereby fluidly coupling flow control module 170 to the high-volume ingredient.

Figure 38:
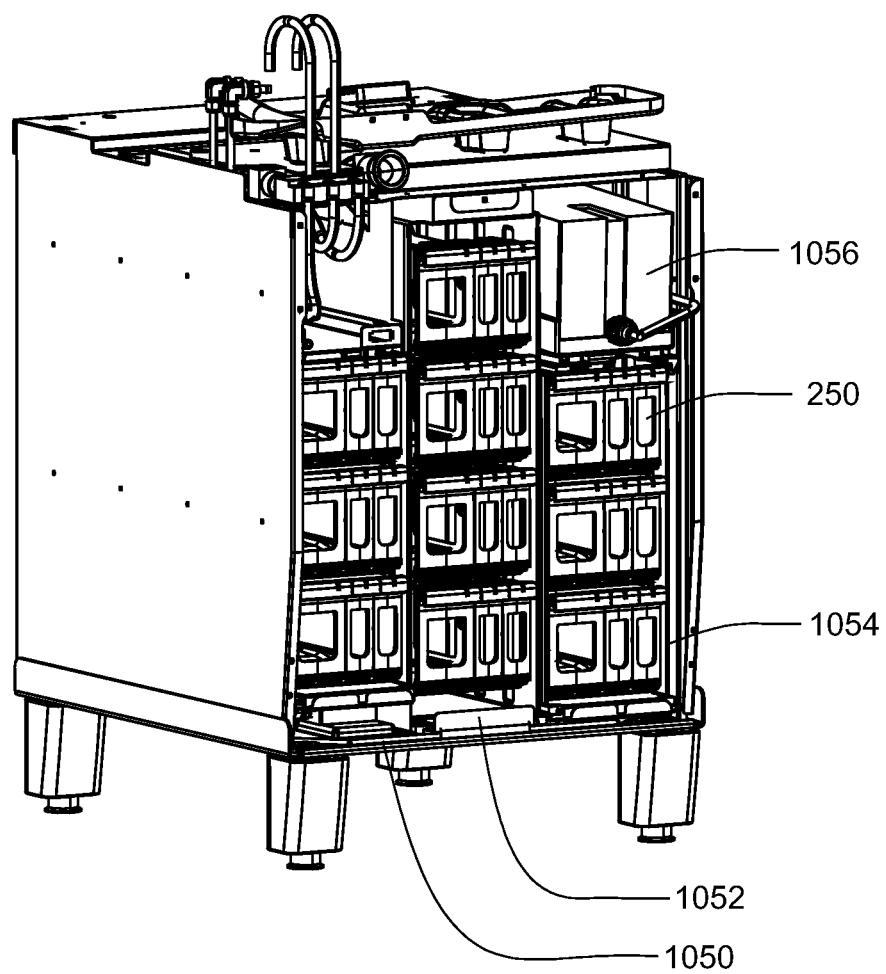
FIG. 38 is a diagrammatic view of the lower cabinet of the processing system of FIG. 30.

With additional reference also to FIG. 38, lower cabinet portion 1006a may include one or more features of microingredient subsystem 18, and may house one or more on-board consumable ingredient supplies. For example, lower cabinet portion 1006a may include one or more microingredient towers (e.g., microingredient towers 1050, 1052, 1054) and supply 1056 of non-nutritive sweetener (e.g., an artificial sweetener or combination of a plurality of artificial sweeteners). As shown, microingredient towers 1050, 1052, 1054 may include one or more product module assemblies (e.g., product module assembly 250), which may each be configured to releasably engage one or more product containers (e.g., product containers 252, 254, 256, 258, not shown). For example, microingredient towers 1050 and 1052 may each include three product module assemblies, and microingredient tower 1054 may include four product module assemblies.

Figure 39:
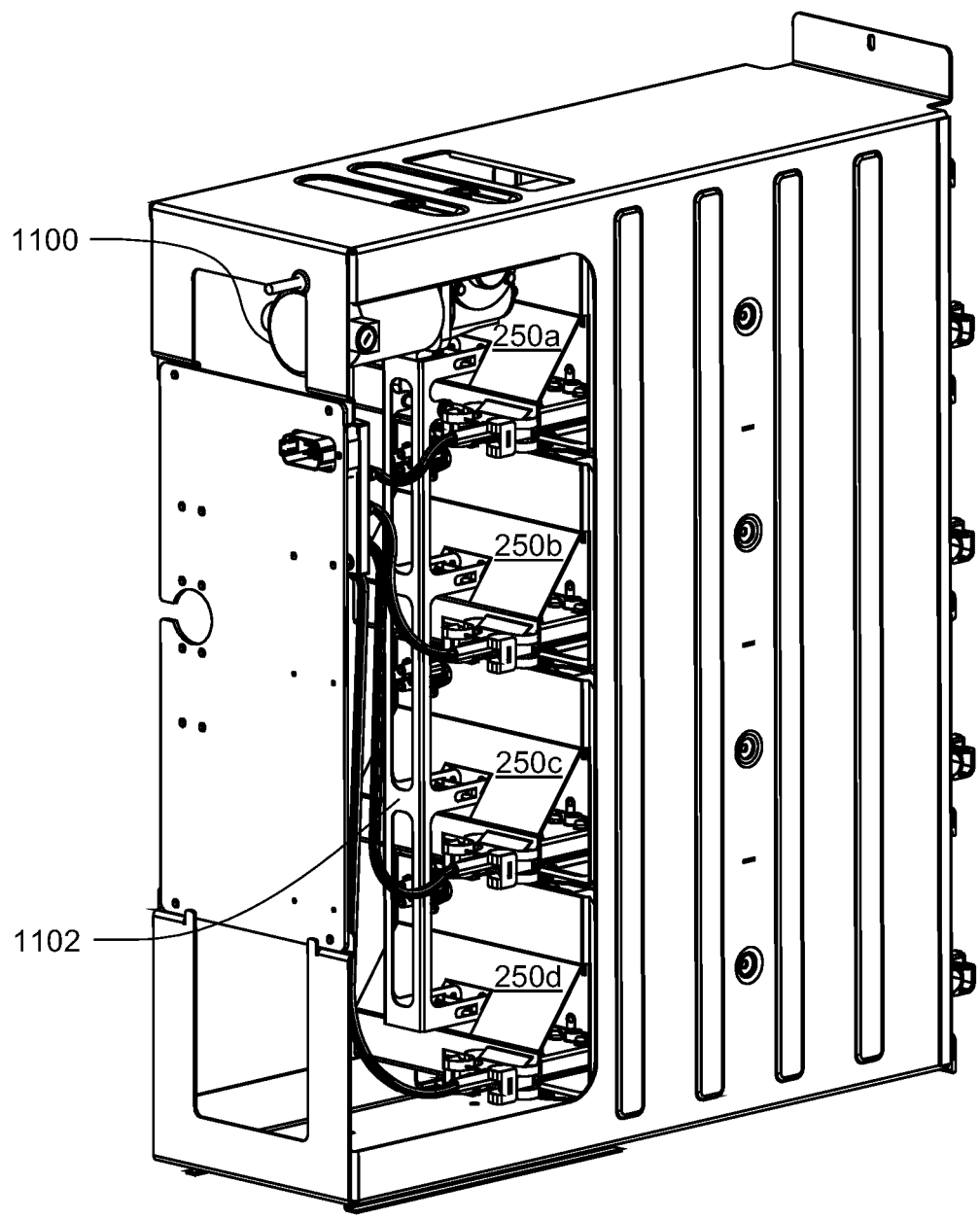
FIG. 39 is a diagrammatic view of a microingredient tower of the lower cabinet of FIG. 38.
Figure 40:
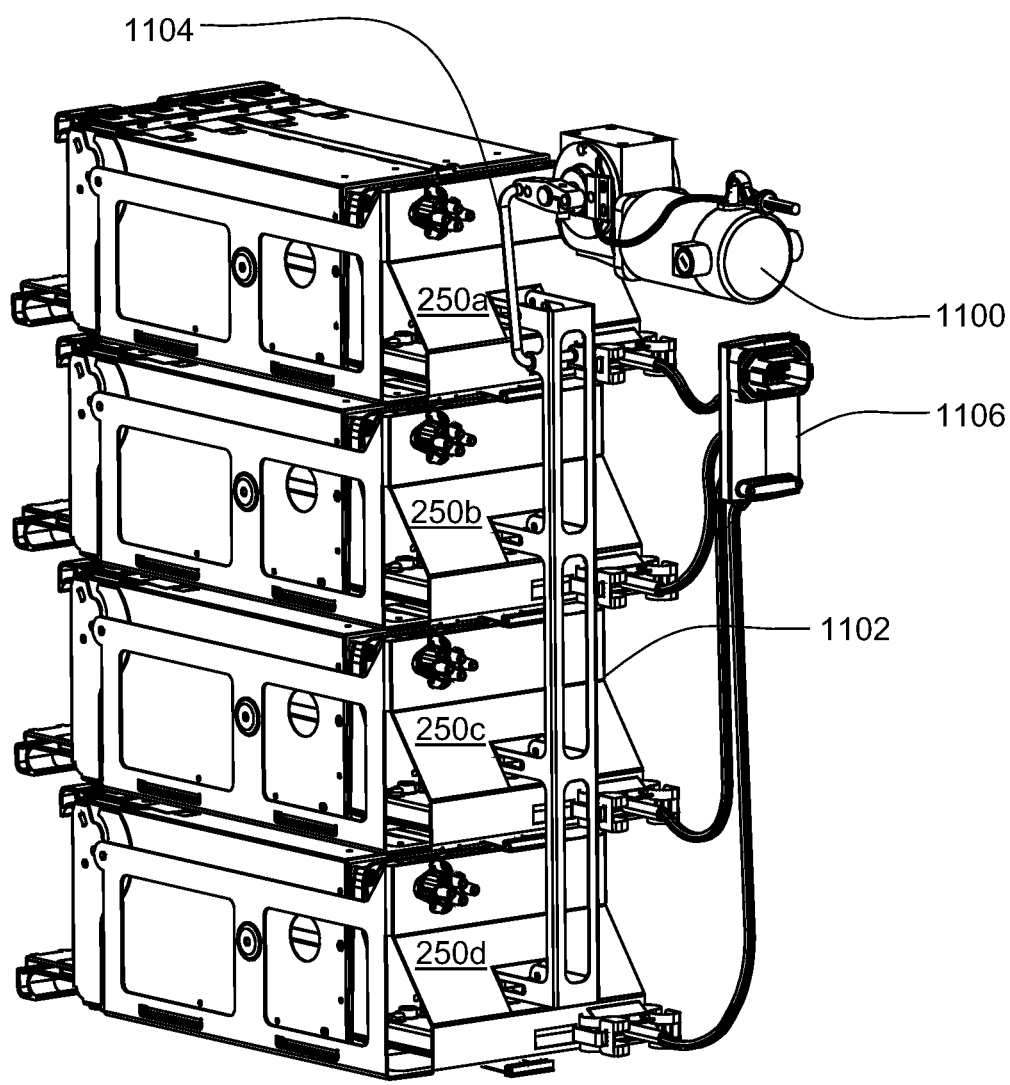
FIG. 40 is a diagrammatic view of a microingredient tower of the lower cabinet of FIG. 38.

Referring also to FIGS. 39 and 40, one or more of the microingredient towers (e.g., microingredient tower 1052) may be coupled to an agitation mechanism, e.g., which may rock, linearly slide, or otherwise agitate microingredient tower 1052, and/or a portion thereof. The agitation mechanism may aid in maintaining a mixture of separable ingredients stored on microingredient tower 1052. The agitation mechanism may include, for example, agitation motor 1100, which may drive agitation arm 1102 via linkage 1104. Agitation arm 1102 may be driven in a generally vertical oscillatory motion, and may be coupled to one or more product module assemblies (e.g., product module assemblies 250a, 250b, 250c, 250d), thereby imparting a rocking agitation to product module assemblies 250a, 250b, 250c, 250d. A safety shut-off may be associated with lower door 854, e.g., which may disable the agitation mechanism when lower cabinet door 1154 is open.

As discussed above, RFID system 700 may detect the presence, location (e.g., product module assembly and slot assembly) and contents of various product containers. Accordingly, RFID system 700 may render a warning (e.g., via RFID subsystem 724 and/or control logic subsystem 14) if a product container including contents that require agitation have been installed in a microingredient tower (e.g., microingredient tower 1052) that is not coupled to the agitation container. Further, control logic subsystem 14 may prevent the product container which is not being agitated from being utilized.

Figure 41:
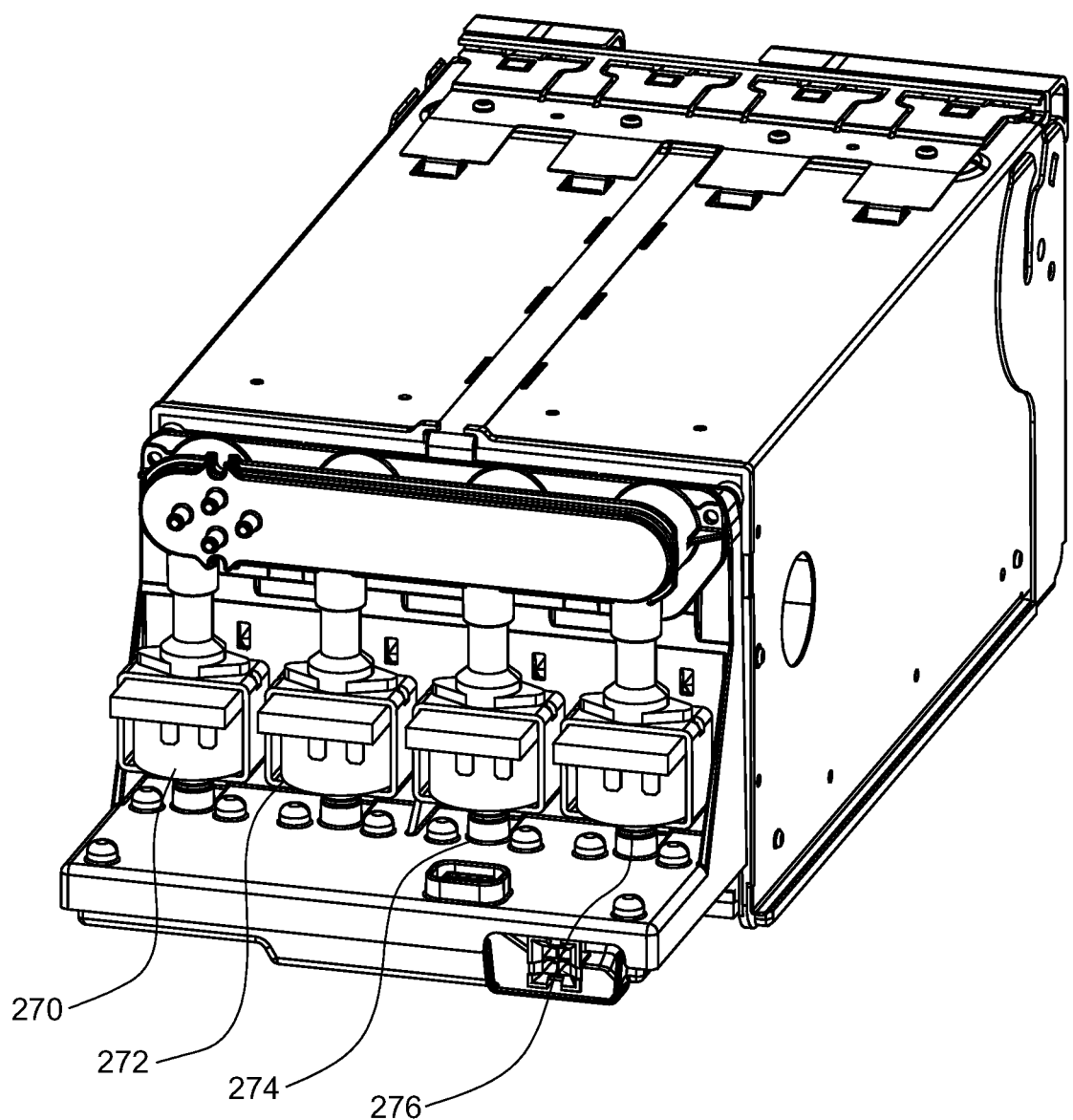
FIG. 41 is a diagrammatic view of a quad product module of the microingredient tower of FIG. 39.

As discussed above, the product module assemblies (e.g., product module assembly 250) may be configured with four slot assemblies, and may, therefore, be referred to as a quad product module and/or quad product module assembly. With additional reference also to FIG. 41, product module assembly 250 may include a plurality of pump assemblies (e.g., pump assemblies 270, 272, 274, 276). For example, one pump assembly (e.g., pump assemblies 270, 272, 274, 276) may be associated with each of the four slot assemblies of product module 250 (e.g., in the case of a quad product module). Pump assemblies 270, 272, 274, 276 may pump product from product containers (not shown) releasably engaged in corresponding slot assemblies of product module assembly 250.

As shown, each product module assembly (e.g., product module assemblies 250a, 250b, 250c, 250d) of the microingredient towers (e.g., microingredient tower 1052) may be coupled to a common wiring harness, e.g., via connector 1106. As such, microingredient tower 1052 may be electrically coupled to, for example, control logic subsystem 14, a power supply, etc., via a single connection point.

Figure 42:
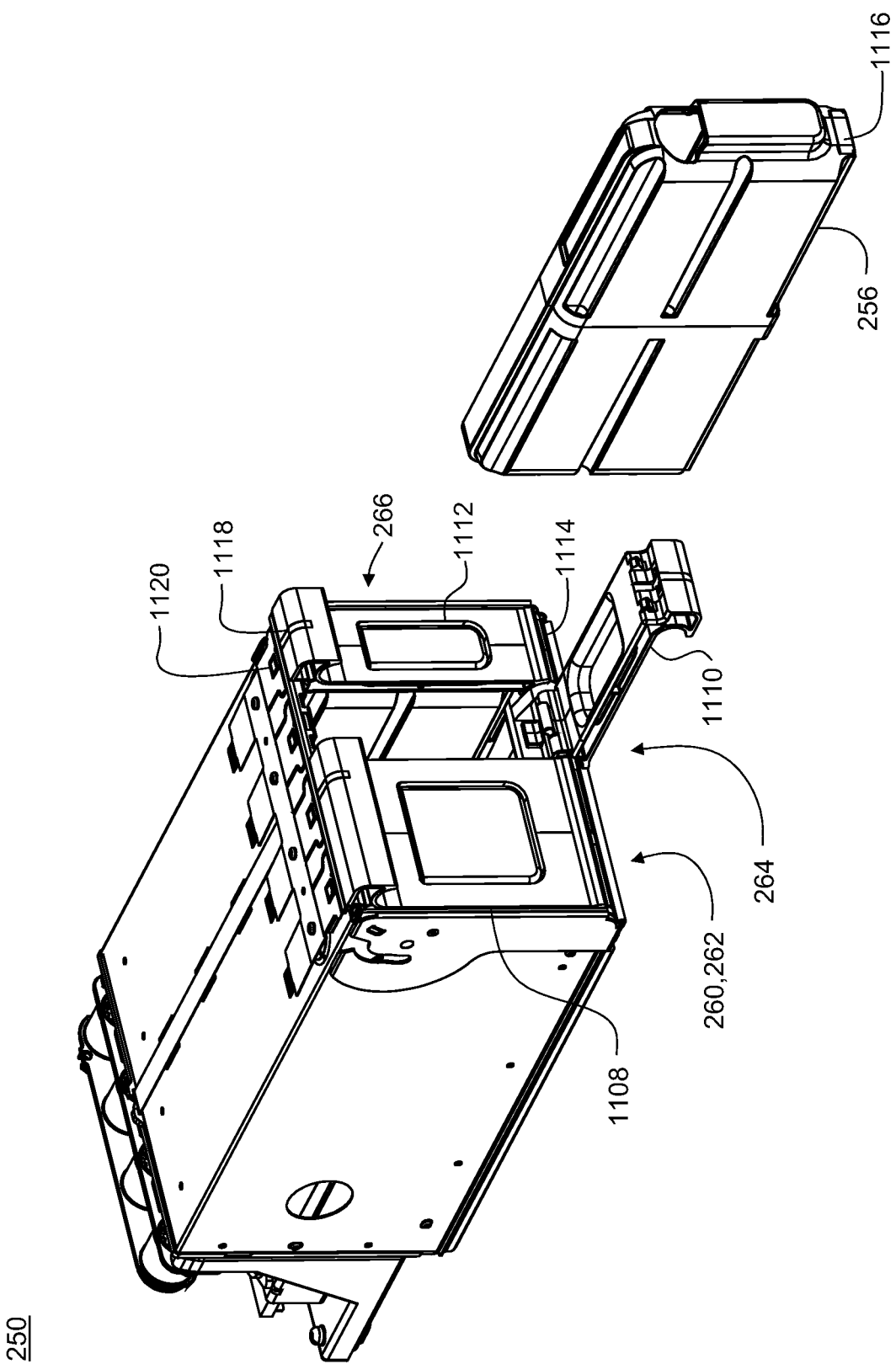
FIG. 42 is a diagrammatic view of a quad product module of the microingredient tower of FIG. 39.

Referring also to FIG. 42, as discussed above, product module 250 may include a plurality of slot assemblies (e.g., slot assemblies 260, 262, 264, 266). Slot assemblies 260, 262, 264, 266 may be configured to releasably engage a product container (e.g., product container 256). Slot assemblies 260, 262, 264, 266 may include respective doors 1108, 1110, 1112. As shown, two or more of the slot assemblies (e.g., slot assemblies 260, 262) may be configured to releasably engage a double wide product container (e.g., a product container configured to be releasably engaged in two slot assemblies), and/or two separate product containers including complimentary products (e.g., separate ingredients for a two ingredient beverage recipe). Accordingly, slot assemblies 260, 262 may include a double-wide door (e.g., door 1108) covering both slot assemblies 260, 262.

Doors 1108, 1110, 1112 may releasably engage a hinge rail to allow pivotal opening and closing of doors 1108, 1108, 1112. For example, doors 1108, 1110, 1112 may include a snap-fit feature, allowing doors 1108, 1108, 1112 to be snapped onto, and off of, the hinge rail. Accordingly, doors 1108, 1110, 1112 may be snapped onto, or off of, the hinge rail allow replacement of broken doors, reconfiguration of the doors (e.g., to replace a double-wide door with two single-wide doors, or vice versa).

Each door (e.g., door 1110) may include a tongue feature (e.g., tongue 1114) which may engage a cooperating feature of a product container (e.g., notch 1116 of product container 256). Tongue 1114 may transfer force to product container 256 (e.g., via notch 1116), and may assist insertion and removal of product container 256 into, and out of, slot assembly 264. For example, during insertion, product container 256 may be at least partially inserted into slot assembly 264. When door 1110 is closed, tongue 1114 may engage notch 1116, and transfer door closing force to product container 256, securing seating product container 256 in slot assembly 264 (e.g., as a result of the leverage provided by door 1110). Similarly, tongue 1114 may at least partially engage notch 1116 (e.g., may be at least partially captured by a lip of notch 1116), and may apply a removal force (e.g., again as a result of the leverage provided by door 1110) to product container 256.

Product module 250 may include one or more indicator lights, e.g., which may convey information regarding the status of a one or more slot assemblies (e.g., slot assemblies 260, 262, 264, 266. For example, each of the doors (e.g., door 1112) may include a light pipe (e.g., light pipe 1118) optically coupled to a light source (e.g., light source 1120). Light pipe 1118 may include, for example, a segment of clear or transparent material (e.g., a clear plastic such as acrylic, glass, etc.) that may transmit light from light source 1120 to the front of door 1112. Light source 1120 may include, for example, one or more LED's (e.g., a red LED and a green LED). In the case of a double-wide door (e.g., door 1108) only a single light pipe and single light source, associated with the single light pipe, corresponding to one of the slot assemblies may be utilized. The unused light source, corresponding to the other slot assembly of the double-wide door, may be blocked off by at least a portion of the door.

As mentioned, light pipe 1118 and light source 1120 may convey various information regarding the slot assembly, product container, etc. For example, light source 1120 may provide a green light (which may be conveyed via light pipe 1118 to the front of door 1112) to indicate an operational status of slot assembly 266 and a non-empty status of the product container releasably engaged in slot assembly 266. Light source 1120 may provide a red light (which may be conveyed via light pipe 1118 to the front of door 1112) to indicate that the product container releasably engaged in slot assembly 266 is empty. Similarly, light source 1120 may provide a flashing red light (which may be conveyed via light pipe 1118 to the front of door 1112) to indicate a malfunction or fault associated with slot assembly 266. Various additional/alternative information may be indicated using light source 1120 and light pipe 1118. Further, additional related lighting schemes may also be utilized (e.g., flashing green light, orange light resulting from the light source providing both a green and a red light, and the like).

Figure 43A:
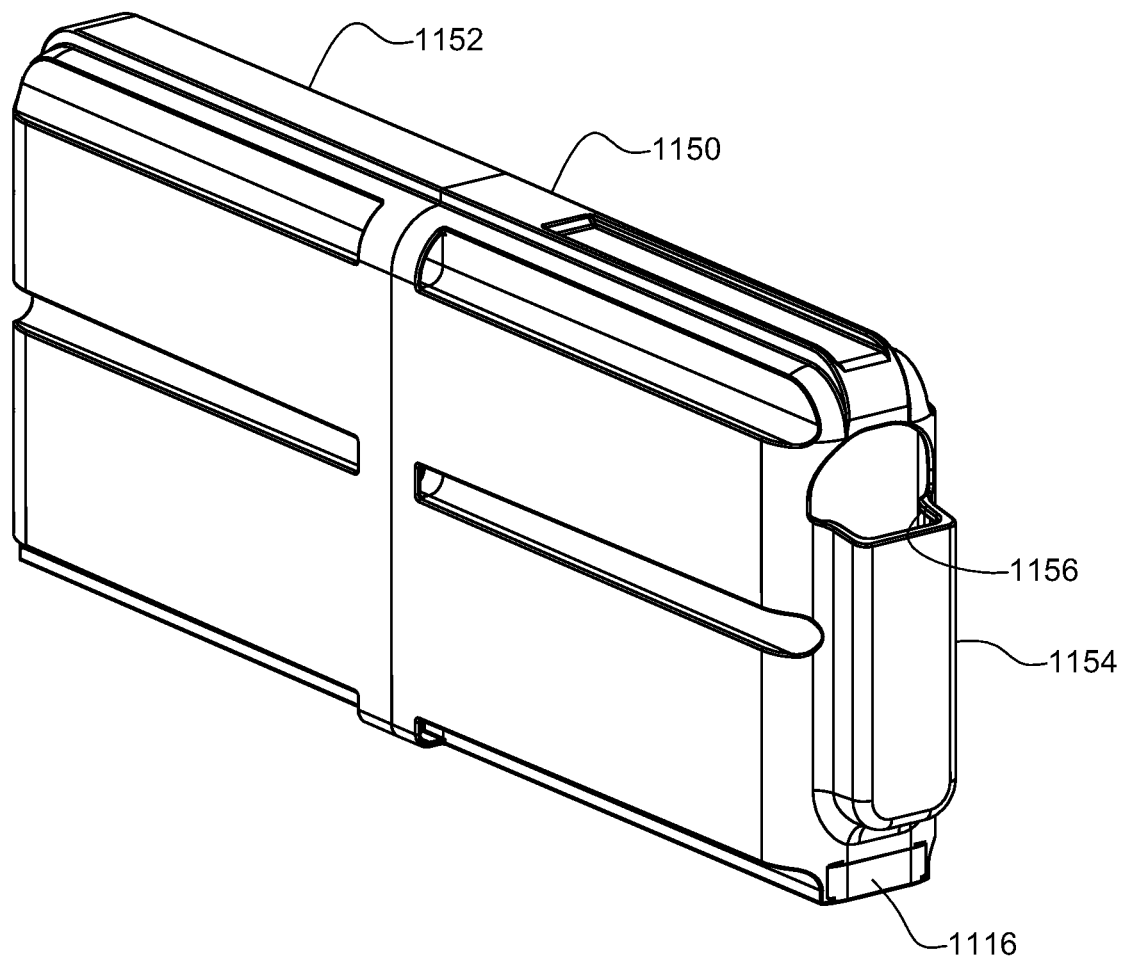
FIGS. 43A, 43B, and 43C are diagrammatic views of one embodiment of a microingredient container.
Figure 43B:
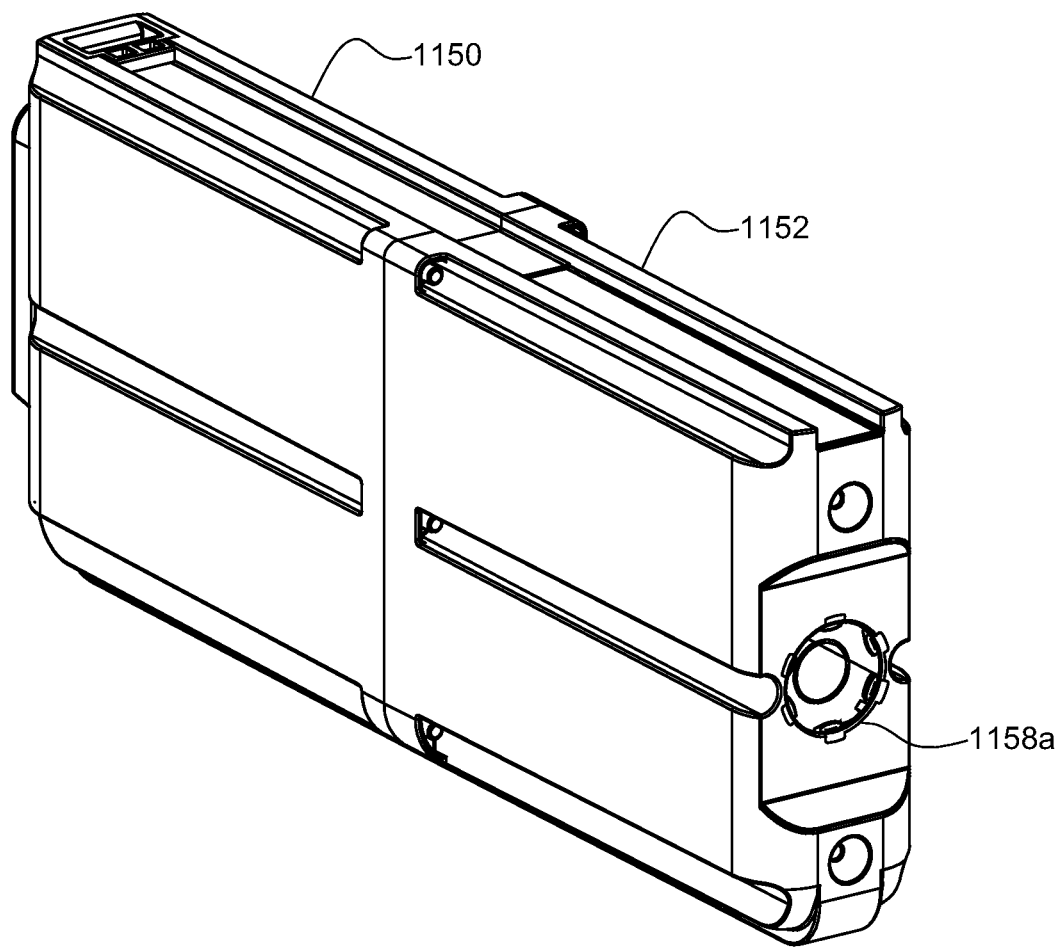
Figure 43C:
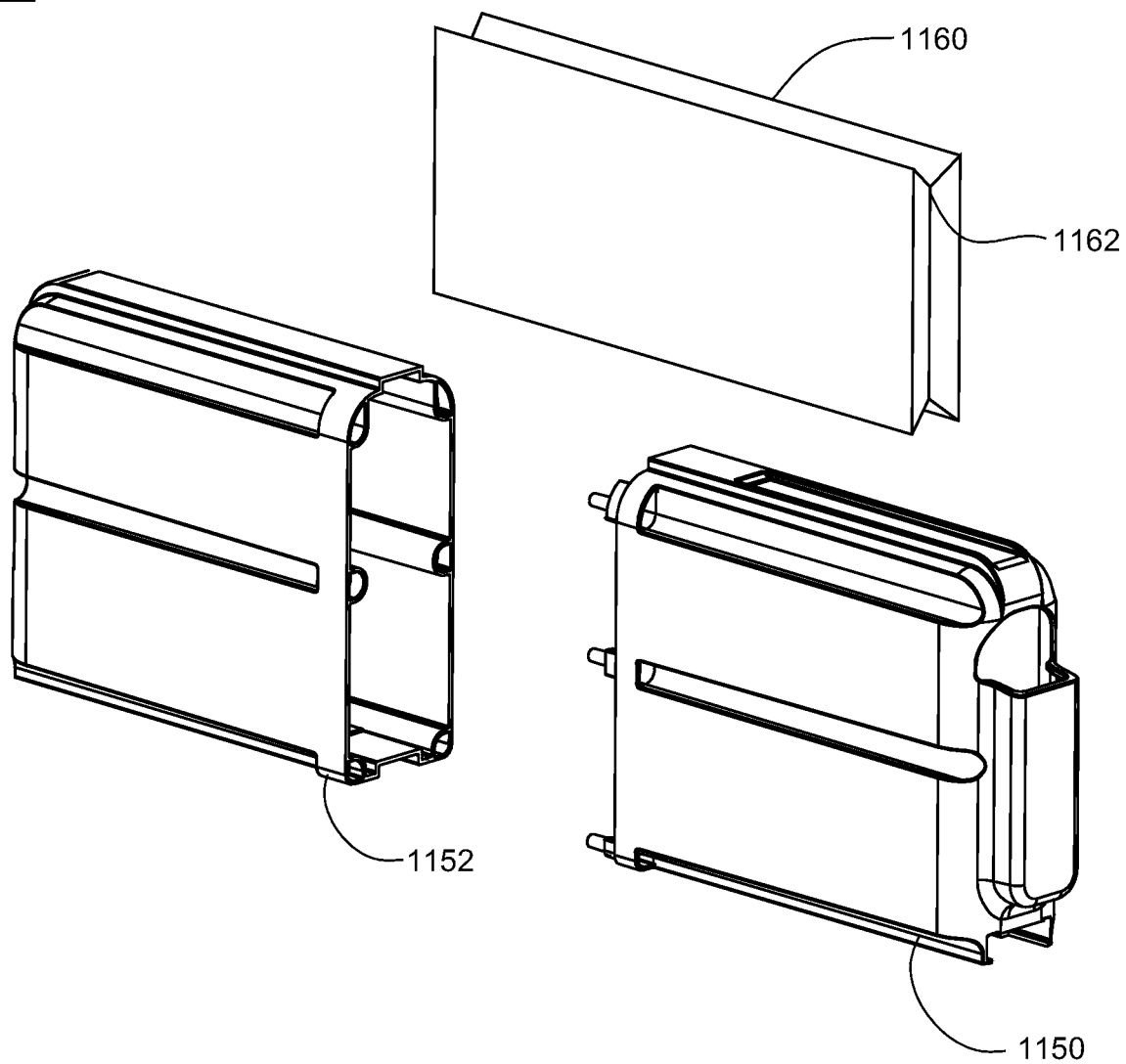

Referring also to FIGS. 43A, 43B, and 43C, product container 256 may, for example, include a two piece housing (e.g., include front housing portion 1150 and rear housing portion 1152). Front housing portion 1150 may include protrusion 1154, e.g., which may provide lip 1156. Lip 1156 may facilitate handling of product container 256 (e.g., during insertion and/or removal of product container from slot assembly 264).

Figure 44:
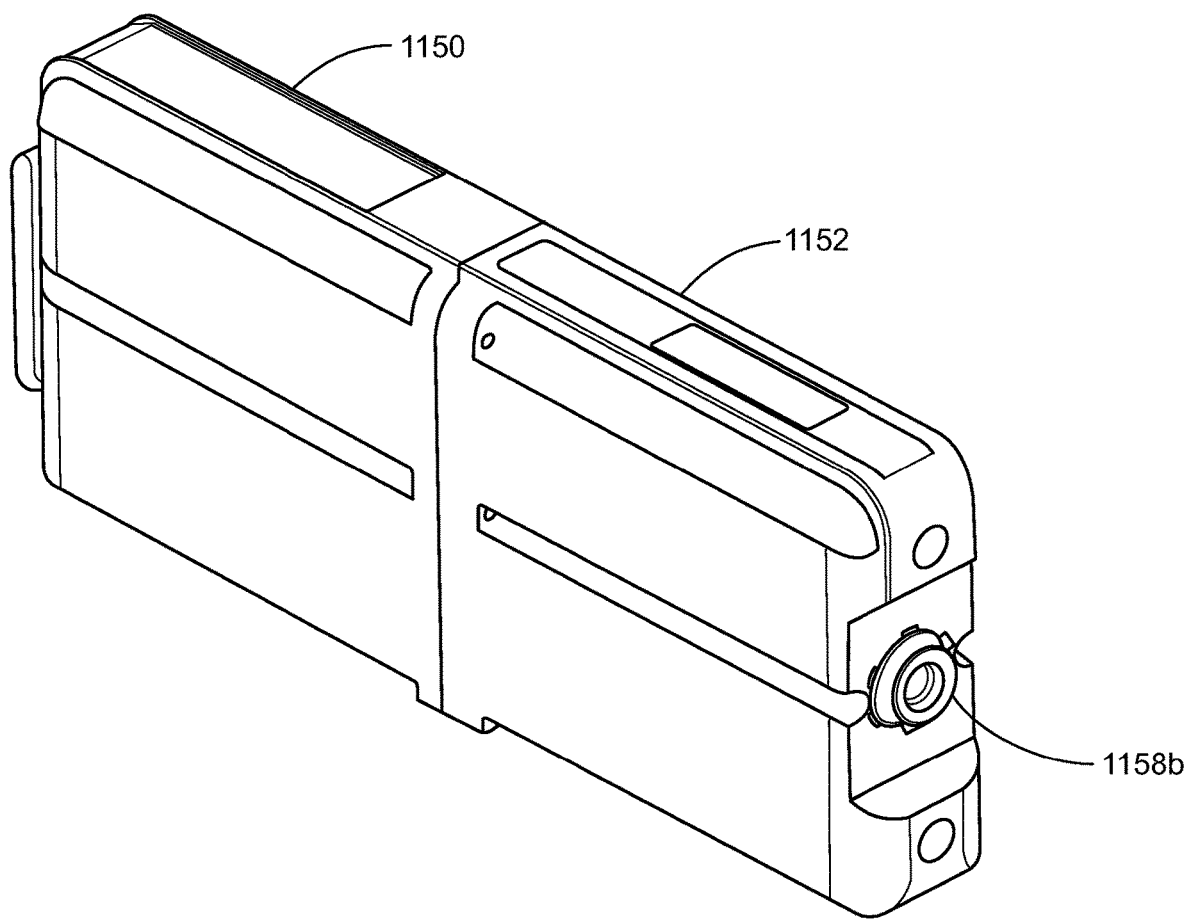
FIG. 44 is a diagrammatic view of another embodiment of a microingredient container.

Rear housing portion 1152 may include fitment feature 1158*a*, e.g., which may fluidly couple the product container (e.g., product container 256) to a mating fitment of a pump assembly (e.g., pump assembly 272 of product module 250). Fitment feature 1158*a* may include a blind mate fluid connector, which may fluidly couple product container 256 to pump assembly 272 when fitment feature is pressed onto a cooperating feature (e.g., a stem) of pump assembly 272. Various alternative fitment features (e.g., fitment feature 1158*b* depicted in FIG. 44) may be provided to provide fluid coupling between product container 256 and various pump assemblies.

Front housing portion 1150 and rear housing portion 1152 may include separate plastic components which may be joined to form product container 256. For example, front housing portion 1150 and rear housing portion 1152 may be heat staked together, adhesively bonded, ultrasonically welded, or otherwise joined in a suitable manner. Product container 256 may further include product pouch 1160, which may be at least partially disposed within front housing portion 1150 and rear housing portion 1152. For example, product pouch 1160 may be filled with a consumable (e.g., a beverage flavoring), and positioned within front housing portion 1150 and rear housing portion 1152, which may be subsequently joined to house product pouch 1160. Product pouch 1160 may include, for example, a flexible bladder that may collapse as the consumable is pumped from product pouch 1160 (e.g., by pump assembly 272).

Product pouch 1160 may include gussets 1162, which may improve the volumetric efficiency of product container 256, e.g., by allowing product pouch 1160 to occupy a relatively larger portion of the interior volume defined by front housing portion 1150 and rear housing portion 1152. Additionally, gussets 1162 may facilitate the collapse of product pouch 1162 as the consumable is pumped out of product pouch 1160. Additionally, fitment feature 1158*a* may be physically joined to product pouch 1160, e.g., via ultrasonic welding.

As mentioned above, in addition to the microingredient towers, lower cabinet portion 1006*a* may include supply 1056 of a large volume microingredient. For example, in some embodiments, the large volume microingredient may be a non-nutritive sweetener (e.g., an artificial sweetener or combination of a plurality of artificial sweeteners). Some embodiments may include microingredients in which larger volumes are required. In these embodiments, one or more large volume microingredient supplies may be included. In the embodiment as shown, supply 1056 may be a non-nutritive sweetener which may include, for example, a bag-in-box container, e.g., which is known to include a flexible bladder containing the non-nutritive sweetener product disposed within a generally rigid box, e.g., which may protect the flexible bladder against rupture, etc. For purposes of illustration only, the non-nutritive sweetener example will be used. However, in other embodiments, any microingredient may be stored in the large volume microingredient supply. In some alternate embodiments, other types of ingredients may be stored in a supply similar to supply 1056 as described herein. The term "large volume microingredient" refers to a microingredient identified as a frequent use microingredient in which, for the products being dispensed, is used frequently enough that a greater than one microingredient pump assembly is used.

Supply 1056 of non-nutritive sweetener may be coupled to a product module assembly, e.g., which may include one or more pump assemblies (e.g., as previously described above). For example, supply 1056 of non-nutritive sweetener may be coupled to a product module including four pump assemblies as described above. Each of the four pump assemblies may include a tube or line directing non-nutritive sweetener from the respective pump assembly to nozzle 24, for dispensing the non-nutritive sweetener (e.g., in combination with one or more additional ingredients).

Figure 45A:
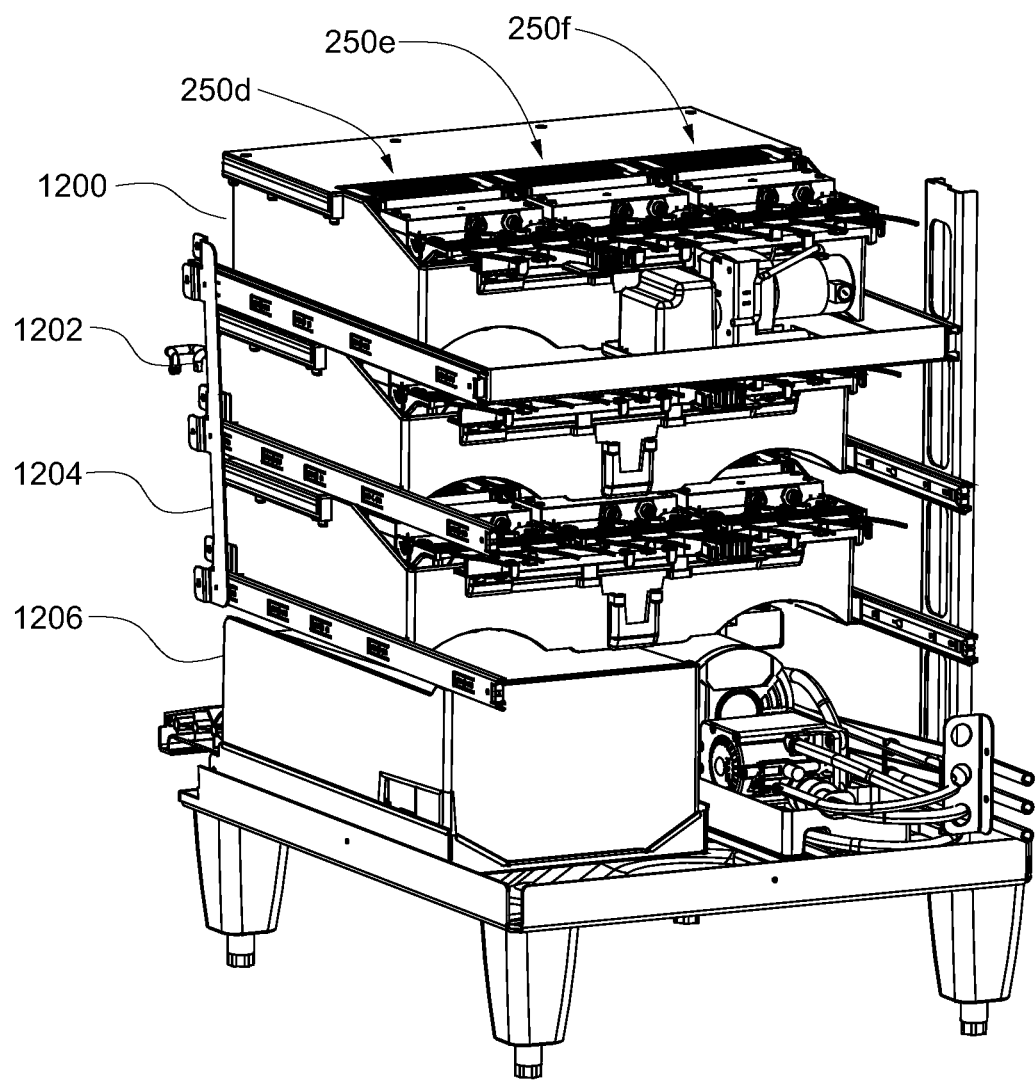
FIGS. 45A and 45B diagrammatically depict an alternative embodiment of a lower cabinet of the processing system of FIG. 30.
Figure 45B:
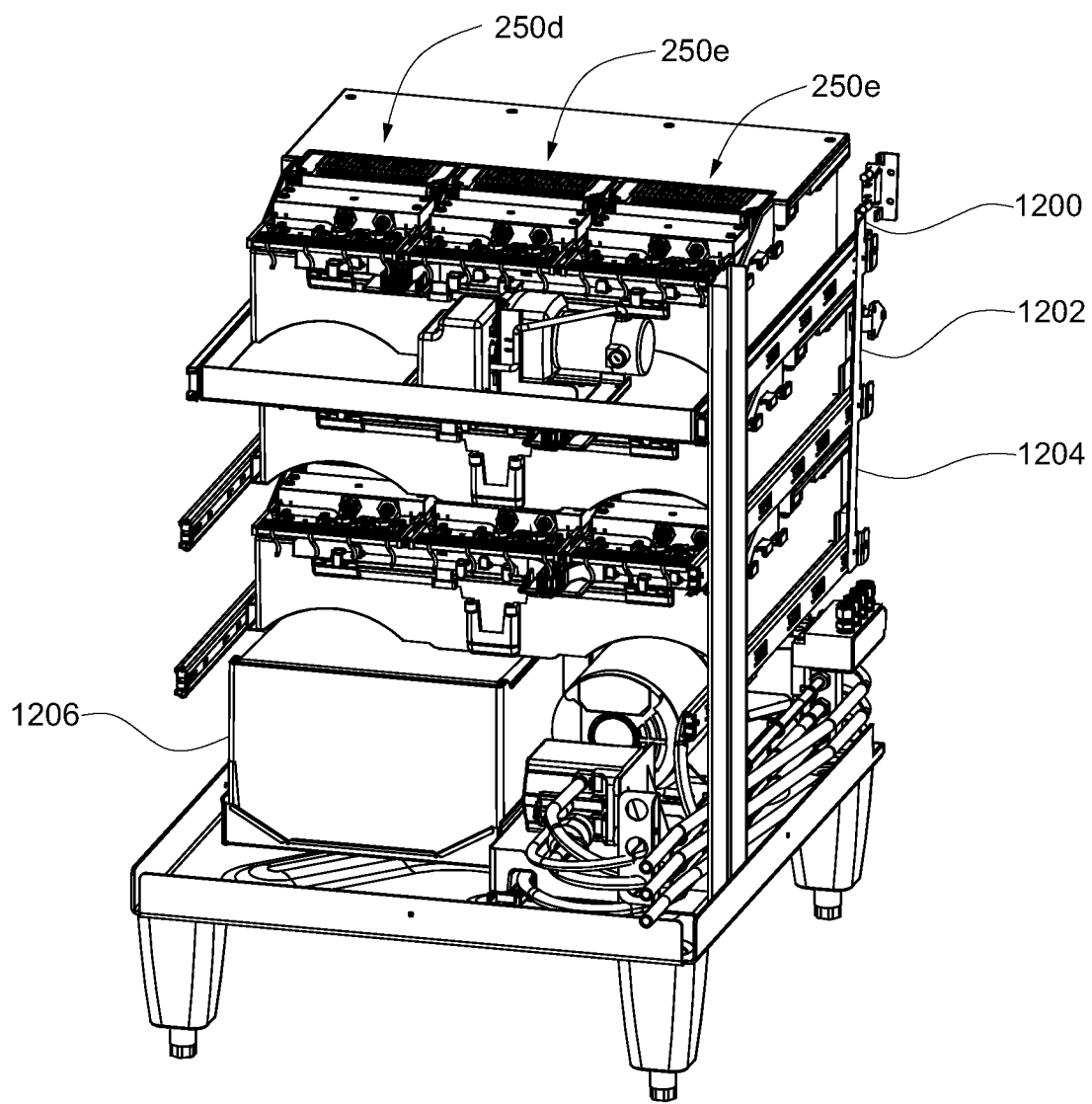
Figure 46A:
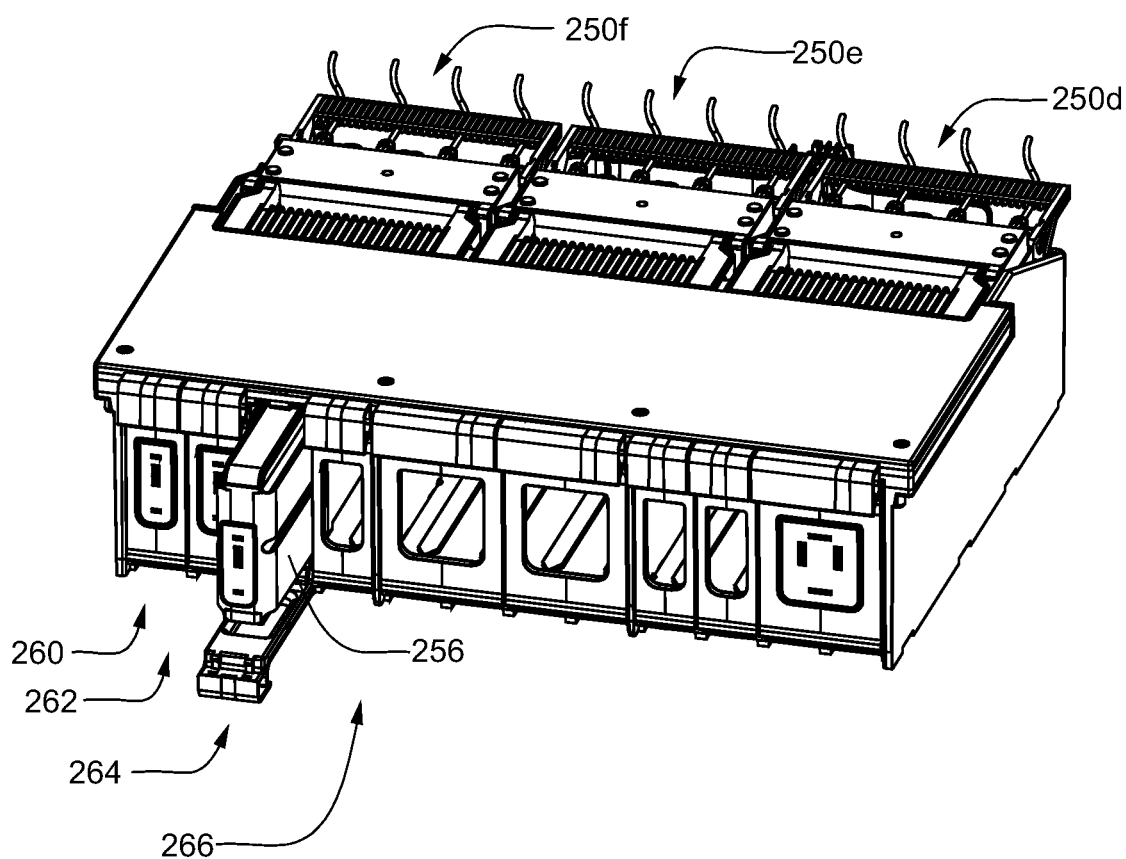
FIGS. 46A, 46B, 46C, and 46D diagrammatically depict one embodiment of a microingredient shelf of the lower cabinet of FIGS. 45A and 45B.
Figure 46B:
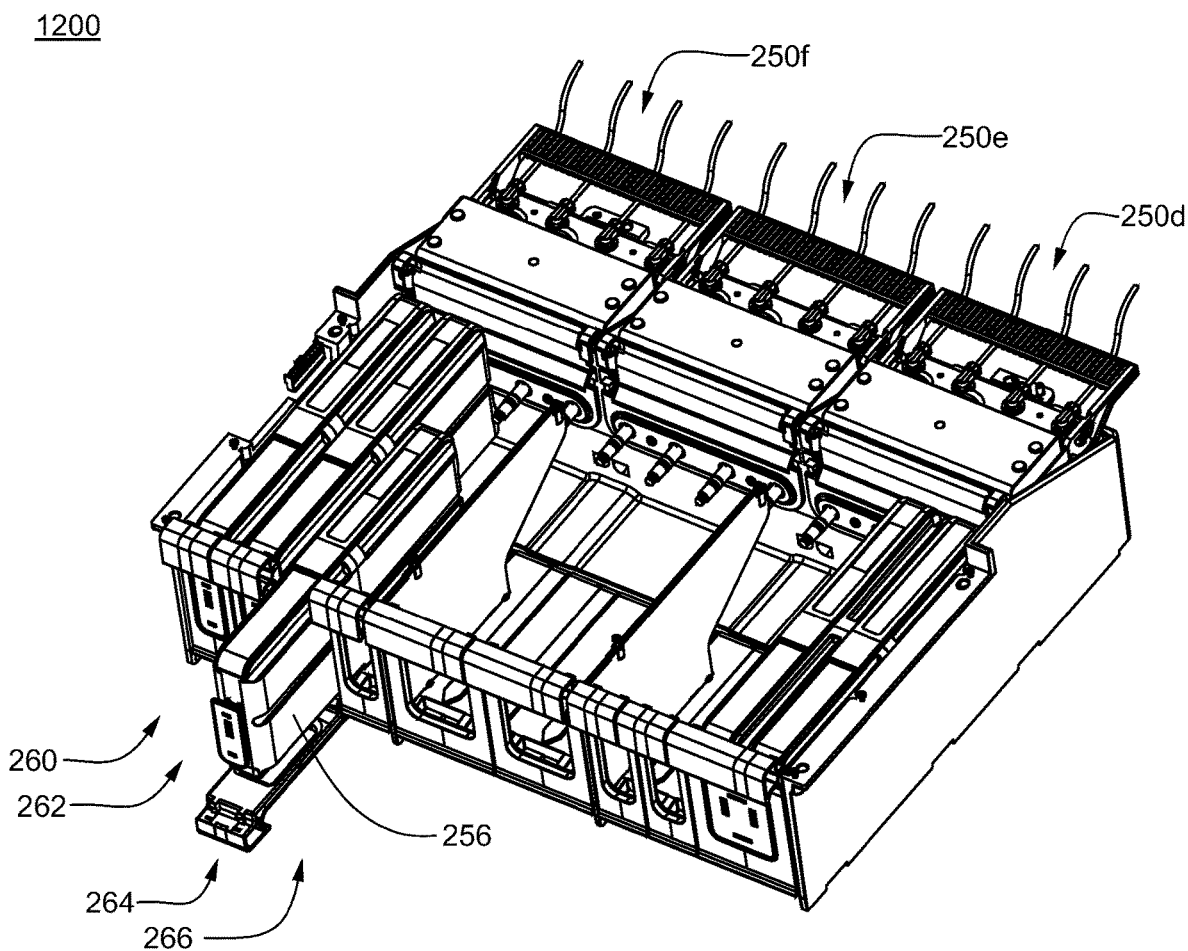
Figure 46C:
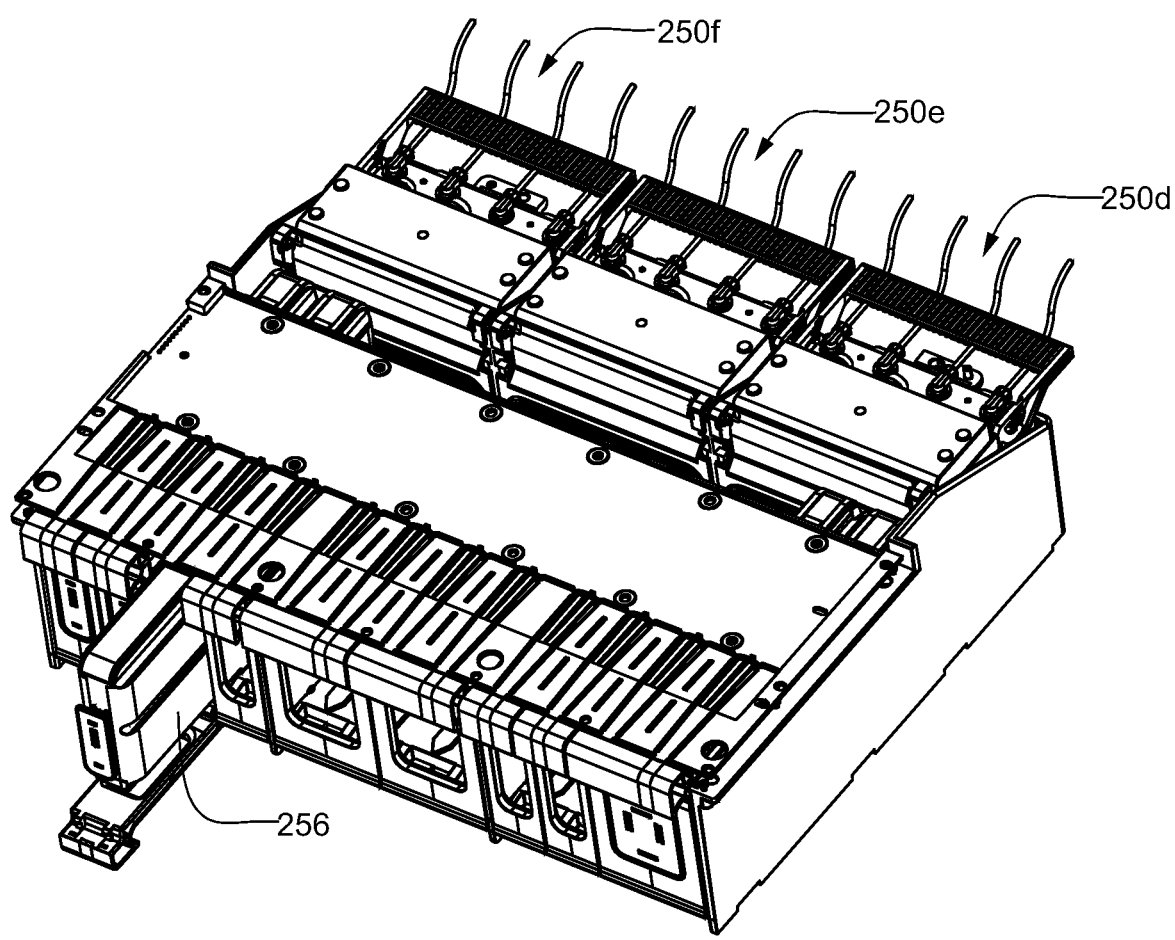
Figure 46D:
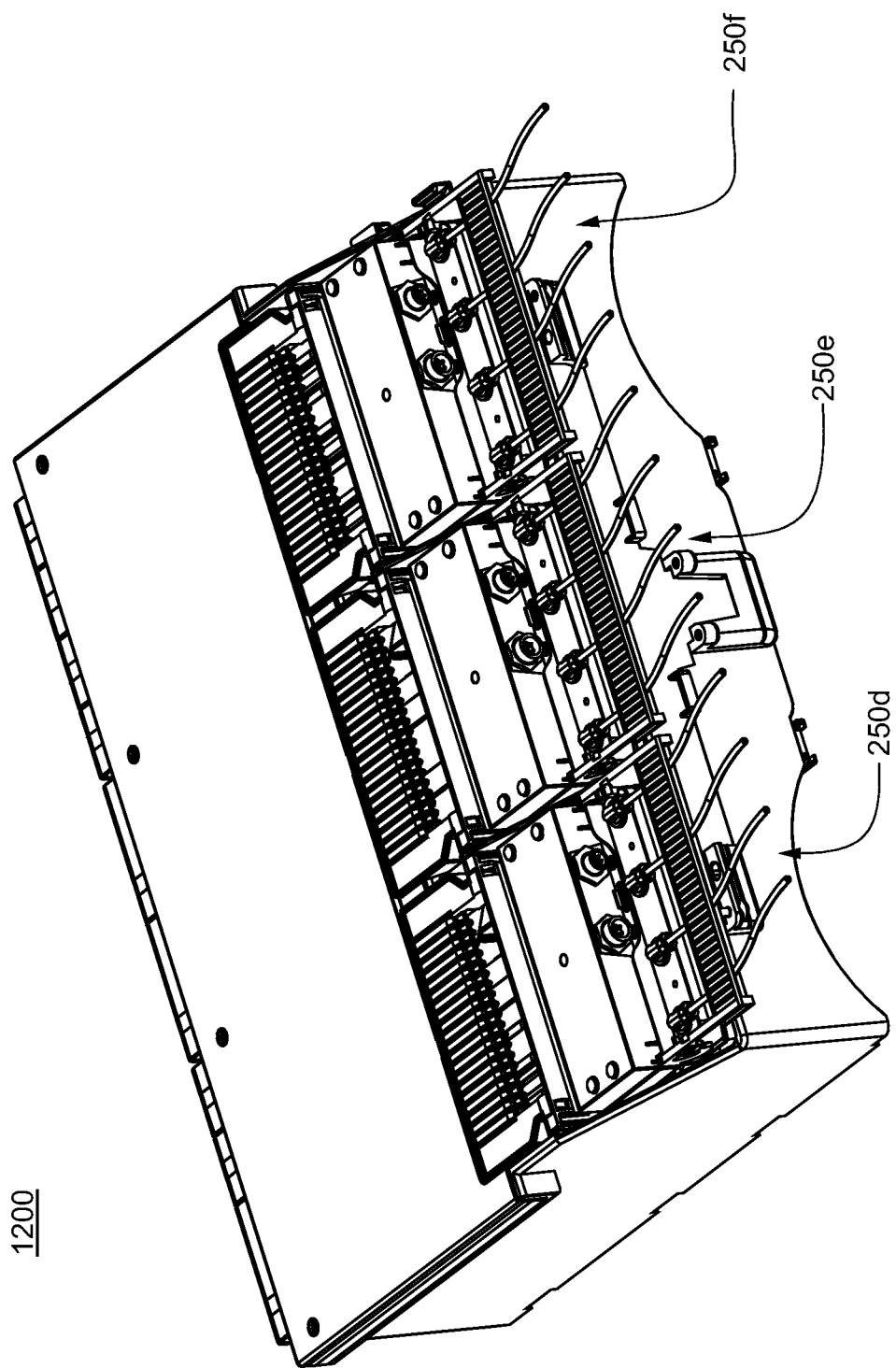

Referring to FIGS. 45A and 45B, lower cabinet portion 1006*b* may include one or more features of microingredient subsystem 18. For example, lower cabinet portion 106*b* may house one or more microingredient supplies. The one or more microingredient supplies may be configured as one or more microingredient shelves (e.g., microingredient shelves 1200, 1202, 1204) and a supply 1206 of non-nutritive sweetener. As shown, each microingredient shelf (e.g., microingredient shelf 1200) may include one or more product module assemblies (e.g., product module assemblies 250*d*, 250*e*, 250*f*) configured in a generally horizontal arrangement. One or more of the microingredient shelves may be configured to agitate (e.g., in a generally similar manner to microingredient tower 1052 described above).

Continuing with the above-described embodiment, in which the one or more microingredient supplies may be configured as one or more microingredient shelves, and as discussed above, shelf 1200 may include a plurality of product module assemblies (namely, product module assemblies 250*d*, 250*e*, 250*f*). Each product module assembly (e.g., product module assembly 250*f*) may be configured to releasably engage one or more product containers (e.g., product container 256) in a respective slot assembly (e.g., slot assemblies 260, 262, 264, 266).

Additionally, each of product module assemblies 250*d*, 250*e*, 250*f* may include a respective plurality of pump assemblies. For example, and referring also to FIGS. 47A, 47B, 47D, 47E, and 47F, product module assembly 250*d* may generally include pump assemblies 270*a*, 270*b*, 270*d*, and 270*e*. A respective one of pump assemblies 270*a*, 270*b*, 270*c*, 270*d* may be associated with one of slot assemblies 260, 262, 264, 266, e.g., for pumping ingredients contained within a respective product container (e.g., product container 256). For example, each of pump assemblies 270*a*, 270*b*, 270*c*, 270*d* may include a respective fluid coupling stem (e.g., fluid coupling stems 1250, 1252, 1254, 1256), e.g., which may fluidly couple to a product container (e.g., product container 256) via a cooperating fitment (e.g., fitment feature 1158*a*, 1158*b* shown in FIGS. 43B and 44).

Figure 47A:
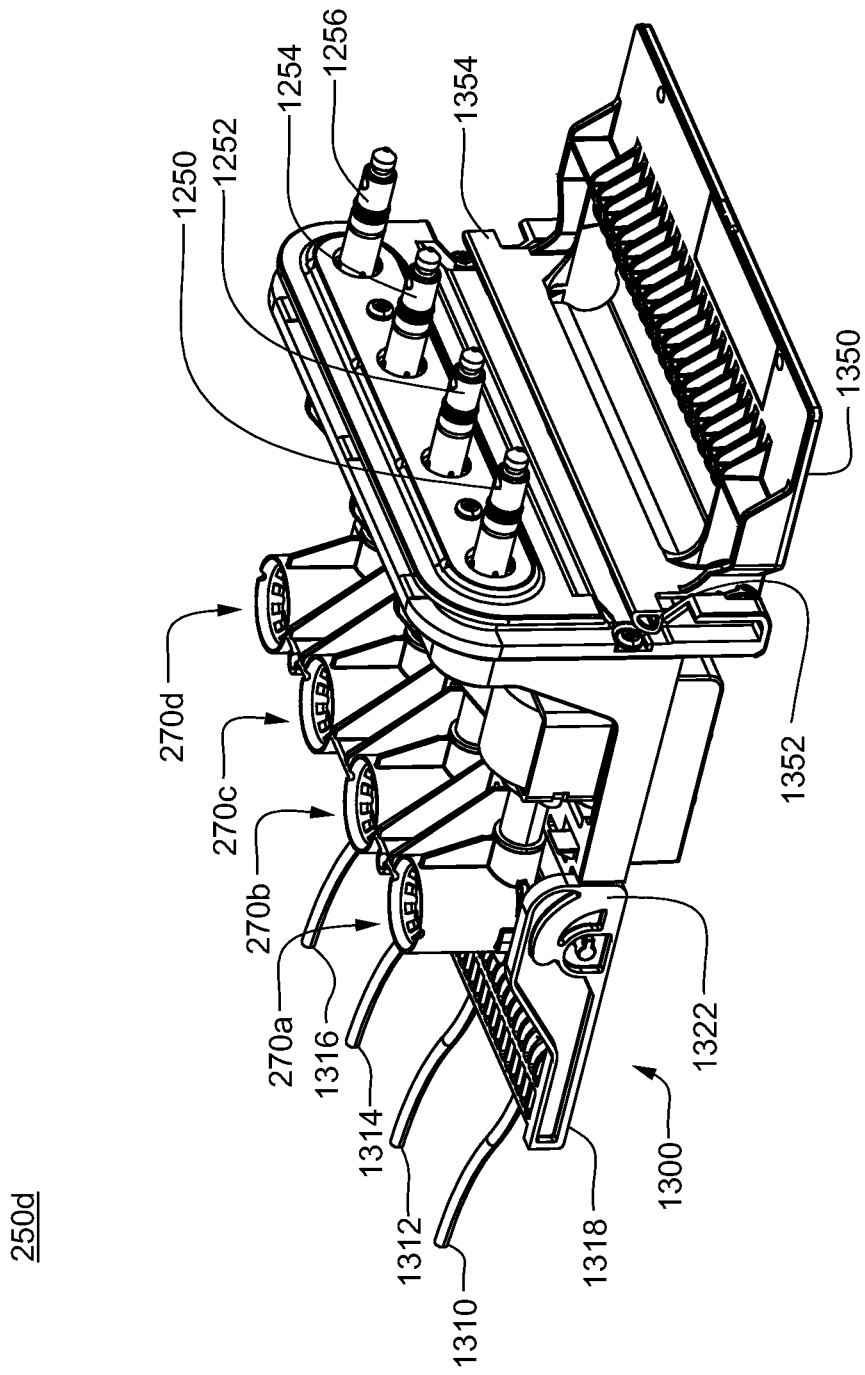
FIGS. 47A, 47B, 47C, 47D, 47E, and 47F diagrammatically depict a quad product module of the microingredient shelf of FIGS. 46A, 46B, 46C, and 46D.
Figure 47B:
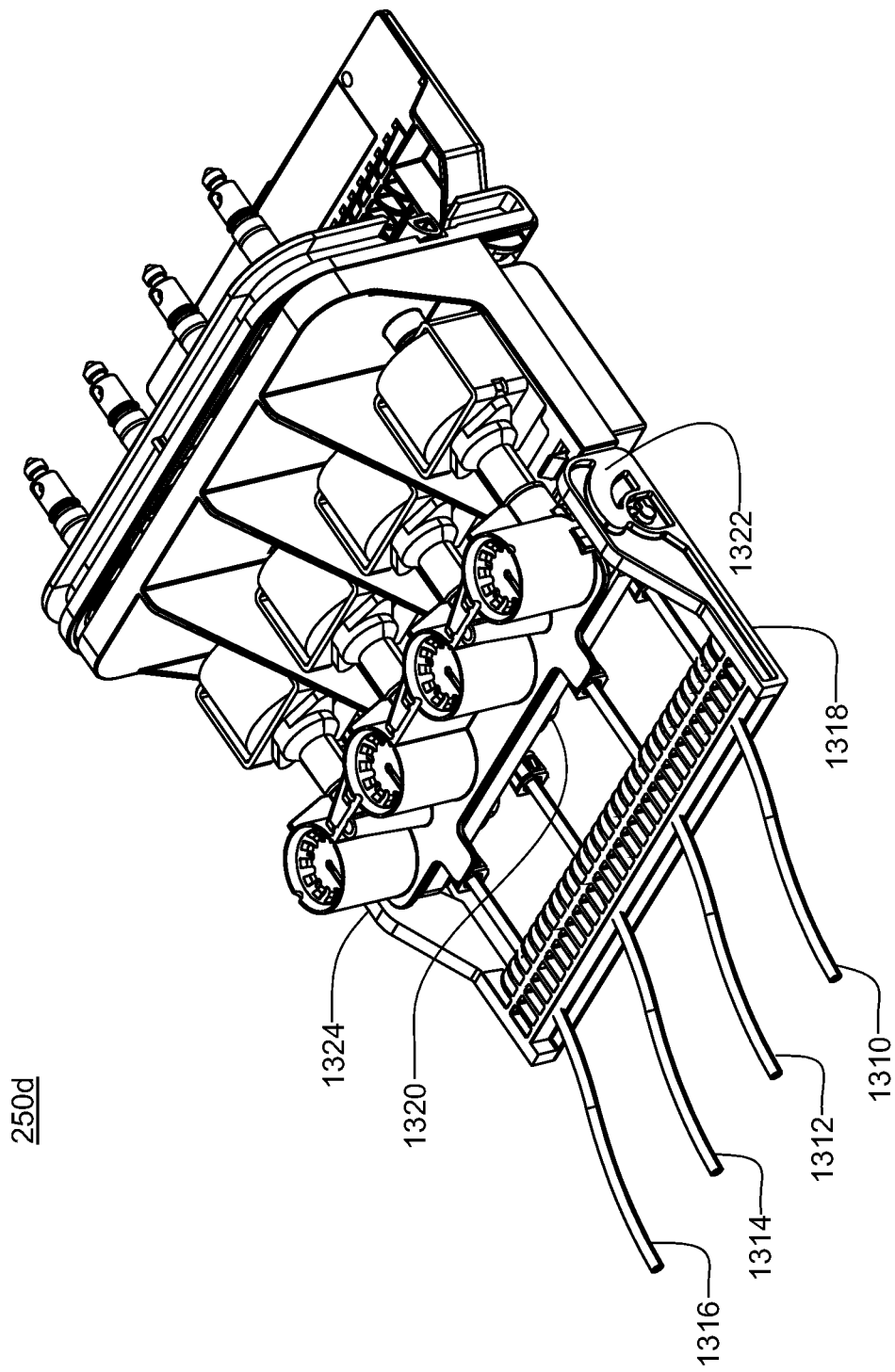
Figure 47C:
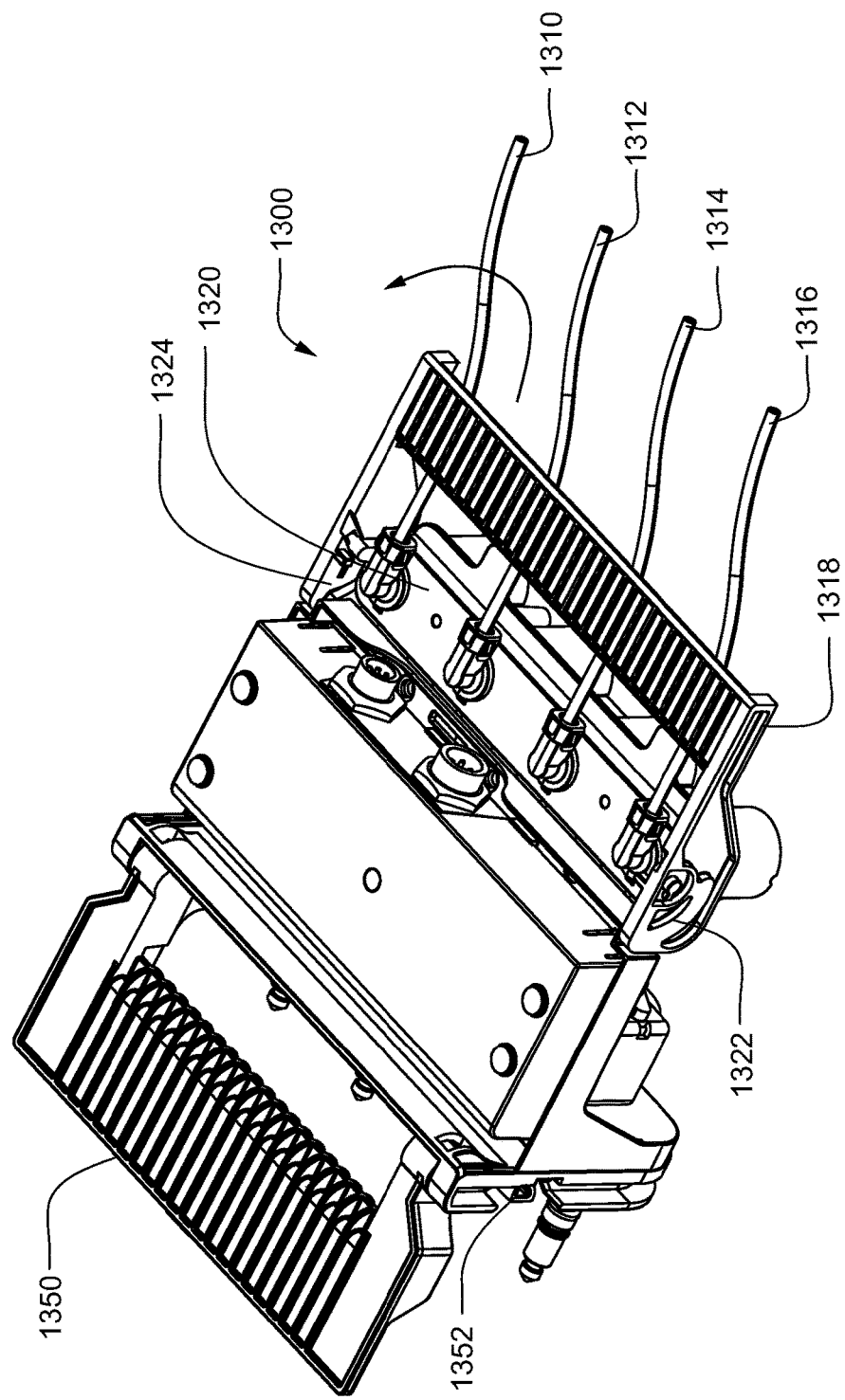
Figure 47D:
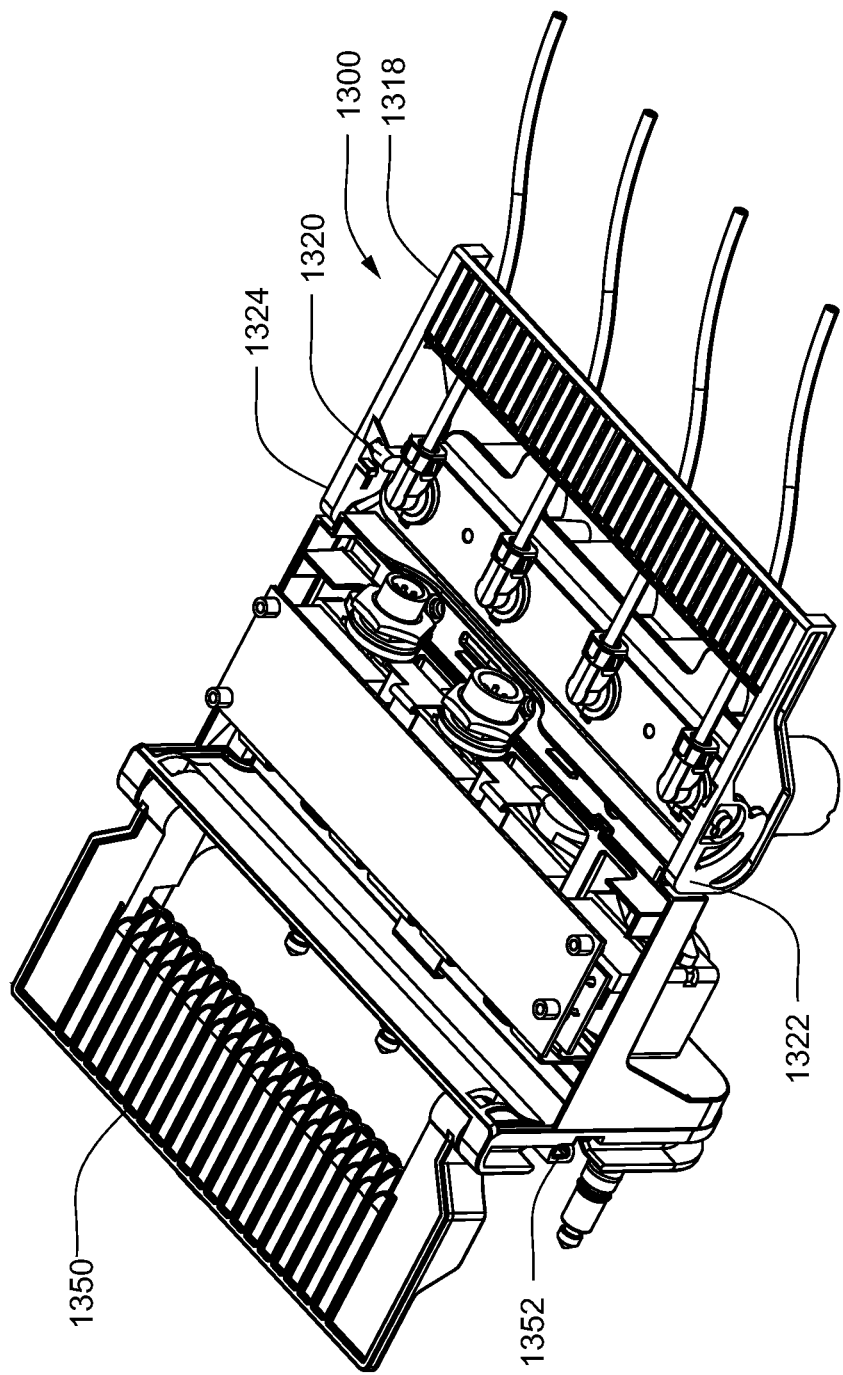
Figure 47E:
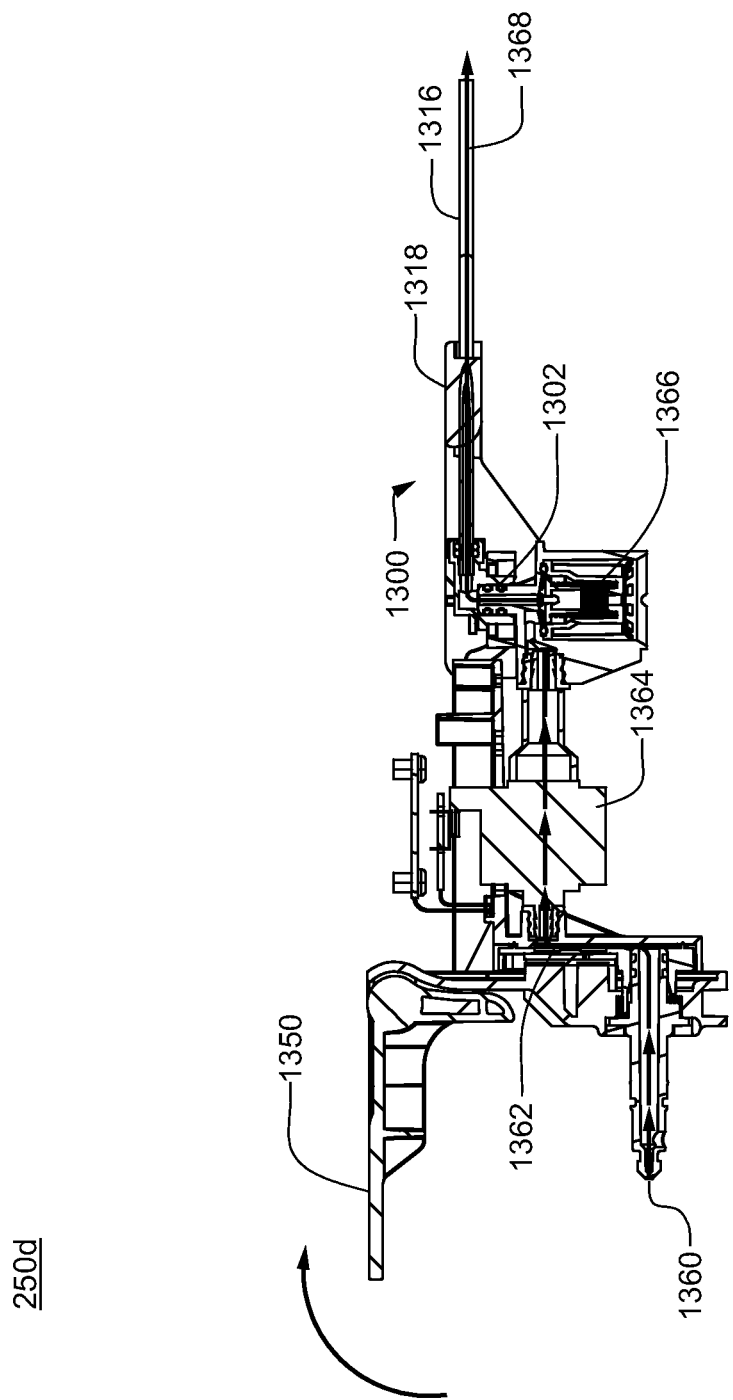

Referring to FIG. 47E, a cross sectional view of the pump module assembly 250d is shown. The assembly 250d includes a fluid inlet 1360 which is shown in the cross sectional view of the fitment. The fitment mates with the female part (shown in FIG. 43B as 1158a) of the product containers (not shown, shown as 256 in FIG. 43B, amongst other figures). The fluid from the product container enters the pump assembly 250d at the fluid inlet 1360. The fluid flows into the capacitive flow sensor 1362 and then through the pump 1364, past the backpressure regulator 1366 and to the fluid outlet 1368. As shown herein, the fluid flow path through the pump module assembly 250d allows the air to flow through the assembly 250d without being trapped within the assembly. The fluid inlet 1360 is on a lower plane than the fluid exit 1368. Additionally, the fluid travels vertically towards the flow sensor and then when traveling in the pump, is again at a higher plane than the inlet 1360. Thus, the arrangement allows the fluid to continually flow upwards allowing air to flow through the system without getting trapped. Thus, the pump module assembly 250d design is a self-priming and purging positive displacement fluid delivery system.

Figure 47F:
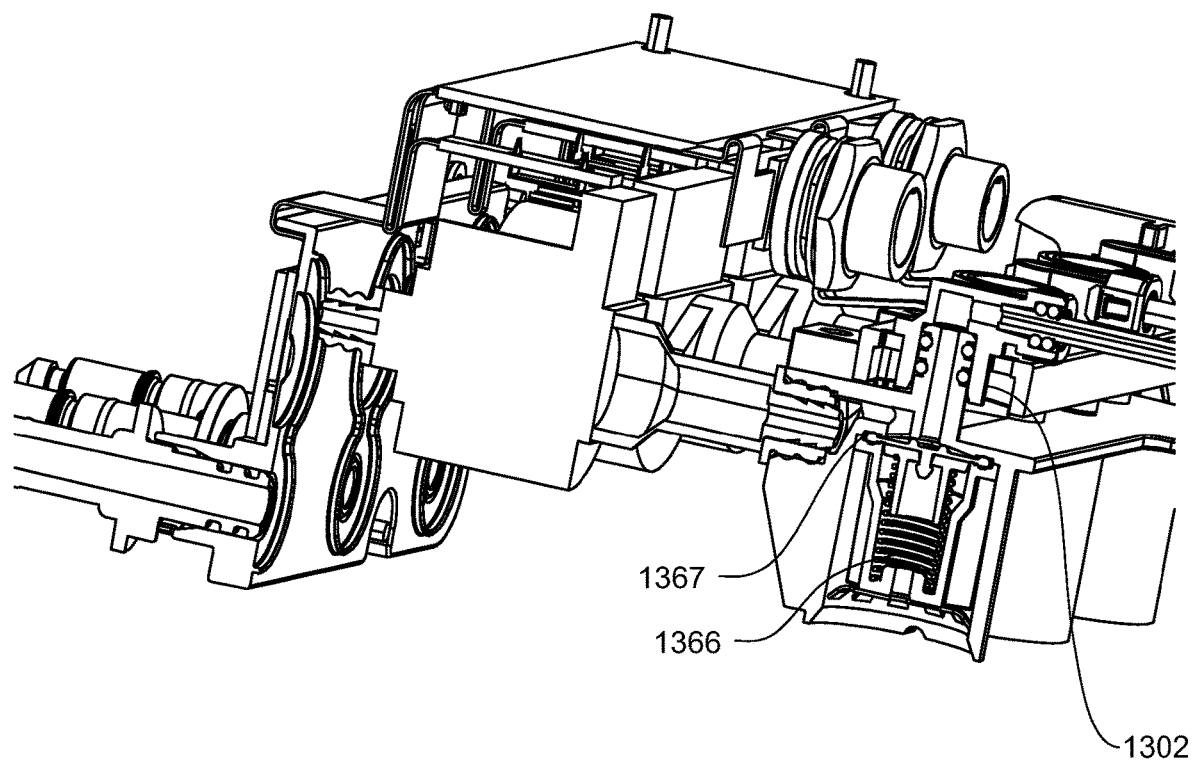

Referring to FIGS. 47E and 47F, the backpressure regulator 1366 may be any backpressure regulator, however, the exemplary embodiment of the backpressure regulator 1366 for pumping small volumes is shown. The backpressure regulator 1366 includes a diaphragm 1367 including "volcano" features and a molded o-ring about the outer diameter. The o-ring creates a seal. A piston is connected to the diaphragm 1367. A spring, about the piston, biases the piston and the diaphragm in a closed position. In this embodiment, the spring is seated on an outer sleeve. When the fluid pressure meets or exceeds the cracking pressure of the piston/spring assembly, the fluid flows past the backpressure regulator 1366 and towards the fluid exit 1368. In the exemplary embodiment, the cracking pressure is approximately 7-9 psi. The cracking pressure is tuned to the pump 1364. Thus, in various embodiments, the pump may be different from the one described, and in some of those embodiment, another embodiment of the backpressure regulator may be used.

Figure 48:
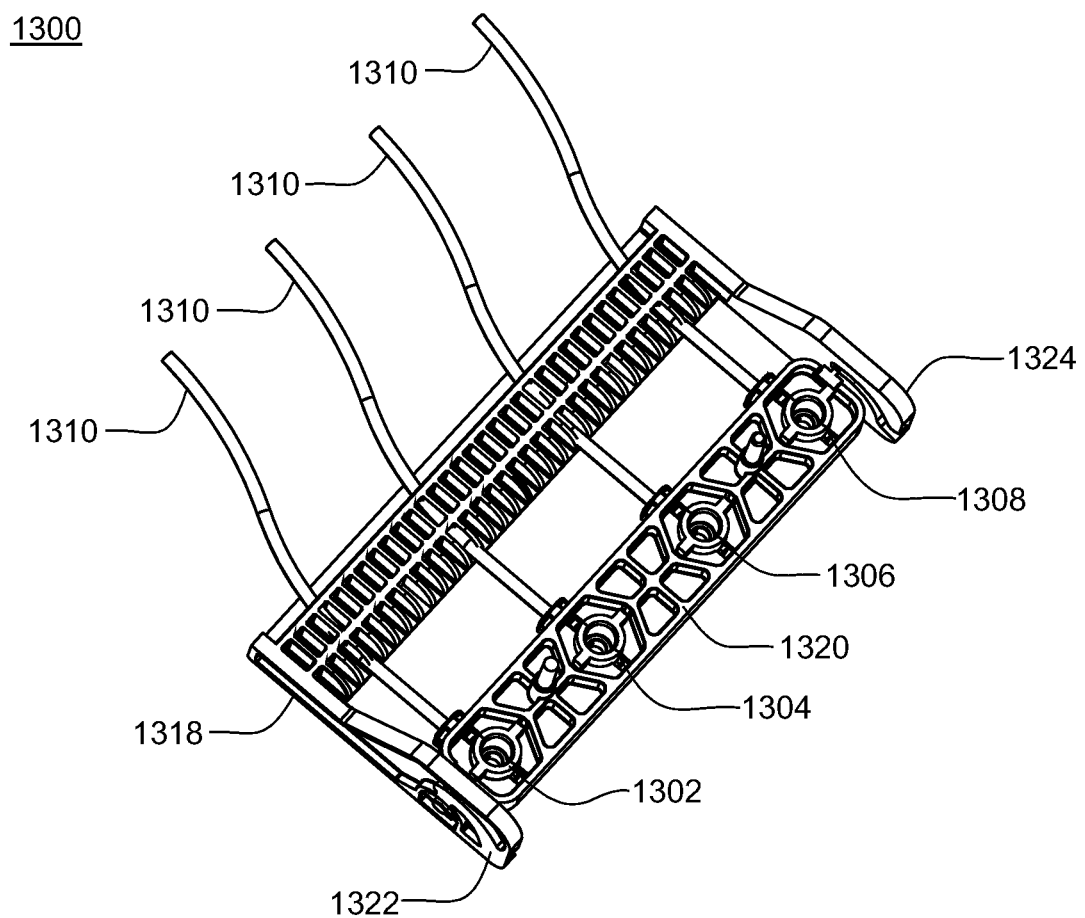
FIG. 48 diagrammatically depicts a plumbing assembly of the quad product module of FIGS. 47A, 47B, 47C, 47D, 47E, and 47F.

With additional reference to FIG. 48, outlet plumbing assembly 1300 may be configured to releasably engage pump assemblies 270a, 270b, 270c, 270d, e.g., for supplying ingredients from a respective product module assembly (e.g., product module assembly 250d) to plumbing/control subsystem 20. Outlet plumbing assembly 1300 may include a plurality of plumbing fitments (e.g., fitments 1302, 1304, 1306, 1308) configured to fluidly couple to respective pump assemblies 270a, 270b, 270c, 270d, e.g., for fluidly coupling pumping assemblies 270a, 270b, 270c, 270d to plumbing/control subsystem 20 via fluid lines 1310, 1312, 1314, 1316.

Releasable engagement between outlet plumbing assembly 1300 and product module assembly 250d may be effectuated, e.g., via a camming assembly providing facile engagement and release of outlet plumbing assembly 1300 and product module assembly 250d. For example, the camming assembly may include handle 1318 rotatably coupled to fitment support 1320, and cam features 1322, 1324. Cam features 1322, 1324 may be engageable with cooperating features (not shown) of product module assembly 250d. With reference to FIG. 47C, rotational movement of handle 1318 in the direction of the arrow may release outlet plumbing assembly 1300 from product module assembly 250d, e.g., allowing outlet plumbing assembly 1300 to be lifted away, and removed, from product module assembly 250d.

With particular reference to FIGS. 47D and 47E, product module assembly 250d may similarly be releasably engageable to microingredient shelf 1200, e.g., allowing facile removal/installation of product module assembly 250 to microingredient shelf 1200. For example, as shown, product module assembly 250d may include release handle 1350, e.g., which may be pivotally connected to product module assembly 250d. Release handle 1350 may include, e.g., locking ears 1352, 1354 (e.g., most clearly depicted in FIGS. 47A and 47D). Locking ears 1352, 1354 may engage cooperating features of microingredient shelf 1200, e.g., thereby retaining product module assembly 250d in engagement with microingredient shelf 1200. As shown in FIG. 47E, release handle 1350 may be pivotally lifted in the direction of the arrow to disengage locking ears 1352, 1354 from the cooperating features of microingredient shelf 1200. Once disengaged, product module assembly 250d may be lifted from microingredient shelf 1200.

One or more sensors may be associated with one or more of handle 1318 and/or release handle 1350. The one or more sensors may provide an output indicative of a locking position of handle 1318 and/or release handle 1350. For example, the output of the one or more sensors may indicate whether handle 1318 and/or release handle 1350 is in an engaged or a disengaged position. Based upon, at least in part the output of the one or more sensor, product module assembly 250d may be electrically and/or fluidly isolated from plumbing/control subsystem 20. Exemplary sensors may include, for example, cooperating RFID tags and readers, contact switches, magnetic position sensors, or the like.

As discussed above and referring again to FIG. 47E, flow sensor 308 may be utilized to sense flow of the above-described micro-ingredients through (in this example) pump assembly 272 (See FIG. 5A-5H). As discussed above, flow sensor 308 may be configured as a capacitance-based flow sensor (See FIGS. 5A-5F); as illustrated as flow sensor 1356 within FIG. 47E. Additionally and as discussed above, flow sensor 308 may be configured as a transducer-based, pistonless flow sensor (See FIG. 5G); as illustrated as flow sensor 1358 within FIG. 47E. Further and as discussed above, flow sensor 308 may be configured as a transducer-based, piston-enhanced flow sensor (See FIG. 5H); as illustrated as flow sensor 1359 within FIG. 47E.

As discussed above, transducer assembly 328 (See FIGS. 5G-5H) may include: a linear variable differential transformer (LVDT); a needle/magnetic cartridge assembly; a magnetic coil assembly; a Hall Effect sensor assembly; a piezoelectric buzzer element; a piezoelectric sheet element; an audio speaker assembly; an accelerometer assembly; a microphone assembly; and an optical displacement assembly.

Further, while the above-described examples of flow sensor 308 are meant to be illustrative, they are not intended to be exhaustive, as other configurations are possible and are considered to be within the scope of this disclosure. For example, while transducer assembly 328 is shown to be positioned outside of diaphragm assembly 314 (See FIG. 5G-5H), transducer assembly 328 may be positioned within chamber 318 (See FIG. 5G-5H).

Figure 49A:
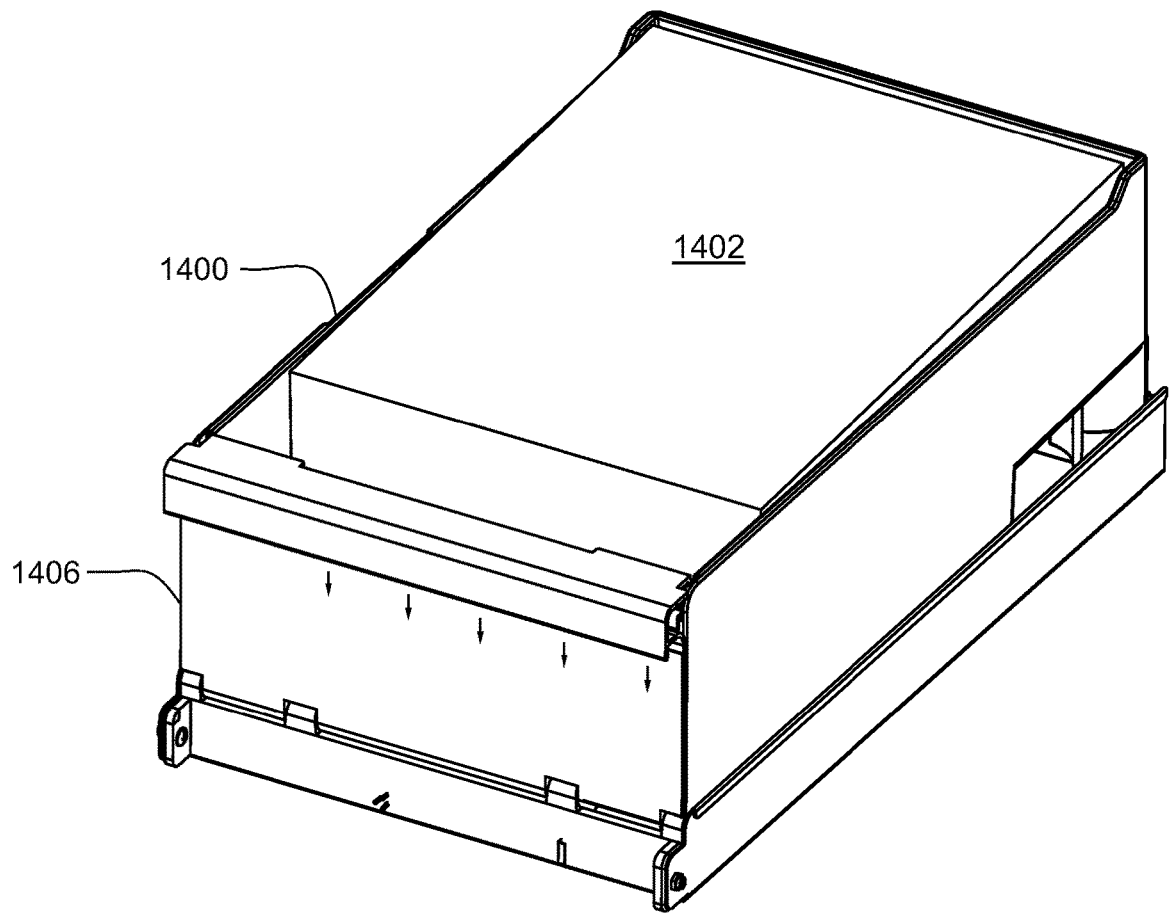
FIG. 49A, 49B, 49C diagrammatically depict a large volume microingredient assembly of the lower cabinet of FIGS. 45A and 45B.
Figure 49B:
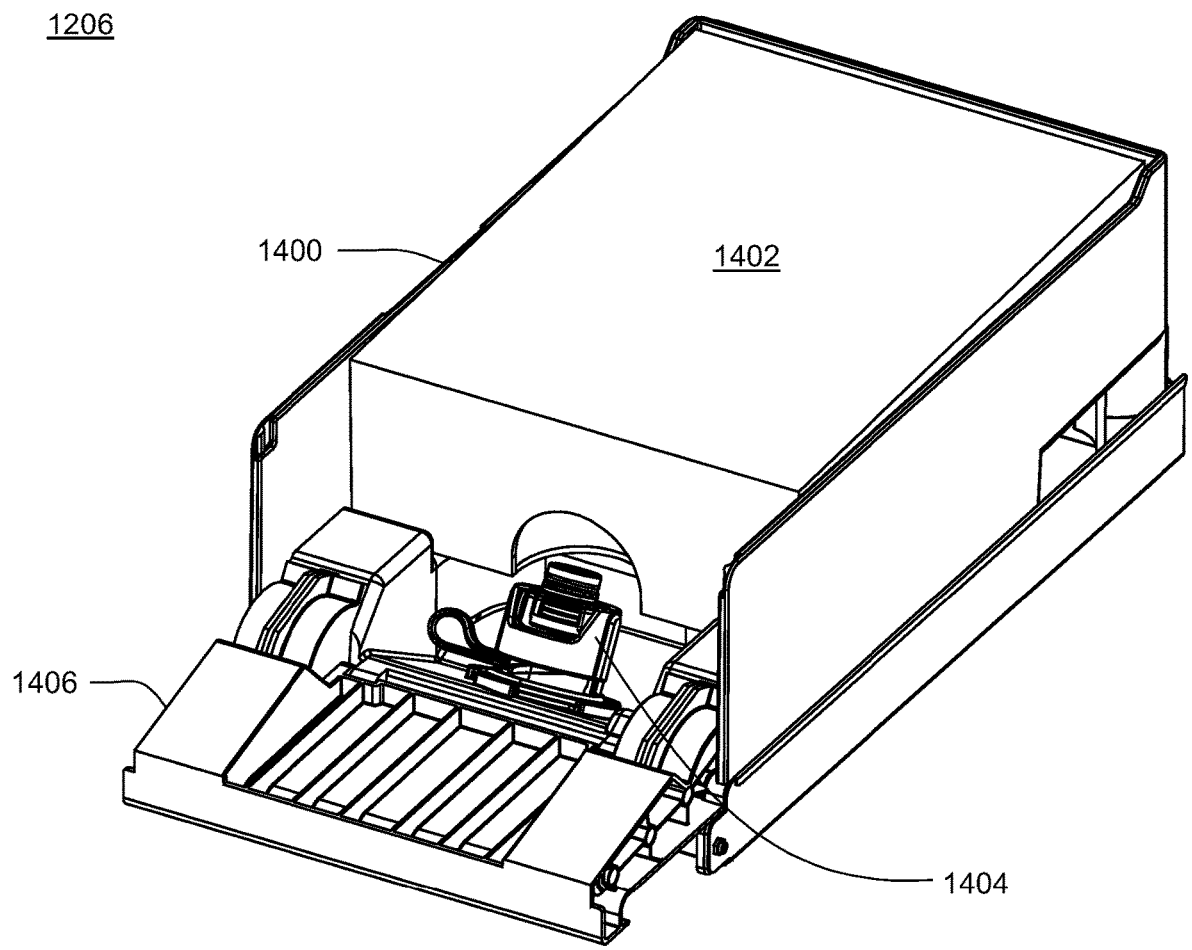
Figure 49C:
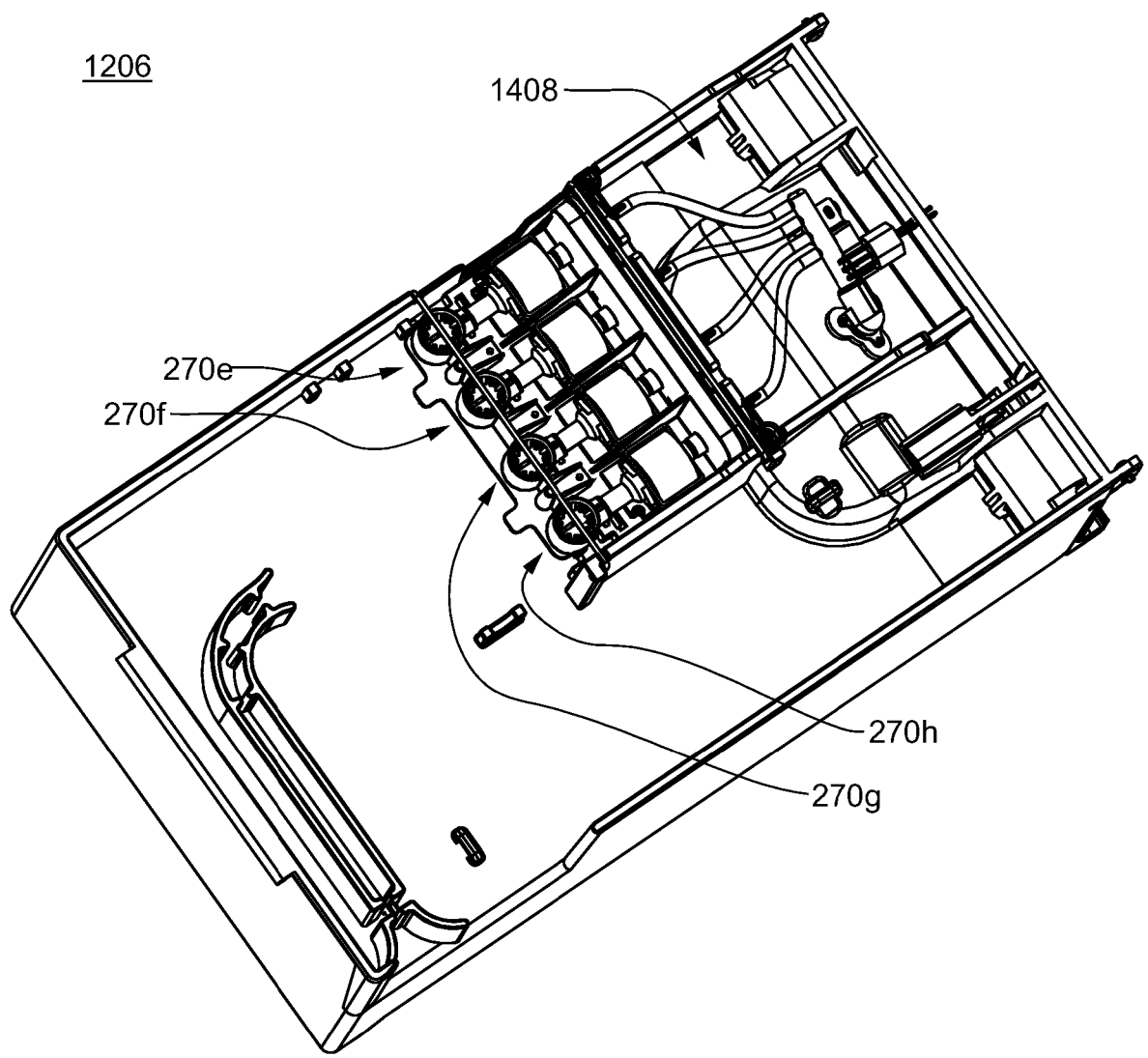

Referring also to FIGS. 49A, 49B, 49C, an exemplary configuration of supply 1206 of non-nutritive sweetener. Supply 1206 of non-nutritive sweetener may generally include housing 1400 configured to receive non-nutritive sweetener container 1402. Non-nutritive sweetener container 1402 may include, for example, a bag-in-box configuration (e.g., a flexible bag containing the non-nutritive sweetener disposed within a generally rigid, protective housing). Supply 1206 may include coupling 1404 (e.g., which may be associated with pivotal wall 1406), which may fluidly couple to a fitment associated with non-nutritive container 1402. The configuration and nature of coupling 1404 may vary according to the cooperating fitment associated with non-nutritive container 1402.

Referring also to FIG. 49C, supply 1206 may include one or more pump assemblies (e.g., pump assemblies 270e, 270f, 270g, 270h). The one or more pump assemblies 270e, 270f, 270g, 270g may be configured similar to the above-discussed product module assemblies (e.g., product module assemble 250). Coupling 1404 may be fluidly coupled to coupling 1404 via plumbing assembly 1408. Plumbing assembly 1408 may generally include inlet 1410, which may be configured to be fluidly connected to coupling 1404. Manifold 1412 may distribute non-nutritive sweetener received at inlet 1410 to one or more distribution tubes (e.g., distribution tubes 1414, 1416, 1418, 1420). Distribution tubes 1414, 1416, 1418, 1420 may include respective connectors 1422, 1424, 1426, 1428 configured to be fluidly coupled to respective pump assemblies 270e, 270f, 270g, 270g.

Figure 50:
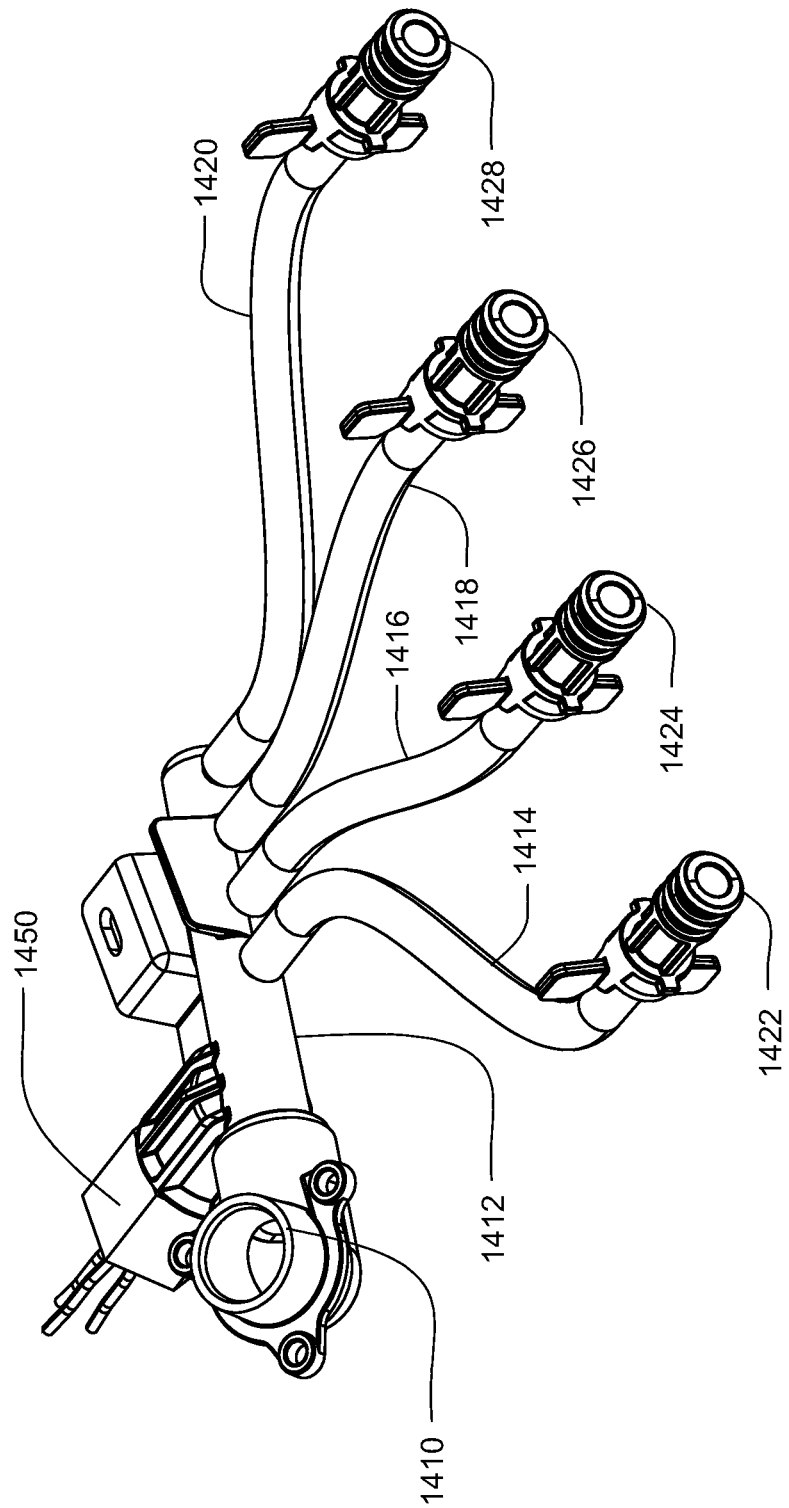
FIG. 50 diagrammatically depicts a plumbing assembly of large volume microingredient assembly of FIG. 49A, 49B, 49C.

Referring now to FIG. 50, plumbing assembly 1408, in the exemplary embodiments, includes an air sensor 1450. The plumbing assembly 1408 thus includes a mechanism for sensing whether air is present. In some embodiments, if the fluid entering through the fluid inlet 1410 includes air, the air sensor 1450 will detect the air and, in some embodiments, may send a signal to stop pumping from the large volume microingredient. This function is desired in many dispensing systems, and particularly in ones where if the volume of the large volume microingredient is incorrect, the dispensed product may be compromised and/or dangerous. Thus, the plumbing assembly 1408 including an air sensor assures air is not pumped and in embodiments where medicinal products are dispensed, for example, is a safety feature. In other products, this embodiment of the plumbing assembly 1408 is part of a quality assurance feature.

While the various electrical components, mechanical components, electro-mechanical components, and software processes are described above as being utilized within a processing system that dispenses beverages, this is for illustrative purposes only and is not intended to be a limitation of this disclosure, as other configurations are possible. For example, the above-described processing system may be utilized for processing/dispensing other consumable products (e.g., ice cream and alcoholic drinks). Additionally, the above-described system may be utilized in areas outside of the food industry. For example, the above-described system may be utilized for processing/dispensing: vitamins; pharmaceuticals; medical products, cleaning products; lubricants; painting/staining products; and other non-consumable liquids/semi-liquids/granular solids or any fluids.

As discussed above, the various electrical components, mechanical components, electro-mechanical components, and software processes of processing system 10 generally (and FSM process 122, virtual machine process 124, and virtual manifold process 126 specifically) may be used in any machine in which on-demand creation of a product from one or more substrates (also referred to as "ingredients") is desired.

In the various embodiments, the product is created following a recipe that is programmed into the processor. As discussed above, the recipe may be updated, imported or changed by permission. A recipe may be requested by a user, or may be preprogrammed to be prepared on a schedule. The recipes may include any number of substrates or ingredients and the product generated may include any number of substrates or ingredients in any concentration desired.

The substrates used may be any fluid, at any concentration, or, any powder or other solid that may be reconstituted either while the machine is creating the product or before the machine creates the product (i.e., a "batch" of the reconstituted powder or solid may be prepared at a specified time in preparation for metering to create additional products or dispensing the "batch" solution as a product). In various embodiments, two or more substrates may themselves be mixed in one manifold, and then metered to another manifold to mix with additional substrates.

Thus, in various embodiments, on demand, or prior to actual demand but at a desired time, a first manifold of a solution may be created by metering into the manifold, according to the recipe, a first substrate and at least one additional substrate. In some embodiments, one of the substrates may be reconstituted, i.e., the substrate may be a powder/solid, a particular amount of which is added to a mixing manifold. A liquid substrate may also be added to the same mixing manifold and the powder substrate may be reconstituted in the liquid to a desired concentration. The contents of this manifold may then be provided to e.g., another manifold or dispensed.

In some embodiments, the methods described herein may be used in conjunction with mixing on-demand dialysate, for use with peritoneal dialysis or hemodialysis, according to a recipe/prescription. As is known in the art, the composition of dialysate may include, but is not limited to, one or more of the following: bicarbonate, sodium, calcium, potassium, chloride, dextrose, lactate, acetic acid, acetate, magnesium, glucose and hydrochloric acid.

The dialysate may be used to draw waste molecules (e.g., urea, creatinine, ions such as potassium, phosphate, etc.) and water from the blood into the dialysate through osmosis, and dialysate solutions are well-known to those of ordinary skill in the art.

For example, a dialysate typically contains various ions such as potassium and calcium that are similar to their natural concentration in healthy blood. In some cases, the dialysate may contain sodium bicarbonate, which is usually at a concentration somewhat higher than found in normal blood. Typically, the dialysate is prepared by mixing water from a source of water (e.g., reverse osmosis or "RO" water) with one or more ingredients: e.g., an "acid" (which may contain various species such as acetic acid, dextrose, NaCl, CaCl, KCl, MgCl, etc.), sodium bicarbonate (NaHCO3), and/or sodium chloride (NaCl). The preparation of dialysate, including using the appropriate concentrations of salts, osmolarity, pH, and the like, is also well-known to those of ordinary skill in the art. As discussed in detail below, the dialysate need not be prepared in real-time, on-demand. For instance, the dialysate can be made concurrently or prior to dialysis, and stored within a dialysate storage vessel or the like.

In some embodiments, one or more substrates, for example, the bicarbonate, may be stored in powder form. Although for illustrative and exemplary purposes only, a powder substrate may be referred to in this example as "bicarbonate", in other embodiments, any substrate/ingredient, in addition to, or instead of, bicarbonate, may be stored in a machine in powder form or as another solid and the process described herein for reconstitution of the substrate may be used. The bicarbonate may be stored in a "single use" container that, for example, may empty into a manifold. In some embodiments, a volume of bicarbonate may be stored in a container and a particular volume of bicarbonate from the container may be metered into a manifold. In some embodiments, the entire volume of bicarbonate may be completely emptied into a manifold, i.e., to mix a large volume of dialysate.

The solution in the first manifold may be mixed in a second manifold with one or more additional substrates/ingredients. In addition, in some embodiments, one or more sensors (e.g., one or more conductivity sensors) may be located such that the solution mixed in the first manifold may be tested to ensure the intended concentration has been reached. In some embodiments, the data from the one or more sensors may be used in a feedback control loop to correct for errors in the solution. For example, if the sensor data indicates the bicarbonate solution has a concentration that is greater or less than the desired concentration, additional bicarbonate or RO may be added to the manifold.

In some recipes in some embodiments, one or more ingredients may be reconstituted in a manifold prior to being mixed in another manifold with one or more ingredients, whether those ingredients are also reconstituted powders/solids or liquids.

Thus, the system and methods described herein may provide a means for accurate, on-demand production or compounding of dialysate, or other solutions, including other solutions used for medical treatments. In some embodiments, this system may be incorporated into a dialysis machine, such as those described in U.S. patent application Ser. No. 12/072,908, filed Feb. 27, 2008, which is now U.S. Pat. No. 8,246,826 issued Aug. 21, 2012 each of which is herein incorporated by reference in its entirety. In other embodiments, this system may be incorporated into any machine where mixing a product, on-demand, may be desired.

Water may account for the greatest volume in dialysate, thus leading to high costs, space and time in transporting bags of dialysate. The above-described processing system 10 may prepare the dialysate in a dialysis machine, or, in a stand-alone dispensing machine (e.g., on-site at a patient's home), thus eliminating the need for shipping and storing large numbers of bags of dialysate. This above-described processing system 10 may provide a user or provider with the ability to enter the prescription desired and the above-described system may, using the systems and methods described herein, produce the desired prescription on-demand and on-site (e.g., including but not limited to: a medical treatment center, pharmacy or a patient's home). Accordingly, the systems and methods described herein may reduce transportation costs as the substrates/ingredients are the only ingredient requiring shipping/delivery.

In addition to the various embodiments of the flow control modules discussed and described above, referring to FIGS. 56-64, various additional embodiments of a variable line impedance, a flow measurement device (or sometimes referred to as "flow meter") and a binary valve for a flow control module are shown.

Referring to FIGS. 56-59 collectively, the exemplary embodiment of this embodiment of the flow control module 3000 may include a fluid inlet 3001, a piston housing 3012, a primary orifice 3002, a piston 3004 a piston spring 3006, a cylinder 3005 about the piston and a secondary orifice(s) 3022. The piston spring 3006 biases the piston 3004 in a closed position, seen in FIG. 56. The flow control module 3000 also includes a solenoid 3008 which includes a solenoid housing 3010 and an armature 3014. A downstream binary valve 3016 is actuated by a plunger 3018 which is biased in an open position by a plunger spring 3020.

The piston 3004, cylinder 3005, piston spring 3006 and piston housing 3012 may be made from any material which, in some embodiments, may be selected based on the fluid intended to flow through the flow control module. In the exemplary embodiment, the piston 3004 and the cylinder 3005 are made from an alumina ceramic, however, in other embodiments, these components may be made form another ceramic or stainless steel. In various embodiments, these components may be made from any material desired and may be selected depending on the fluid. In the exemplary embodiment, the piston spring 3006 is made from stainless steel, however, in various embodiments; the piston spring 3006 may be made from a ceramic or another material. In the exemplary embodiment, the piston housing 3012 is made from plastic. However, in other embodiments, the various parts may be made from stainless steel or any other dimensionally stable, corrosion resistant material. Although as shown in FIGS. 56-59, the exemplary embodiment includes a binary valve, in some embodiments, the flow control module 3000 may not include a binary valve. In these embodiments, the cylinder 3005 and the piston 3004, where in the exemplary embodiment, as discussed above, are made from alumina ceramic, may be match ground to a free running fit, or may be manufactured to impart a very tight clearance between the two components to provide a close, free running fit.

The solenoid 3008 in the exemplary embodiment is a constant force solenoid 3008. In the exemplary embodiments, the constant force solenoid 3008 shown in FIGS. 56-59 may be used. The solenoid 3008 includes a solenoid housing 3010 which, in the exemplary embodiment, is made from 416 stainless steel. In the exemplary embodiment, the constant force solenoid 3008 includes a spike. In this embodiment, as the armature 3014 approaches the spikes, the force roughly constant and minimally variant with respect to position. The constant force solenoid 3008 exerts magnetic force onto the armature 3014, which, in the exemplary embodiment, is made from 416 stainless steel. In some embodiments the armature 3014 and/or the solenoid housing 3012 may be made from a ferritic stainless steel or any other magnetic stainless steel or other material having desirable magnetic properties. The armature 3014 is connected to the piston 3004. Thus, the constant force solenoid 3008 provides force to linearly move the piston 3004 from a closed position (shown in FIGS. 56 and 57) to an open position (shown in FIGS. 58 and 59) with respect to the secondary orifice(s) 3022. Thus, the solenoid 3008 actuates the piston 3004 and the current applied to control the constant force solenoid 3008 is proportional to the force exerted on the armature 3014.

The size of the primary orifice 3002 may be selected so that the maximum pressure drop for the system is not exceeded and such that the pressure across the primary orifice 3002 is significant enough to move the piston 3004. In the exemplary embodiment, the primary orifice 3002 is about 0.180 inch. However, in various embodiments, the diameter may be larger or smaller depending on the desired flow rate and pressure drop. Additionally, obtaining the maximum pressure drop at a particular flow rate minimizes the total amount of travel by the piston 3004 to maintain a desired flow rate.

The constant force solenoid 3008 and the piston spring 3006 exert roughly a constant force over piston 3004 travel. The piston spring 3006 acts on the piston 3004 in the same direction as the fluid flow. A pressure drop occurs upon the entrance of fluid through the primary orifice 3002. The constant force solenoid 3008 (also referred to as a "solenoid") counters the fluid pressure by exerting force on the armature 3014.

Figure 56:
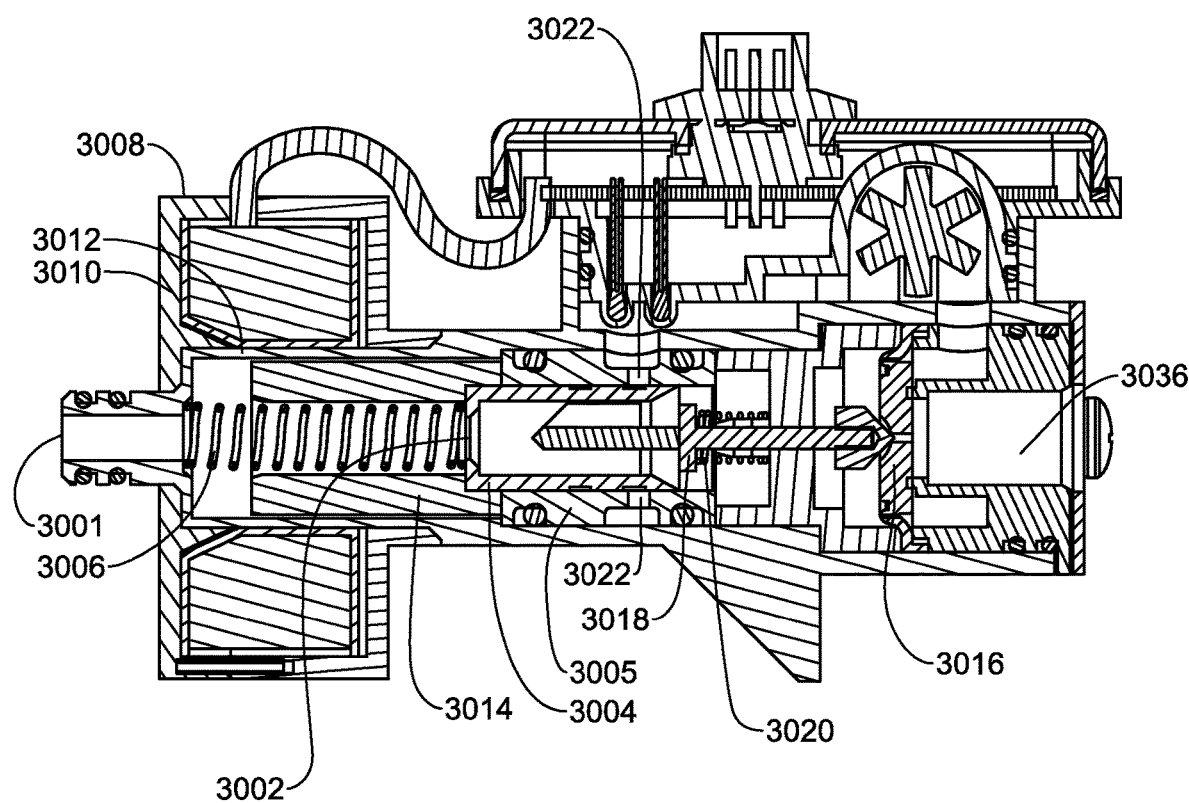
FIG. 56 is a cross sectional view of one embodiment of a flow control module in a de-energized position.

Referring now to FIG. 56, the flow control module 3000 is shown in a closed position, with no fluid flow. In the closed position, the solenoid 3008 is de-energized. The piston spring 3006 biases the piston 3004 to the closed position, i.e., the secondary orifice(s) (shown in FIGS. 58-59 as 3022) are fully closed. This is beneficial for many reasons, including, but not limited to, a fail safe flow switch in the event the flow control module 3000 experiences a loss of power. Thus, when power is not available to energize the solenoid 3008, the piston 3004 will move to "normally closed" state.

Figure 57:
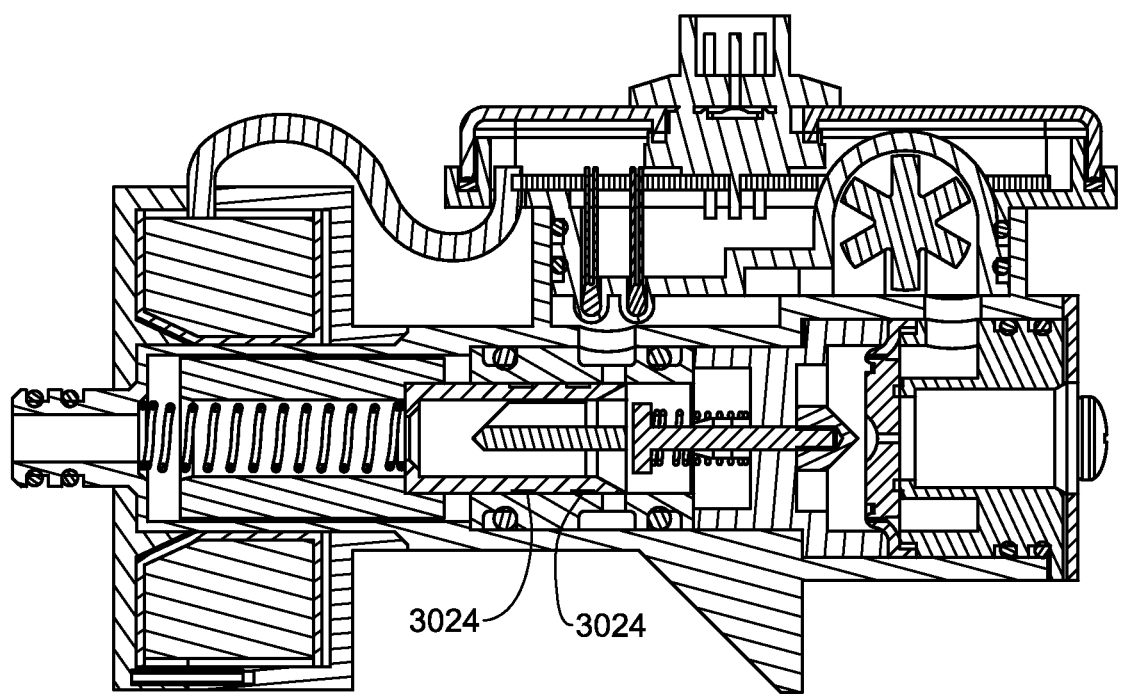
FIG. 57 is a cross sectional view of one embodiment of a flow control module with the binary valve in an open position.
Figure 58:
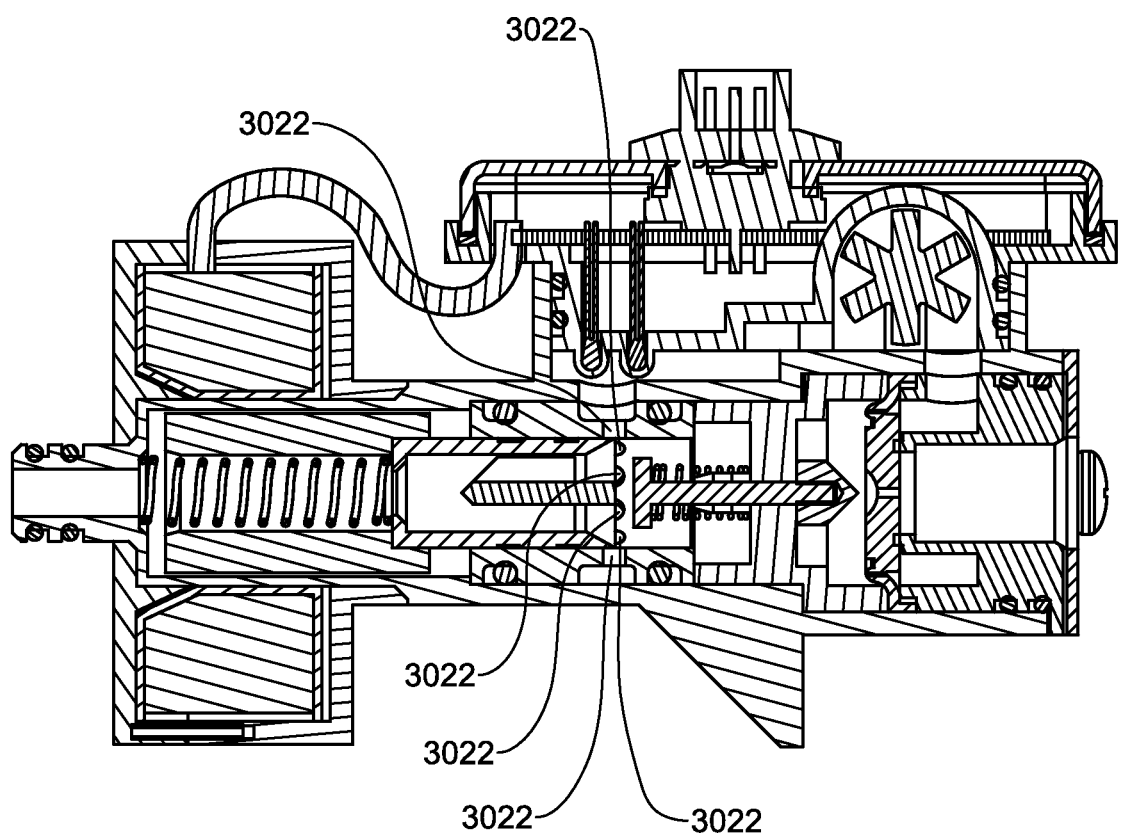
FIG. 58 is a cross sectional view of one embodiment of a flow control module in a partially energized position.
Figure 59:
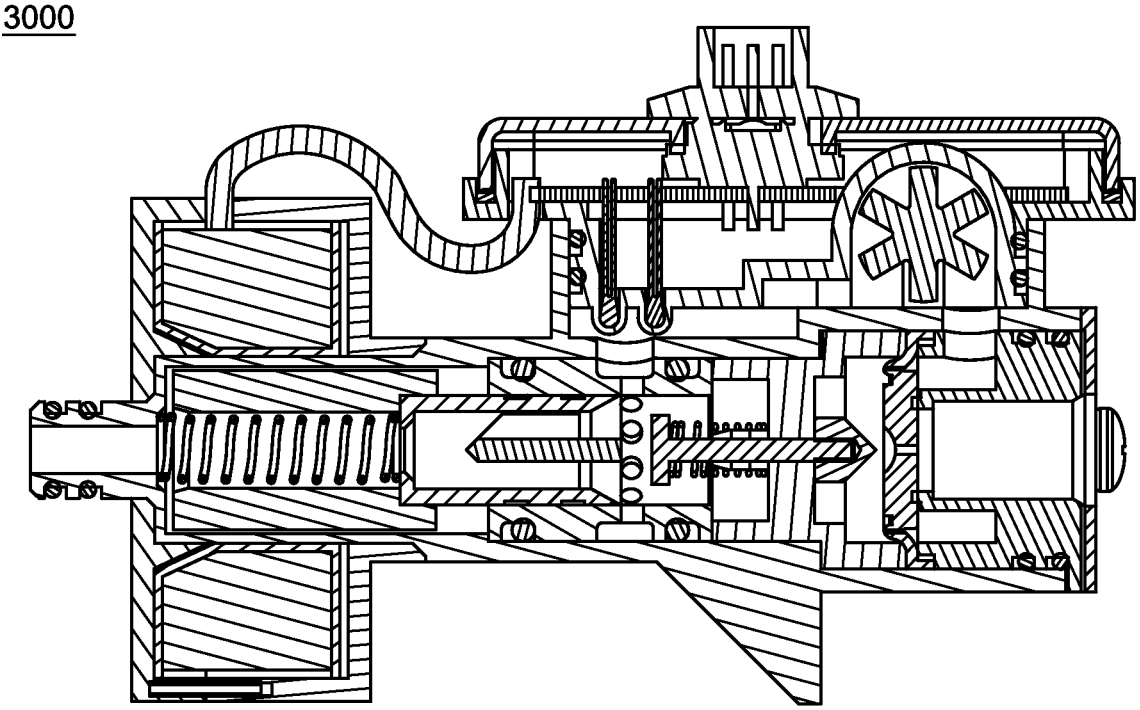
FIG. 59 is a cross sectional view of one embodiment of a flow control module in a fully energized position.

Referring also to FIGS. 57-59, the energy or current applied to the solenoid 3008 controls the movement of the armature 3014 and the piston 3004. As the piston 3004 moves further towards the fluid inlet 3001, this opens the secondary orifice(s) 3022. Thus, the current applied to the solenoid 3008 may be proportional to the force exerted on the armature 3014 and the current applied to the solenoid 3008 may be varied to obtain a desired flow rate. In the exemplary embodiment of this embodiment of the flow control module the flow rate corresponds to the current applied to the solenoid 3008; as current is applied the force on the piston 3004 increases.

To maintain a constant force profile on the solenoid 3008, it may be desirable to maintain the travel of the armature 3014 roughly within a predefined area. As discussed above, the spike in the solenoid 3008 contribute to the maintenance of near constant force as the armature 3014 travels. This is desirable in some embodiments for when the secondary orifice(s) 3022 are open, maintaining near constant force will maintain a near constant flow rate.

As the force from the solenoid 3008 increases, in the exemplary embodiment, the force from the solenoid 3008 moves the piston 3004 linearly towards the fluid inlet 3001 to initiate flow through the secondary orifice(s) 3022. This causes the fluid pressure within the flow control module to decrease. Thus, the primary orifice 3002 (linked to the piston 3004), together with the secondary orifice(s) 3022, act as a flow meter and variable line impedance; the pressure drop across the primary orifice 3002 (which is in indicator of flow rate) remains constant through varying the cross sectional areas of the secondary orifice(s) 3022. The flow rate, i.e., the pressure differential across the primary orifice 3002, dictates the amount of movement of the piston 3004, i.e., the variable line impedance of the fluid path.

Referring now to FIGS. 58-59, in the exemplary embodiment, the variable line impedance includes at least one secondary orifice 3022. In some embodiments, for example, the embodiments shown in FIGS. 58-59, the secondary orifice 3022 includes multiple apertures. Embodiments including multiple apertures may be desirable as they allow for structural integrity maintenance and minimize piston travel while providing a total secondary orifice size sufficient for a desired flow rate at a maximum pressure drop.

Referring to FIGS. 56-59, to equalize pressure that may be introduced by blow-by during operation, in the exemplary embodiment, the piston 3004 includes at least one radial groove 3024. In the exemplary embodiment, the piston 3004 includes two radial grooves 3024. In other embodiments, the piston 3004 may include three or more radial grooves. The at least one radial groove 3024 provides both a means for equalizing the pressure from the blow-by, thus, centering the piston 3004 in the cylinder 3005 which may reduce blow-by. Centering of the piston 3004 may also provide a hydrodynamic bearing effect between the cylinder 3005 and the piston 3004, thus reducing friction. In some embodiments, any other means for reducing friction may be used, which include, but are not limited to, coating the piston 3004 to reduce friction and/or incorporating the use of ball bearings. Coatings which may be used include, but are not limited to diamond-like-coating ("DLC") and titanium nitride. Reducing friction is beneficial for reduction of hysteresis in the system thus reducing flow control errors in the system.

In the exemplary embodiment, for a given variable line impedance device, the current as well as the method of applying the current to yield a given flow rate may be determined. The various modes of applying the current include, but are not limited to, dithering the current, sinusoidal dither, dither scheduling the current or using various Pulse Width Modulation ("PWM") techniques. Current control may be used to produce various flow rates and various flow types, for example, but not limited to, choppy or pulsatile flow rates or smooth flow rates. For example, sinusoidal dithering may be used to reduce hysteresis and friction between the cylinder 3005 and the piston 3004. Thus, predetermined schedules may be determined and used for a given desired flow rate.

Figure 62:
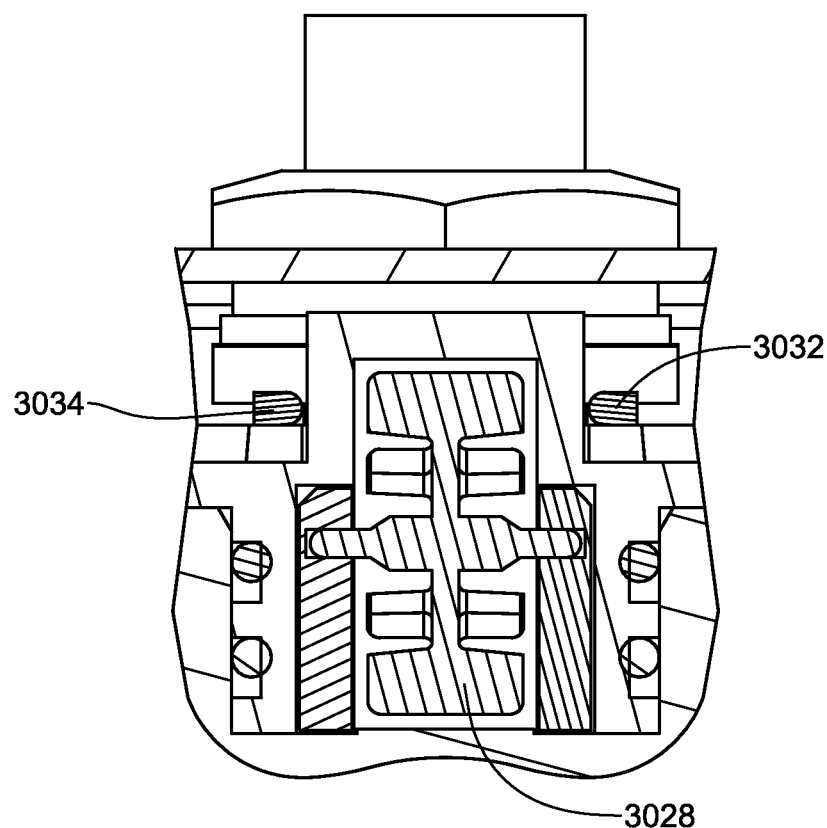
FIG. 62 is a top cut-away view of one embodiment of the paddle wheel sensor.
Figure 63:
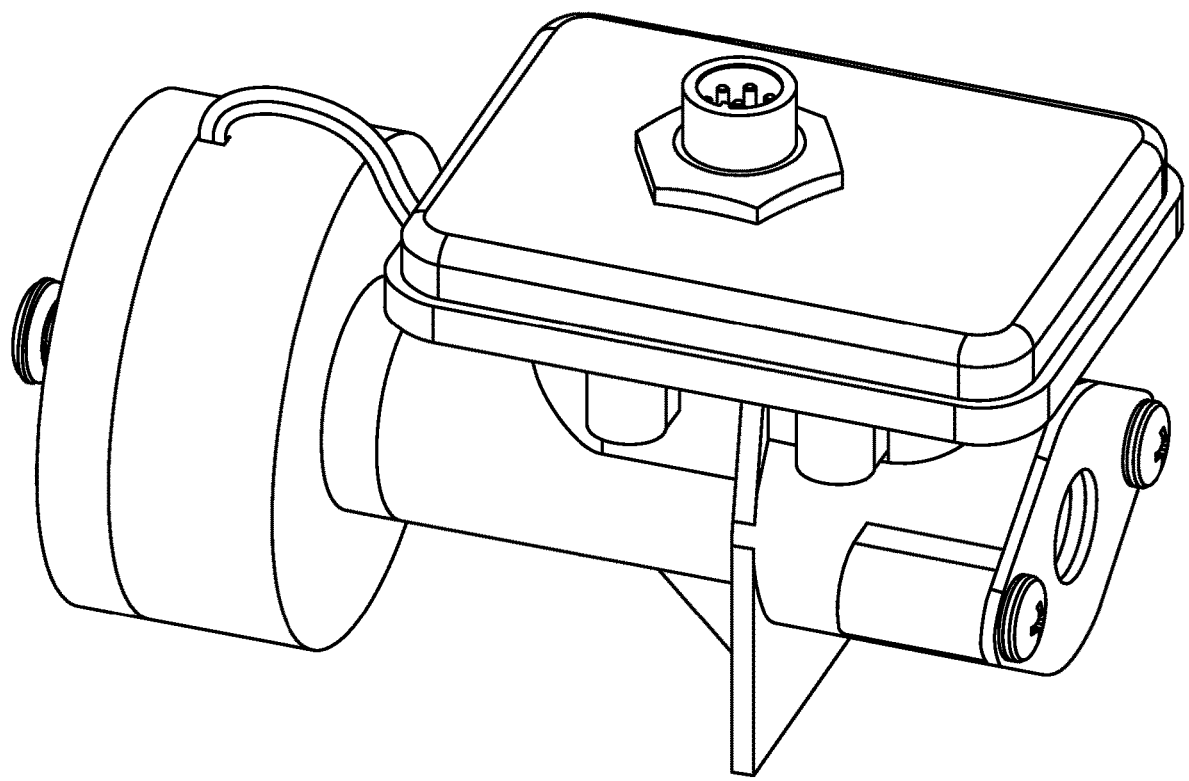
FIG. 63 is an isometric view of one embodiment of a flow control module.
Figure 64:
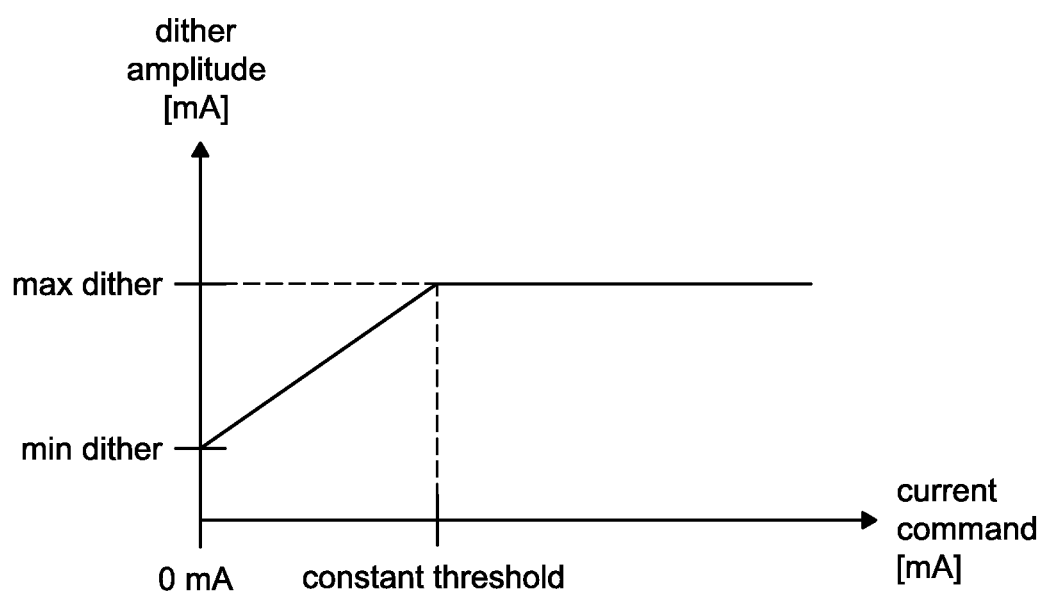
FIG. 64 is one embodiment of a dither scheduling scheme.

Referring now to FIG. 64, an example of a solenoid control method which may be applied to the variable line impedance device shown in FIGS. 56-63 is shown. In this control method, a dither function is shown that applies lower amplitude dither at low flow rates and higher amplitude dither at as the flow rates increase. The dither may be specified either as a step function, where dither may increase at a specified threshold, or as a ramp function, which may become constant above a specified threshold. FIG. 64 shows an example of a dither ramp function. Both dither frequency and dither amplitude may be varied with the current command. In some embodiments, the dither function may be replaced by a lookup table that specifies optimal dither characteristics or other dither scheduling for any desired flow rate.

Upstream fluid pressure may increase or decrease. However, the variable line impedance compensates for pressure changes and maintains the constant desired flow rate through use of the constant force solenoid, together with the spring and the plunger. Thus, the variable line impedance maintains a constant flow rate even under variable pressure. For example, when the inlet pressure increases, because the system includes a fixed sized primary orifice 3002, the pressure drop across the primary orifice 3002 will cause the piston 3004 to move toward the fluid outlet 3036 and "turn down" the opening of the secondary orifice(2) 3022. This is accomplished through linear movement of the piston 3004 towards the fluid outlet 3036.

Conversely, when the inlet pressure decreases, because the system has a fixed sized primary orifice 3002, the pressure drop across the primary orifice 3002 will cause the piston 3004 to "turn up" the opening of the secondary orifice(s) 3022 thus keeping flowrate constant. This is accomplished through linear movement of the piston 3004 towards the fluid inlet 3001.

The exemplary embodiment also includes a binary valve. Although shown in the exemplary embodiment, in some embodiments, a binary valve may not be used, for example, where the tolerances between the piston and the secondary orifice are such that the piston may act as a binary valve to the secondary orifice. Referring now to FIGS. 56-59, the binary valve in the exemplary embodiment is downstream from the secondary orifice 3022. In the exemplary embodiment, the binary valve is a piloted diaphragm 3016 actuated by a plunger 3018. In the exemplary embodiment, the diaphragm 3016 is an over molded metal disc, however, in other embodiments, the diaphragm 3016 may be made from any material suitable for the fluid flowing through the valve, which may include, but is not limited to, metals, elastomers and/or urethanes or any type of plastic or other material suitable for the desired function. It should be noted that although the FIGS. illustrate the membrane seated in the open position, in practice, the membrane would be unseated. The plunger 3018 is directly actuated by the piston 3004 and in its resting position; the plunger spring 3020 biases the plunger 3018 in the open position. As the piston 3004 returns to a closed position, the force generated by the piston spring 3006 is great enough to overcome to plunger spring 3020 bias and actuate the plunger 3018 to the closed position of the binary valve. Thus, in the exemplary embodiment, the solenoid provides the energy for both the piston 3004 and the plunger 3018, thus, controls both the flow of fluid through the secondary orifice 3022 and through the binary valve.

Referring to FIGS. 56-59, the progressive movement of the piston 3004 may be seen with respect to increased force from the solenoid 3008. Referring to FIG. 56, both the binary valve and the secondary orifice (not shown) are closed. Referring to FIG. 57, current has been applied to the solenoid and the piston 3004 has moved slightly, while the binary valve is open due to the plunger spring 3020 bias. In FIG. 58, the solenoid 3008 having applied additional current, the piston 3004 has moved further to primary orifice 3002 and has opened the secondary orifice 3022 slightly. Referring now to FIG. 59, increased current from the solenoid 3008 has moved the piston 3004 further towards the fluid inlet 3001 (or further into the solenoid 3008 in this embodiment), and the secondary orifice 3022 is fully open.

The embodiments described above with respect to FIGS. 56-59 may additionally include one or more sensors, which may include one or more, but not limited to, the following: a piston position sensor and/or a flow sensor. One or more sensors may be used to verify that fluid flow is established when the solenoid 3008 is energized. A piston position sensor, for example, may detect whether or not the piston is moving. A flow sensor may detect whether the piston is moving or not moving.

Figure 60:
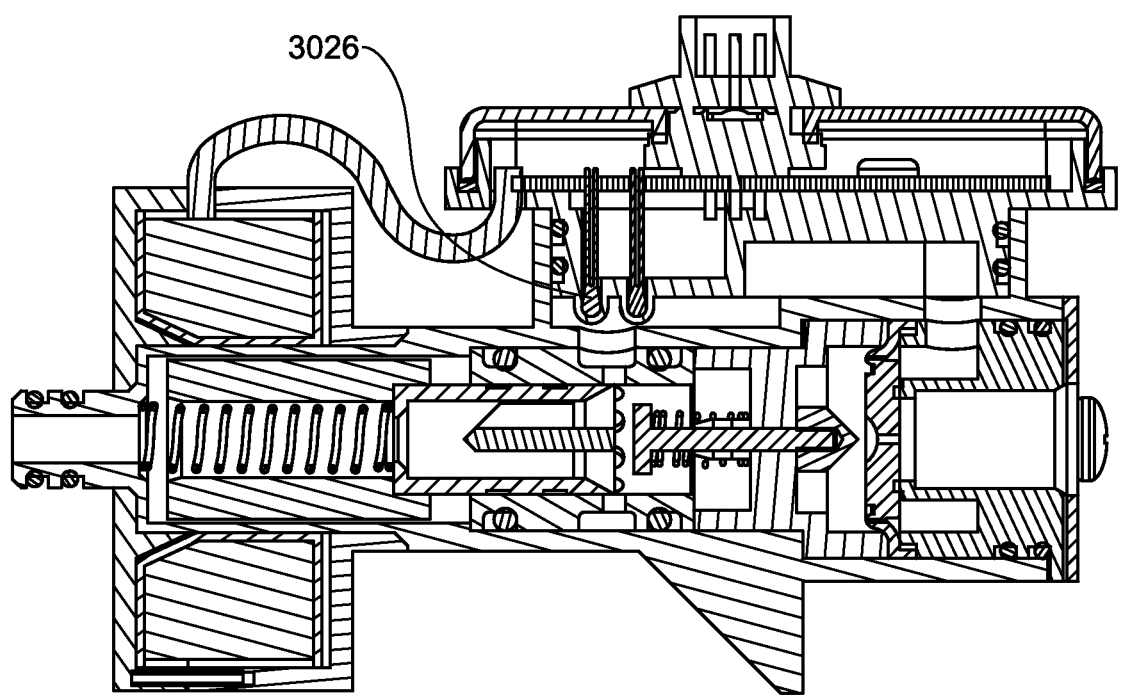
FIG. 60 is a cross sectional view of one embodiment of a flow control module with an anemometer sensor.
Figure 61:
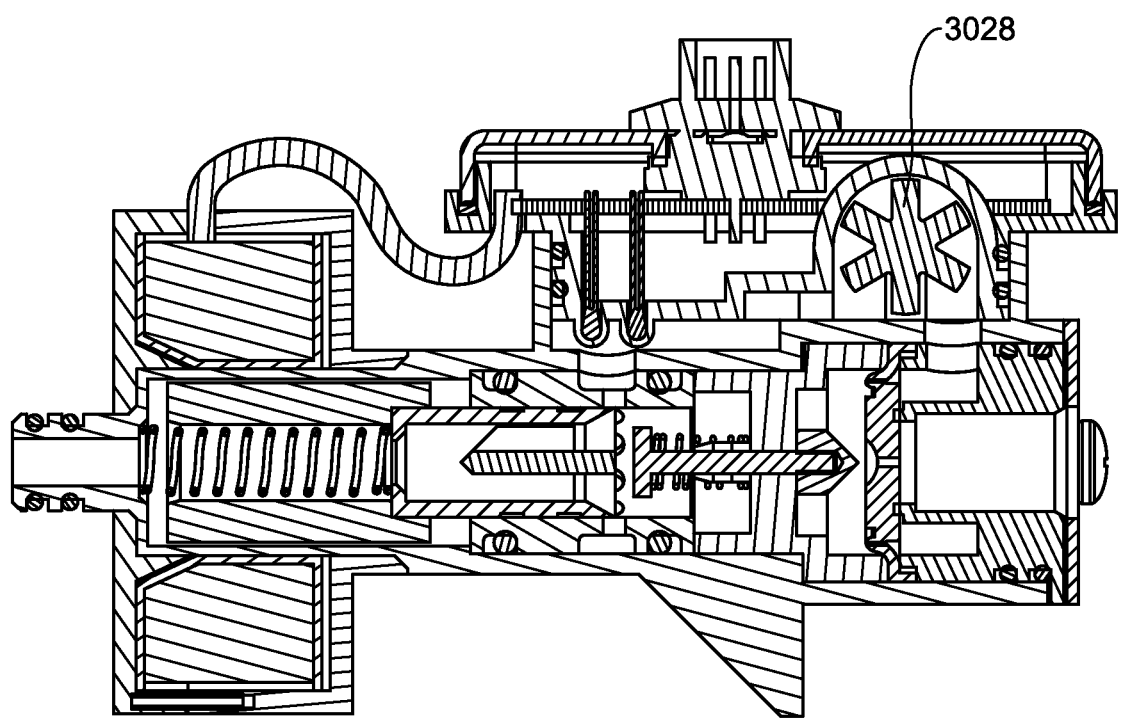
FIG. 61 is a cross sectional view of one embodiment of a flow control module with a paddle wheel sensor.

Referring now to FIGS. 60-61, in various embodiments, the flow control module 3000 may include one or more sensors. Referring to FIG. 60, the flow control module 3000 is shown with an anemometer 3026. In one embodiment, one or more thermistor(s) are located in close proximity to a thin wall contacting the fluid path. The thermistor(s) may dissipate a known power amount, e.g., 1 Watt, and thus, a predictable temperature increase may be expected for either stagnant fluid or flowing fluid. As the temperature will increase less where fluid is flowing, the anemometer may be used as a fluid flow sensor. In some embodiments, the anemometer may also be used to determine the temperature of the fluid, whether or not the sensor is additionally detecting the presence of fluid flow.

Referring now to FIG. 61, the flow control module 3000 is shown with a paddle wheel 3028. A cut-away view of the paddle wheel sensor 3030 is shown in FIG. 62. The paddle wheel sensor 3030 includes a paddle wheel 3028 within the fluid path, an Infrared ("IR") emitter 3032 and an IR receiver 3034. The paddle wheel sensor 3030 is a metering device and may be used to calculate and/or confirm flow rate. The paddle wheel sensor 3030 may, in some embodiments, be used to simply sense whether fluid is flowing or not. In the embodiment shown in FIG. 62, the IR diode 3032 shines and as fluid flows, the paddle wheel 3028 turns, interrupting the beam from IR diode 3032, which is detected by the IR receiver 3034. The rate of interruption of the IR beam may be used to calculate flow rate.

As shown in FIGS. 56-59, in some embodiments, more than one sensor may be used in the flow control module 3000. In these embodiments, both an anemometer sensor and a paddle wheel sensor are shown. While, in other embodiments, either the paddle wheel (FIG. 61) or the anemometer (FIG. 60) sensor is used. However, in various other embodiments, one or more different sensors may be used to detect, calculate or sense various conditions of the flow control module 3000. For example, but not limited to, in some embodiments, a Hall Effect sensor may be added to the magnetic circuit of the solenoid 3010 to sense flux.

In some embodiments, the inductance in the coil of the solenoid 3008 may be calculated to determine the position of the piston 3004. In the solenoid 3008 in the exemplary embodiment, reluctance varies with armature 3014 travel. The inductance may be determined or calculated from the reluctance and thus, the position of the piston 3004 may be calculated based on the calculated inductance. In some embodiments, the inductance may be used to control the movement of the piston 3004 via the armature 3014.

Referring now to FIG. 63, one embodiment of the flow control module 3000 is shown. This embodiment of the flow control module 3000 may be used in any of the various embodiments of the dispensing system described herein. Further, the variable flow impedance mechanism may be used in place of the various variable flow impedance embodiments described above. Further, in various embodiments, the flow control module 3000 may be used in conjunction with a downstream or upstream flow meter.

Figure 65:
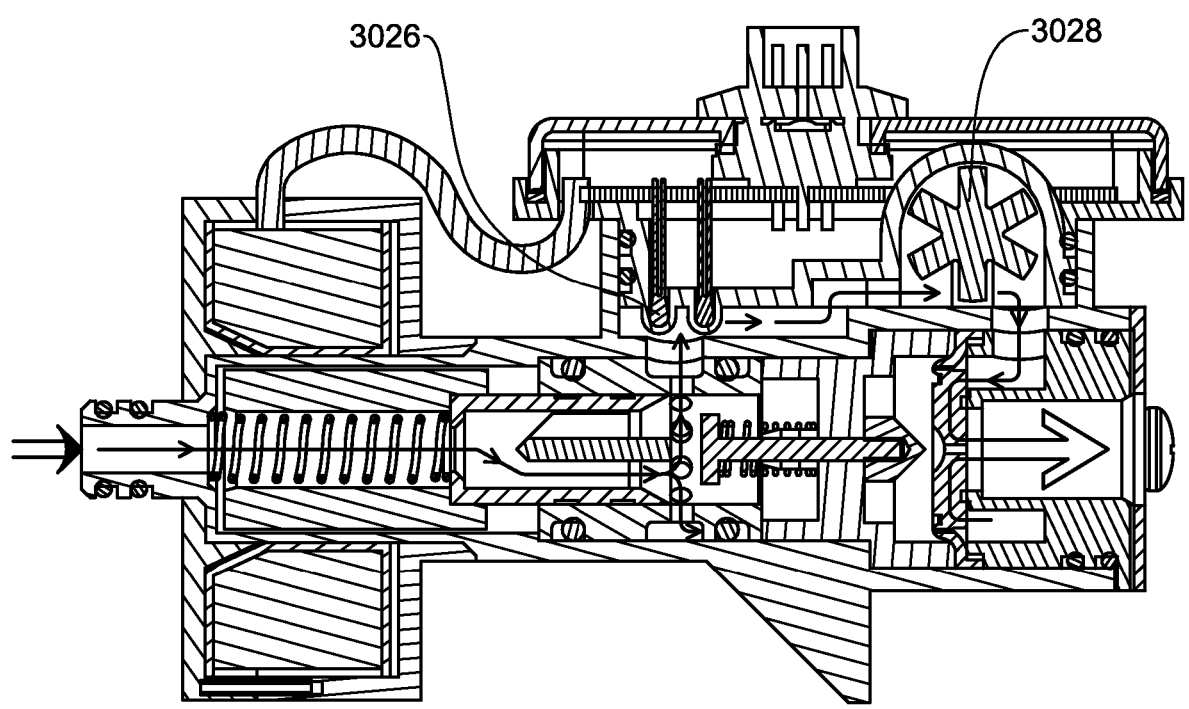
FIG. 65 is a cross sectional view of one embodiment of a flow control module in a fully energized position with the fluid flow path indicated.

Referring to FIG. 65, the fluid path is indicated through one embodiment of the flow control module 3000. In this embodiment, the flow control module 3000 includes both a paddle wheel 3028 sensor and an anemometer 3026. However, as discussed above, some embodiments of the flow control module 3000 may include additional sensors or less sensors than shown in FIG. 65.

Figure 66:
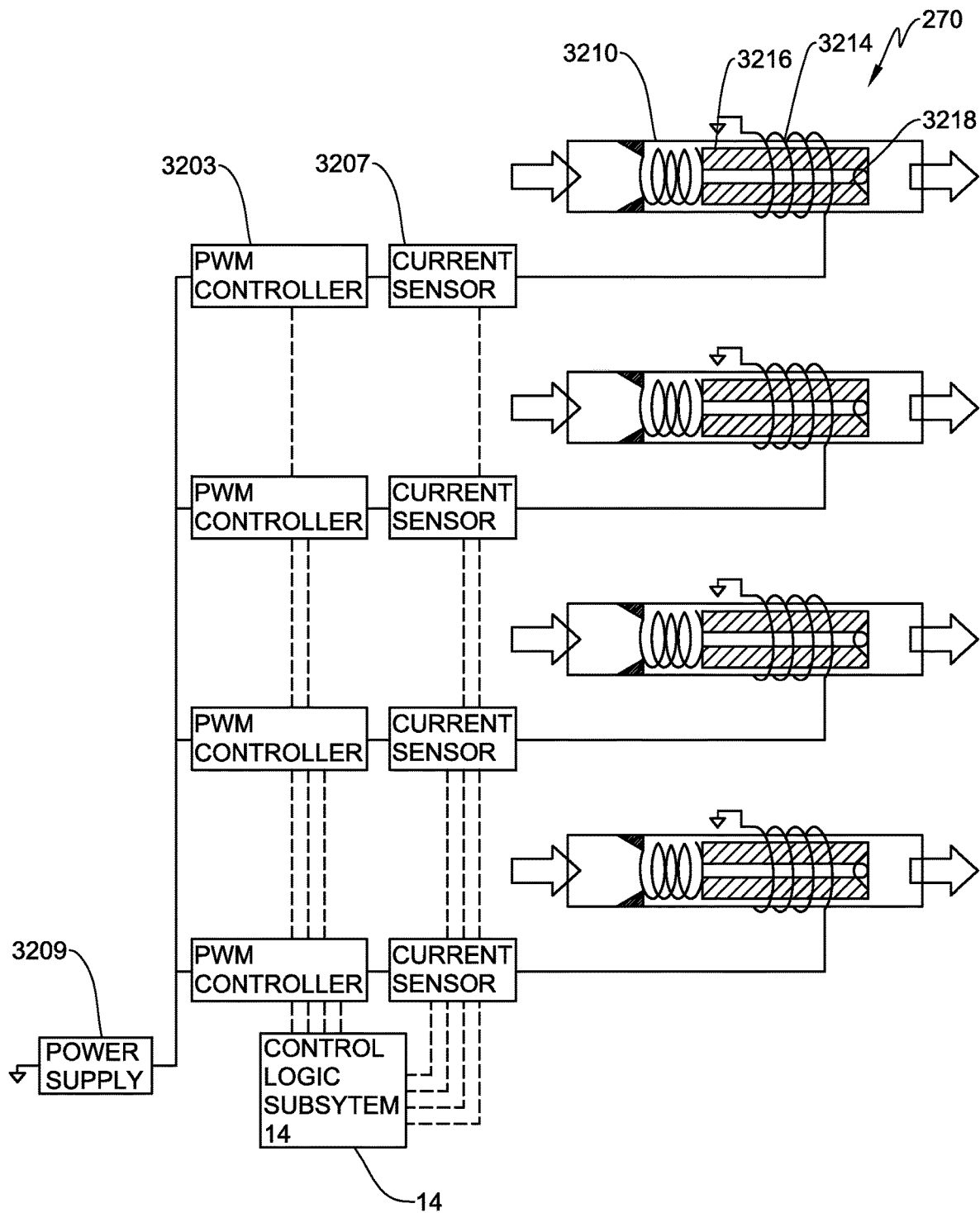
FIG. 66 is a schematic representation of an exemplary solenoid pump, measurement and control circuitry.

In some embodiments, one or more of pump assemblies 270, 272, 274, 276 shown in FIG. 4 may be a solenoid piston pump assembly that is driven by an electrical circuit and logic that allows the flow to be monitored. An example of an embodiment of a solenoid pump 270 and drive circuitry are shown in FIG. 66, where the pump 270 is energized by passing current through the coil 3214. The resulting magnetic flux may drive the solenoid slug or piston 3216 to the left and may compress the return spring 3210. The pumped fluid may flow through the piston 3216 and check valve 3218 as the piston 3218 moves to the left. The spring 3210 may return the piston 3216 to the right when coils 3214 are no longer applying enough magnetic flux to hold the spring compressed. As the piston 3216 moves to the right, the check valve 3218 may close and force the fluid out of the pump. In some embodiments, pumps available from ULKA Costruzioni Elettromeccaniche S.p.A. of Pavia, Italy may be used.

The solenoid piston pump may move a given volume of fluid from left to right each time the piston compresses the spring to the left hand side of FIG. 66 and returns to the original position on the right. The solenoid piston pump may be energized by a number of driving circuits that are well known in the art. The various modes of applying the current include, but are not limited to, dithering the current, sinusoidal dither, dither scheduling the current and/or using various Pulse Width Modulation ("PWM") techniques.

Some embodiments include where the driving circuit is connected to a power supply by a circuit capable of creating a variable current through the coils 3214 and measuring the current flow through the solenoid. The circuit may measure the current flow indirectly by measuring other parameters which may include, but are not limited to, one or more of the following: the voltage across the solenoid coil and/or the duty cycle of the periodic current flow. In some embodiments, as shown in FIG. 66, multiple solenoid pump may be connected to a power supply via a PWM controller 3203 and a current sensor 3207. However, in some embodiments, one solenoid pump may be connected to a power supply via a PWM controller 3203 and a current sensor 3207. The PWM controller 3203 may operate at a high frequency to control the voltage supplied to the coil superimposed on a slower frequency to control the cycling of the pump. In some embodiments, the PWM controller 3203 may energize the pump at a frequency optimized for pump operation, referred to herein as "optimized pump frequency". The optimized pump frequency may, in some embodiments, be determined by one or more variables including, but not limited to, the stiffness of the spring 3210, the mass of the piston 3216, and/or the viscosity of the fluid. In some embodiments, the pump frequency may be approximately 20 Hz. However in other embodiments, the pump frequency may be greater than or less than 20 Hz. The PWM controller 3203 may control the voltage while energizing the pump by cycling at a high frequency at a range of duty cycles. In some embodiments the PWM controller 3203 cycles at 10 kHz while energizing the pump coil. In some embodiments, the methodology for generating the above-described drive signal is one disclosed in U.S. patent application Ser. No. 11/851,344, entitled SYSTEM AND METHOD FOR GENERATING A DRIVE SIGNAL, which was filed on 6 Sep. 2007, now U.S. Pat. No. 7,905,373, issued Mar. 15, 2011, which is hereby incorporated herein by reference in its entirety.

In some embodiments, the PWM controller 3203 may vary the voltage during the time the pump is energized. In some embodiments, the PWM controller 3203 may hold the voltage constant while the pump is energized. In some embodiments, the PWM controller 3203 may initially raise the voltage to the desired level and hold the voltage constant during the pump energization, then ramp the voltage down to zero at a desired rate. In some embodiments, the voltage may be ramped down to zero to minimized noise in the drive circuits of the other pumps sharing a common power supply.

In some embodiments, the duty cycle may be fixed to provide a constant voltage or, in some embodiments, the duty cycle may be varied to provide a time varying voltage while energizing the pump. In some embodiments, the PWM controller 3203 and current sensor 3207 may be linked to the control logic subsystem 14. In some embodiments, the control logic subsystem 14 may control the flow of fluids through the pump by commanding the pump duty cycle. The control logic subsystem 14 may vary the voltage applied to the pump by varying the high frequency duty cycle. The control logic subsystem 14 may monitor and record the current through the pump. The control logic subsystem 14 may vary the high frequency duty cycle of the PWM controller 3203 to control the current measured by the current sensor 3207. In some embodiments, the control logic subsystem 14 may monitor the current sensor signal to identify abnormal flow conditions.

Figure 67:
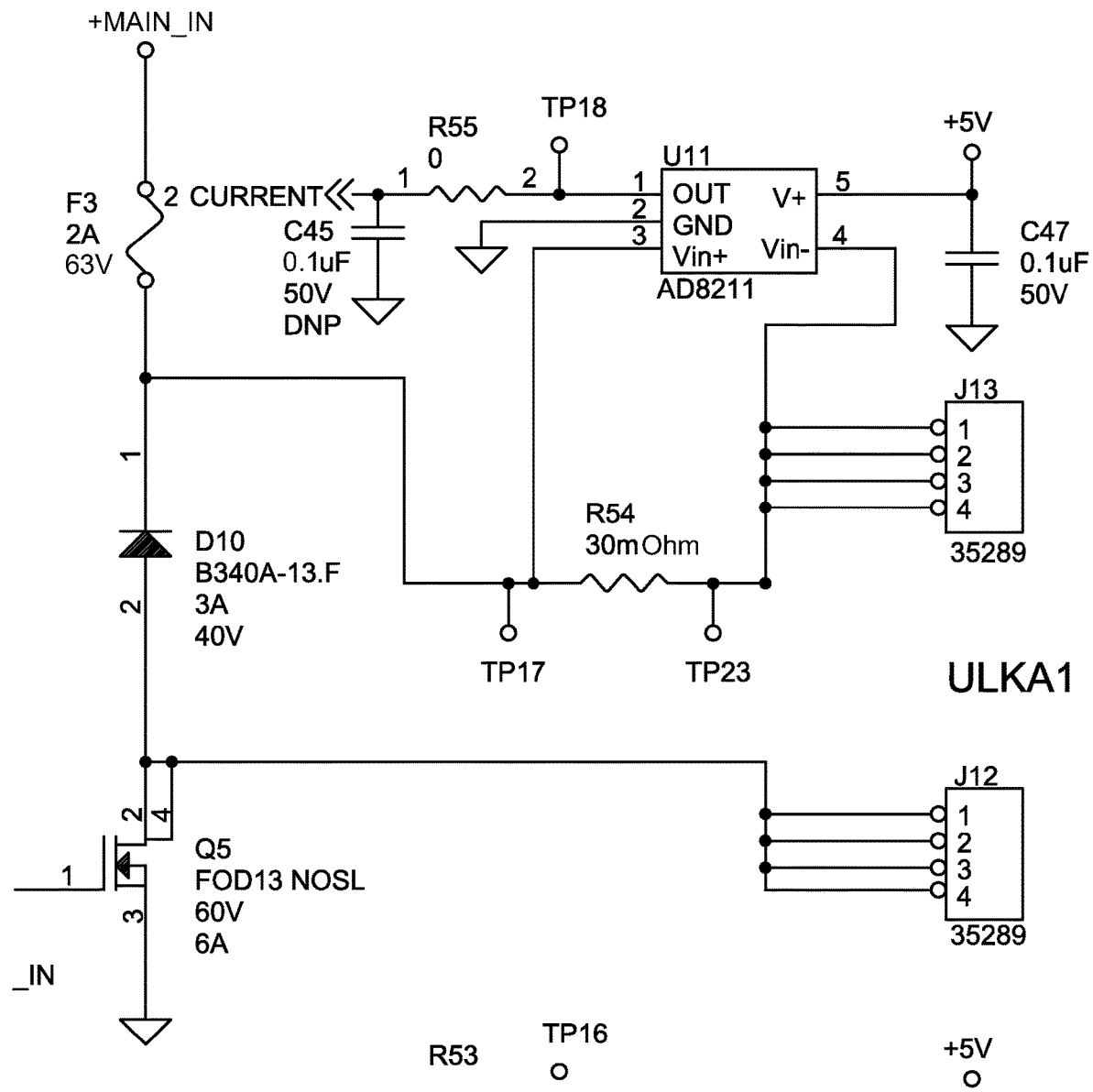
FIG. 67 is a schematic representation of the pwm controller and current sensing circuit.

One embodiment of the PWM controller and current sensor is shown schematically in FIG. 67. This embodiment is one embodiment and in various other embodiments the arrangement of the PWM controller and current sensor may vary. Q5 is the transistor for PWMing the current to the solenoid. The R54 is a high-side current-sense resistor used by U11 current-sense/difference amplifier with output signal CURRENT1. The connectors J12 and J13 are the electrical interface to the solenoid. F3 is a fuse for catastrophic fault isolation. D10 is for snubbing energy stored in solenoid inductance. The power supply provides 28.5V DC power. However, in some embodiments, the schematic may vary.

In some embodiments, the flow through the solenoid pump 270 may be monitored by measuring the current flow through the solenoid coil 3214. The coil is an inductor-resistor element which allows a rising current flow after the voltage is applied. The position of the piston 3216 relative to the coil 3214 affects the inductance of the coil and thus affects the shape of the current rise.

Figure 68A:
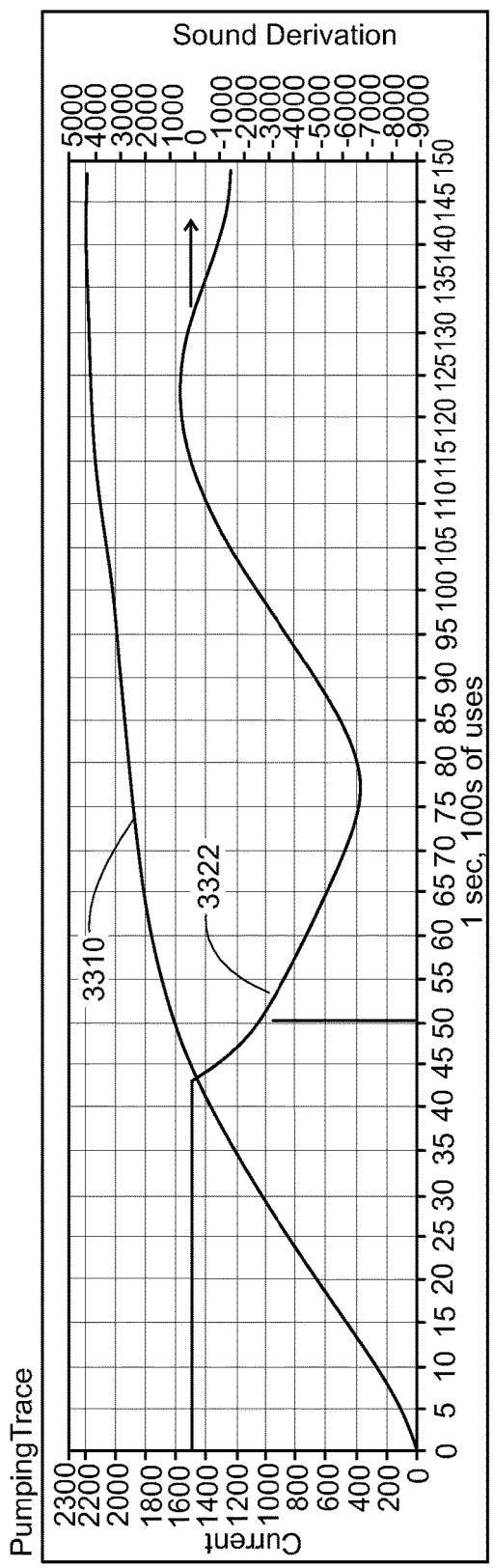
FIGS. 68A, 68B, 68C and 68D plot the time varying current in a solenoid pump for a different normal, empty and occluded cases according to one embodiment.

A "functional pump stroke" is defined herein as a pump stroke that moves a volume of fluid out the pump that is a significant fraction of the rated volume per stroke for the given pump. A functional pump stroke may be further defined as not exceeding the design temperature or current limits for the coil 3214. One example of a functional pump stroke is shown in FIG. 68A. The current through the solenoid coil is plotted as line 3310 that starts at zero and rises toward a steady state value. Line 3325 plots the $2^{nd}$ time derivative of the current through the solenoid. The timing and size of the $2^{nd}$ derivative peak 3325 may be indicative of the timing and speed of the piston. The current measurements may indicate a number of abnormal conditions including, but not limited to, one or more of the following: air or vacuum in the pump, blocked or occluded line, excessive coil temperature, and/or abnormal coil current.

In some embodiments, the control logic subsystem 14 may determine if one or more micro-ingredient product containers, for example, product containers 254, 256, 258 shown in FIG. 4, are empty or unable to supply additional ingredient, by monitoring the signal from the current sensor 3207. Product containers 254, 256, 258 are herein used as an example of one embodiment, however, in various other embodiments, the number of product containers may vary. The condition of an empty product container 254, 256, 258 or a blocked line upstream of the valve 270 is herein referred to as a "Sold-Out Condition".

The micro-ingredient product container 254, 256, 258 may contain RFID tags that store a value that represents the amount of liquid left in the product container 254, 256, 258. This value is herein referred to as the "Fuel Gauge" and has units of milliliters (mL). The Fuel Gauge is set to a full value when the product container 254, 256, 258 is filled. In use the Fuel Gauge value may be periodically updated by the control logic subsystem 14.

In some embodiments, the control logic subsystem 14 may determine the Sold-Out Condition (of a product container) exists based in part on the output of the current sensor 3207. In some embodiments, the control logic subsystem 14 may determine the Sold-Out Condition exists in a micro-ingredient product container 254, 256, 258 based in part on the Fuel Gauge value of the container. In some embodiments, the control logic subsystem 14 may determine the Sold-Out Condition based on one or more inputs including but not limited to one or more of the following: the current sensor output, the Fuel Gauge value and/or the status of the pour. The output of the current sensor 3207 during each pump stroke may be processed by the control logic subsystem 14 to determine if the stroke was a functional stroke, a Sold-Out Stroke or a non-functional stroke. The functional stroke was defined above and the Sold-Out Stroke and non-functional strokes will be more fully described below.

In some embodiments, the control logic subsystem 14 determines a Sold-Out condition exists if a given number/threshold of consecutive Sold-Out Strokes occurs. The threshold number of consecutive Sold-Out Strokes varies with the Fuel Gauge value and with the status of the pour. For example, in some embodiments, the control logic subsystem 14 may declare a Sold-Out Condition when the Fuel Gauge is above a threshold volume, for example, 60 mLs, and the pump experiences a threshold number of Sold-Out Strokes in a row, for example, 60 Sold-Out Strokes in a row, however these values are given merely by example and in various other embodiments, these values may differ. The sensitivity of the Sold-Out Algorithm is reduced in some embodiments, because the Fuel Gauge indicates a substantial amount of fluid left in the container. When the Fuel Gauge is below the threshold volume, which, in some embodiments, may be 60 mLs for example, the control logic subsystem 14 may declare a Sold-Out Condition if there are a threshold number of Sold-Out Strokes in a row, e.g. three (3) consecutive Sold-Out Strokes, or if the system determines that the threshold number of consecutive Sold-Out Strokes is reached, and there have been e.g. twelve (12) strokes to container 30 during the current pour. In some embodiments, if the Fuel Gauge is below the threshold volume, e.g. 60 mLs, and there have been less than e.g. 12 strokes during the current pour, the control logic subsystem 14 may declare a Sold-Out Condition after e.g. 20 consecutive Sold-Out Strokes. In some embodiments, the number of Sold-Out Strokes may be stored from pour to pour. The Sold-Out Stroke counter may be reset to zero anytime a functional stroke is recorded. The criteria for non-functional stroke are described below and include criteria for an occluded stroke, a temperature error and a current error.

In various embodiments, multiple pumps may pump fluid out of a common source to achieve a desired flow rate. The common source may include any fluid including, but not limited to non-nutritive sweetener (NNS). The control logic subsystem 14 may declare a Sold-Out Condition for example when any one pump produces a given number of consecutive Sold-Out Strokes. In some embodiments, the control logic subsystem 14 declares a Sold-Out Condition when any one of the pumps has 20 consecutive Sold-Out Strokes. However, in various other embodiments, the number of consecutive Sold-Out Strokes that indicate a Sold-Out Condition may vary.

Figure 68B:
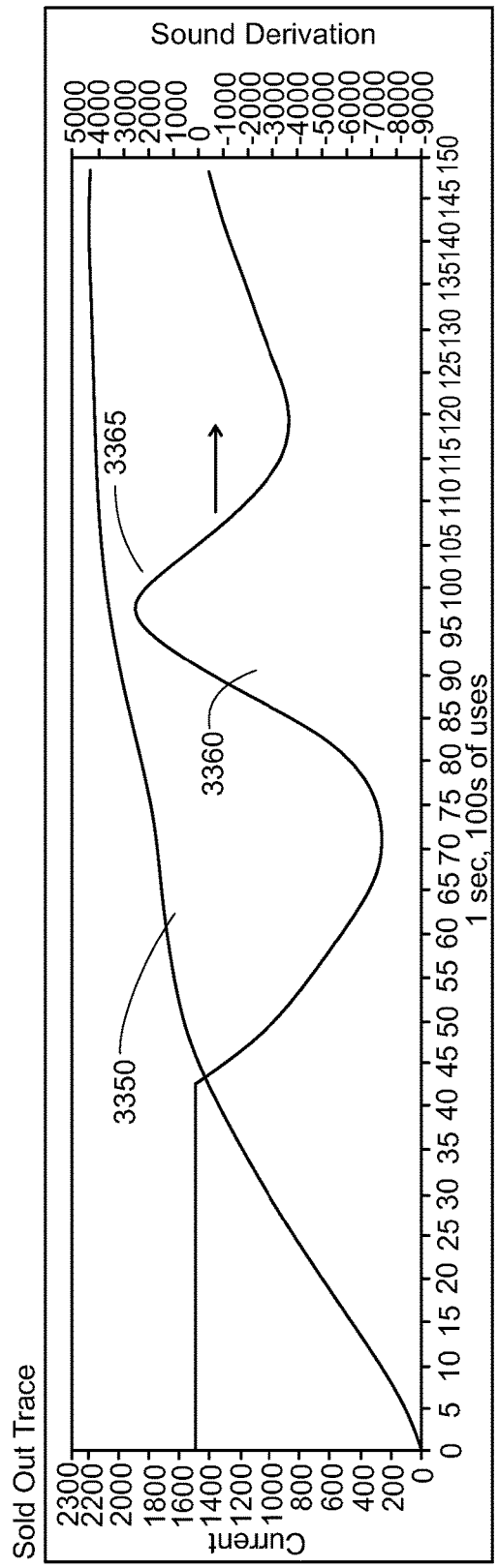

In some embodiments, a Sold-Out Stroke may be detected by the control logic subsystem 14 by an algorithm that measures the peak amplitude of the $2^{nd}$ order time derivative of the current and the timing of the peak amplitude. Referring to FIG. 68B, an exemplary plot of the current 3350 and its $2^{nd}$ derivative 3360 for a Sold-Out stroke is shown. The peak in the $2^{nd}$ derivative 3360 of the current with respect to time at 3365 is higher and earlier than the peak 3325 for a normal pumping trace shown in FIG. 68A.

A Sold-Out Stroke may be defined as a value of SO greater than a threshold value where SO is defined as:

$$SO = \frac{\frac{d^2I}{dt^2_{max}}}{(t_{max} - ft)^2} \quad \text{[EQN 1]}$$

$d^2I/dt^2{}_{max}$ is the maximum value of the $2^{nd}$ time derivative of the current, $t_{max}$ is the time from the start of current flow to $d^2I/dt^2{}_{max}$ and ft is a constant. The SO threshold value for a Sold-out Stroke may be determined experimentally. The constant ft may be calibrated for each solenoid pump. The constant ft may be equal to 9.5 milliseconds.

In some embodiments, the SO value may be calculated from raw A-D measurement and the number of time steps.

$$SO = \frac{\ddot{I}_{max} * 2^{16}}{(t_{max} - ft)^2} \quad \text{[EQN 2]}$$

Where $\ddot{I}_{max}$ is the peak value for the $2^{nd}$ derivative of the current and $t_{max}$ is the number of time steps after voltage is applied to the solenoid pump. The value of ft may be calibrated for each solenoid pump or may be set to 95. The SO threshold value is 327680 for this calculation.

In some embodiments, the $2^{nd}$ time derivative of the current may be calculated by first filtering the current signal with an alpha beta filter:

$I_i = \alpha I_{i-1} + \beta C_i$ $\alpha = 0.9$ $\beta = 0.1$ [EQN 3]

where $I_{i-1}$ is the current calculated in the previous step, and $C_i$ is the current read from the A-D (in A-D counts), where one count equals 1.22 mA. The first and second derivatives of the current with respect to time may be calculated as $$\dot{I} = \sum_{-15}^{k=0} I_k - 4\sum_{-15}^{k=-12} I_k \quad \text{[EQN 4]}$$

$$\ddot{I} = \sum_{-15}^{k=0} \dot{I}_k - 4\sum_{-15}^{k=-12} \dot{I}_k \quad \text{[EQN 5]}$$

The $2^{nd}$ derivative may be filtered with an alpha beta filter where $\alpha = 0.85$ and $\beta = 0.15$.

$\ddot{I}_i = \alpha \ddot{I}_{i-1} + \beta \ddot{I}_i$ [EQN 6]

The determination of the 2nd time derivative of the current is described as an example and may be calculated by a number of alternate methods well known in the art.

Figure 68C:
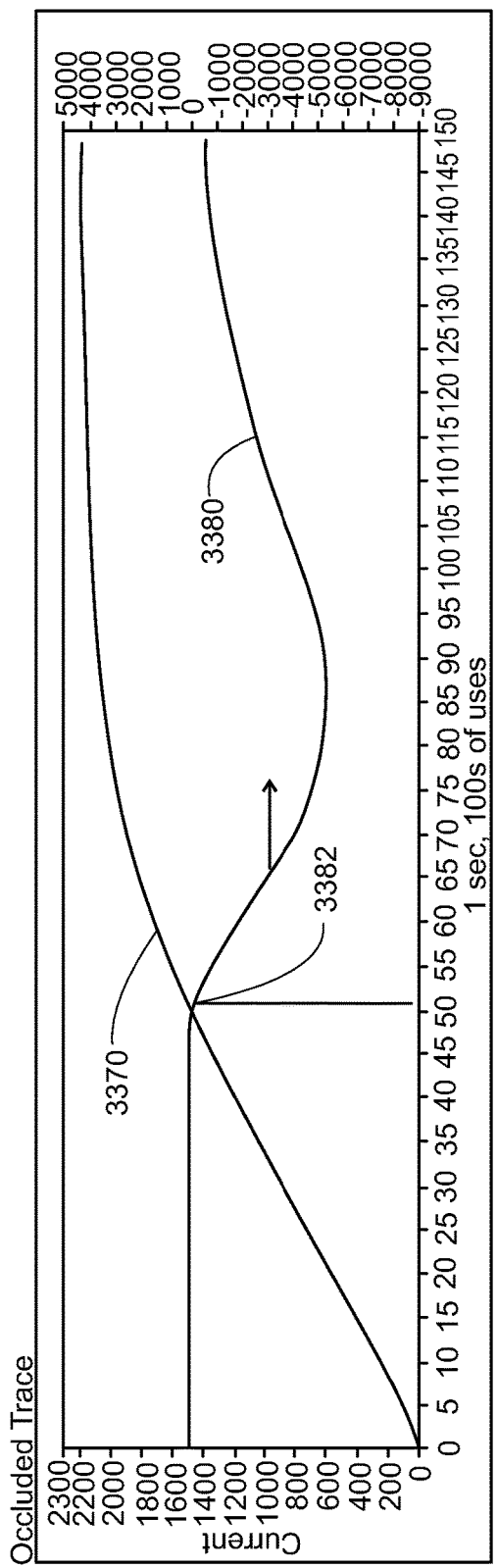
Figure 68D:
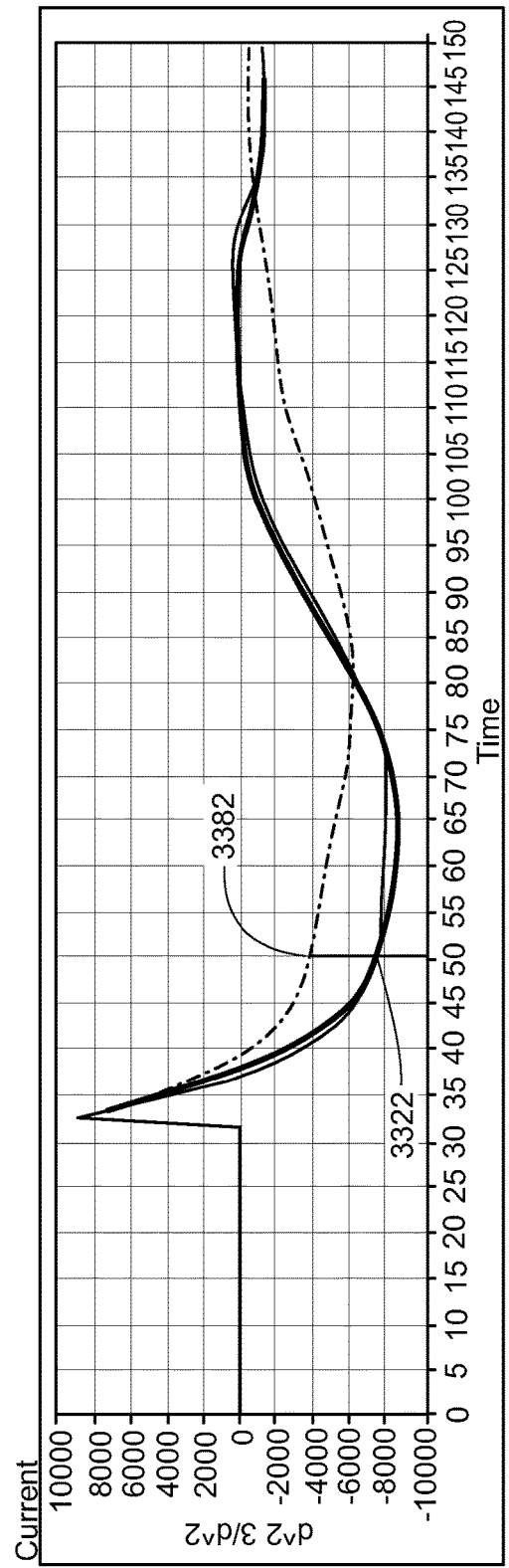

In some embodiments, the control logic subsystem 14 may determine if the line supplying fluid to the container 30 in FIG. 1 is blocked or occluded based on the signal from the current sensor 3207. Referring to FIG. 68C, an exemplary plot of the current 3370 and its $2^{nd}$ derivative 3380 for a occluded stroke is shown. The value of the $2^{nd}$ time derivative 3382 at 5 ms or 50 time steps may be significantly higher than the $2^{nd}$ time derivative of the current in a functional pumping stroke 3322 in FIG. 68A. Referring to FIG. 68D, an exemplary plot of the $2^{nd}$ time derivative of the current for pumping strokes 3320 and for an occluded stroke 3380 is shown. In some embodiments, the control logic subsystem 14 may determine that an occluded condition exists if the $2^{nd}$ time derivative of the current flow is above an occluded threshold value at a specified time. The specified time and threshold values may be determined experimentally. The specified time and threshold values may be determined for each pump.

In some embodiments the occlusion value OCC may be determined by the following equation:

$$OCC = \ddot{I}_{50} + (A*R - B) \quad \text{[EQN 7]}$$

Where $\ddot{I}_{50}$ is the $2^{nd}$ time derivative of the current at 5 ms after voltage is applied to the solenoid pump, R is the resistance of the coil and A and B are empirical constants. In some embodiments, the resistance R may be measured during the maximum current flow at the end of the piston stroke which may occur e.g. 14.0 ms after voltage is first applied to the pump. The resistance may be calculated from the applied voltage and measured current. The applied voltage may be calculated from the voltage of the power supply 3209 times the PWM duty cycle. The power supply voltage may be an assumed value or it may be measured. The current may be measured by the current sensor 3207.

In some embodiments the OCC value may be calculated from raw A-D measurement and the number of time steps as:

$$OCC = \ddot{I}_{50} + (3.84*\text{Resistance} - 9216) \quad \text{[EQN 8]}$$

The occluded threshold for this equation may be −2304. Alternatively the occluded threshold may be set to a value 2048 above the OCC value for a functional pump stroke. The OCC value for a normal pump stroke may be determined on a manufacturing test and the value recorded for each pump. Therefore the OCC value may vary in various embodiments.

The resistance is calculated as $$\text{Resistance} = \frac{1195*(5000 - PWM_{Value})}{I_{Max}} \quad \text{[EQN 9]}$$

where the PWM_Value may vary between 200 and 2000 (27.36 volts to 17.1 volts). The $I_{max}$ is the highest current during the time that the valve is energized.

The coil temperature may be determined from the output of the current sensor. The coil temperature may be calculated from the known temperature coefficient of the coil wire material and the resistance at a known temperature.

$$\text{Temperature} = \frac{\text{Resistance}}{Tcoef * R_{T0}} + T0 \quad \text{[EQN 10]}$$

In some embodiments, copper wire may be used for the coil with a temperature coefficient of 0.4%/° C. and the resistance of the coil is 7 ohms at 20° C.

$$\text{Temperature} = \frac{\text{Resistance}}{0.004*7} + 20 \quad \text{[EQN 11]}$$

where Temperature is the coil temperature in degrees C., Resistance is calculated as described above and has units of ohms. The control logic subsystem 14 may declare a temperature error when the measured temperature, calculated from the coil resistance as described above, exceeds a maximum allowed value. In some embodiments, the maximum allowed temperature for the coil temperature may be 120 degrees C. However, in various other embodiments the maximum allowed temperature for the coil temperature may be less than or greater than 120 degrees C.

In some embodiments, the control logic subsystem 14 may control current by adjusting the PWM command sent to the PWM controller 3203 based on the output of the current sensor 3207. In some embodiments, the PWM command value is limited to values between 200 and 2000 (27.36 and 17.1 volts respectively). However, in various other embodiments the PWM command value may not be limited and in some embodiments where the PWM command value is limited, the values may be greater than or less than the range listed herein by example. The current may be controlled to a maximum value $I_{Max}$ through the following equation:

$$\Delta_i = I_{Max} - I_{Target} \quad \text{[EQN 12]}$$
$$PWM = PWM_{Prev} + \left(\frac{\Delta_i}{2}\right).$$

In some embodiments, the control logic subsystem 14 may compare the measured maximum current $I_{Max}$ to the target current $I_{Target}$ for each stroke. In some embodiments, the control logic subsystem 14 may declare a current error if the absolute current difference [absolute value of $(I_{Max} - I_{Target})$] exceeds a given current error threshold. In some embodiments, the current error threshold may be 1.22 A, however in various other embodiments the maximum current error threshold may be less than or greater than 1.22 A.

In some embodiments, the control logic subsystem 14 may determine that the pump 270 is unable to deliver fluid. In some embodiments, the control logic subsystem 14 may monitor the number of consecutive Occluded Strokes based on the occluded threshold described above. In some embodiments, the control logic subsystem 14 may monitor the number of times coil-temperature errors occur. In some embodiments, the control logic subsystem 14 may monitor the number of times a current error occurs. The logic controller subsystem 14 may determine that the pump 270 is unable to deliver fluid if a sufficient number of consecutive non-functional strokes occur. A non-functional stroke may include, but is not limited to, one or more of the following: an occluded stroke, excessive temperature and/or current error. In some embodiments, the control logic subsystem 14 may declare that the pump is unable to deliver fluid if e.g. 3 non-functional strokes occur consecutively. The non-functional stroke count may in some embodiments return to zero as soon as a functional stroke occurs. However in various other embodiments the number of non-functional strokes required to declare the pump is unable to deliver fluid may be less than or greater than 3.

Noise Detect

In addition to the Sold-Out calculations and methods described above, in some embodiments, Sold-Out may also be determined by analyzing the standard deviation of the Sold-out values to detect noise. This may be desirable for many reasons, including, but not limited to, the ability to determine a Sold-Out condition sooner. In this method, the Sold-Out condition may be determined by measuring the variability of the current signal/Sold-Out values. In some embodiments, by detecting noise a Sold-Out condition may be determined.

Figure 74:
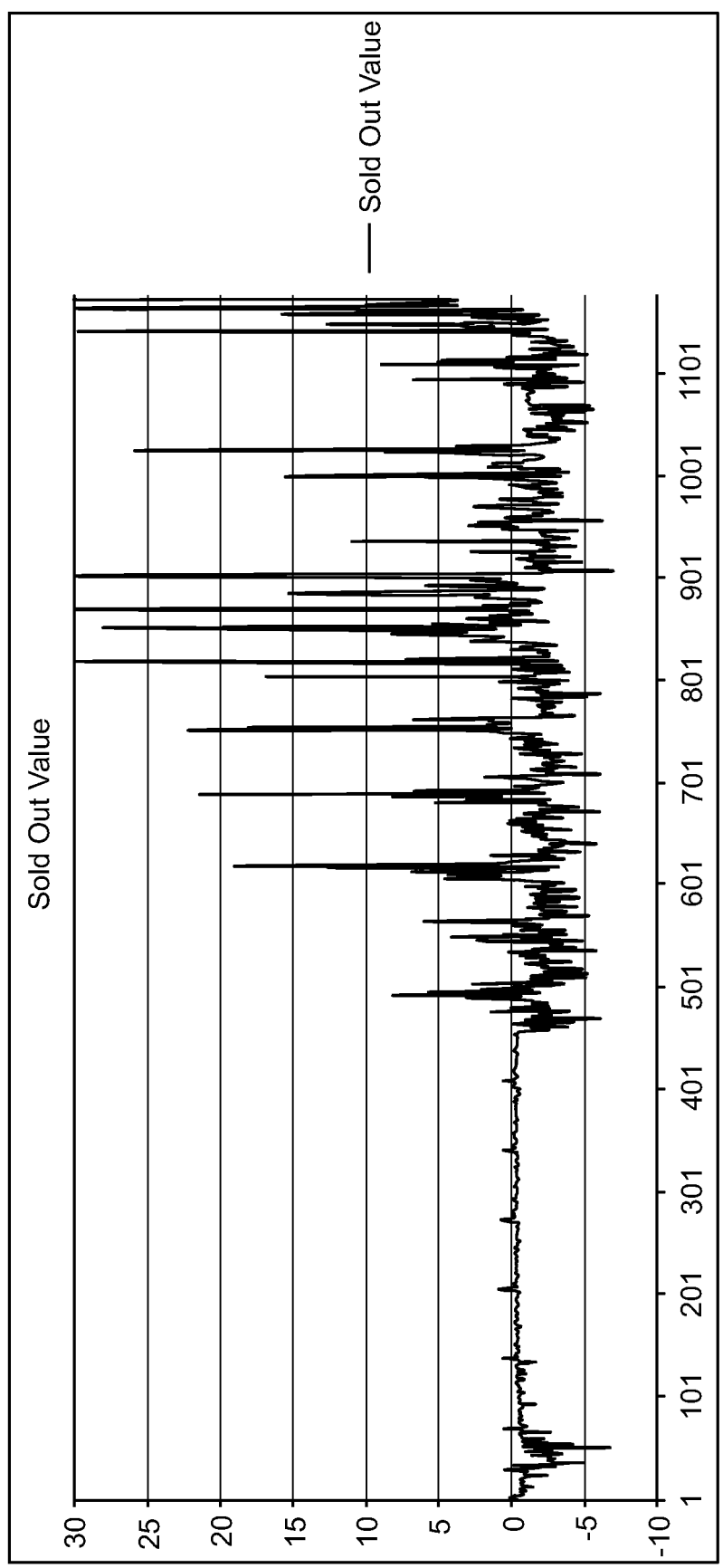
FIG. 74 is a plot of pulses and Sold-Out Value of a product according to one embodiment.

Referring to FIG. 74, this data represents results showing the Sold-Out value. In this example, the product was not found to be Sold-Out until the end of the data set. However, during this time, and before the product was found to be Sold-Out, the product was under-delivered where the Sold-Out value was noisy.

In some embodiments, a method to determine a Sold-Out condition may include analyzing the noise of the Sold-Out value. In some embodiments, the standard deviation may be used to detect the noise. The standard deviation is shown below:

$$\sigma = \sqrt{\frac{1}{N}\sum_{i=1}^{N}(x_i - \bar{x})^2}$$ [EQN 13]

The standard deviation equation may be simplified to make the equation more efficient for use by removing constants and eliminating square roots and multiplications. In some embodiments, the simplified equation may be used. The resulting equation is an approximation of standard deviation, at least in terms of the signal to noise ratio for the Sold-Out data, while relying only on add, subtract, and shift operations.

$$\bar{x} = \left[\sum_{i=1}^{8} x_i\right] \gg 3$$ [EQN 14]

$$\sigma = \sum_{i=1}^{8} |x_i - \bar{x}|$$

Figure 75:
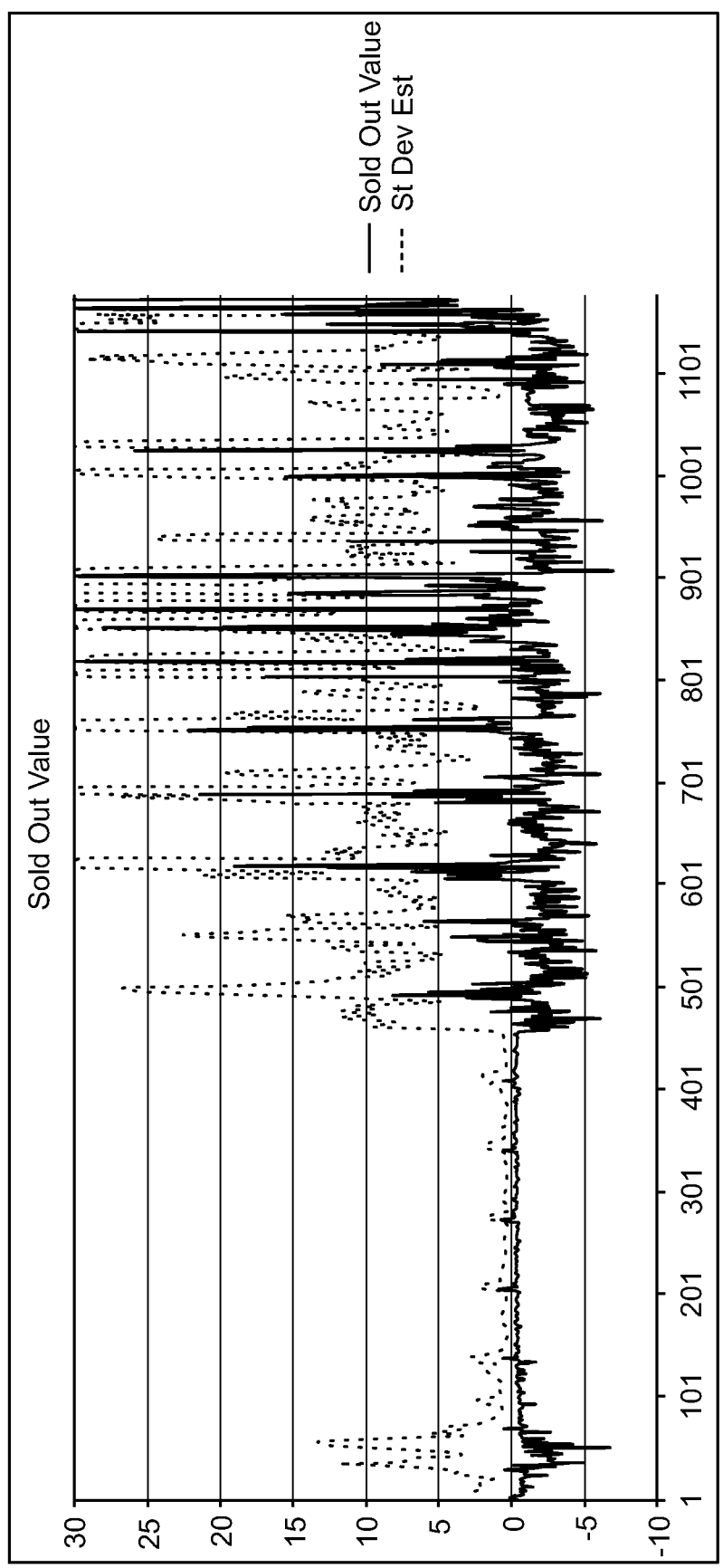
FIG. 75 is a plot of pulses and Sold-Out Value and pulses and Estimated Standard Deviation according to one embodiment.

Referring now to FIG. 75, the standard deviation estimate is shown compared with the Sold-Out Value. As shown, the calculations above measure the difference between normal pumping and the noise condition. In various embodiments, a predetermined, pre-programmed threshold may be set to indicate a noise condition. In various embodiments, a standard deviation/estimated standard deviation threshold may be preset/pre-programmed at 10. However, in other embodiments, the threshold amount may be greater than or less than 10.

In some embodiments, the standard deviation method to determine Sold-Out may be pre-programmed to be inactive when the Fuel Gauge is above a threshold amount, which, in some embodiments, may be 60 mL, but in other embodiments, the threshold amount may be greater than or less than 60 mL.

In some embodiments, the equation 15, shown below, may be used, where x is the calculated Sold Out value described above.

$$\bar{x} = \left[\sum_{i=1}^{8} x_i\right] \gg 3$$ [EQN 15]

$$\sigma = \sum_{i=1}^{8} |x_i - \bar{x}|$$

In some embodiments, the system may determine the product is Sold-Out (and, in some embodiments, when the system determines that the product is Sold-Out for a given pulse, the system increments a counter, as described above) if, for a given pulse, the Sold-Out value is greater than a predetermined/pre-set threshold or if the standard deviation or estimated standard deviation is greater than a predetermined/pre-set threshold. For each of these conditions, in some embodiments, a counter is incremented. In some embodiments, once the counter reaches a predetermined/pre-set threshold, the product container is Sold-Out.

In some embodiments, a Fuel Gauge method is used. In some embodiments, the RFID tag assembly indicates the volume of product in the product container. In some embodiments, each time product is pumped out of the product container, the RFID tag assembly is updated with the updated volume by subtracting the volume pumped from the volume Fuel Gauge. In some embodiments, when the Fuel Gauge reaches a preset/predetermined threshold, for example, in some embodiments, the preset/predetermined threshold may be −15 ml, the system may determine that the product container is Sold-Out even if the above-discussed Sold-Out methods do not determine that the product container is Sold-Out. In some embodiments, if the Fuel Gauge reaches a preset/predetermined threshold, the system may desensitize the Sold-Out and/or standard deviation equation. In some embodiments, this threshold may be 60.

In some embodiments, each of product module assemblies 250*d*, 250*e*, 250*f* may include a respective plurality of pump assemblies. For example, and referring also to FIGS. 69A, 69B, 69D, 69E, and 69F, product module assemblies 250*d*, 250*e*, 250*f* in FIG. 4 may generally include pump assemblies 4270*a*, 4270*b*, 4270*d*, and 4270*e*. A respective one of pump assemblies 4270*a*, 4270*b*, 4270*c*, 4270*d* may be associated with one of slot assemblies 260, 262, 264, 266, e.g., for pumping ingredients contained within a respective product container (e.g., product container 256). For example, each of pump assemblies 4270*a*, 4270*b*, 4270*c*, 4270*d* may include a respective fluid coupling stem (e.g., fluid coupling stems 1250, 1252, 1254, 1256), e.g., which may fluidly couple to a product container (e.g., product container 256) via a cooperating fitment (e.g., fitment feature 1158*a*, 1158*b* shown in FIGS. 43B and 44).

Figure 69A:
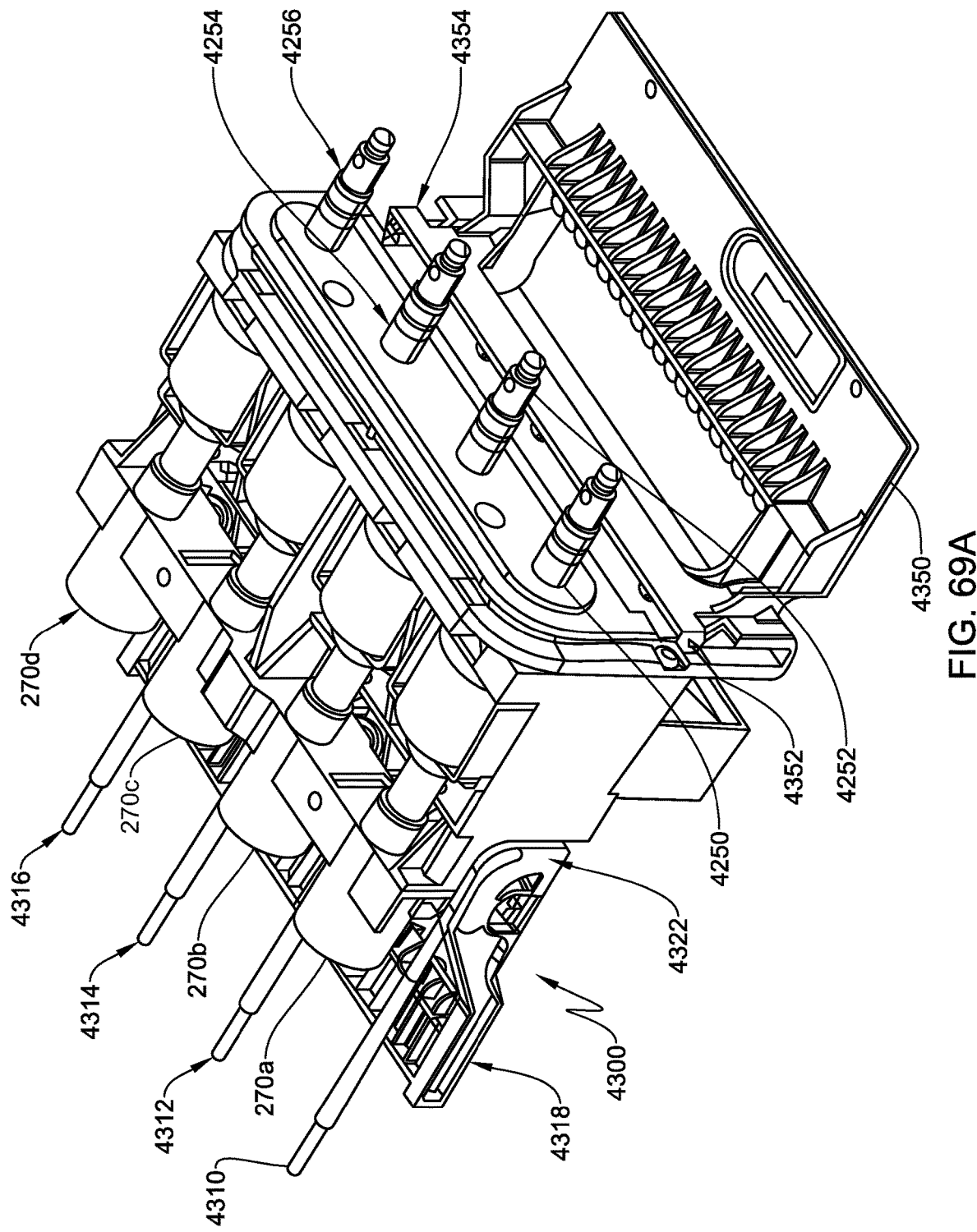
FIGS. 69A, 69B, 69C, 69D, 69E, and 69F diagrammatically depict an alternative quad product module of the microingredient shelf of FIGS. 46A, 46B, 46C, and 46D according to one embodiment.
Figure 69B:
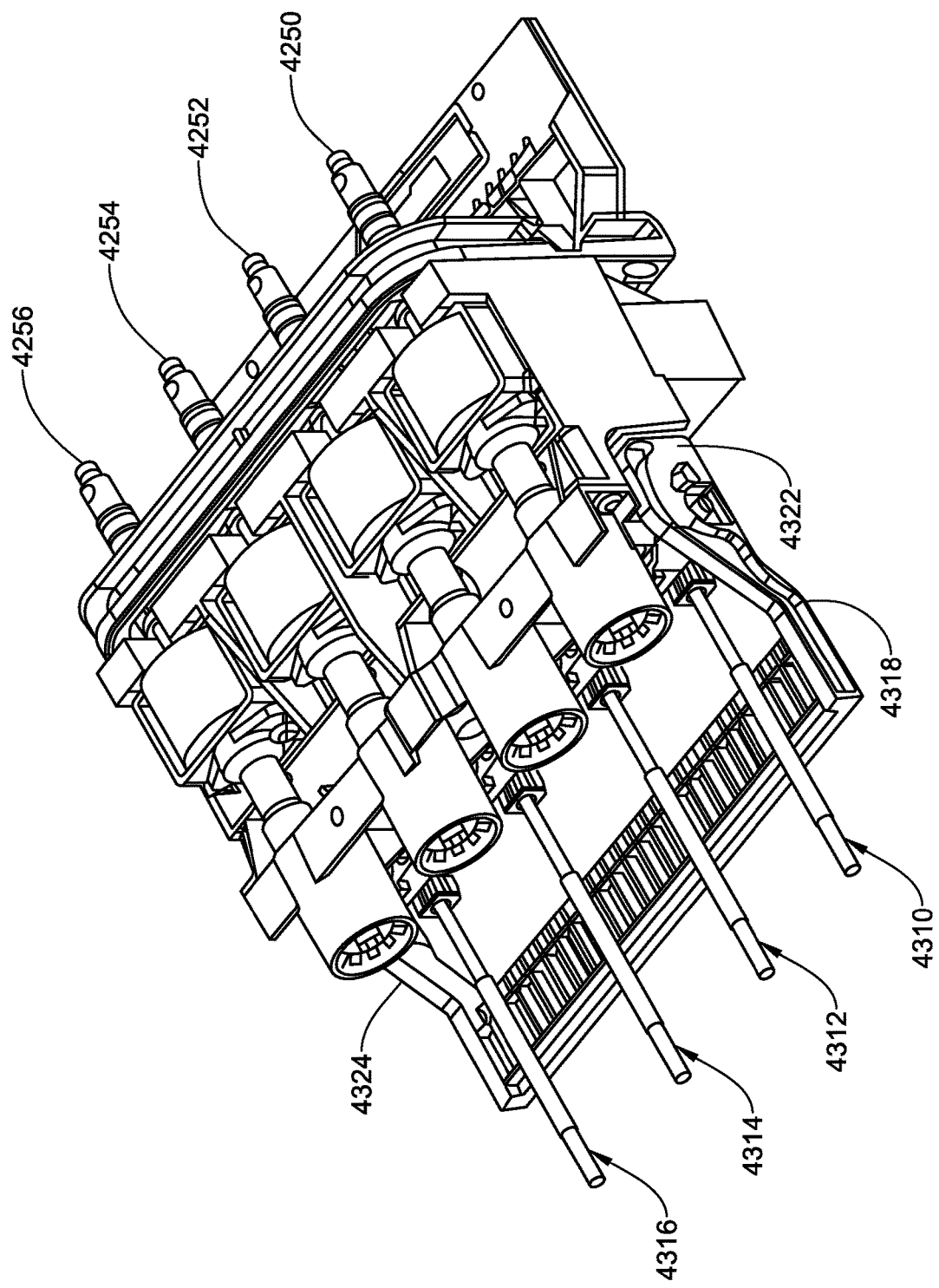
Figure 69C:
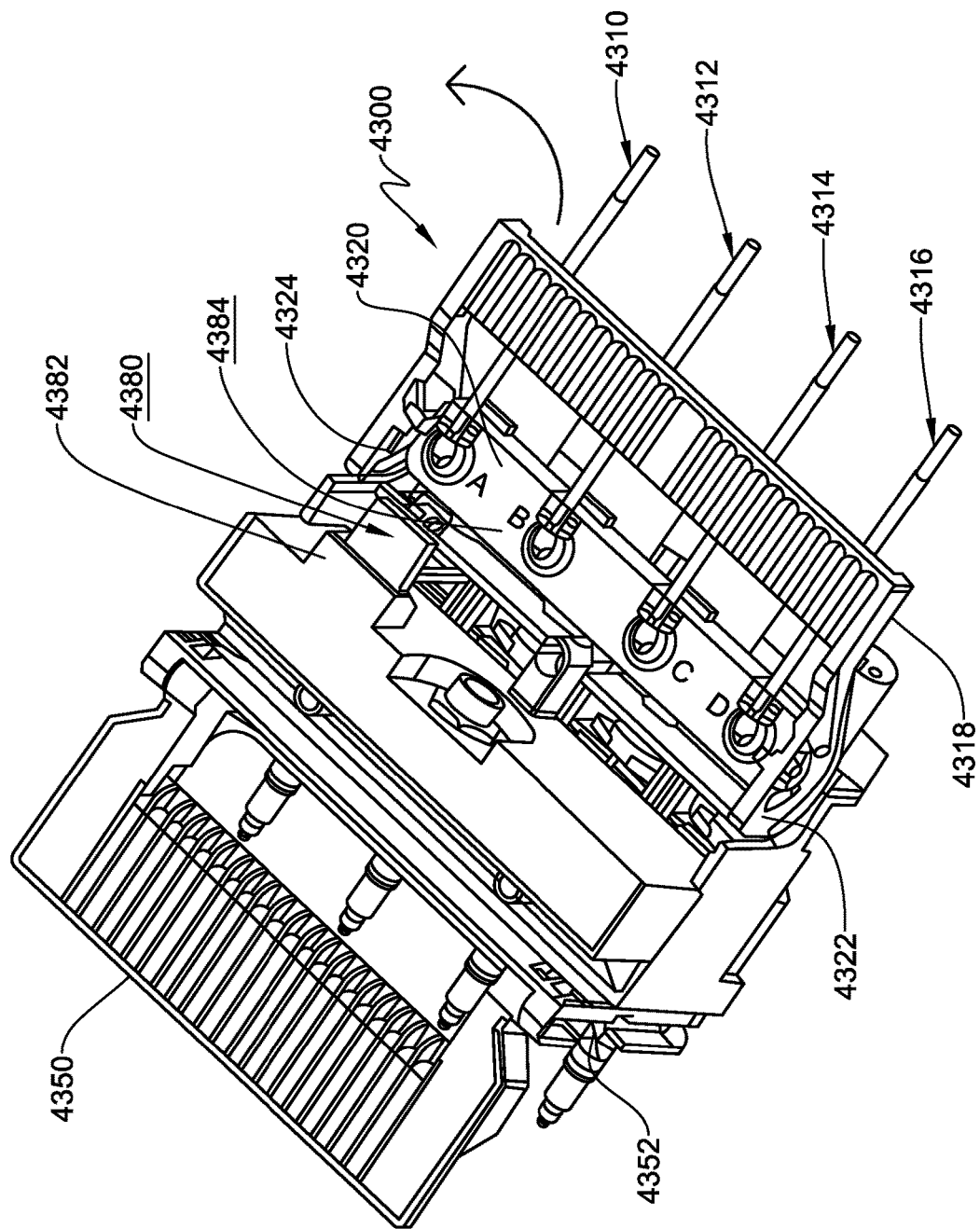
Figure 69D:
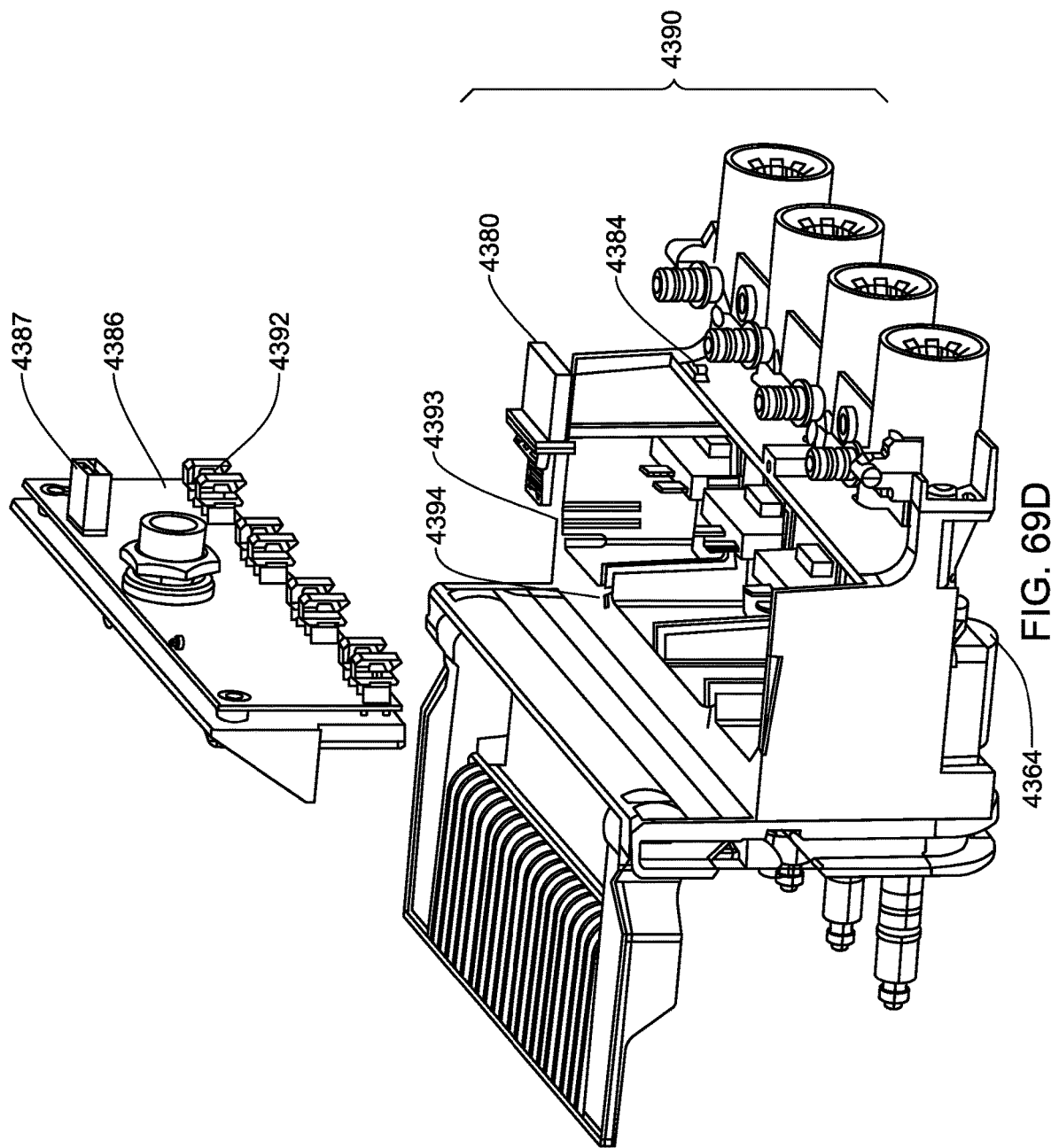
Figure 69E:
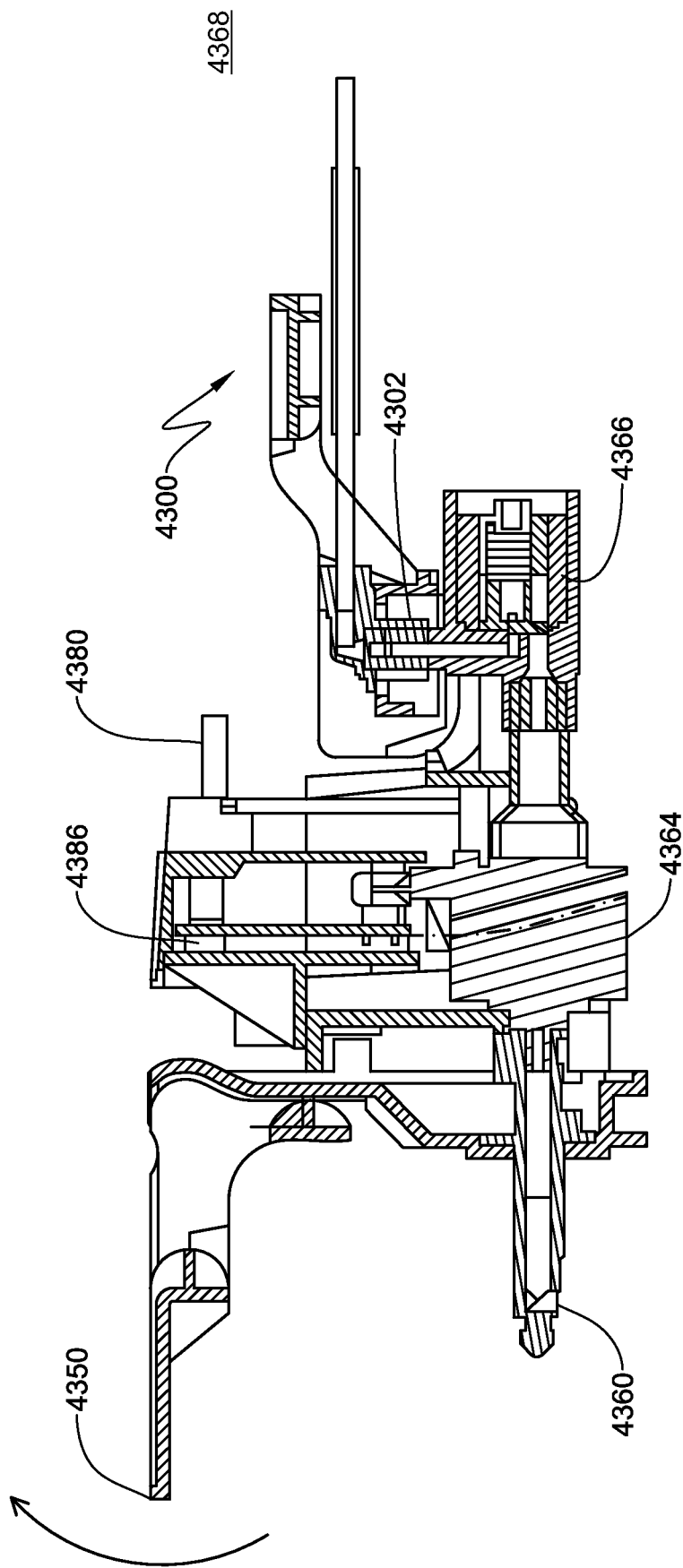

Referring to FIG. 69E, a cross sectional view of the pump module assembly 250*d* is shown. The assembly 250*d* includes a fluid inlet 4360 which is shown in the cross sectional view of the fitment. The fitment mates with the female part (shown in FIG. 43B as 1158*a*) of the product containers (not shown, shown as 256 in FIG. 43B, amongst other figures). The fluid from the product container enters the pump assembly 250*d* at the fluid inlet 4360. The fluid flows through the pump 4364, past the backpressure regulator 4366 and up to the fluid outlet 4368. As shown herein, the fluid flow path through the pump module assembly 250*d* allows the air to flow through the assembly 250*d* without being trapped within the assembly. The fluid inlet 4360 is on a lower plane than the fluid exit 4368. Additionally, the fluid travels vertically from the plane of the inlet and pump 4368 through the back pressure regulator 4366 to the plane of the exit 4368. Thus, the arrangement allows the fluid to continually flow upwards allowing air to flow through the system without getting trapped. Thus, the pump module assembly 250*d* design is a self-priming and purging positive displacement fluid delivery system.

Figure 69F:
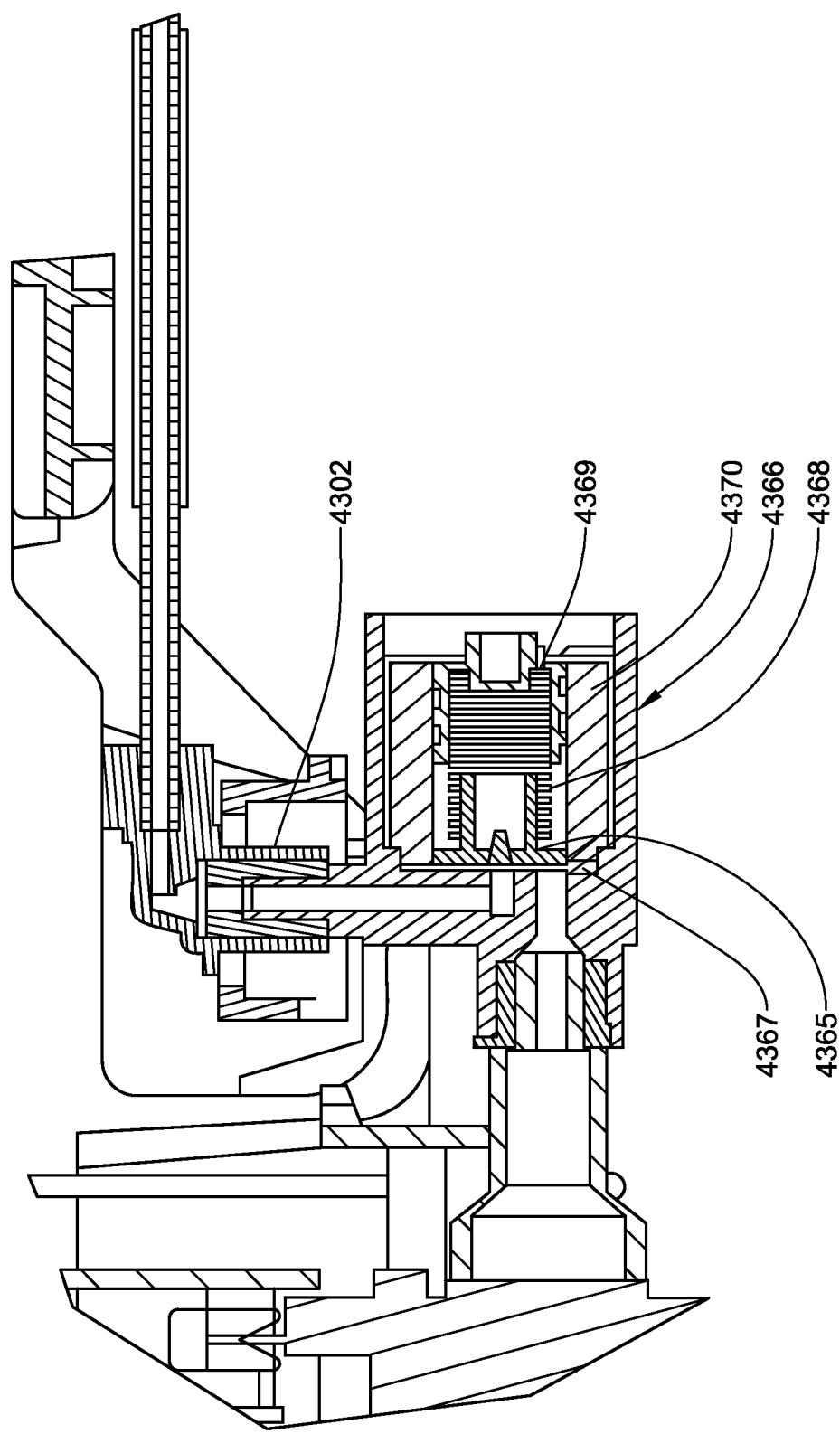

Referring to FIGS. 69E and 69F, the backpressure regulator 4366 may be any backpressure regulator; however, an embodiment of the backpressure regulator 4366 for pumping small volumes is shown. The backpressure regulator 4366 includes a diaphragm 4367 including "volcano" features and a molded o-ring about the outer diameter. The o-ring creates a seal. A piston 4365 is connected to the diaphragm 4367. A spring 4366, about the piston 4365, biases the piston and the diaphragm in a closed position. In this embodiment, the spring is seated on an outer sleeve 4369. When the fluid pressure meets or exceeds the cracking pressure of the piston/spring assembly, the fluid flows past the backpressure regulator 4366 and towards the fluid exit 4368. In some embodiments, the cracking pressure is approximately 7-9 psi. The cracking pressure may be tuned to the pump 4364. In some embodiments, the cracking pressure may be adjusted by changing the position of the outer sleeve 4369. The outer sleeve 4369 may be threaded into an outer wall 4370. Turning the outer sleeve 4329 relative to the outer wall 4370 may change the preload on the spring 4368 and thus the cracking pressure. An adjustable regulator may be produced more cheaply than a regulator with a precisely fixed back-pressure. An adjustable regulator may then be adjusted and tuned to the individual pump during manufacturing and check-out testing. In various embodiments, the pump may be different from the one described, and in some of those embodiment, another embodiment of the backpressure regulator may be used.

Releasable engagement between outlet plumbing assembly 4300 and product module assembly 250*d* may be effectuated, e.g., via a camming assembly providing facile engagement and release of outlet plumbing assembly 4300 and product module assembly 250*d*. For example, the camming assembly may include handle 4318 rotatably coupled to fitment support 4320, and cam features 4322, 4324. Cam features 4322, 4324 may be engageable with cooperating features (not shown) of product module assembly 250*d*. With reference to FIG. 69C, rotational movement of handle 4318 in the direction of the arrow may release outlet plumbing assembly 4300 from product module assembly 250*d*, e.g., allowing outlet plumbing assembly 4300 to be lifted away, and removed, from product module assembly 250*d*.

With particular reference to FIGS. 69D and 69E, product module assembly 250*d* may similarly be releasably engaged to microingredient shelf 1200, e.g., allowing facile removal/installation of product module assembly 250*d* to microingredient shelf 1200. For example, as shown, product module assembly 250*d* may include release handle 4350, e.g., which may be pivotally connected to product module assembly 250*d*. Release handle 4350 may include, e.g., locking ears 4352, 4354 (e.g., most clearly depicted in FIGS. 69A and 69D). Locking ears 4352, 4354 may engage cooperating features of microingredient shelf 1200, e.g., thereby retaining product module assembly 250*d* in engagement with microingredient shelf 1200. As shown in FIG. 69E, release handle 4350 may be pivotally lifted in the direction of the arrow to disengage locking ears 4352, 4354 from the cooperating features of microingredient shelf 1200. Once disengaged, product module assembly 250*d* may be lifted from microingredient shelf 1200.

One or more sensors may be associated with one or more of handle 4318 and/or release handle 4350. The one or more sensors may provide an output indicative of a locking position of handle 4318 and/or release handle 4350. For example, the output of the one or more sensors may indicate whether handle 4318 and/or release handle 4350 is in an engaged or a disengaged position. Based upon, at least in part the output of the one or more sensor, product module assembly 250*d* may be electrically and/or fluidly isolated from plumbing/control subsystem 20. Exemplary sensors may include, for example, cooperating RFID tags and readers, contact switches, magnetic position sensors, or the like.

The flow may be monitored by measuring the current flow through the solenoid piston pump 4364 as described above. One or more constants used to interpret the current flow measurements may be calibrated to individual pumps in the product module assembly 250*d*. These calibration constants may be determined during check-out testing as part of the manufacturing process. The calibration constants may be stored in an e-prom that is connected to the electronics board via a removal plug. Referring to FIGS. 69C, 69D and 69E, the e-prom may be mounted in a plug 4380 that is connected to the pump electronic board 4386 after assembly. The e-prom plug 4380 may connect to a USB mount 4387 on the electronic board 4386 to assure good mechanical attachment. The e-prom plug 4380 may seal liquid from the electronics by sealing on the inside of the port 4282 of the electronic case. The e-prom 4380 may be attached via a lanyard to a mount 4384 on the case of the product module assemblies 250*d*. The e-prom plug 4380 may be kept with the pump assembly 4390 when the electronics board 4386 is replaced. A separate e-prom advantageously separates the electronics into a plug 4380 that is matched to a specific pump assembly 4390 and an electronic board that can be used with any pump assembly. The electronics board 4386 and the pump assembly 4390 may include features including but not limited to clips for electrical contacts 4392, slots 4393 and threaded holds 4394 to facilitate quick disassembly and reassembly.

Figure 70A:
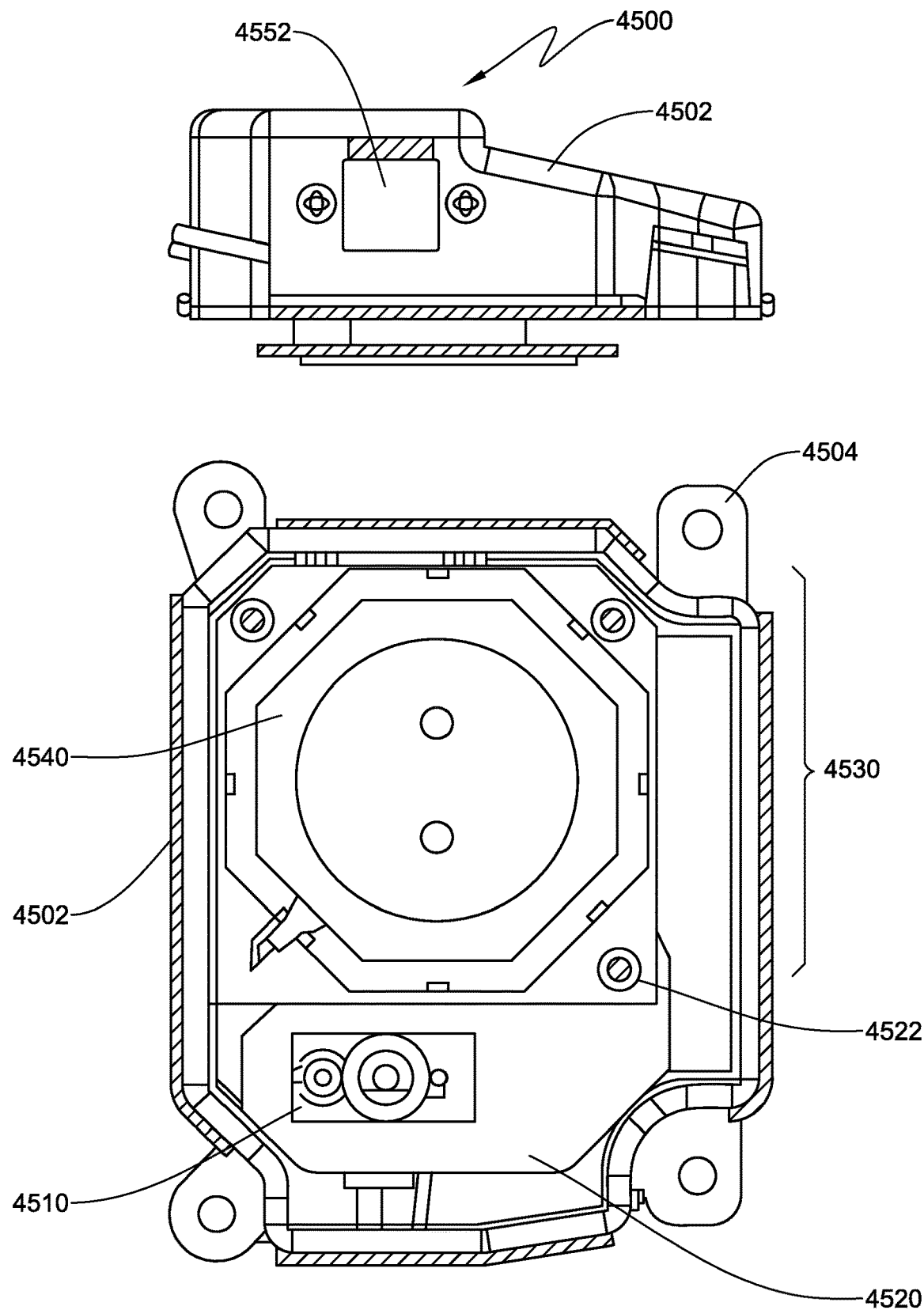
FIG. 70A is a view of one embodiment of the external communication module according to one embodiment.

In some embodiments, the processing system 10 may include an external communication module 4500, one embodiment of which is shown in FIG. 70A, that may allow service personnel and or consumers to communicate with the processing system 10 using, for example, but not limited to, one or more of the following: RFID tags and/or bar codes and/or other formats. In some embodiments, the external communication module 4500 may incorporate the previously described RFID access antenna assembly 900. The external communication module 4500 may include a number of devices that may receive or send communications including, but not limited to, one or more of the following: a radio frequency antenna 4530, an optical bar code reader 4510, blue tooth antenna, camera and/or other short range communication hardware. The processing system 10 may use information obtained by the external communication module 4500 to, for example, facilitate service and maintenance by a number of actions including, but not limited to, one or more of the following: unlocking service doors, informing the service provider of errors, required maintenance, failed equipment, required parts, and/or identifying those containers which may need to be replaced. The external communication module 4500 may provide consumers/users with one or more options for interacting with the processing system 10 including, but not limited to, one or more of the following: redeeming coupons and/or providing individual services including, but not limited to, one or more of the following: personalized beverages and/or accepting payment and/or tracking use and/or awarding prizes. In some embodiments, the external communication module 4500 may communicate with the control logic subsystem 14 and receive electrical power via a wired connection at connector 4552. The external communication module 4500 may communicate with the control logic subsystem 14 via wireless communication.

In some embodiments, the external communication module 4500 may be mounted near the front surface of the housing assembly 850. In some embodiments, the external communication module 4500 may be mounted in the structure of the processing system 10 such that the bar code reader or other optical device has an unobstructed view to the outside. In some embodiments, the RFID antenna may also be mounted within an inch of the front surface of the processing system 10

In some embodiments, the external communication module 4500 may include a bar code reader/decoder 4510. The barcode reader/decoder 4510 may read any optical code presented within its line of sight. In some embodiments, the optical code may be presented in a number of formats including, but not limited to, one or more of the following:

as a printed item and/or as an image on an electronic device and/or on a smart phone and/or on a personal digital assistant and/or on the screen of a computer or any other device capable of displaying an optical code.

In some embodiments, the RFID antenna reader may receive a signal from a variety of devices presented to the processing system 10 by, for example, service personnel and/or users/consumers. The list of possible RFID devices includes, but is not limited to, one or more of the following: key fobs and/or plastic cards and/or paper cards.

Figure 70B:
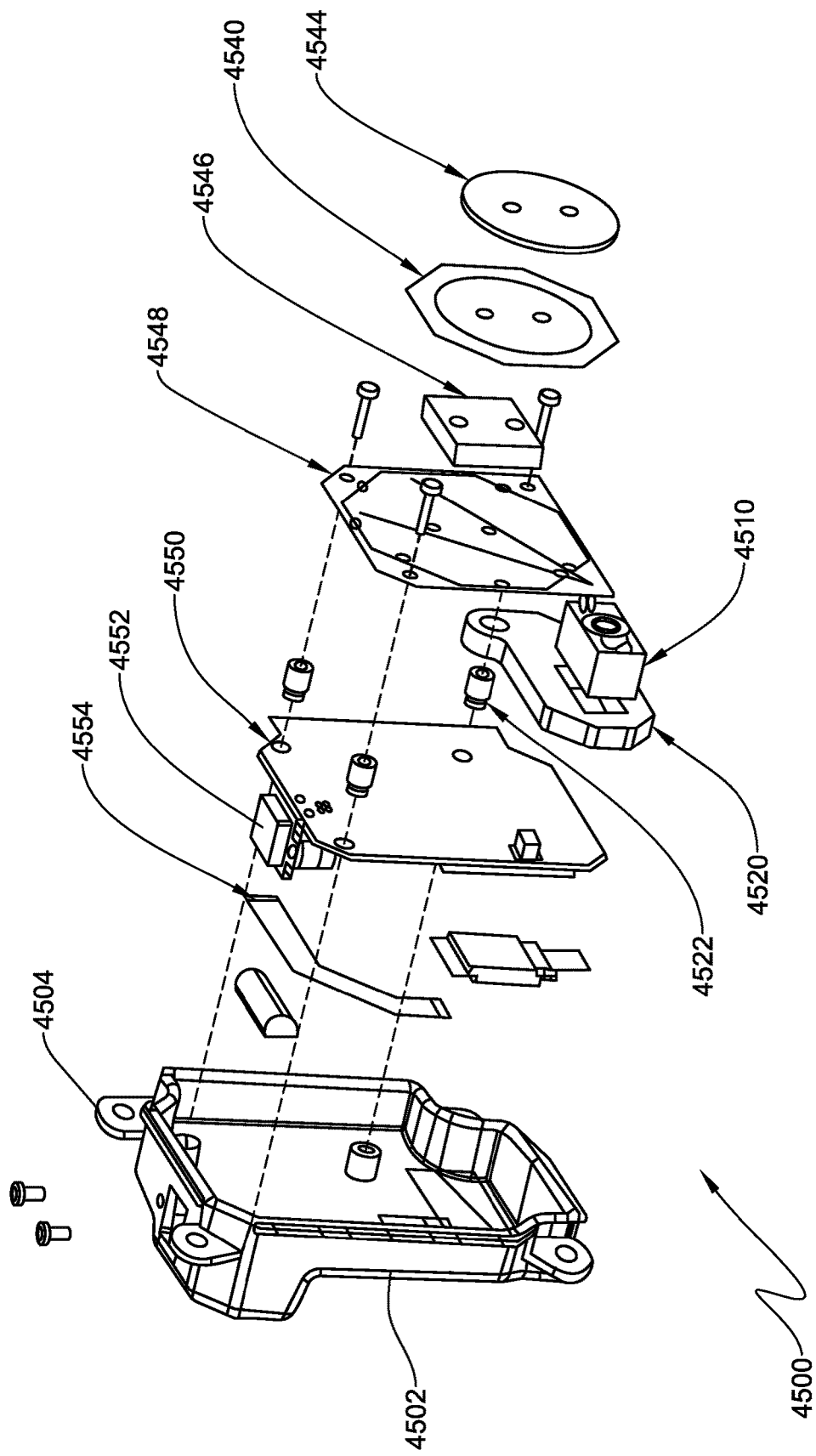
FIG. 70B is an exploded view of one embodiment of the external communication module according to one embodiment.

One embodiment of the external communication module 4500 is shown in FIGS. 70A and 70B. In some embodiments, the module may be housed in a case 4502. In some embodiments, the case 4502 may be plastic, however, if various other embodiments, the case may be made from a different material. In some embodiments, the case 4502 may be open on one side to receive the RFID sensor close to the outside of the housing assembly 850. In some embodiments, the case 4502 may include one or more, or a plurality of, flanges 4504. The flanges 4504 may be used to secure the module to the structure of the processing system 10 or to the skin of the housing assembly 850.

Many of the individual components of one embodiment may be seen in the exploded drawing of the external communication module 4500 shown in FIG. 70B. In this embodiment, the RFID antenna assembly 4530 (FIG. 70) may include an antenna 4548, a resonator 4540, resonator spacers 4546, 4544, and an outlet junction 4552. The barcode reader/decoder 4510 may be held by a foam mount 4520. The foam mount 4520 may retain the barcode reader/decoder 4510 within the case 4502 during installation of the external communication module 4500 in the processing system 10. The foam mount 4520 may be secured within the external communication module 4500 by the spacer 4522 that passes through a matching hole in the foam mount 4520. The RFID antenna assembly 4530 and the foam mount 4520 may be secured to the case 4502 by one or more screws (and/or bolts and/or other attachment mechanisms) that pass through the PCB of the RFID antenna assembly 4530 and are thread into molded bosses in the case 4502.

Figure 71A:
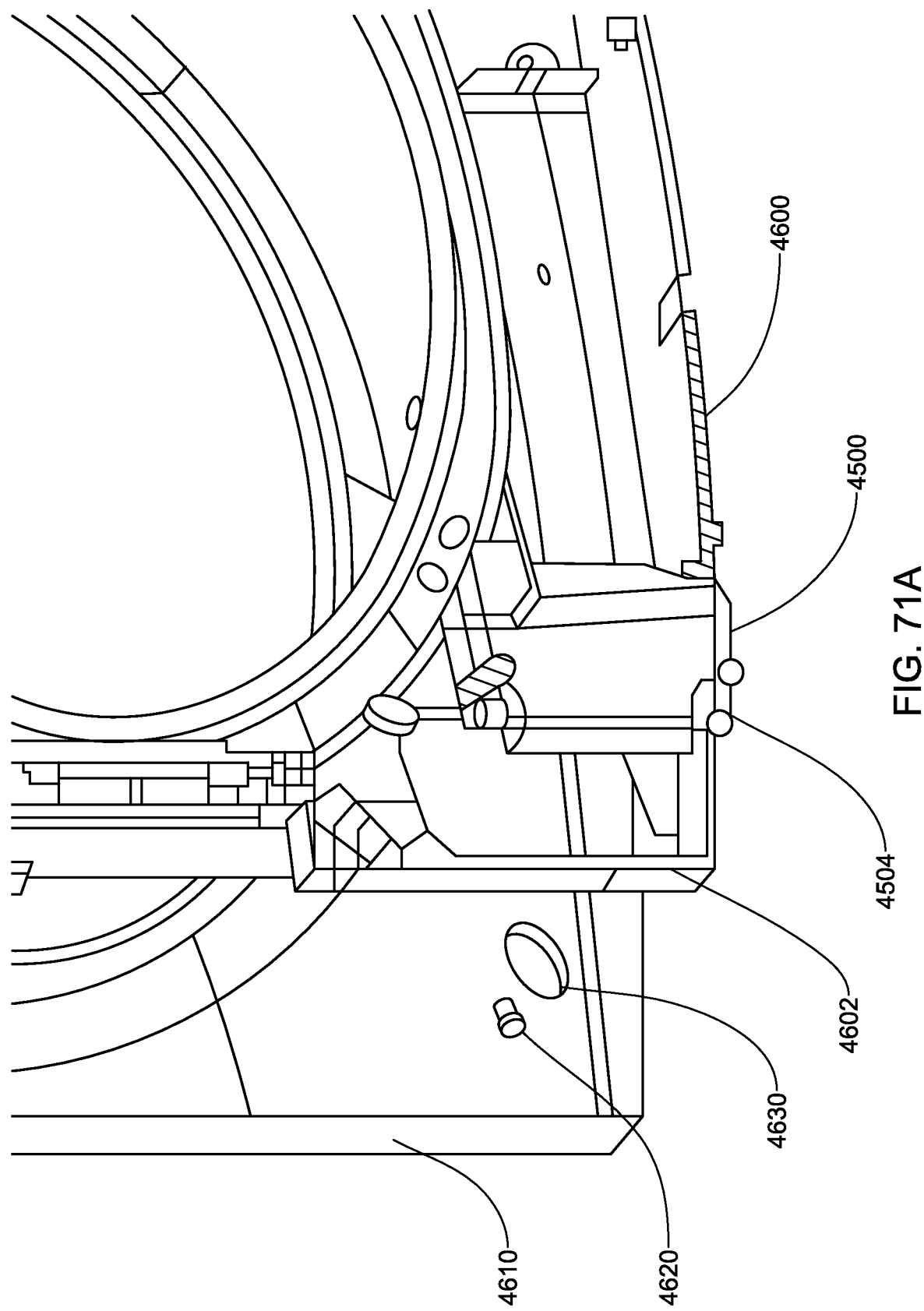
FIGS. 71A, 71B, and 71C are isometric views of one embodiment of the external communication module mounting in the upper door of the processing system according to one embodiment.

In some embodiments, the external communication module 4500 may be mounted in the structure of the upper door 4600 as shown in FIG. 71A. In some embodiments, the external communication module 4500 may be secured to the upper door 4600 with mechanical fasteners including, but not limited to, one or more of the following: screws and/or rivets and/or snaps through the flanges 4504, or other mechanical fasteners or the like. In some embodiments, the upper door 4600 may be part of the internal structure of the housing assembly 850. In some embodiments, an upper door skin 4610 may be attached to the upper door 4600.

Figure 71B:
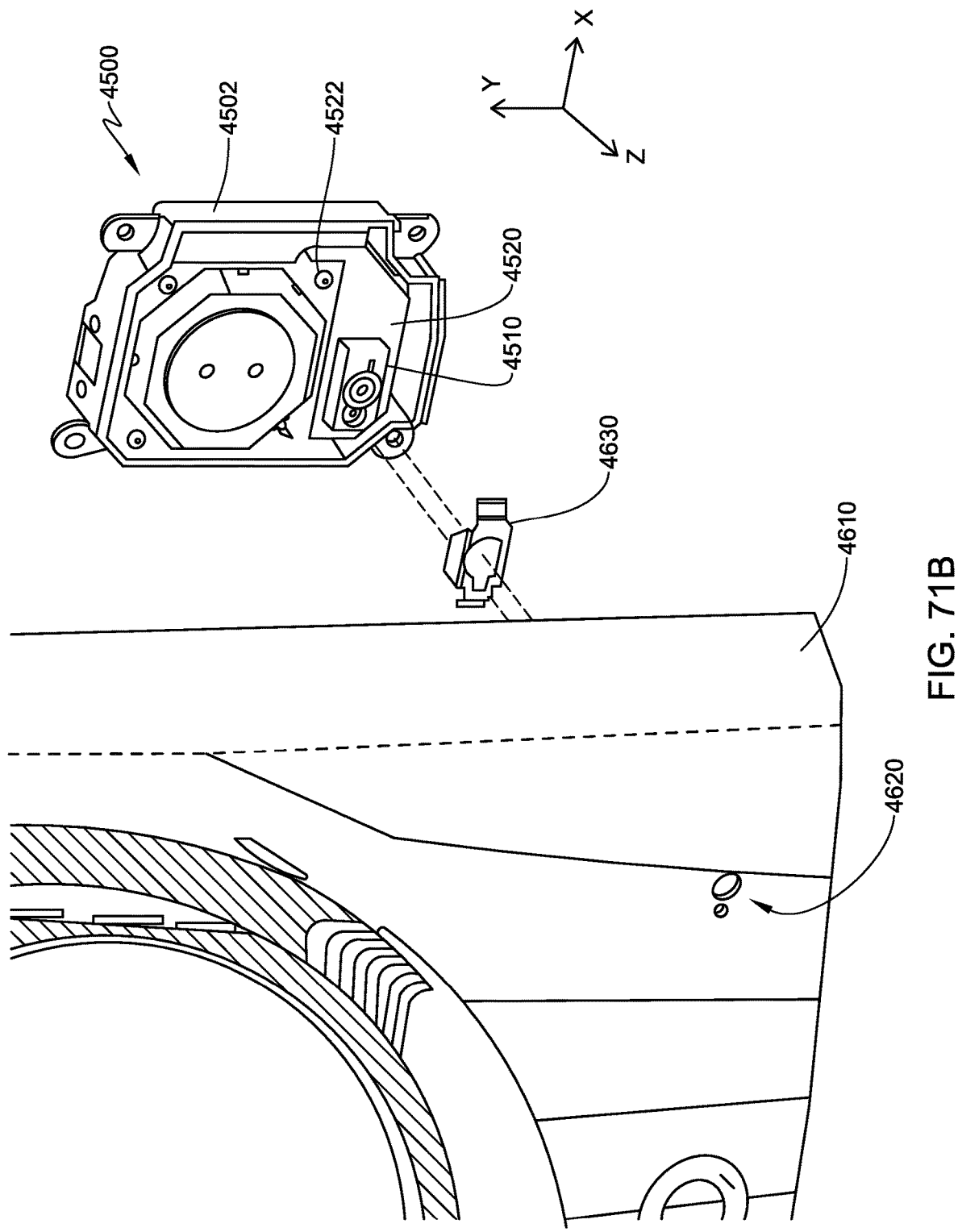
Figure 71C:
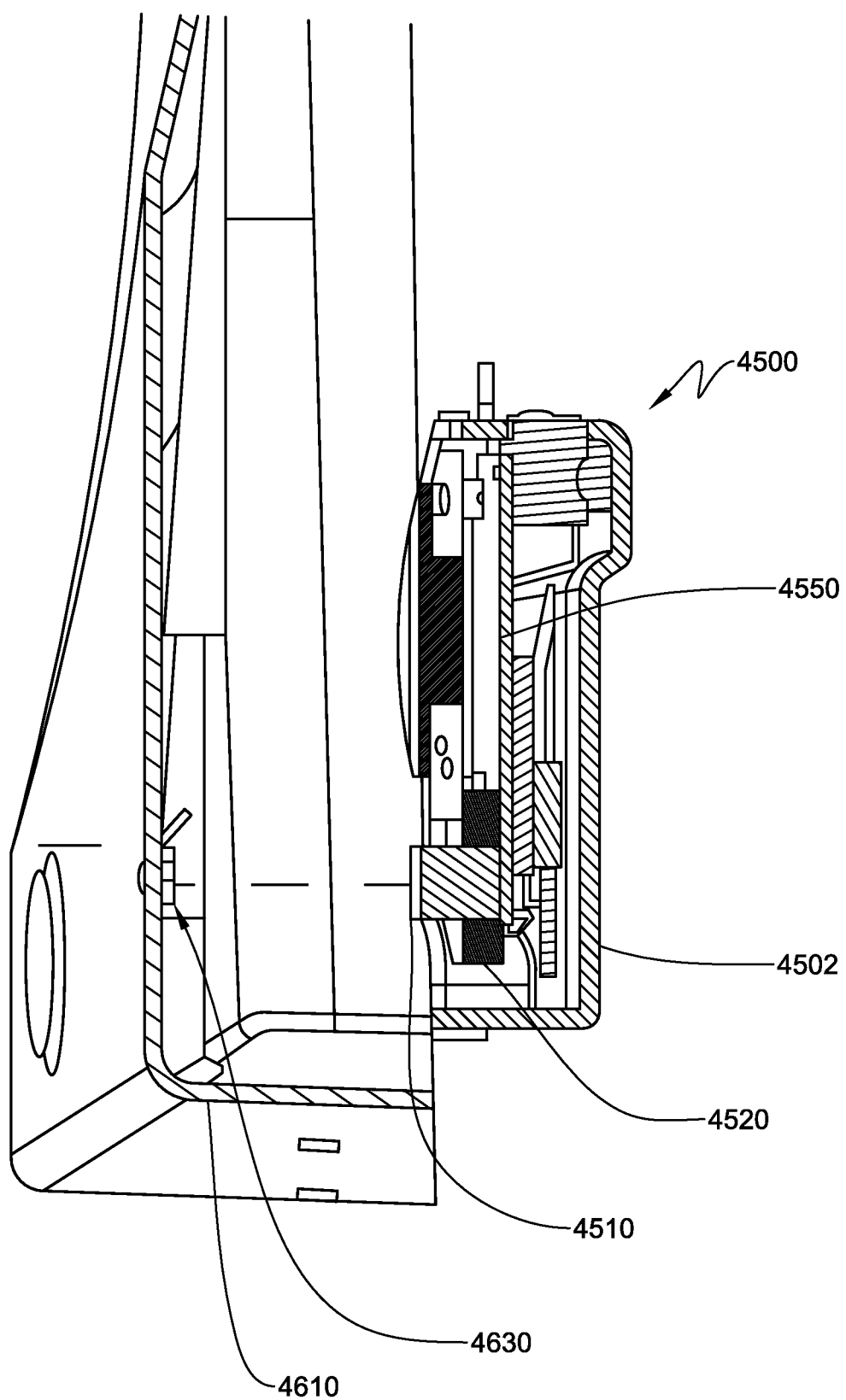

In some embodiments, an alignment bracket 4630 may be attached to the upper door skin 4610. In some embodiments, the alignment bracket 4630 may align the barcode reader/decoder 4510 to the windows 4620 in the upper door skin 4610 as shown in FIGS. 71B and 71C. In some embodiments, the alignment bracket may be aligned with the windows 4620 and attached with, for example, including, but not limited to, one or more of the following: glue and/or double sided tape and/or other non-mechanical attachment methods compatible with a plastic skin on the inside of the upper door skin 4610. However, in some embodiments, mechanical fasteners may be used. In some embodiments, the alignment bracket may be attached with mechanical fasteners to the upper door skin 4610 which may include, but not limited to, one or more of screws and/or rivets and/or snaps. In some embodiments, the alignment bracket 4630 may be aligned to the windows 4620 with a sticker (not shown) or other indicator that may be attached or may be indicated on the upper door skin 4610 and provides visual marks to aid in the proper alignment of the alignment bracket 4630 to the windows 4620. In some embodiments, the visual marks may include, but are not limited to, embossing and/or marked on and/or stuck on letters and/or symbols and/or colors and/or any other indicator that may assist with proper alignment.

Figure 72:
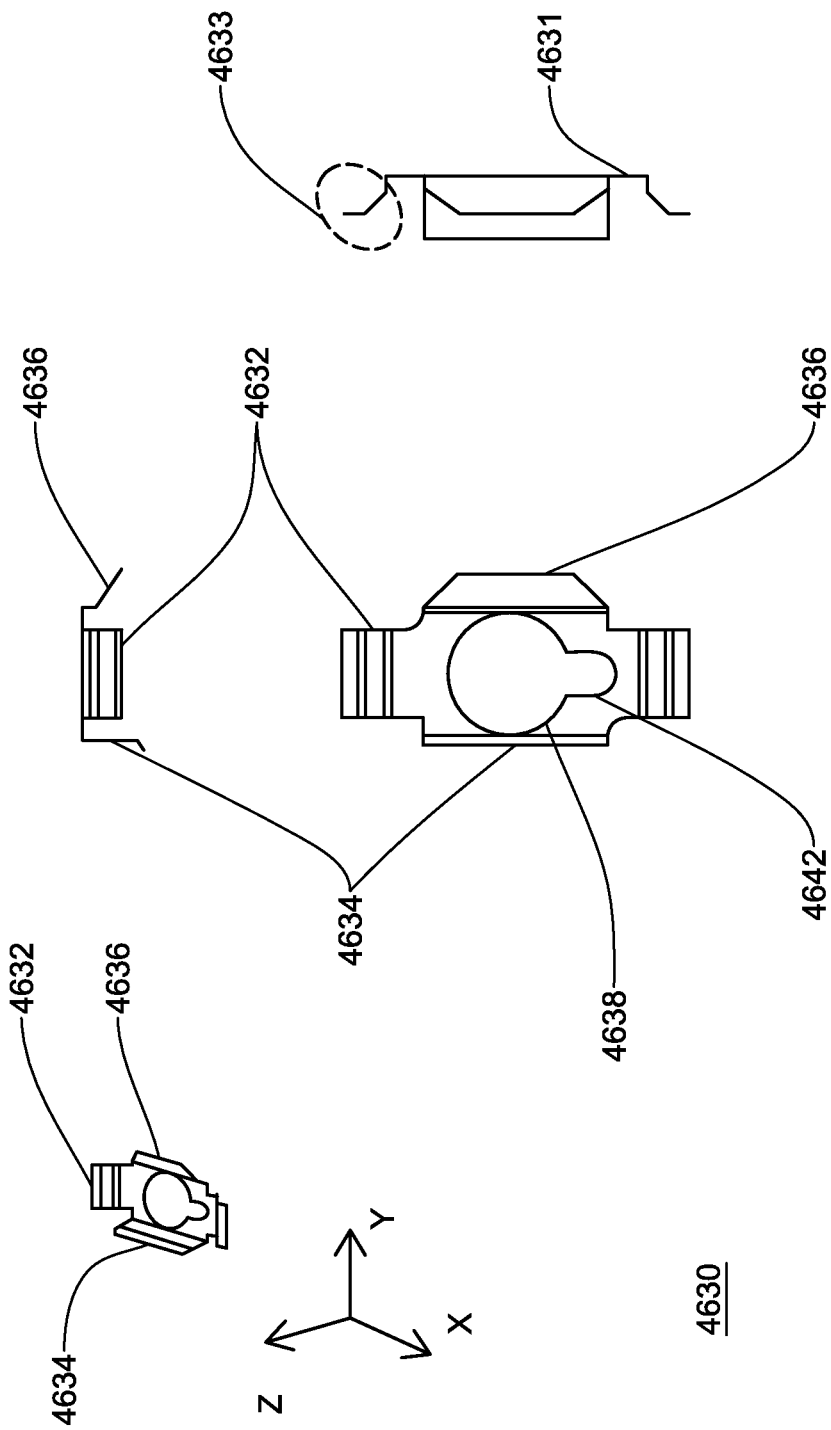
FIG. 72 is a view of one embodiment of the alignment bracket according to one embodiment.

In some embodiments, the alignment bracket 4630 may align the barcode reader/decoder 4510 independently of the alignment of the external communication module 4500. In some embodiments, the bracket, one embodiment of which is shown in detail in FIG. 72, provides two side tabs 4632, a top tab 4636 and a bottom tab 4634 to constrain the barcode reader/decoder 4510 in two dimensions (X & Y) to align with the windows 4620. However, in various other embodiments, the number and location of the tabs may vary. The flexible foam mount 4520 assists the barcode reader/decoder 4510 to translate in two dimensions (X & Y) and to rotate about the Z axis as the alignment bracket 4630 guides the barcode reader/decoder 4510 during the insertion of the external communication module 4500 into the upper door 4600. In some embodiments, the foam mount 4520 may constrain the barcode reader/decoder so that the external communication module 4500 can be installed in the upper door. In some embodiments, the foam mount 4520 may further constrain barcode reader/decoder 4510 so that the leading corners of the barcode reader/decoder contact the tapered sections of the tabs 4631,4634 and 4636. In some embodiments, the barcode reader/decoder 4510 may be constrained in the Z axis by the alignment bracket 4630 and the PCB 4550 of the RFID antenna. In some embodiments, the upper door skin 4610 and the PCB 4550 may provide a limited amount of compliance to allow for tolerance stackup in the Z direction between the upper door skin 4610, external communication module 4500 and the barcode reader/decoder 4510.

In some embodiments the barcode reader/decoder 4510 may be retained in the external communication module 4500 by flexible brackets. The flexible brackets may provide enough flexibility to allow the barcode reader/decoder 4510 to translate and rotate as needed to align with the alignment bracket. The flexible brackets may constrain the barcode reader/decoder within a limited range to allow insertion of the module into the upper door 4600. The flexible brackets 4520 may further constrain the barcode reader/decoder 4510 so that the leading corners of the barcode reader/decoder contact the tapered sections of the tabs 4631,4634 and 4636 during the insertion process.

In some embodiments, the tabs 4632, 4634, 4636 on the alignment bracket 4630 may include an angled section 4633 that guides the barcode reader/decoder 4510 into alignment with the windows 46220. In some embodiments, each tab includes a straight section near the base 4631 that is perpendicular to the base and constrains the movement of the barcode reader/decoder 4510 in the X & Y directions. In some embodiments, the distance between the straight sections of opposing tabs may be slightly larger than the barcode reader/decoder which may be beneficial for many reasons, including, but not limited to, ease of assembly and alignment accuracy. In some embodiments, the tab may have larger or smaller tapered sections to allow installation through openings in the upper door 4600.

In some embodiments, the external communication module 4500 may allow consumers/users to interact with the processing system 10 by a variety of methods including, but not limited to, a communication interface tethered to the external communication module 4500, a communication interface retractably tethered to the external communication module 4500, and/or a wireless communication interface (e.g., Bluetooth technology and/or a wireless network or in various embodiments, any wireless communication interface). In some embodiments, the communication interface may be implemented by an application on one or more of consumers'/users' devices. In some embodiments, the wireless communication interface may be implemented by one or more applications on one or more consumers'/users' devices. In some embodiments, one or more consumers'/users' devices may be wireless capable devices including, but not limited to, smartphones, computers, desktop computers, laptop computers, MP3 players, and/or tablet computers. In some embodiments, the external communication module 4500 may be part of or communicate with an automation network.

Figure 79:
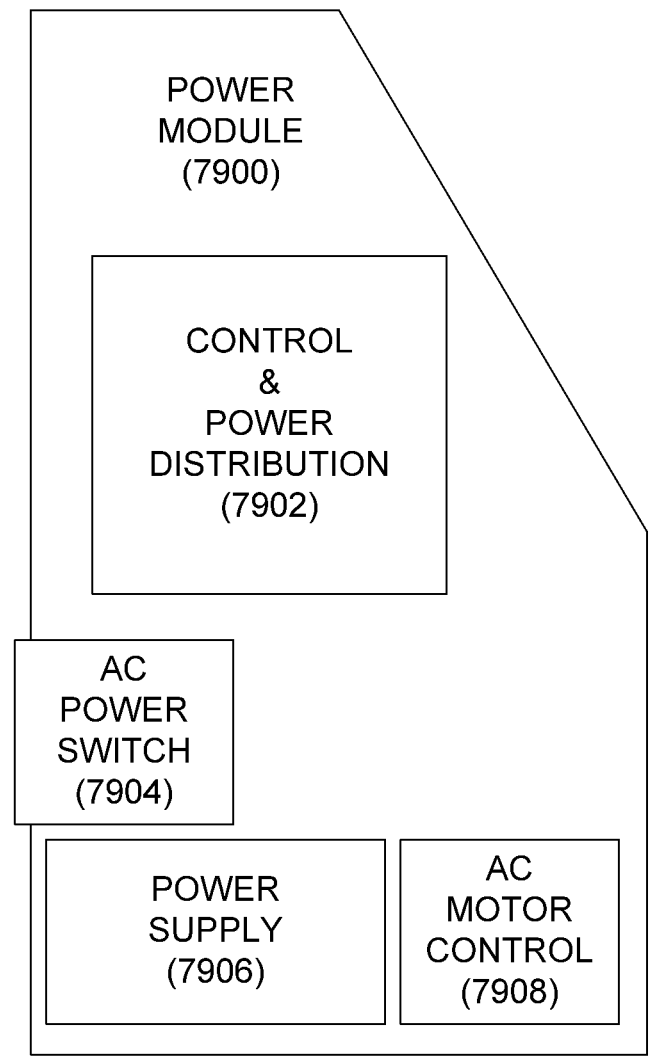
FIG. 79 is a block diagram of a power module.

As stated above, in some embodiments, the product dispensing system may have a processing system 10. Referring now also to FIG. 79, in some embodiments, processing system 10 may contain a power module 7900. In some embodiments, the power module 7900 may include a control and power distribution component 7902, an AC power switch 7904, a power supply 7906, and an AC motor control 7908. In some embodiments, the power module 7900 may include a communication interface (e.g. a controller area network (CAN) bus, Ethernet, etc.) to allow communication between subsystems within the processing system 10. In some embodiments, the communication interface may extend from the control and power distribution component 7902. In some embodiments, the communication interface may allow communication between the control and power distribution component 7902 and user interface subsystem 22.

Figure 80:
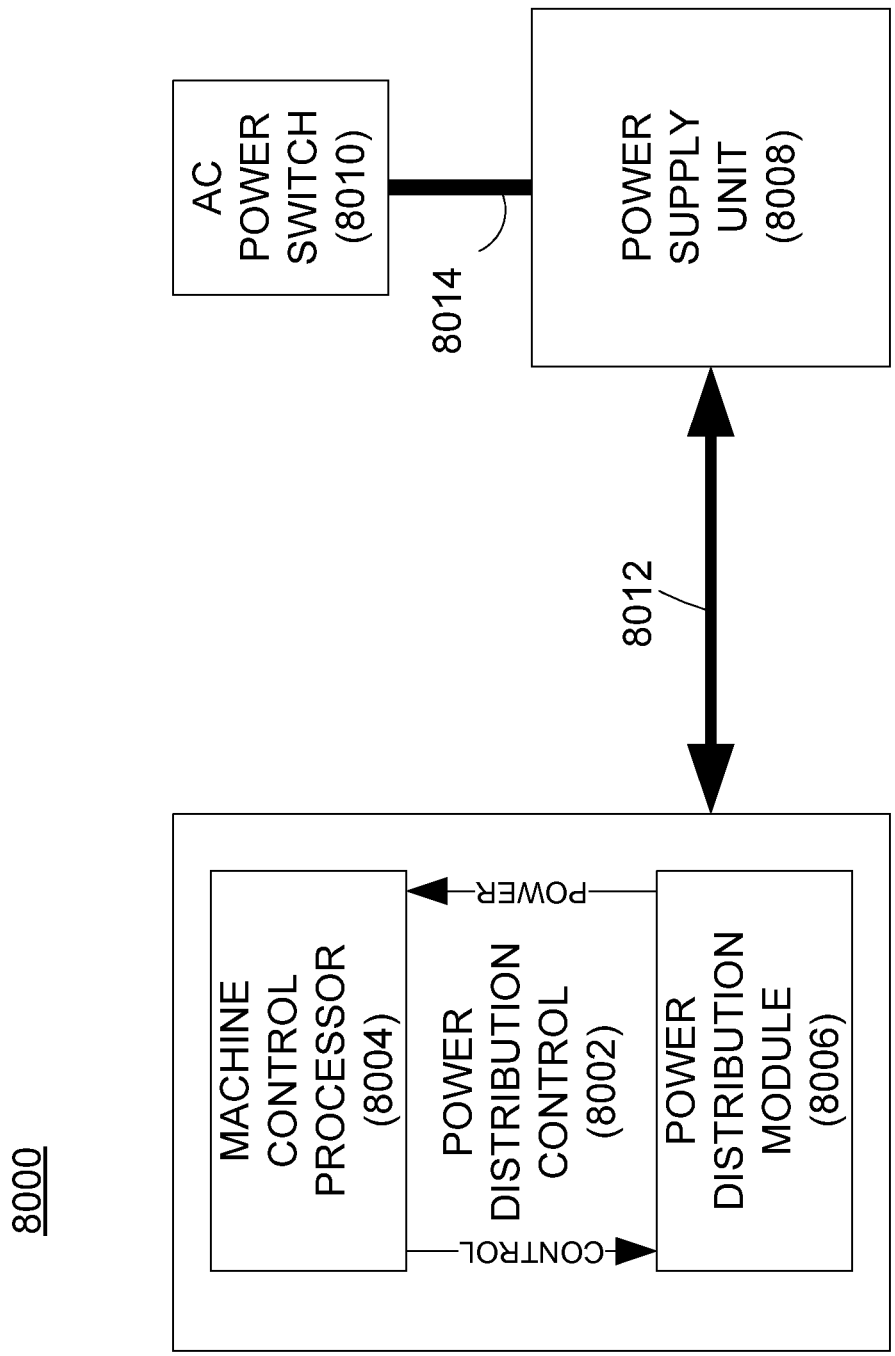
FIG. 80 is a diagrammatic view of one embodiment of the power module of FIG. 79.
Figure 81:
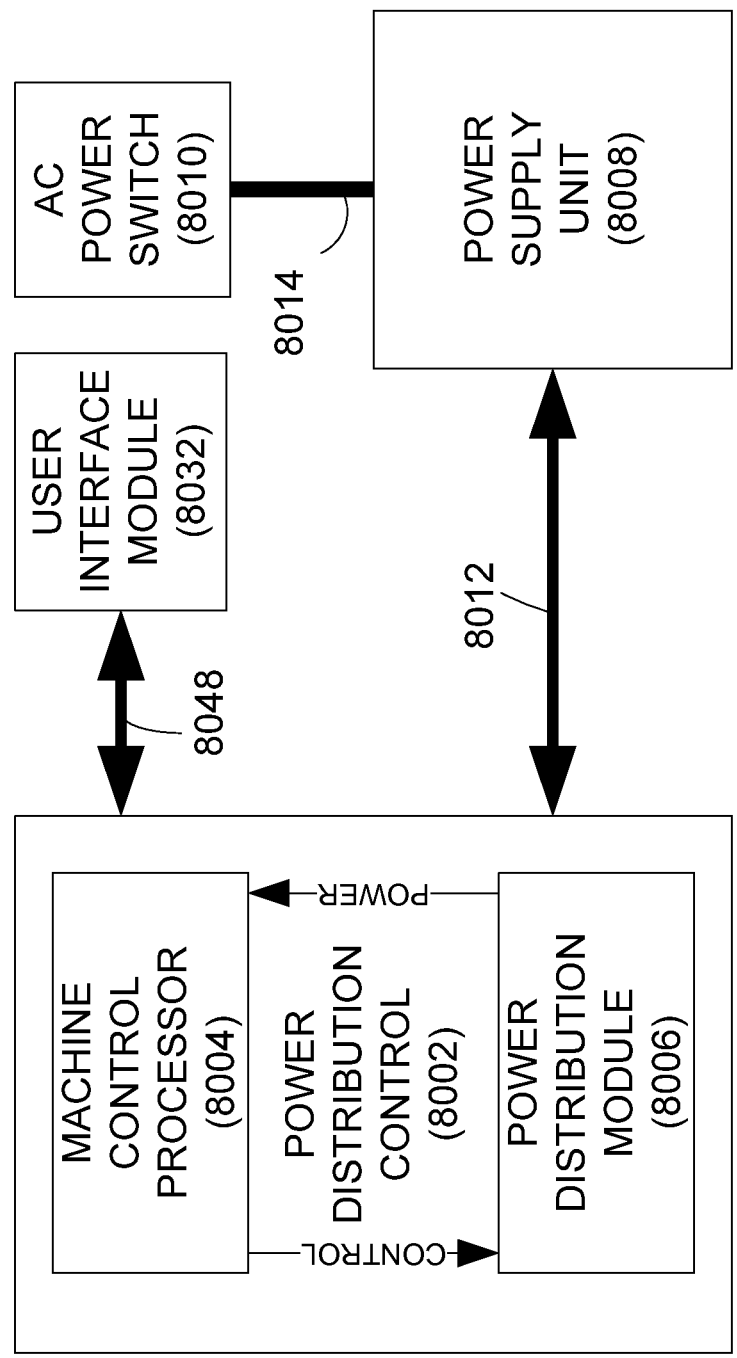
FIG. 81 is a diagrammatic view of one the power module of FIG. 80 in communication with a user interface module according to one embodiment.

Referring now also to FIGS. 80-81, in some embodiments, processing system 10 may include a power module 8000. The power module 8000 may include a power distribution control 8002 and a power supply unit 8008. In some embodiments, the power module 8000 may include a connection 8014 to connect the power supply unit 8008 to an AC power switch 8010. In some embodiments, AC power may be routed through the AC power switch 8010 before AC power is sent to the power supply unit 8008 via connection 8014. In some embodiments, the power supply unit 8008 may contain an AC motor control. In some embodiments, the power distribution control 8002 may contain a machine control processor 8004. In some embodiments, the power distribution control 8002 may contain a power distribution module 8006. In some embodiments, a connection 8012 may connect the power supply unit 8008 and the power distribution control 8002. In some embodiments, the connection 8012 may be used for a variety of purposes including, but not limited to, one or more of the following: transmitting DC power from the power supply unit 8008 to the power distribution control 8002 and/or transmitting control data between the machine control processor 8004 and the power supply unit 8008. In some embodiments, the power supply unit 8008 may supply power to the power distribution control 8002 via a connection to the power distribution module 8006. In some embodiments, the power distribution module 8006 may send power to the machine control processor 8004. In some embodiments, the machine control processor 8004 may control the processing system 10 via a microprocessor and a communication interface (e.g. a CAN bus, Ethernet, etc.) routed through the power distribution module 8006. In some embodiments, the communication interface may allow communication between the machine control processor 8004 and a user interface module 8032 via connection 8048. In some embodiments, the machine control processor 8004 may communicate with the user interface module 8032 remotely (i.e. the user interface module 8032 may be physically decoupled from the power module 8000, and connection 8048 may be a wireless connection). For example, in some embodiments, the machine control processor 8004 may communicate with the user interface module 8032 using Bluetooth technology or a wireless network. In various embodiments, the user interface module 8032 may be attached to the housing assembly 850 in one or more mechanisms for attachment which may include, but are not limited to, one or more of the following: a tether, a retractable tether, VELCRO, one or more clips, and/or one or more brackets. In some embodiments, the user interface module 8032 may be physically decoupled from the housing assembly 850 and interact with the product dispensing system remotely. In some embodiments, a consumer/user may use the user interface module 8032 to interact with the product dispensing system in a variety of ways which may include, but is not limited to, one or more of the following: redeeming coupons and/or providing individual services including, but not limited to, one or more of the following: personalized beverages and/or accepting payment and/or tracking use and/or awarding prizes.

In some embodiments, power module 8000 may have some advantages over power module 7900. In some embodiments, power module 8000 may have three components (the power supply unit 8008, power distribution control 8002, and AC power switch 8010) instead of the one-component configuration of power module 7900. This may be referred to herein as the "three-component configuration". In some embodiments, the three-component configuration may be smaller in size and therefore may more easily be accommodated into the housing assembly 850 than the one-component configuration. In various embodiments, the three-component configuration may be beneficial/desirable for many reasons, including, but not limited to, enabling easy field replacement as one component that may be in need of replacement may be replaced without also replacing the other two components. For example, in some embodiments, processing system 10 may be updated and/or replaced with a processing system having more or less power. In the preceding example, the power supply unit 8008 may be replaced without replacing the power distribution control 8002 or the AC power switch 8010. Also, in some embodiments, the machine control processor 8004 and power distribution module 8006 may be separate components of the power distribution control 8002. In some embodiments, the machine control processor 8004 and power distribution module 8006 being separate components may be beneficial/desirable for many reasons, including, but not limited to, to the ability to update the processing system 10 by replacing one without necessarily replacing one or more of the other components. For example, in some embodiments, it may be desirable to add additional processing power to the processing system 10. Thus, in some embodiments, the machine control processor 8004 may be replaced without replacing the power distribution module 8006.

In some embodiments, for example, the product dispensing system may be updated to include additional nozzles. Thus, in these embodiments, the power distribution module 8006 may be replaced without also replacing the machine control processor 8004.

In some embodiments, the three-component configuration may contribute to reducing the overall cost of the processing system 10 based on increased design flexibility. For example, in some embodiments, separating the power supply unit 8008 from the product distribution control 8002 may allow for an "off the shelf" power supply (i.e. a commercial power supply sold in substantial quantities) to be used within the three-component configuration. In some embodiments, a power supply unit optimal for a power grid in a specific country may be used within the three-component configuration, therefore, contributing to modularity which may be beneficial for many reasons, including, but not limited to, changing out only the power supply unit to configure the processing system 10 for use with various power grids.

In some embodiments, the three-component configuration may allow the power supply unit 8008 to be placed in a location within the housing assembly 850 so as to expel an optimal amount of generated heat. Thus, in some embodiments, power supply unit 8008 may be placed in the rear of the housing assembly 850.

In some embodiments, the three-component configuration may allow for the use of a first communication interface within the processing system 10 and a second communication interface between the power distribution control 8002 and the user interface module 8032. For example, in some embodiments, the processing system 10 may run on a CAN bus interface, but the connection between the power distribution control 8002 and the user interface module 8032 may be an Ethernet communication interface.

In some embodiments, the connection between the power distribution control 8002 and the user interface module 8032 may be wireless. For example, in some embodiments, the connection between the power distribution control 8002 and the user interface module 8032 may be a wireless network or a BLUETOOTH connection (in various embodiments, other connection types may be used). In some embodiments, the different communication interfaces may allow for the user interface module 8032 to be fully customizable.

In some embodiments, the three-component configuration may allow for separation of the beverage selection function of the processing system 10 from the beverage delivery/distribution control function of the processing system 10. For example, in some embodiments, the beverage selection function of the processing system 10 may reside in the user interface module 8032, and the beverage delivery/distribution control function of the processing system 10 could reside in the machine control processor 8004.

Figure 82:
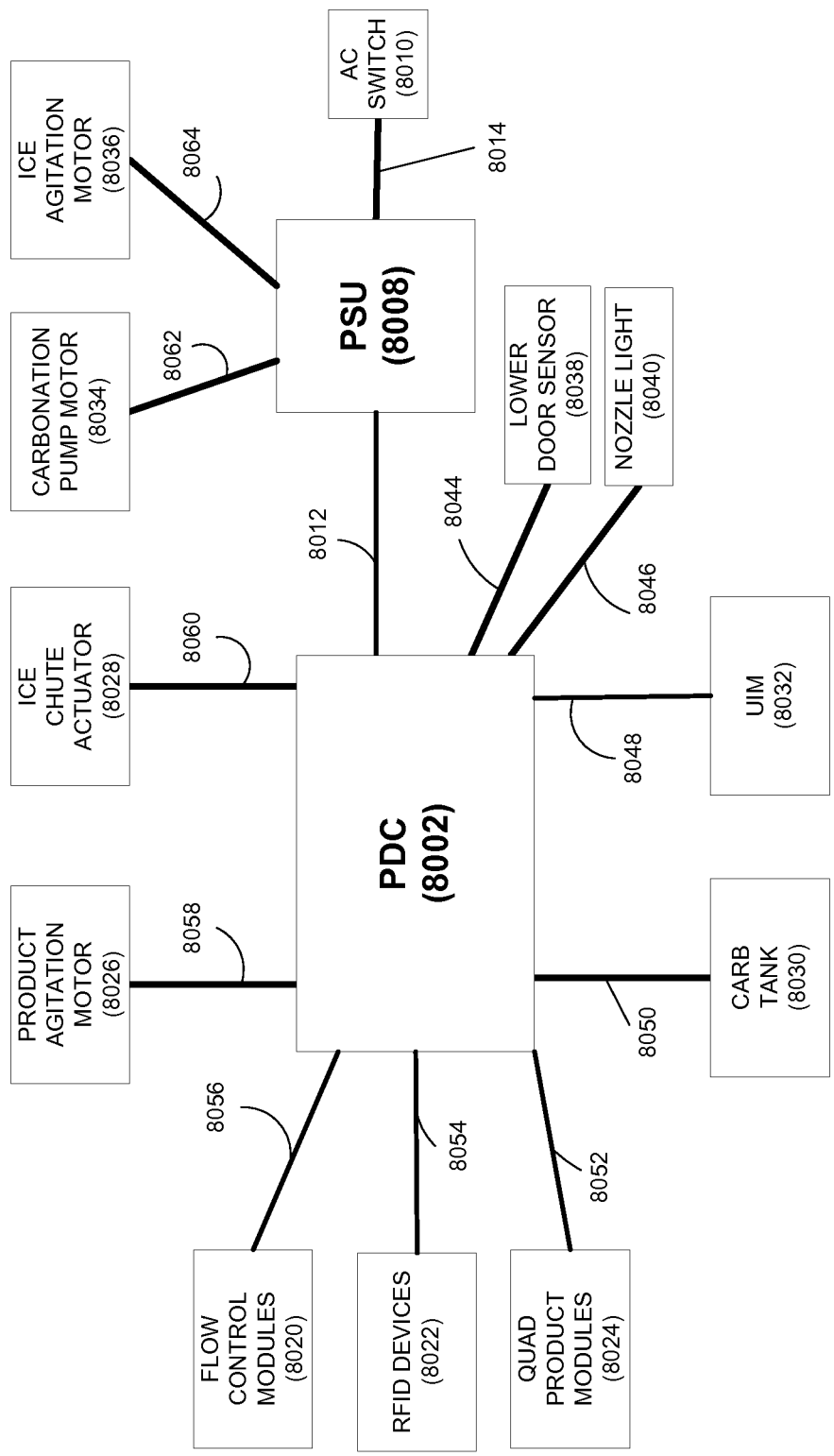
FIG. 82 is a diagrammatic view of one embodiment of a configuration of connections between the power module of FIG. 80 and other subsystems and devices of the processing system, according to one embodiment.

Referring now also to FIG. 82, a schematic of one embodiment of the power module 8000 connections to a variety of subsystems and devices within the processing system is shown. This is one embodiment and should not be construed as a limitation on the disclosure, as other configurations may be utilized. In some embodiments, one or more of the connections shown may be used, however, in other embodiments, all of the connections shown may be used. In some embodiments, the connections may vary and may not include the connections shown.

In some embodiments, the power module 8000 may be connected to a variety of subsystems and devices within the processing system via connections 8012, 8014, 8044, 8046, 8048, 8050, 8052, 8054, 8056, 8058, 8060, 8062, 8064. In some embodiments, the power distribution control 8002 ("PDC") may communicate with the flow control modules 8020, the RFID devices 8022, and the quad product modules 8024 via connections 8056, 8054, and 8052 respectively. In some embodiments, the power distribution control 8002 may send power to the flow control modules 8020, the RFID devices 8022, and the quad product modules 8024 and may send commands to and receive information from the flow control modules 8020, the RFID devices 8022, and the quad product modules 8024 via a communication interface.

In some embodiments, the power distribution control 8002 may communicate with a carbonation tank 8030 via connection 8050. In some embodiments, the carbonation tank 8030 may communicate information to the power distribution control 8002 concerning the level of carbonated water in the carbonation tank 8030. In some embodiments, the power distribution control 8002 may communicate with the user interface module 8032 via connection 8048. In some embodiments, the power distribution control 8002 may send power to the user interface module 8032 and may receive commands from and send information to the user interface module 8032 via a communication interface. In some embodiments, the power distribution control 8002 may communicate with a lower door sensor 8038 via connection 8044. In some embodiments, the lower door sensor 8038 may communicate information to the power distribution control 8002 concerning whether the lower door 854 of the housing assembly 850 is open or closed. In some embodiments, the power distribution control 8002 may communicate with a nozzle light 8040 via connection 8046. In some embodiments, the power distribution control 8002 may send power to the nozzle light 8040 when the upper door 852 of the housing assembly 850 is open. In some embodiments, the power distribution control 8002 may send power to the nozzle light 8040 when the product dispensing system is dispensing a beverage.

In some embodiments, the power distribution control 8002 may communicate with a product agitation motor 8026 via connection 8058. In some embodiments, the product agitation motor 8026 may be a DC motor. In some embodiments, the product agitation motor 8026 may be an AC motor. In some embodiments, the power distribution control 8002 may send power to the product agitation motor 8026 when an agitation mechanism needs to be activated. In some embodiments, the product agitation motor 8026 may communicate to the power distribution control 8002 information concerning the location of one or more product module assemblies (e.g., product module assemblies 250a, 250b, 250c, 250d) of one or more microingredient towers (e.g., microingredient towers 1050, 1052, 1054) that are being agitated by the agitation mechanism. In some embodiments, the power distribution control 8002 may communicate to the product agitation motor 8026 information concerning when to stop agitating one or more product module assemblies (e.g., product module assemblies 250a, 250b, 250c, 250d) being agitated and the position to place the one or more product module assemblies (e.g., product module assemblies 250a, 250b, 250c, 250d) at rest. In some embodiments, the product agitation motor 8026 may communicate to the power distribution control 8002 information concerning the location of one or more product module assemblies (e.g., product module assemblies 250d, 250e, 250f) of one or more microingredient shelves (e.g., microingredient shelves 1200, 1202, 1204) that are being agitated by the agitation mechanism. In some embodiments, the power distribution control 8002 may communicate to the product agitation motor 8026 information concerning when to stop agitating one or more product module assemblies (e.g., product module assemblies 250d, 250e, 250f) being agitated and what position to place the one or more product module assemblies (e.g., product module assemblies 250d, 250e, 250f) at rest.

In some embodiments, the power distribution control 8002 may communicate with an ice chute actuator 8028 via connection 8060. In some embodiments, the power distribution control 8002 may send power to the ice chute actuator 8028 when the ice dispensing chute 1010 should open. In some embodiments, the power supply unit 8008 ("PSU") may communicate with a carbonation pump motor 8034 via a connection 8062. In some embodiments, the carbonation pump motor 8034 may be an AC motor. In some embodiments, the carbonation pump motor 8034 may be a DC motor. In some embodiments, the power distribution control 8002 may signal the power supply unit 8008 to send power to the carbonation pump motor 8034 when the carbonation pump motor 8034 needs to pump $CO_2$ and water into the carbonation tank 8030. In some embodiments, the power supply unit 8008 may communicate with an ice agitation motor 8036 via connection 8064. In some embodiments, the ice agitation motor 8036 may be an AC motor. In some embodiments, the ice agitation motor 8036 may be a DC motor.

In some embodiments, the power distribution control 8002 may signal the power supply unit 8008 to send power to the ice agitation motor 8036 to churn ice in the ice hopper 1008. In some embodiments, the ice hopper 1008 may churn ice to dispense ice through the ice dispensing chute 1010. In some embodiments, the ice hopper 1008 may churn ice to prevent the formation of an ice bridge on top of the cold plate 163. For example, in some embodiments, the ice hopper 1008 may churn ice when a preset volume of fluid has travelled through the cold plate 163. In some embodiments, the volume of fluid may be measured by the flow control modules 8020. As another example, in some embodiments, the ice hopper 1008 may churn ice when a preset amount of time has passed since the ice hopper 1008 last churned ice.

Figure 83:
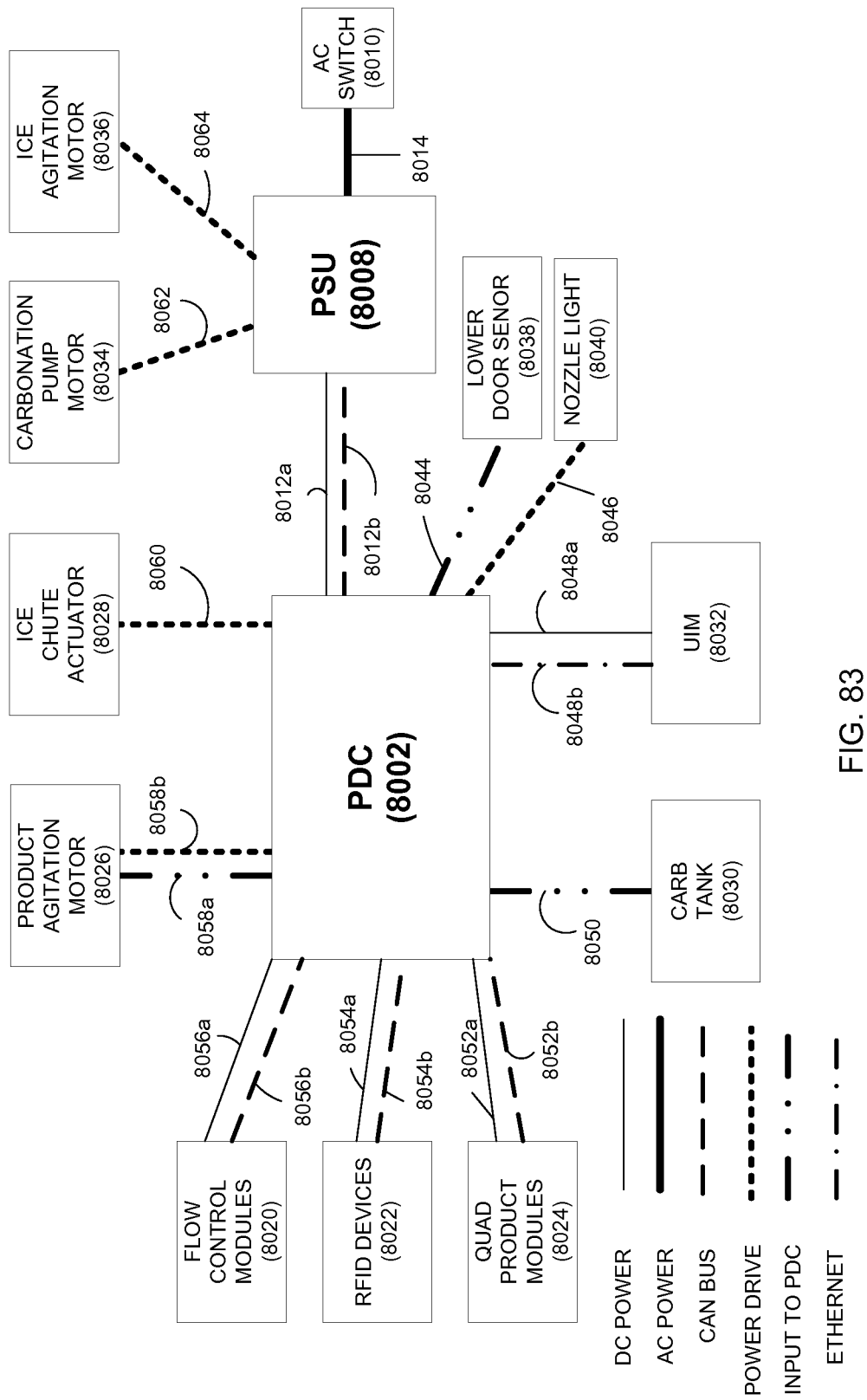
FIG. 83 is one embodiment of connections within the configuration of FIG. 82.

Referring now also to FIGS. 82-83, an embodiment of a schematic of a configuration of connections 8012, 8014, 8044, 8046, 8048, 8050, 8052, 8054, 8056, 8058, 8060, 8062, 8064 of the power module 8000 is shown. This is one embodiment and should not be construed as a limitation on the disclosure, as other configurations may be utilized. In some embodiments, one or more of the connections shown may be used, however, in other embodiments, all of the connections shown may be used. In some embodiments, the connections may vary and may not include the connections shown.

In some embodiments, connection 8012 may be DC power line 8012a and CAN bus line 8012b. In some embodiments, connection 8014 may be an AC power line. In some embodiments, connection 8044 may be an input line to the power distribution control 8002. In some embodiments, connection 8046 may be a power drive line (a line that only sends power when necessary). In some embodiments, connection 8048 may be DC power line 8048a and Ethernet line 8048b. In some embodiments, connection 8050 may be an input line to the power distribution control 8002. In some embodiments, connections 8052, 8054, and 8056 may be DC power lines 8052a, 8054a, 8056a and CAN bus lines 8052b, 8054b, 8056b respectively. In some embodiments, connection 8058 may be an input to the power distribution control line 8058a and a power drive line 8058b. In some embodiments, connections 8060, 8062, 8064 may be power drive lines.

As discussed above, other examples of such products producible by processing system 10 may include but are not limited to: dairy-based products (e.g., milkshakes, floats, malts, frappes); coffee-based products (e.g., coffee, cappuccino, espresso); soda-based products (e.g., floats, soda w/ fruit juice); tea-based products (e.g., iced tea, sweet tea, hot tea); water-based products (e.g., spring water, flavored spring water, spring water w/ vitamins, high-electrolyte drinks, high-carbohydrate drinks); solid-based products (e.g., trail mix, granola-based products, mixed nuts, cereal products, mixed grain products); medicinal products (e.g., infusible medicants, injectable medicants, ingestible medicants); alcohol-based products (e.g., mixed drinks, wine spritzers, soda-based alcoholic drinks, water-based alcoholic drinks); industrial products (e.g., solvents, paints, lubricants, stains); and health/beauty aid products (e.g., shampoos, cosmetics, soaps, hair conditioners, skin treatments, topical ointments).

A number of implementations have been described. Nevertheless, it will be understood that various modifications may be made. Accordingly, other implementations are within the scope of the following claims.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed is:

1. A system for controlling selection and distribution of a product in a product dispensing system comprising:
    a flow control device configured to regulate a first ingredient, the flow control device comprising:
        a flow measuring device configured to provide a feedback signal based upon a volume of the first ingredient flowing within the flow control device; and
        a variable line impedance configured to regulate the first ingredient based upon, at least in part, the feedback signal of the flow measuring device and the first control signal provided by the controller; a pump module configured to be coupled to a supply of a second ingredient;
    a controller configured to provide a first control signal to the flow control device for controlling the supply of a first quantity of the first ingredient based upon, at least in part, a predetermined recipe, and to provide a second control signal to the pump module for controlling the supply of a first quantity of the second ingredient based upon, at least in part, the predetermined recipe;
    a user interface module for prompting a selection and selecting the product;
    a machine control processor in communication with the user interface module;
    a power distribution module comprising:
        a power supply unit;
        a power distribution control; and
        an AC power switch,
        wherein the power supply unit, power distribution control and the AC power switch are three separate components, and
        wherein the power supply unit is connected to the machine control processor and in communication with the user interface module; and
    wherein the machine control processor and power distribution module communicate with the user interface module using an Ethernet connection.

2. The system of claim 1, wherein the machine control processor further comprising:
    a microprocessor; and
    a communication interface.

3. The system of claim 1, wherein the machine control processor controls the distribution of the product through control of the power distribution module and a control logic subsystem.

4. The system of claim 1, wherein the power distribution module supplys power to the machine control processor through the power supply unit.

5. The system of claim 1, wherein the communication between the machine control processor and the user interface is a wireless communication.

6. The system of claim 1, wherein the communication between the machine control processor and the user interface is a wired communication.

7. A method for controlling selection and distribution of a product from a product dispensing system comprising:
  providing a flow control device configured to regulate a first ingredient, the flow control device comprising:
    a flow measuring device configured to provide a feedback signal based upon a volume of the first ingredient flowing within the flow control device; and
    a variable line impedance configured to regulate the first ingredient based upon, at least in part, the feedback signal of the flow measuring device and the first control signal provided by the controller; a pump module configured to be coupled to a supply of a second ingredient;
  providing a controller configured to provide a first control signal to the flow control device for controlling the supply of a first quantity of the first ingredient based upon, at least in part, a predetermined recipe, and to provide a second control signal to the pump module for controlling the supply of a first quantity of the second ingredient based upon, at least in part, the predetermined recipe;
  prompting a selection of the product on a user interface module;
  communicating the selection from the user interface module to a machine control processor; and
  dispensing the product under the control of the machine control processor and a power distribution module, the power distribution module comprising:
    a power supply unit;
    a power distribution control; and
    an AC power switch,
    wherein the power supply unit, power distribution control and the AC power switch are three separate components, and
  wherein the power distribution module in communication with the user interface module, and
  wherein the machine control processor and power distribution module communicate with the user interface module using an Ethernet connection.

8. The method of claim 7, wherein the machine control processor further comprising:
  a microprocessor; and
  a communication interface.

9. The method of claim 7, wherein the selection is communicated to the user interface from a wireless device.

10. The method of claim 9, wherein the wireless device selects the product from the user interface using a downloaded application.

11. The method of claim 9, wherein the wireless device is a device from the group comprising a smartphone, a desktop computer, a laptop computer, an MP3 player, and a tablet computer.

12. The method of claim 7, wherein the selection communication from the user interface to the machine control processor is a wireless communication.

* * * * *